(12) United States Patent
Qin et al.

(10) Patent No.: US 12,435,348 B2
(45) Date of Patent: Oct. 7, 2025

(54) MICROBIAL CELLS FOR SPERMIDINE PRODUCTION

(71) Applicant: CHRYSEA LIMITED, Dublin (IE)

(72) Inventors: Jiufu Qin, Virum (DK); Anastasia Krivoruchko, Gothenburg (SE); Florian David, Gothenburg (SE); Jens Nielsen, Gothenburg (SE)

(73) Assignee: CHRYSEA LIMITED, Dublin (IE)

( * ) Notice: Subject to any disclaimer, the term of this patent is extended or adjusted under 35 U.S.C. 154(b) by 861 days.

(21) Appl. No.: 16/629,643

(22) PCT Filed: Jul. 13, 2018

(86) PCT No.: PCT/SE2018/050763
§ 371 (c)(1),
(2) Date: Jan. 9, 2020

(87) PCT Pub. No.: WO2019/013696
PCT Pub. Date: Jan. 17, 2019

(65) Prior Publication Data
US 2020/0270654 A1  Aug. 27, 2020

(30) Foreign Application Priority Data
Jul. 14, 2017 (SE) .................... 1750933-2

(51) Int. Cl.
| | | |
|---|---|---|
| C12P 13/00 | (2006.01) | |
| A23L 33/135 | (2016.01) | |
| C07K 14/395 | (2006.01) | |
| C12N 9/06 | (2006.01) | |
| C12N 9/10 | (2006.01) | |
| C12N 9/12 | (2006.01) | |
| C12N 9/88 | (2006.01) | |

(52) U.S. Cl.
CPC ........... *C12P 13/001* (2013.01); *A23L 33/135* (2016.08); *C07K 14/395* (2013.01); *C12N 9/0028* (2013.01); *C12N 9/1077* (2013.01); *C12N 9/1085* (2013.01); *C12N 9/1096* (2013.01); *C12N 9/1252* (2013.01); *C12N 9/88* (2013.01); *C12Y 105/0102* (2013.01); *C12Y 204/02028* (2013.01); *C12Y 205/01006* (2013.01); *C12Y 205/01016* (2013.01); *C12Y 205/01022* (2013.01); *C12Y 206/01001* (2013.01); *C12Y 207/07007* (2013.01); *C12Y 401/0105* (2013.01); *A23V 2002/00* (2013.01)

(58) Field of Classification Search
None
See application file for complete search history.

(56) References Cited

U.S. PATENT DOCUMENTS

2004/0110772 A1* 6/2004 Furneaux ................ A61P 43/00
514/262.1

FOREIGN PATENT DOCUMENTS

| WO | 01/09358 | 2/2001 |
| WO | 2016/144247 | 9/2016 |

OTHER PUBLICATIONS

Inoue, "Branced-Chain Amino Acid Aminotransferase of *Escherichia coli*: Overproduction and Properties", Journal of Biochemistry, 1988, vol. 104, Issue 5, 777-784. (Year: 1988).*
Bartasun ("A study on the Interaction of Rhodamine B with Methylthioadenosine Phosphorylase Protein Sourced from an Antarctic Soil Metagenomic Library", Plos One, 2013, vol. 8 Is. 1, e55697, 1-11) (Year: 2013).*
Xie ("Spermidine Biosynthesis in *Esherichia coli*: Promoter and Termination Regions of the speED Operon", Journal of Bacteriology, 1989, vol. 171, No. 8, 4457-4465) (Year: 1989).*
ATCC ("*Escherichia coli* (Migula) Castellani and Chalmers 47090™" available at https://www.atcc.org/products/47090#detailed-product-information, accessed on Dec. 17, 2022). (Year: 2022).*
Donoviel ("Isolation and Identification of Genes Activating UAS2-Dependent ADH2 Expression in *Saccharomyces cerevisiae*", Genetics, 143, 1137-1148 (1996)). (Year: 1996).*
Chattopadhyay ("Studies on the regulation of ornithine decarboxylase in yeast: Effect of deletion in the MEU1 gene" PNAS, vol. 102, No. 45, (2005), 16158-16163 (Year: 2005).*
YMDB ("Multicopy enhancer of UAS2", Yeast Metabolome Database, The Metabolomics Innovation Center, Canada, available at www.ymdb.ca/proteins/Q07938, accessed on Jun. 29, 2023) (Year: 2023).*
Kim ("Metabolic engineering of *Saccharomyces cerevisiae* for production of spermiding under optimal culture conditions", Enzyme and Microbial Technology, 101 (2017), 30-35, Published Mar. 19, 2017) (Year: 2017).*
Albers ("Metabolic Characteristics and Importance of the Universal Methionine Salvage Pathway Recycling Methionine from 5'-Methylthioadenosine", Life, 61(12), 1132-1142, Dec. 2009). (Year: 2009).*
International Search Report and Written Opinion corresponding to International Patent Application No. PCT/SE2018/050763, mailed Oct. 16, 2018, 9 pages.
International Preliminary Report on Patentability corresponding to International Application No. PCT/SE2018/050763, dated Jan. 14, 2020, 6 pages.
Canelas, André B., et al., "Quantitative Evaluation of Intracellular Metabolite Extraction Techniques for Yeast Metabolomics", Analytical Chemistry, 81(17):7379-7389 (2009).
Chen, Yun , et al., "Establishing a platform cell factory through engineering of yeast acetyl-CoA metabolism", Metabolic Engineering, 15:48-54 (2013).
Gibson, Daniel G., et al., "Enzymatic assembly of DNA molecules up to several hundred kilobases", Nature Methods, 6(5):343-345 (2009).

(Continued)

Primary Examiner — Robert J Yamasaki
Assistant Examiner — Charles Zoltan Constantine
(74) Attorney, Agent, or Firm — Myers Bigel, P.A.

(57) ABSTRACT

The present invention generally related to a modified microbial cell capable of producing high levels of spermidine and/spermidine derivatives. The genetically modified microbial cell comprises at least one modification to native spermidine biosynthetic pathway via putrescine together with genes involved in the S-adenosylmethionine biosyntheticpathway.

22 Claims, 11 Drawing Sheets
Specification includes a Sequence Listing.

(56) References Cited

OTHER PUBLICATIONS

Gietz, R. Daniel, et al., "High-efficiency yeast transformation using the LiAc/SS carrier DNA/PEG method", Nature Protocols, 2(1):31-34 (2007).

Kim, Sun-Ki, et al., "Enhanced ethanol fermentation by engineered Saccharomyces cerevisiae strains with high spermidine contents", Bioprocess and Biosystems Engineering, 40(5):683-691 (2017).

Kim, Sun-Ki, et al., "Enhanced tolerance of Saccharomyces cerevisiae to multiple lignocellulose-derived inhibitors through modulation of spermidine contents", Metabolic Engineering, 29:46-55 (2015).

Kim, Sun-Ki, et al., "Metabolic engineering of Saccharomyces cerevisiae for production of spermidine under optimal culture conditions", Enzyme and Microbial Technology, 101:30-35 (2017).

Mumberg, Dominik, et al., "Yeast vectors for the controlled expression of heterologous proteins in different genetic backgrounds", Gene, 156(1):119-122 (1995).

Qin, Jiufu, et al., "Modular pathway rewiring of Saccharomyces cerevisiae enables high-level production of L- ornithine", Journal of Nature Communications, 6(8224):1-11 (2015).

Scalcinati, Gionata, et al., "Dynamic control of gene expression in Saccharomyces cerevisiae engineered for the production of plant sesquitepene α-santalene in a fed-batch mode", Metabolic Engineering, 14:91-103 (2012).

Schneider, Jens, et al., "Putrescine production by engineered Corynebacterium glutamicum", Applied Microbiology and Biotechnology, 88(4):859-868 (2010).

Shao, Zengyi, et al., "DNA assembler, an in vivo genetic method for rapid construction of biochemical pathways", Nucleic Acids Research, 37(2):e16 (2009).

\* cited by examiner

SEQUENCE LISTING

<160> NUMBER OF SEQ ID NOS: 152

<210> SEQ ID NO 1
<211> LENGTH: 411
<212> TYPE: PRT
<213> ORGANISM: Artificial
<220> FEATURE:
<223> OTHER INFORMATION: Streptomyces spectabilis mutated

<400> SEQUENCE: 1

```
Met Ser Arg Arg Leu Phe Thr Ser Glu Ser Val Thr Glu Gly His Pro
1               5                   10                  15

Asp Arg Ile Ala Asp Gln Ile Ser Asp Thr Ile Leu Asp Ala Pro Leu
            20                  25                  30

Arg Glu Asp Pro Thr Ser Arg Val Ala Val Glu Thr Leu Ile Thr Thr
        35                  40                  45

Gly Leu Val His Val Ala Gly Glu Val Thr Thr Lys Ala Tyr Ala Pro
    50                  55                  60

Val Ala Gln Leu Val Arg Glu Lys Ile Leu Glu Ile Gly Tyr Asp Ser
65                  70                  75                  80

Ser Lys Lys Gly Phe Asp Gly Ala Ser Cys Gly Val Ser Val Ser Ile
                85                  90                  95

Gly Ala Gln Ser Pro Asp Ile Ala Gln Gly Val Asp Thr Ala Tyr Glu
            100                 105                 110

Ser Arg Val Glu Gly Asp Glu Asp Glu Leu Asp Arg Gln Gly Ala Gly
        115                 120                 125

Asp Gln Gly Leu Met Phe Gly Tyr Ala Cys Asp Glu Thr Pro Glu Leu
    130                 135                 140

Met Pro Leu Pro Ile His Leu Ala His Arg Leu Ser Arg Arg Leu Ser
145                 150                 155                 160

Glu Val Arg Lys Asn Gly Thr Ile Pro Tyr Leu Arg Pro Asp Gly Lys
                165                 170                 175

Thr Gln Val Thr Ile Glu Tyr Asp Gly Asp Lys Ala Val Arg Leu Asp
            180                 185                 190

Thr Val Val Ser Ser Gln His Ala Ser Asp Ile Asp Leu Glu Ser
        195                 200                 205

Leu Leu Ala Pro Asp Ile Arg Glu Phe Val Val Glu Pro Glu Leu Lys
    210                 215                 220

Ala Leu Val Glu Asp Gly Ile Lys Leu Glu Thr Glu Gly Tyr Arg Leu
225                 230                 235                 240

Leu Val Asn Pro Thr Gly Arg Phe Glu Ile Gly Gly Pro Met Gly Asp
                245                 250                 255

Ala Gly Leu Thr Gly Arg Lys Ile Ile Ile Asp Thr Tyr Gly Gly Met
            260                 265                 270

Ser Arg His Gly Gly Gly Ala Phe Ser Gly Lys Asp Pro Ser Lys Val
        275                 280                 285

Asp Arg Ser Ala Ala Tyr Ala Met Arg Trp Val Ala Lys Asn Val Val
    290                 295                 300

Ala Ala Gly Leu Ala Ser Arg Cys Glu Val Gln Val Ala Tyr Ala Ile
305                 310                 315                 320

Gly Lys Ala Glu Pro Val Gly Leu Phe Val Glu Thr Phe Gly Thr Asn
                325                 330                 335

Thr Ile Asp Thr Gly Lys Ile Glu Gln Ala Ile Ser Glu Val Phe Asp
            340                 345                 350

Leu Arg Pro Ala Ala Ile Ile Arg Asp Leu Asp Leu Leu Arg Pro Ile
```

```
                355                 360                 365
Tyr Ser Gln Thr Ala Ala Tyr Gly His Phe Gly Arg Ser Leu Pro Glu
    370                 375                 380

Phe Thr Trp Glu Lys Thr Asp Arg Val Asp Gly Cys Gly Arg Pro Pro
385                 390                 395                 400

Val Trp Arg Ala Asp Leu Leu Pro Leu Val His
                405                 410

<210> SEQ ID NO 2
<211> LENGTH: 384
<212> TYPE: PRT
<213> ORGANISM: Artificial
<220> FEATURE:
<223> OTHER INFORMATION: Saccharomyces cerevisiae mutated

<400> SEQUENCE: 2

Met Ser Lys Ser Lys Thr Phe Leu Phe Thr Ser Glu Ser Val Gly Glu
1               5                   10                  15

Gly His Pro Asp Arg Ile Cys Asp Gln Val Ser Asp Ala Ile Leu Asp
                20                  25                  30

Ala Cys Leu Glu Gln Asp Pro Phe Ser Lys Val Ala Cys Glu Thr Ala
            35                  40                  45

Ala Lys Thr Gly Met Ile Met Val Phe Gly Glu Ile Thr Thr Lys Ala
        50                  55                  60

Arg Leu Asp Tyr Gln Gln Ile Val Arg Asp Thr Ile Lys Lys Ile Gly
65                  70                  75                  80

Tyr Asp Asp Ser Ala Lys Gly Phe Asp Tyr Lys Thr Cys Asn Val Leu
                85                  90                  95

Val Ala Ile Glu Gln Gln Ser Pro Asp Ile Ala Gln Gly Leu His Tyr
            100                 105                 110

Glu Lys Ser Leu Glu Asp Leu Gly Ala Gly Asp Gln Gly Ile Met Phe
        115                 120                 125

Gly Tyr Ala Thr Asp Glu Thr Pro Glu Gly Leu Pro Leu Thr Ile Leu
130                 135                 140

Leu Ala His Lys Leu Asn Met Ala Met Ala Asp Ala Arg Arg Asp Gly
145                 150                 155                 160

Ser Leu Pro Trp Leu Arg Pro Asp Thr Lys Thr Gln Val Thr Val Glu
                165                 170                 175

Tyr Glu Asp Asp Asn Gly Arg Trp Val Pro Lys Arg Ile Asp Thr Val
            180                 185                 190

Val Ile Ser Ala Gln His Ala Asp Glu Ile Ser Thr Ala Asp Leu Arg
        195                 200                 205

Thr Gln Leu Gln Lys Asp Ile Val Glu Lys Val Ile Pro Lys Asp Met
210                 215                 220

Leu Asp Glu Asn Thr Lys Tyr Phe Ile Gln Pro Ser Gly Arg Phe Val
225                 230                 235                 240

Ile Gly Gly Pro Gln Gly Asp Ala Gly Leu Thr Gly Arg Lys Ile Ile
                245                 250                 255

Val Asp Ala Tyr Gly Gly Ala Ser Ser Val Gly Gly Gly Ala Phe Ser
            260                 265                 270

Gly Lys Asp Tyr Ser Lys Val Asp Arg Ser Ala Ala Tyr Ala Ala Arg
        275                 280                 285

Trp Val Ala Lys Ser Leu Val Ala Ala Gly Leu Cys Lys Arg Val Gln
290                 295                 300

Val Gln Phe Ser Tyr Ala Ile Gly Ile Ala Glu Pro Leu Ser Leu His
```

```
                305                 310                 315                 320
Val Asp Thr Tyr Gly Thr Ala Thr Lys Ser Asp Asp Glu Ile Ile Glu
                    325                 330                 335

Ile Ile Lys Lys Asn Phe Asp Leu Arg Pro Gly Val Leu Val Lys Glu
                340                 345                 350

Leu Asp Leu Ala Arg Pro Ile Tyr Leu Pro Thr Ala Ser Tyr Gly His
                355                 360                 365

Phe Thr Asn Gln Glu Tyr Ser Trp Glu Lys Pro Lys Lys Leu Glu Phe
            370                 375                 380

<210> SEQ ID NO 3
<211> LENGTH: 599
<212> TYPE: PRT
<213> ORGANISM: Artificial
<220> FEATURE:
<223> OTHER INFORMATION: Chimeric construct

<400> SEQUENCE: 3

Met Lys Ile Thr Glu Lys Leu Glu Gln His Arg Gln Thr Ser Gly Lys
1               5                   10                  15

Pro Thr Tyr Ser Phe Glu Tyr Phe Val Pro Lys Thr Thr Gln Gly Val
                20                  25                  30

Gln Asn Leu Tyr Asp Arg Met Asp Arg Met Tyr Glu Ala Ser Leu Pro
            35                  40                  45

Gln Phe Ile Asp Ile Thr Trp Asn Ala Gly Gly Arg Leu Ser His
        50                  55                  60

Leu Ser Thr Asp Leu Val Ala Thr Ala Gln Ser Val Leu Gly Leu Glu
65                  70                  75                  80

Thr Cys Met His Leu Thr Cys Thr Asn Met Pro Ile Ser Met Ile Asp
                85                  90                  95

Asp Ala Leu Glu Asn Ala Tyr His Ser Gly Cys Gln Asn Ile Leu Ala
                100                 105                 110

Leu Arg Gly Asp Pro Pro Arg Asp Ala Glu Asn Trp Thr Pro Val Glu
            115                 120                 125

Gly Gly Phe Gln Tyr Ala Lys Asp Leu Ile Lys Tyr Ile Lys Ser Lys
        130                 135                 140

Tyr Gly Asp His Phe Ala Ile Gly Val Ala Gly Tyr Pro Glu Cys His
145                 150                 155                 160

Pro Glu Leu Pro Asn Lys Asp Val Lys Leu Asp Leu Glu Tyr Leu Lys
                165                 170                 175

Gln Lys Ile Asp Ala Gly Gly Asp Phe Ile Ile Thr Gln Met Phe Tyr
            180                 185                 190

Asp Val Asp Asn Phe Ile Asn Trp Cys Ser Gln Val Arg Ala Ala Gly
        195                 200                 205

Met Asp Val Pro Ile Ile Pro Gly Ile Met Pro Ile Thr Thr Tyr Ala
210                 215                 220

Ala Phe Leu Arg Arg Ala Gln Trp Gly Gln Ile Ser Ile Pro Gln His
225                 230                 235                 240

Phe Ser Ser Arg Leu Asp Pro Ile Lys Asp Asp Glu Leu Val Arg
                245                 250                 255

Asp Ile Gly Thr Asn Leu Ile Val Glu Met Cys Gln Lys Leu Leu Asp
            260                 265                 270

Ser Gly Tyr Val Ser His Leu His Ile Tyr Thr Met Asn Leu Glu Lys
        275                 280                 285

Ala Pro Leu Met Ile Leu Glu Arg Leu Asn Ile Leu Pro Thr Glu Ser
```

```
            290                 295                 300
Glu Phe Asn Ala His Pro Leu Ala Val Leu Pro Trp Arg Lys Ser Leu
305                 310                 315                 320

Asn Pro Lys Arg Lys Asn Glu Glu Val Arg Pro Ile Phe Val Arg Pro
                325                 330                 335

Ile Phe Trp Ala Asn Arg Pro Lys Ser Tyr Ile Ser Arg Thr Lys Gly
            340                 345                 350

Trp Asn Asp Phe Pro His Gly Arg Trp Gly Asp Ser His Ser Ala Ala
                355                 360                 365

Tyr Ser Thr Leu Ser Asp Tyr Gln Phe Ala Arg Pro Lys Gly Arg Asp
            370                 375                 380

Lys Lys Leu Gln Gln Glu Trp Val Val Pro Leu Lys Ser Ile Glu Asp
385                 390                 395                 400

Val Gln Glu Lys Phe Lys Glu Leu Cys Ile Gly Asn Leu Lys Ser Ser
                405                 410                 415

Pro Trp Ser Glu Leu Asp Gly Leu Gln Pro Glu Thr Lys Ile Ile Asn
            420                 425                 430

Glu Gln Leu Gly Lys Ile Asn Ser Asn Gly Phe Leu Thr Ile Asn Ser
            435                 440                 445

Gln Pro Ser Val Asn Ala Ala Lys Ser Asp Ser Pro Ala Ile Gly Trp
        450                 455                 460

Gly Gly Pro Gly Gly Tyr Val Tyr Gln Lys Ala Tyr Leu Glu Phe Phe
465                 470                 475                 480

Cys Ser Lys Asp Lys Leu Asp Thr Leu Val Glu Lys Ser Lys Ala Phe
                485                 490                 495

Pro Ser Ile Thr Tyr Met Ala Val Asn Lys Ser Glu Asn Trp Val Ser
            500                 505                 510

Asn Thr Gly Glu Ser Asp Val Asn Ala Val Thr Trp Gly Val Phe Pro
            515                 520                 525

Ala Lys Glu Val Ile Gln Pro Thr Ile Val Asp Pro Ala Ser Phe Lys
        530                 535                 540

Val Trp Lys Asp Glu Ala Phe Glu Ile Trp Ser Arg Ser Trp Ala Asn
545                 550                 555                 560

Leu Tyr Pro Glu Asp Asp Pro Ser Arg Lys Leu Leu Glu Glu Val Lys
                565                 570                 575

Asn Ser Tyr Tyr Leu Val Ser Leu Val Asp Asn Asn Tyr Ile Asn Gly
            580                 585                 590

Asp Ile Phe Ser Val Phe Ala
        595

<210> SEQ ID NO 4
<211> LENGTH: 510
<212> TYPE: PRT
<213> ORGANISM: Artificial
<220> FEATURE:
<223> OTHER INFORMATION: Ashbya gossypii mutated

<400> SEQUENCE: 4

Met Cys Gly Ile Leu Gly Val Val Leu Ala Asp Gln Ser Lys Val Val
1               5                   10                  15

Ala Pro Glu Leu Phe Asp Gly Ser Leu Phe Leu Gln His Arg Gly Gln
                20                  25                  30

Asp Ala Ala Gly Ile Ala Thr Cys Gly Pro Gly Gly Arg Leu Tyr Gln
            35                  40                  45

Cys Lys Gly Asn Gly Met Ala Arg Asp Val Phe Thr Gln Ala Arg Met
```

```
                50                  55                  60
Ser Gly Leu Val Gly Ser Met Gly Ile Ala His Leu Arg Tyr Pro Thr
65                  70                  75                  80

Ala Gly Ser Ser Ala Asn Ser Glu Ala Gln Pro Phe Tyr Val Asn Ser
                85                  90                  95

Pro Tyr Gly Ile Cys Met Ser His Asn Gly Asn Leu Val Asn Thr Met
            100                 105                 110

Ser Leu Arg Arg Tyr Leu Asp Glu Asp Val His Arg His Ile Asn Thr
        115                 120                 125

Asp Ser Asp Ser Glu Leu Leu Leu Asn Ile Phe Ala Ala Glu Leu Glu
    130                 135                 140

Lys Tyr Asn Lys Tyr Arg Val Asn Asn Asp Asp Ile Phe Cys Ala Leu
145                 150                 155                 160

Glu Gly Val Tyr Lys Arg Cys Arg Gly Tyr Ala Cys Val Gly Met
                165                 170                 175

Leu Ala Gly Tyr Gly Leu Phe Gly Phe Arg Asp Pro Asn Gly Ile Arg
            180                 185                 190

Pro Leu Leu Phe Gly Glu Arg Val Asn Asp Asp Gly Thr Met Asp Tyr
        195                 200                 205

Met Leu Ala Ser Glu Ser Val Val Leu Lys Ala His Arg Phe Gln Asn
    210                 215                 220

Ile Arg Asp Ile Leu Pro Gly Gln Ala Val Ile Pro Lys Thr Cys
225                 230                 235                 240

Gly Ser Ser Pro Pro Glu Phe Arg Gln Val Val Pro Ile Glu Ala Tyr
                245                 250                 255

Lys Pro Asp Leu Phe Glu Tyr Val Tyr Phe Ala Arg Ala Asp Ser Val
            260                 265                 270

Leu Asp Gly Ile Ser Val Tyr His Thr Arg Leu Leu Met Gly Ile Lys
        275                 280                 285

Leu Ala Glu Asn Ile Lys Lys Gln Ile Asp Leu Asp Glu Ile Asp Val
    290                 295                 300

Val Val Ser Val Pro Val Thr Ala Arg Thr Cys Ala Leu Glu Cys Ala
305                 310                 315                 320

Asn His Leu Asn Lys Pro Tyr Arg Glu Gly Phe Val Gln Asn Arg Tyr
                325                 330                 335

Val Gly Arg Thr Phe Ile Met Pro Asn Gln Lys Glu Arg Val Ser Ser
            340                 345                 350

Val Arg Arg Lys Leu Asn Pro Met Asn Ser Glu Phe Lys Asp Lys Arg
        355                 360                 365

Val Leu Ile Val Asp Asp Ser Ile Val Arg Gly Thr Thr Ser Lys Glu
    370                 375                 380

Ile Val Asn Met Ala Lys Glu Ser Gly Ala Ala Lys Val Tyr Phe Ala
385                 390                 395                 400

Ser Ala Ala Pro Ala Ile Arg Phe Asn His Ile Tyr Gly Ile Asp Leu
                405                 410                 415

Trp Asp Thr Lys Gln Leu Val Ala Tyr Asn Arg Thr Val Glu Glu Ile
            420                 425                 430

Thr Ala Glu Leu Gly Cys Asp Arg Val Ile Tyr Gln Ser Leu Asp Asp
        435                 440                 445

Leu Ile Asp Cys Cys Lys Thr Asp Ile Ile Ser Glu Phe Glu Val Gly
    450                 455                 460

Val Phe Thr Gly Asn Tyr Val Thr Gly Val Glu Asp Val Tyr Leu Gln
465                 470                 475                 480
```

```
Glu Leu Glu Arg Cys Arg Ala Leu Asn Asn Ser Asn Lys Gly Glu Ala
                485                 490                 495

Lys Ala Glu Val Asp Ile Gly Leu Tyr Asn Ser Ala Asp Tyr
            500                 505                 510

<210> SEQ ID NO 5
<211> LENGTH: 476
<212> TYPE: PRT
<213> ORGANISM: Artificial
<220> FEATURE:
<223> OTHER INFORMATION: Bacillus subtillis mutated

<400> SEQUENCE: 5

Met Leu Ala Glu Ile Lys Gly Leu Asn Glu Glu Cys Gly Val Phe Gly
1               5                   10                  15

Ile Trp Gly His Glu Glu Ala Pro Gln Ile Thr Tyr Tyr Gly Leu His
            20                  25                  30

Ser Leu Gln His Arg Gly Gln Glu Gly Ala Gly Ile Val Ala Thr Asp
        35                  40                  45

Gly Glu Lys Leu Thr Ala His Lys Gly Gln Gly Leu Ile Thr Glu Val
    50                  55                  60

Phe Gln Asn Gly Glu Leu Ser Lys Val Lys Gly Lys Gly Ala Ile Gly
65                  70                  75                  80

His Val Arg Tyr Ala Thr Ala Gly Gly Gly Tyr Glu Asn Val Gln
                85                  90                  95

Pro Leu Leu Phe Arg Ser Gln Asn Asn Gly Ser Leu Ala Leu Ala His
            100                 105                 110

Asn Gly Asn Leu Val Asn Ala Thr Gln Leu Lys Gln Gln Leu Glu Asn
        115                 120                 125

Gln Gly Ser Ile Phe Gln Thr Ser Ser Asp Thr Glu Val Leu Ala His
    130                 135                 140

Leu Ile Lys Arg Ser Gly His Phe Thr Leu Lys Asp Gln Ile Lys Asn
145                 150                 155                 160

Ser Leu Ser Met Leu Lys Gly Ala Tyr Ala Phe Leu Ile Met Thr Glu
                165                 170                 175

Thr Glu Met Ile Val Ala Leu Asp Pro Asn Gly Leu Arg Pro Leu Ser
            180                 185                 190

Ile Gly Met Met Gly Asp Ala Tyr Val Val Ala Ser Glu Thr Cys Ala
        195                 200                 205

Phe Asp Val Val Gly Ala Thr Tyr Leu Arg Glu Val Glu Pro Gly Glu
    210                 215                 220

Met Leu Ile Ile Asn Asp Glu Gly Met Lys Ser Glu Arg Phe Ser Met
225                 230                 235                 240

Asn Ile Asn Arg Ser Ile Cys Ser Met Glu Tyr Ile Tyr Phe Ser Arg
                245                 250                 255

Pro Asp Ser Asn Ile Asp Gly Ile Asn Val His Ser Ala Arg Lys Asn
            260                 265                 270

Leu Gly Lys Met Leu Ala Gln Glu Ser Ala Val Glu Ala Asp Val Val
        275                 280                 285

Thr Gly Val Pro Val Ser Ser Ile Ser Ala Ala Ile Gly Tyr Ala Glu
    290                 295                 300

Ala Thr Gly Ile Pro Tyr Glu Leu Gly Leu Ile Gln Asn Arg Tyr Val
305                 310                 315                 320

Gly Arg Thr Phe Ile Gln Pro Ser Gln Ala Leu Arg Glu Gln Gly Val
                325                 330                 335
```

```
Arg Met Lys Leu Ser Ala Val Arg Gly Val Val Glu Gly Lys Arg Val
                340                 345                 350

Val Met Val Asp Asp Ser Ile Val Arg Gly Thr Thr Ser Arg Arg Ile
                355                 360                 365

Val Thr Met Leu Arg Glu Ala Gly Ala Thr Glu Val His Val Lys Ile
            370                 375                 380

Ser Ser Pro Pro Ile Ala His Pro Cys Phe Tyr Gly Ile Asp Thr Ser
385                 390                 395                 400

Thr His Glu Glu Leu Ile Ala Ser Ser His Ser Val Glu Glu Ile Arg
                405                 410                 415

Gln Glu Ile Gly Ala Asp Thr Leu Ser Phe Leu Ser Val Glu Gly Leu
            420                 425                 430

Leu Lys Gly Ile Gly Arg Lys Tyr Asp Asp Ser Asn Cys Gly Gln Cys
        435                 440                 445

Leu Ala Cys Phe Thr Gly Lys Tyr Pro Thr Glu Ile Tyr Gln Asp Thr
450                 455                 460

Val Leu Pro His Val Lys Glu Ala Val Leu Thr Lys
465                 470                 475

<210> SEQ ID NO 6
<211> LENGTH: 527
<212> TYPE: PRT
<213> ORGANISM: Artificial
<220> FEATURE:
<223> OTHER INFORMATION: Saccharomyces cerevisiae mutated

<400> SEQUENCE: 6

Met Pro Met Asp Phe Gln Pro Thr Ser Ser His Ser Asn Trp Val Val
1               5                   10                  15

Gln Lys Phe Gly Gly Thr Ser Val Gly Lys Phe Pro Val Gln Ile Val
                20                  25                  30

Asp Asp Ile Val Lys His Tyr Ser Lys Pro Asp Gly Pro Asn Asn Asn
            35                  40                  45

Val Ala Val Val Cys Ser Ala Arg Ser Ser Tyr Thr Lys Ala Glu Gly
        50                  55                  60

Thr Thr Ser Arg Leu Leu Lys Cys Cys Asp Leu Ala Ser Gln Glu Ser
65                  70                  75                  80

Glu Phe Gln Asp Ile Ile Glu Val Ile Arg Gln Asp His Ile Asp Asn
                85                  90                  95

Ala Asp Arg Phe Ile Leu Asn Pro Ala Leu Gln Ala Lys Leu Val Asp
            100                 105                 110

Asp Thr Asn Lys Glu Leu Glu Leu Val Lys Lys Tyr Leu Asn Ala Ser
        115                 120                 125

Lys Val Leu Gly Glu Val Ser Ser Arg Thr Val Asp Leu Val Met Ser
    130                 135                 140

Cys Gly Glu Lys Leu Ser Cys Leu Phe Met Thr Ala Leu Cys Asn Asp
145                 150                 155                 160

Arg Gly Cys Lys Ala Lys Tyr Val Asp Leu Ser His Ile Val Pro Ser
                165                 170                 175

Asp Phe Ser Ala Ser Ala Leu Asp Asn Ser Phe Tyr Thr Phe Leu Val
            180                 185                 190

Gln Ala Leu Lys Glu Lys Leu Ala Pro Phe Val Ser Ala Lys Glu Arg
        195                 200                 205

Ile Val Pro Val Phe Thr Gly Phe Phe Gly Leu Val Pro Thr Gly Leu
    210                 215                 220
```

```
Leu Asn Gly Val Gly Arg Gly Tyr Thr Asp Leu Cys Ala Ala Leu Ile
225                 230                 235                 240

Ala Val Ala Val Asn Ala Asp Glu Leu Gln Val Trp Lys Glu Val Asp
            245                 250                 255

Gly Ile Phe Thr Ala Asp Pro Arg Lys Val Pro Glu Ala Arg Leu Leu
        260                 265                 270

Asp Ser Val Thr Pro Glu Glu Ala Ser Glu Leu Thr Tyr Tyr Gly Ser
    275                 280                 285

Glu Val Ile His Pro Phe Thr Met Glu Gln Val Ile Arg Ala Lys Ile
290                 295                 300

Pro Ile Arg Ile Lys Asn Val Gln Asn Pro Leu Gly Asn Gly Thr Ile
305                 310                 315                 320

Ile Tyr Pro Asp Asn Val Ala Lys Lys Gly Glu Ser Thr Pro Pro His
                325                 330                 335

Pro Pro Glu Asn Leu Ser Ser Ser Phe Tyr Glu Lys Arg Lys Arg Gly
            340                 345                 350

Ala Thr Ala Ile Thr Thr Lys Asn Asp Ile Phe Val Ile Asn Ile His
        355                 360                 365

Ser Asn Lys Lys Thr Leu Ser His Gly Phe Leu Ala Gln Ile Phe Thr
370                 375                 380

Ile Leu Asp Lys Tyr Lys Leu Val Val Asp Leu Ile Ser Thr Phe Glu
385                 390                 395                 400

Val His Val Ser Met Ala Leu Pro Ile Pro Asp Ala Asp Ser Leu Lys
                405                 410                 415

Ser Leu Arg Gln Ala Glu Glu Lys Leu Arg Ile Leu Gly Ser Val Asp
            420                 425                 430

Ile Thr Lys Lys Leu Ser Ile Val Ser Leu Val Gly Lys His Met Lys
        435                 440                 445

Gln Tyr Ile Gly Ile Ala Gly Thr Met Phe Thr Thr Leu Ala Glu Glu
    450                 455                 460

Gly Ile Asn Ile Glu Met Ile Ser Gln Gly Ala Asn Glu Ile Asn Ile
465                 470                 475                 480

Ser Cys Val Ile Asn Glu Ser Asp Ser Ile Lys Ala Leu Gln Cys Ile
                485                 490                 495

His Ala Lys Leu Leu Ser Glu Arg Thr Asn Thr Ser Asn Gln Phe Glu
            500                 505                 510

His Ala Ile Asp Glu Arg Leu Glu Gln Leu Lys Arg Leu Gly Ile
        515                 520                 525

<210> SEQ ID NO 7
<211> LENGTH: 812
<212> TYPE: PRT
<213> ORGANISM: Artificial
<220> FEATURE:
<223> OTHER INFORMATION: Xenorhabdus bovienii mutated

<400> SEQUENCE: 7

Met Ser Ala Leu Ala Thr Ala Gly Ala Glu Phe Gly Arg Gln Leu His
1               5                   10                  15

Lys Phe Gly Gly Ser Ser Leu Ala Asp Val Lys Cys Tyr Gln Arg Val
                20                  25                  30

Ala Glu Ile Met Ala Asn Tyr Ser Gln Pro Gly Asp Leu Met Val Val
            35                  40                  45

Ser Ala Ala Gly Ser Thr Thr Asn Gln Leu Ile Asp Trp Leu Lys Leu
50                  55                  60
```

```
Ser Gln Ser Asp Arg Ile Ser Ala His Gln Val Gln Ser Leu Arg
65                  70                  75                  80

Arg Tyr Gln Gln Glu Leu Ile Arg Gly Leu Leu Pro Glu Val Ile Ala
                85                  90                  95

Glu Glu Leu Val Ala His Phe Ile Ser Asp Leu Glu Lys Leu Ser Val
            100                 105                 110

Leu Leu Asp Lys Pro Ile Thr Asp Ile Thr Tyr Ala Glu Val Val Gly
            115                 120                 125

His Gly Glu Ile Trp Ser Ala Arg Leu Met Ala Ala Val Leu Glu His
        130                 135                 140

Lys Gly Ile Ser Ser Ala Trp Leu Asp Ala Arg Gln Phe Leu Arg Ala
145                 150                 155                 160

Glu Arg Ala Ala Gln Pro Gln Val Asp Val Asn Leu Ser Gln Pro Leu
                165                 170                 175

Leu Ser Gln Leu Leu Ile Gln Asn Pro Ser Lys Arg Leu Val Val Thr
            180                 185                 190

Gly Phe Ile Ser Arg Asn Gln Lys Gly Glu Thr Val Leu Leu Gly Arg
        195                 200                 205

Asn Gly Ser Asp Tyr Ser Ala Thr Gln Val Gly Ala Leu Ala Gly Ala
    210                 215                 220

Lys Lys Val Thr Ile Trp Ser Asp Val Ala Gly Val Tyr Ser Ala Asp
225                 230                 235                 240

Pro Arg Lys Val Lys Asp Ala Cys Leu Leu Pro Leu Leu Arg Leu Asp
                245                 250                 255

Lys Ala Ser Glu Leu Ala Arg Leu Ala Ala Pro Val Leu His Thr Arg
            260                 265                 270

Thr Leu Gln Pro Val Ser Val Ser Asp Ile Asp Leu Gln Leu Arg Cys
        275                 280                 285

Ser Tyr Gln Pro Glu Gln Gly Ser Thr Arg Ile Glu Arg Val Leu Ala
    290                 295                 300

Thr Gly Thr Gly Ala Lys Ile Val Thr Ser His Asp Asp Val Cys Leu
305                 310                 315                 320

Ile Glu Leu His Ile Ser Ser Ala His Asp Phe Lys Gln Ile Tyr Lys
                325                 330                 335

Asp Ile Asp Ser Leu Leu Lys Arg Ala Gln Ile Arg Pro Leu Ala Thr
            340                 345                 350

Gly Leu His Ala Asp Cys Asn Leu Ile Gln Leu Cys Tyr Thr Ser Glu
        355                 360                 365

Val Val Asn Ser Ala Leu Asp Val Leu Gln Asp Ala Ser Leu Pro Gly
    370                 375                 380

Lys Leu Ser Leu Arg Glu Gly Leu Ala Leu Val Ala Leu Val Gly Ala
385                 390                 395                 400

Gly Val Cys Lys Asn Pro Leu His Ser His Arg Phe Tyr Gln Gln Leu
                405                 410                 415

Lys Asp Gln Pro Ile Glu Phe Ile Trp His Ala Glu Gly Ile Ser
            420                 425                 430

Leu Val Ala Val Leu Arg Leu Ser Gln Thr Ser His Leu Ile Gln Gly
        435                 440                 445

Leu His Gln Ser Leu Phe Arg Ala Glu Lys Arg Ile Gly Leu Val Leu
    450                 455                 460

Phe Gly Lys Gly Asn Ile Gly Ser Arg Trp Leu Glu Leu Phe Ala Arg
465                 470                 475                 480
```

Glu Gln Lys Asn Ile Ser Ala Arg Ser Gly Phe Glu Phe Ile Leu Ala
                485                 490                 495

Gly Ile Val Asp Ser Arg Arg Ser Leu Leu Asn Tyr Gln Gly Leu Asp
            500                 505                 510

Ala Ser Arg Ala Leu Ala Phe Phe Gly Asp Glu Ala Thr Gln His Glu
            515                 520                 525

Asp Asp Ala Leu Phe Leu Trp Met Arg Ala His Pro Tyr Asp Asp Leu
            530                 535                 540

Val Val Leu Asp Val Thr Ala Ser Glu Glu Leu Ala Lys Asp Tyr Ile
545                 550                 555                 560

Asp Phe Ala Ser Tyr Gly Phe His Val Ile Ser Ala Asn Lys Ile Ala
                565                 570                 575

Gly Ser Ser Asn Ser Asn Thr Tyr Arg Met Val Arg Asp Ala Phe Ala
            580                 585                 590

Lys Thr Gly Arg His Trp Leu Tyr Asn Ala Thr Val Gly Ala Gly Leu
            595                 600                 605

Pro Ile Asn His Ser Val Arg Asp Leu Arg Glu Ser Gly Asp Thr Ile
            610                 615                 620

Leu Ser Ile Ser Gly Ile Phe Ser Gly Thr Leu Ser Trp Leu Phe Leu
625                 630                 635                 640

Gln Phe Asp Gly Ser Val Pro Phe Ser Asp Leu Val Glu Gln Ala Trp
                645                 650                 655

Gln Gln Gly Leu Thr Glu Pro Asp Pro Arg Ile Asp Leu Ser Gly Gln
            660                 665                 670

Asp Val Met Arg Lys Leu Ile Ile Leu Ala Arg Glu Ala Gly Tyr Glu
            675                 680                 685

Ile Glu Pro Asp Gln Val Arg Val Glu Ser Leu Val Pro Val Glu Ala
            690                 695                 700

Arg Thr Gly Ser Ile Glu Asp Phe Phe Glu Asn Ser Ala Val Ile Asn
705                 710                 715                 720

Glu Gln Met Leu Gln Arg Leu Glu Ala Ser Gln Glu Met Gly Met Val
                725                 730                 735

Leu Arg Tyr Val Ala Arg Phe Asp Ala Thr Ser Gly Lys Ala Lys Val
            740                 745                 750

Gly Val Glu Ala Val Arg Ala Asp His Pro Leu Ala Ser Leu Leu Pro
            755                 760                 765

Gly Asp Asn Val Phe Ala Ile Glu Ser Arg Trp Tyr Arg Asp Asn Pro
            770                 775                 780

Leu Val Ile Arg Gly Pro Gly Ala Gly Arg Asp Val Thr Ala Gly Ala
785                 790                 795                 800

Ile Gln Ser Asp Leu Asn Arg Leu Ser Gln Leu Leu
                805                 810

<210> SEQ ID NO 8
<211> LENGTH: 457
<212> TYPE: PRT
<213> ORGANISM: Artificial
<220> FEATURE:
<223> OTHER INFORMATION: Xenorhabdus bovienii mutated

<400> SEQUENCE: 8

Met Cys Ala Val Ser Ser Thr Tyr Pro Gln Tyr Val Val Ala Lys Phe
1               5                   10                  15

Gly Gly Thr Ser Val Ala Asp Phe Asp Ala Met Asn His Cys Ala Asp
            20                  25                  30

-continued

```
Ile Ile Leu Ala Asn Ala Asp Val Arg Val Val Leu Ser Ala Ser
         35                  40                  45

Ala Gly Val Thr Asn Leu Leu Val Ala Leu Ala Thr Gly Cys Asp Asn
 50                  55                  60

Asp Lys Arg Lys Lys Cys Leu Lys Gln Ile Arg Asp Ile Gln Tyr Ala
 65                  70                  75                  80

Ile Ile Asp Arg Leu Asn Asp Val Asn Val Ile Cys Glu Glu Ile Asp
                 85                  90                  95

Arg Leu Leu Glu Asn Ile Glu Met Leu Ser Glu Ala Ala Ser Leu Ala
                100                 105                 110

Thr Ser Glu Ala Leu Thr Asp Glu Leu Val Ser His Gly Glu Val Met
            115                 120                 125

Ser Thr Leu Leu Phe Val Glu Leu Leu Arg Gln Arg Asn Val Asn Ala
    130                 135                 140

Glu Trp Phe Asp Ile Arg Arg Val Met Arg Thr Asn Asp His Phe Gly
145                 150                 155                 160

Arg Ala Glu Pro Asp Ser Leu Gln Leu His Ile Ser Ala Val Glu Leu
                165                 170                 175

Leu Gln Pro Arg Leu Asn Asn Thr Val Val Ile Thr Gln Gly Phe Ile
                180                 185                 190

Gly Arg Glu Glu Lys Gly Arg Thr Thr Thr Leu Gly Arg Gly Gly Ser
            195                 200                 205

Asp Tyr Thr Ala Ala Leu Leu Gly Glu Ala Leu Asn Leu Gln Arg Val
    210                 215                 220

Asp Ile Trp Thr Asp Val Pro Gly Ile Tyr Thr Thr Asp Pro Arg Val
225                 230                 235                 240

Ala Pro Thr Ala Lys Arg Ile Asp Lys Ile Ala Phe Asp Glu Ala Ala
                245                 250                 255

Lys Met Ala Thr Phe Gly Ala Lys Ile Leu His Pro Ala Thr Leu Leu
                260                 265                 270

Pro Ala Ile Arg Cys Gly Ile Pro Val Phe Val Gly Ser Ser Lys Asp
            275                 280                 285

Pro Gln Ala Gly Gly Thr Leu Val Cys Asp Lys Thr Glu Asn Pro Pro
    290                 295                 300

Leu Phe Arg Ala Leu Ala Leu Arg Arg Lys Gln Thr Leu Leu Thr Leu
305                 310                 315                 320

His Ser Leu Lys Met Leu His Ala Arg Gly Phe Leu Ala Glu Val Phe
                325                 330                 335

Thr Leu Leu Leu Arg His Asn Ile Ser Val Asp Leu Ile Thr Thr Ser
            340                 345                 350

Glu Val Ser Val Ala Leu Ile Leu Asp Thr Thr Gly Ser Thr Ser Thr
    355                 360                 365

Asn Gly Ser Leu Leu Thr Asn Ala Leu Leu Thr Glu Leu Ser Thr Leu
370                 375                 380

Cys Arg Val Glu Val Glu Glu Asp Leu Ala Leu Val Ala Ile Ile Gly
385                 390                 395                 400

Asn Glu Leu Ser Gln Ala Lys Gly Leu Gly Lys Glu Ile Phe Gly Thr
                405                 410                 415

Leu Glu Ser Phe Asn Ile Arg Met Ile Ser Tyr Gly Ala Ser Ser His
                420                 425                 430

Asn Val Cys Leu Leu Val Pro Gly Gln Asp Ala Glu Ser Val Ile Gln
            435                 440                 445

Lys Leu His Gln Asn Leu Phe Lys Val
```

<210> SEQ ID NO 9
<211> LENGTH: 146
<212> TYPE: PRT
<213> ORGANISM: Vitreoscilla sp

<400> SEQUENCE: 9

```
Met Leu Asp Gln Gln Thr Ile Asn Ile Ile Lys Ala Thr Val Pro Val
1               5                   10                  15

Leu Lys Glu His Gly Val Thr Ile Thr Thr Phe Tyr Lys Asn Leu
            20                  25                  30

Phe Ala Lys His Pro Glu Val Arg Pro Leu Phe Asp Met Gly Arg Gln
        35                  40                  45

Glu Ser Leu Glu Gln Pro Lys Ala Leu Ala Met Thr Val Leu Ala Ala
    50                  55                  60

Ala Gln Asn Ile Glu Asn Leu Pro Ala Ile Leu Pro Ala Val Lys Lys
65                  70                  75                  80

Ile Ala Val Lys His Cys Gln Ala Gly Val Ala Ala His Tyr Pro
                85                  90                  95

Ile Val Gly Gln Glu Leu Leu Gly Ala Ile Lys Glu Val Leu Gly Asp
            100                 105                 110

Ala Ala Thr Asp Asp Ile Leu Asp Ala Trp Gly Lys Ala Tyr Gly Val
        115                 120                 125

Ile Ala Asp Val Phe Ile Gln Val Glu Ala Asp Leu Tyr Ala Gln Ala
    130                 135                 140

Val Glu
145
```

<210> SEQ ID NO 10
<211> LENGTH: 1206
<212> TYPE: DNA
<213> ORGANISM: Artificial
<220> FEATURE:
<223> OTHER INFORMATION: Synthetic construct

<400> SEQUENCE: 10

| | | |
|---|---|---|
| atgaagaatt tgttgatcat cggtgctggt ggtgtttcaa gagttgctac tgttaagtgt | 60 |
| gcaatgaact ctgatacttt ttcaaagatc acattggctt caagaactaa gtcaaagtgt | 120 |
| gatgaaatcg ctgcttttat taaggaaaga ttgggtgttc aaattgaaac agctcaaatt | 180 |
| gatgcagatg attctaacgc tgttgttgaa ttgattaaga aaactggtgc tcaaattttg | 240 |
| ttgaacgttg cattgccata tcaagatttg tcattaatgg atgcttgtat caaggcaggt | 300 |
| atcgattacg ttgatacagc taactacgaa catccagatt tggcaaagtt cgaatacaag | 360 |
| gaacaatggg ctagaaacga tgagtttaaa caagcaggta ttttgggttt gttaggttct | 420 |
| ggttttgatc aggtgttac taatgttttc tgtgcttatg cacaacaaaa tttgttcgat | 480 |
| gaaatttcat acattgatat tttggattgt aatgctggag atcatggtta cgctttcgca | 540 |
| acaaacttca acccagaaat taatttgaga gaagtttctg caaaaggtag atattgggaa | 600 |
| aatggtaaat ggatcgaaac tcaaccaatg gaaattaaaa tggaatggga ttacccagaa | 660 |
| gttggtgtta aggattctta tttgttgtac catgaagaat tggaatcatt agttaaaaat | 720 |
| atcaagggtt tgaagagaat tagatttttc atgacatttg gtcaatctta tttgactcac | 780 |
| atgaagtgtt tagaaaacgt tggcatgttg ggtattaaac cagttatgca tcagggtaaa | 840 |
| gaaatcatcc caatcgaatt tttgaaaaca ttgttaccag atccagcttc attgggtcca | 900 |

| | | |
|---|---|---|
| agaactaagg gttacacaaa catcggttgt gttatcagag gtaaaaagga tggtaaagat | 960 |
| aagcaagttt acatctataa cgtttgtaat catgaagaat gttataaaga aacaggtgct | 1020 |
| caagcagttt catacactac aggtgttcca gctatgatcg gtactaaatt gatcgcaaag | 1080 |
| ggtatttggc agggtaaagg tgttttttaat atggaagaat tgatgctaa gccttttatg | 1140 |
| gaagaattaa attctcaagg tttaccttgg aagatcatcg aaatgactcc atcattgggt | 1200 |
| gaataa | 1206 |

<210> SEQ ID NO 11
<211> LENGTH: 1149
<212> TYPE: DNA
<213> ORGANISM: Artificial
<220> FEATURE:
<223> OTHER INFORMATION: Synthetic construct

<400> SEQUENCE: 11

| | |
|---|---|
| atgttttatg aaaagattca aactccagct tacattttgg aagaagataa attgagaaag | 60 |
| aattgtgaat tgttggcatc tatcggtgaa aaatcaggtg ctaaagtttt gttggcattg | 120 |
| aagggtttcg cttttctctgg tgcaatgaag atcgttggtg aatatttgaa gggttgtact | 180 |
| tgttcaggtt tatgggaggc taagttcgca aaggaataca tggataagga aattcataca | 240 |
| tactctccag cttttaaaga agatgaaatc ggtgaaattg catctttgtc acatcatatt | 300 |
| gttttaatt cattggctca attccataag tttcaatcta agactcagaa aaattctttg | 360 |
| ggtttaagat gtaacgttga attttctttg gctccaaagg aattatacaa cccatgtggt | 420 |
| agatactcaa gattgggtat tagagcaaag gatttcgaaa acgttgattt gtctactatc | 480 |
| gaaggtttgc attttcatgc tttatgtgaa gaatcagctg atgcattgga agcagttttg | 540 |
| aaggttttcg aagaaaagtt cggtaaatgg atcggtcaaa tgaaatgggt taattttggt | 600 |
| ggtggtcatc atatcactaa gaaaggttac gatgttgaaa aattgatcgc tttgtgtaag | 660 |
| aacttctctg ataaatatgg tgttcaagtt tacttggaac aggtgaagc tgttggttgg | 720 |
| caaactggta atttggttgc atctgttgtt gatatcatcg aaaacgaaaa gcaaattgct | 780 |
| atttttagata catcttcaga agcacacatg ccagatacta tcatcatgcc atacacatct | 840 |
| gaagttttga acgctagaat tttagcaact agagaaaacg aaaagatttc tgatttgaag | 900 |
| gaaaatgaat tgcttatttt gttaactggt aatacatgtt tagctggtga cgttatgggt | 960 |
| gaatacgcat tcgataagaa attgaagatt ggtgacaaaa ttattttctt ggatcaaatc | 1020 |
| cattacacaa tcgttaaaaa tactactttt aatggtatta gattgccaaa tttgatgttg | 1080 |
| ttagatcata aaaatgaatt gcaaatgatt agagaattt cttataaaga ttactcatta | 1140 |
| agaaattaa | 1149 |

<210> SEQ ID NO 12
<211> LENGTH: 1245
<212> TYPE: DNA
<213> ORGANISM: Artificial
<220> FEATURE:
<223> OTHER INFORMATION: Synthetic construct

<400> SEQUENCE: 12

| | |
|---|---|
| atgtctattt tgcaaattgg tgcaggtggt gttggttggg ttgttgctca taaggctgca | 60 |
| caaaacaacg atgttttggg tgacatcact atcgcttcaa gatcaatcgc taagtgtgaa | 120 |
| aagattatcg aatctattaa aggtaaaaat aatttgaaag attcttctaa gaaattggaa | 180 |

| | | |
|---|---|---|
| gcaagacaag ttaacgctga tgatatcgaa tcattggtta aattgattaa tgaagttaaa | 240 | |
| ccagatttgg ttattaatgc tggtccacct tgggttaatg ttgcaattat ggaagcatgt | 300 | |
| tatcaagcaa aagtttctta cttggataca tctgtttcag ttgatttgtg ttctaaaggt | 360 | |
| caacaagttc cagaagccta tgatgcacaa tgggctttta gagacaagtt taaacaagct | 420 | |
| ggtatcactg caatcttgtc tgctggtttt gatccaggtg ttgtttcagt ttttgctgct | 480 | |
| tatgctgcaa agtacttgtt cgatgaaatc gatacaatcg atgttttaga tatcaacgca | 540 | |
| ggagatcatg gtaaaaagtt cgctactaac ttcgatccag aaacaaattt gttagaaatc | 600 | |
| cagggtgact ctatctattg ggatgctggt gaatggaaaa gagttccatg tcatactaga | 660 | |
| atgttggaat ttgatttccc aaagtgtggt aaattcaaag tttactctat gtcacatgat | 720 | |
| gaattgagat cattgaagga gtttattcca gctaagagaa tcgaattttg gatgggtttt | 780 | |
| ggtgacagat atttgaacta cttcaacgtt atgagagata ttggtttgtt atcaccagaa | 840 | |
| ccattgactt tacaagatgg tacagttgtt aagccattgc aagttttgaa ggcaatgttg | 900 | |
| ccagatccaa catctttagc tccaggttat aaaggtttga cttgtattgg tacatgggtt | 960 | |
| caaggtaaaa aggatggtaa agctagatca gttttttatat ataaccatgc agatcatgaa | 1020 | |
| gttgcttacc atgatgttga acatcaagct attgcataca ctacaggtgt tccagcaatt | 1080 | |
| actgctgcat acaatttttt cagaggtgaa tgggctgaac aggtgttttt taatatggaa | 1140 | |
| caattgaacc cagatccatt tttagaaaca atgccatcaa tcggtttggg ttgggatgtt | 1200 | |
| atggaattag aaccaggtca accagatatt caagttgtta ataa | 1245 | |

<210> SEQ ID NO 13
<211> LENGTH: 1164
<212> TYPE: DNA
<213> ORGANISM: Artificial
<220> FEATURE:
<223> OTHER INFORMATION: Synthetic construct

<400> SEQUENCE: 13

| | | |
|---|---|---|
| atggaaactt tgcaagatat cggtacaaac atgttgaagg atgaattaag aacaccatac | 60 | |
| ttcatgatcg atgaagctaa attgatcgca aatttggaaa tcgctaagca tttgaaggaa | 120 | |
| atttctggtg ttaagatggt tttggcattg aagtgtttct caacttgggg tgttttcgat | 180 | |
| attattaagc atatttggga tggtactaca tcttcaggtc cattcgaagt caaattgggt | 240 | |
| tacgaaactt ttggtggtga aacacatgct tattctgttg gttactcaga agaagatgtt | 300 | |
| aaggaagtta ttgatatttg tgataagatg attttcaatt ctcaatcaca attggctgca | 360 | |
| tatagacatt tggttgaggg taaagcatct ttgggtttaa gaattaatcc aggtgtttca | 420 | |
| tacgcaggtc aagatttggc taatccagca agacaatttt caagattggg tgttcaagct | 480 | |
| gatcatatcg atgaatctgt tttcgattca attaatggtg ttatgttcca catgaactgt | 540 | |
| gaaaataagg atgttgatgc ttttattggt ttgttagatg caatctctga agattcggt | 600 | |
| agatatttgg ataaattgga ttgggtttct ttgggtggtg gtgttttctt tacatggcca | 660 | |
| ggttacgatg ttgaaaaatt gggtgctgca ttaaaagcat tgcagaaaag acatgctgtt | 720 | |
| caattgtatt tggaaccagg tgaagcaatc atcacaaaga ctacgatttt ggttgttact | 780 | |
| gttgttgata tcgttgaaaa cggtatgaag actgctatcg ttgattctgc tacagaagca | 840 | |
| catagattgg atactttgat ctataaggaa ccagcttctg ttttagaagc atcagataaa | 900 | |
| ggtcaacatg aatacgttat tggttcttgt tcatgtttgg ctggtgacca attctgtgtt | 960 | |
| gcaaagttcg atgaaccatt acaagttggt caaaaattgc atatttttaga ttctgctggt | 1020 | |

```
tacacaatgg ttaaattgaa ctggttcaac ggtttaaaga tgccatcagt ttactgtgaa   1080
agaaagaatg gtcaaatcca aaagattaat caattcggtt atgaagattt taaaagaact   1140
ttgtctttat ggtcaattga ataa                                          1164
```

<210> SEQ ID NO 14
<211> LENGTH: 1281
<212> TYPE: DNA
<213> ORGANISM: Artificial
<220> FEATURE:
<223> OTHER INFORMATION: Synthetic construct

<400> SEQUENCE: 14

```
atgtcttcag tttctttaca agatttcgat gctgaaagaa ttggtttgtt tcatgaagat     60
atcaagagaa agttcgatga attaaagtct aaaaatttga aattagattt gacaagaggt    120
aaaccatctt cagaacaatt ggatttcgca gatgaattgt tggctttgcc tggtaaaggt    180
gactttaaag ctgctgatgg tactgatgtt agaaattatg gtggtttgga tggtatcgtt    240
gatatcagac aaatttgggc tgatttgtta ggtgttccag ttgaacaagt tttagcaggt    300
gacgcttctt cattgaacat catgttcgat gttatttctt ggtcatatat ttttggtaat    360
aatgattctg ttcaaccttg gtcaaaggaa gaaacagtca agtggatctg tccagttcca    420
ggttacgata acatttctc tatcactgaa agattcggtt tcgaaatgat ctcagttcca    480
atgaacgaag atggtccaga tatggatgct gttgaagaat tagttaaaaa tccacaagtt    540
aaaggcatgt gggttgttcc agtttctct aatccaacag ttttactgt tacagaagat    600 gttgcaaaaa gattgtcagc tatggaaact gctgcaccag attttagagt tgtttgggat    660
aatgcatacg ctgttcatac tttgacagat gaatttccag aagttattga tatcgttggt    720
ttgggtgaag ctgctggtaa tccaaataga ttctgggctt ttacttctac ttcaaagatc    780
acattggcag gtgctggtgt ttctttcttt ttgacttcag cagaaaacag aaaatggtat    840
acaggtcatg ctggtattag aggtattggt ccaaataagg ttaatcaatt agcacatgct    900
agatactttg gtgacgcaga aggtgttaga gctgttatga gaaaacatgc tgcatcttta    960
gctccaaagt ttaataaggt tttagaaatt ttggattcaa gattggcaga atatggtgtt   1020
gctcaatgga ctgttccagc aggtggttac tttatttctt tagatgttgt tccaggtaca   1080
gcttcaagag ttgcagaatt agctaaagaa gcaggtattc ctttgactgg tgcaggttct   1140
tcatatccat tgagacaaga tccagaaaat aagaatttga gattggctcc atctttacca   1200
ccagttgaag aattggaagt tgcaatggat ggtgttgcta cttgtgtttt gttagctgct   1260
gctgaacatt acgctaatta a                                             1281
```

<210> SEQ ID NO 15
<211> LENGTH: 1266
<212> TYPE: DNA
<213> ORGANISM: Artificial
<220> FEATURE:
<223> OTHER INFORMATION: Synthetic construct

<400> SEQUENCE: 15

```
atggctttgg ttgttcaaaa gtacggtggt tcttcattag aatctgctga agaattaga     60 aacgttgctg aaagaattgt tgctactaag aaagctggta atgatgttgt tgttgtttgt    120
tcagctatgg gtgacactac agatgaattg ttagaattgg ctgctgctgt taatccagtt    180
ccaccagcta gagaaatgga tatgttgtta acagcaggtg aaagaatttc taatgctttg    240
```

-continued

| | |
|---|---|
| gttgcaatgg ctattgaatc attaggtgca gaagctcaat cttttactgg ttcacaagca | 300 |
| ggtgttttga ctacagaaag acatggtaat gctagaattg ttgatgttac accaggtaga | 360 |
| gttagagaag cattagatga aggtaaaatt tgtattgttg ctggttttca aggtgttaat | 420 |
| aaggaaacta gagatgttac tacattaggt agaggtggtt ctgatactac agcagttgct | 480 |
| ttggcagctg cattgaacgc tgatgtttgt gaaatatatt cagatgttga tggtgtttac | 540 |
| acagcagatc caagaattgt tccaaatgct caaaaattgg aaaaattatc ttttgaagaa | 600 |
| atgttggaat tagctgctgt tggttctaaa attttggttt tgagatcagt tgaatatgca | 660 |
| agagctttta atgttccatt gagagttaga tcatcttact ctaatgatcc aggtacttta | 720 |
| attgctggtt caatggaaga tattccagtt gaagaagctg ttttgactgg tgttgcaact | 780 |
| gataagtctg aagctaaggt tacagttttg ggtatctcag ataaaccagg tgaagctgca | 840 |
| aaagttttta gagcattggc tgatgcagaa attaatatcg atatggtttt acaaaacgtt | 900 |
| tcttcagttg aagatggtac tacagatatc attttttactt gtccaagatc agatggtaga | 960 |
| agagctatgg aaattttgaa gaaattgcaa gttcagggta actggacaaa cgttttgtac | 1020 |
| gatgatcaag ttggtaaagt ttctttagtt ggtgctggta tgaaatcaca tccaggtgtt | 1080 |
| actgctgagt ttatggaagc attgagagat gttaacgtta acatcgaatt aatctctaca | 1140 |
| tcagaaatta gaatttctgt tttgattaga gaagatgatt tggatgctgc tgctagagct | 1200 |
| ttgcatgaac aatttcaatt aggtggtgaa gatgaagctg ttgtttacgc aggtactggt | 1260 |
| agataa | 1266 |

<210> SEQ ID NO 16
<211> LENGTH: 1035
<212> TYPE: DNA
<213> ORGANISM: Artificial
<220> FEATURE:
<223> OTHER INFORMATION: Synthetic construct

<400> SEQUENCE: 16

| | |
|---|---|
| atgactacaa ttgctgttgt tggtgcaact ggtcaagttg gtcaagttat gagaacattg | 60 |
| ttagaagaaa gaaacttccc agctgatact gttagatttt tcgcatctcc aagatcagct | 120 |
| ggtagaaaga tcgagtttag aggtacagaa atcgaagttg aagatatcac tcaagcaaca | 180 |
| gaagaatctt tgaaggatat cgatgttgct ttgttttctg ctggtggtac tgcttcaaaa | 240 |
| caatatgcac cattgtttgc tgctgctggt gctacagttg ttgataattc ttcagcatgg | 300 |
| agaaaagatg atgaagttcc attgatcgtt tcagaagtta acccatctga taaggattca | 360 |
| ttggttaagg gtatcatcgc taacccaaac tgtactacaa tggcagctat gccagttttg | 420 |
| aaaccattac atgatgcagc tggttttggtt aaattgcatg tttcttcata ccaagctgtt | 480 |
| tctggttcag gtttggcagg tgttgaaact ttagctaaac aagttgcagc tgttggtgac | 540 |
| cataatgttg aatttgttca tgatggtcaa gcagctgatg ctggtgacgt tggtccatac | 600 |
| gtttctccaa ttgcatacaa tgttttgcca tttgctggta atttggttga tgatggtact | 660 |
| tttgaaacag atgaagaaca aaaattgaga acgaatcaa gaaaaatttt gggtttacca | 720 |
| gatttgaaag tttcaggtac ttgtgttaga gttccagttt ttacaggtca tactttgaca | 780 |
| atccatgcag aatttgataa ggctatcact gttgatcaag ctcaagaaat tttaggtgca | 840 |
| gcttctggtg tcaaattggt tgatgttcca actccattag ctgctgctgg tatcgatgaa | 900 |
| tctttagttg gtagaattag acaagattca acagttgatg ataacagagg tttggttttg | 960 |
| gttgtttcag gtgacaattt gagaaagggt gctgcattga acacaatcca aattgctgaa | 1020 | ttgttagtta aataa 1035

<210> SEQ ID NO 17
<211> LENGTH: 1014
<212> TYPE: DNA
<213> ORGANISM: Saccharomyces cerevisiae

<400> SEQUENCE: 17

| | | | | | |
|---|---|---|---|---|---|
| atgaacagga | ttaagaatac | attttctgtt | gctaagagat | taaaactaag | caaagttatg | 60 |
| acgaactcag | aattaccgag | catattcgaa | ggaactgttg | atttagggat | tattggtggt | 120 |
| acaggtttat | ataaccttga | ctgtctggag | cccatcgctt | tgcttccacc | catggtaaca | 180 |
| ccatggggta | ccacatcgtc | tcctgtcaca | atctctcagt | tcgtaggaac | taacagccac | 240 |
| tttcacgttg | cgttcatagc | cagacacggt | attaaccacg | aatacccacc | cactaaagtc | 300 |
| ccatttagag | caaacatggc | ggccttaaag | aacttaaatt | gtaaagccgt | tctttctttt | 360 |
| agtgccgtgg | ggtctttaca | accccatata | aagcctagat | attttgtgtt | accacagcaa | 420 |
| ataatcgaca | gaactaaagg | cataagacat | tcttcatatt | tcaacgatga | aggcttggta | 480 |
| ggtcacgttg | gtttcggaca | gccgttctct | caaaaattcg | cagagtatat | ctatcaattc | 540 |
| aagaacgaga | taacaaatcc | tgaatccgaa | gaaccgtgcc | atttgcatta | cgacaaggat | 600 |
| atgaccgttg | tgtgtatgga | aggcccacaa | ttctccacgc | gcgctgaatc | caagatgtac | 660 |
| agaatgtttg | gtggccatgt | tattaacatg | agtgttattc | cagaagccaa | attggcgcgt | 720 |
| gagtgtgagc | tgccttacca | gatgatttgt | atgtctaccg | attacgacgc | atggagagat | 780 |
| gaggcagaac | ctgttaccgt | agaaaccgtt | attggtaatt | tgacgaataa | tgggcgcaat | 840 |
| gcaaatattt | tagcttctaa | gatcatcgtc | tcaatggcca | aggaaatccc | agagttcatg | 900 |
| catactggcg | atgggctgcg | cggttccatc | aagaaatcta | tctctaccaa | accagaggct | 960 |
| atgtccaagg | aaaccttaga | aagactaaga | tacttatttc | caaactattg | gtaa | 1014 |

<210> SEQ ID NO 18
<211> LENGTH: 1131
<212> TYPE: DNA
<213> ORGANISM: Saccharomyces cerevisiae

<400> SEQUENCE: 18

| | | | | | |
|---|---|---|---|---|---|
| atgaccttgg | caccCctaga | cgcctccaaa | gttaagataa | ctaccacaca | acatgcatct | 60 |
| aagccaaaac | cgaacagtga | gttagtgttt | ggcaagagct | tcacggacca | catgttaact | 120 |
| gcggaatgga | cagctgaaaa | agggtggggt | accccagaga | ttaaacctta | tcaaaatctg | 180 |
| tctttagacc | cttccgcggt | ggttttccat | tatgcttttg | agctattcga | agggatgaag | 240 |
| gcttacagaa | cggtggacaa | caaaattaca | atgtttcgtc | cagatatgaa | tatgaagcgc | 300 |
| atgaataagt | ctgctcagag | aatctgtttg | ccaacgttcg | acccagaaga | gttgattacc | 360 |
| ctaattggga | aactgatcca | gcaagataag | tgcttagttc | ctgaaggaaa | aggttactct | 420 |
| ttatatatca | ggcctacatt | aatcggcact | acggccggtt | taggggtttc | cacgcctgat | 480 |
| agagccttgc | tatatgtcat | ttgctgccct | gtgggtcctt | attacaaaac | tggatttaag | 540 |
| gcggtcgagac | tggaagccac | tgattatgcc | acaagagctt | ggccaggagg | ctgtggtgac | 600 |
| aagaaactag | gtgcaaacta | cgcccccctgc | gtcctgccac | aattgcaagc | tgcttcaagg | 660 |
| ggttaccaac | aaaattttatg | gctatttggt | ccaataacca | acattactga | agtcggcacc | 720 |
| atgaatgctt | ttttcgtgtt | taaagatagt | aaaacgggca | agaaggaact | agttactgct | 780 |

| ccactagacg gtaccatttt ggaaggtgtt actagggatt ccattttaaa tcttgctaaa | 840 |
| gaaagactcg aaccaagtga atggaccatt agtgaacgct acttcactat aggcgaagtt | 900 |
| actgagagat ccaagaacgg tgaactactt gaagcctttg gttctggtac tgctgcgatt | 960 |
| gtttctccca ttaaggaaat cggctggaaa ggcgaacaaa ttaatattcc gttgttgccc | 1020 |
| ggcgaacaaa ccggtccatt ggccaaagaa gttgcacaat ggattaatgg aatccaatat | 1080 |
| ggcgagactg agcatggcaa ttggtcaagg gttgttactg atttgaactg a | 1131 |

<210> SEQ ID NO 19
<211> LENGTH: 1158
<212> TYPE: DNA
<213> ORGANISM: Artificial
<220> FEATURE:
<223> OTHER INFORMATION: Synthetic construct

<400> SEQUENCE: 19

| atggaaggtg gtggtgctag aaatgtttct gctgctgctg ctcaaactga aggttctggt | 60 |
| gacgatggtt caagaaaacc attgccacca tgttgtgtta aagctcaagc tgctgttgct | 120 |
| gaatctgaag caaaatgtca tgctacagtt gtttcagaat ggtttactgg tacaagatca | 180 |
| agatcaggta accatctaa ggcacaatac ttcaacaatc caatgtggcc aggtgaagct | 240 |
| cattcattga aggttgaaaa gattttgtac cagggtaaat ctccatacca agaagttttg | 300 |
| gttttcgaac catcaactta tggtaacgtt ttggttttag atggtatcgt tcaattgact | 360 |
| gataaggatg aatgtgcata ccaagaaatg gttacacatt tggctttatg ttctatccca | 420 |
| tcacctaaaa atgttttggt tgttggtggt ggtgacggtg gtgttttgag agaaatcgct | 480 |
| aagcatgatt ctgttgaaac aatcgatatt tgtgaaatcg atcaattggt tattgatgtt | 540 |
| tgtaaggatt tctttccaag attgtacgtt ggttacaaag atccaagagt tagattgcat | 600 |
| gttggtgacg ctgttgaatt tttgagaaat tcaccagagg gtaaatacga tgcaatcatc | 660 |
| gttgattctt cagatccaat tggtccagct caagaattgg ttgaaaagcc atttttccaa | 720 |
| actatcgcta gagcattaaa accaggtggt gttttgtcta atttggctga atcaatgtgg | 780 |
| ttgcatacac atttgatcca agatatgttg tctatttgta gagaagtttt taaaggtggt | 840 |
| gttcattatg cttgggcatc tgttccaact tacccatcag gtgttattgg tttcttgtta | 900 |
| tgtgcaaaag aaggtccacc agttgatttc ttgactccag ttaatccaat tgaaaagatt | 960 |
| gaaggtgcta caaaagatgg tagagaaatg agattctaca actctgaaat ccataaggct | 1020 |
| gcttttattt tgccaacttt cgttaagaga gaattagaag catacaattc ttcaactgaa | 1080 |
| aaggaaagac cagaaaaacc aacagctaag ccagttaaga tgaaagttat gagagattct | 1140 |
| gctattacag catcatga | 1158 |

<210> SEQ ID NO 20
<211> LENGTH: 1401
<212> TYPE: DNA
<213> ORGANISM: Saccharomyces cerevisiae

<400> SEQUENCE: 20

| atgtctagta ctcaagtagg aaatgctcta tctagttcca ctactacttt agtggacttg | 60 |
| tctaattcta cggttacccca aagaagcaa tattataaag atggcgagac gctgcacaat | 120 |
| cttttgcttg aactaaagaa taaccaagat ttggaacttt taccgcatga acaagcgcat | 180 |
| cctaaaatat ttcaagcgct caaggctcgt attggtagaa ttaataatga aacgtgcgac | 240 |
| cccggtgagg agaactcgtt tttcatatgc gatttgggag aagtcaagag attattcaac | 300 |

```
aactgggtga aggagcttcc tagaattaag ccattttatg ccgtcaaatg taatcctgat    360
accaaggttt tgtcattatt agcagagttg ggcgttaatt tcgattgcgc ttccaaagtg    420
gaaattgaca gagtattatc gatgaacatc tcgccggata gaattgttta cgctaatcct    480
tgtaaagtag catctttcat tagatatgca gcttcaaaaa atgtaatgaa gtctactttt    540
gacaatgtag aagaattgca taaaatcaaa aagtttcatc ctgagtctca gttgttatta    600
agaatcgcta ccgatgactc taccgctcaa tgtcgacttt ccaccaaata tggctgtgaa    660
atggaaaacg tagacgtttt attaaaggct ataaggaac taggtttaaa cctggctggt     720 gtttcttttcc acgtcggttc aggcgcttct gattttacaa gcttatacaa agccgttaga   780
gatgcaagaa cggtatttga caaagctgct aacgaatacg ggttgccccc tttgaagatt    840
ttggatgtag gtggtggatt tcaatttgaa tccttcaaag aatcaactgc tgttttgcgt    900
ctagcgctag aggaattttt ccctgtaggt tgtggtgttg atataattgc agagcctggc    960
agatactttg tagctacagc gttcactttg gcatctcatg tgattgcgaa gagaaaactg   1020
tctgagaatg aagcaatgat ttacactaac gatggtgtat acgggaacat gaattgtatt   1080
ttattcgatc atcaagagcc ccatccaaga acccttatc ataatttgga atttcattac    1140
gacgattttg aatccactac tgcggtcctc gactctatca acaaaacaag atctgagtat   1200
ccatataaag tttccatctg gggacccaca tgtgatggtt tggattgtat tgccaaagag   1260
tattacatga agcatgatgt tatagtcggt gattggtttt attttcctgc cctgggtgcc   1320
tacacatcat cggcggctac tcaattcaac ggctttgagc agactgcgga tatagtatac   1380
atagactctg aactcgattg a                                              1401

<210> SEQ ID NO 21
<211> LENGTH: 1191
<212> TYPE: DNA
<213> ORGANISM: Saccharomyces cerevisiae

<400> SEQUENCE: 21
atgactgtca ccataaaaga attgactaac cacaactaca ttgaccacga actatcagcc     60
actttagact caacggatgc gttcgagggt cccgagaagt tgctggaaat ctggttcttc    120
cctcacaaga agtccatcac gaccgaaaag acattaagaa atattggcat ggatagatgg    180
atcgagattt tgaaattagt gaaatgcgaa gttctttcca tgaagaagac taagaaactg    240
gatgcctttt tgttgagtga gtcttccctc ttcgtcttcg atcacaaatt gacgatgaag    300
acgtgccgta ctacaaccac attgttctgt ctcgaaaagc ttttccagat cgttgagcaa    360
gagttatcgt gggctttccg cacaacacaa gggggcaagt acaaaccatt taaagtgttt    420
tattctagac gatgtttcct ttcccctgt aagcaagccg ctatccatca aaactgggct    480
gacgaagtcg actatttgaa caaatttttc gacaatggta aaagttattc cgtgggaaga    540
aatgacaaga gcaaccactg gaacctgtac gtcaccgaga cggaccgctc cacacctaag    600
ggaaaggagt acatcgagga tgacgacgaa actttcgaag tactgatgac ggagctggac    660
ccagaatgcg ctagtaagtt tgtttgcggg cctgaggcat ccacaaccgc tctcgtggag    720
ccaaacgaag ataagggcca aacctcggc taccaaatga ctaaaaatac aaggcttgac     780
gaaatatatg tcaactcggc ccaagactcc gatttatcat ttcaccacga tgcatttgcg    840
ttcacgccat gtggatactc atccaatatg attctcgctg aaaaatacta ttacaccctg    900
cacgtgactc cggaaaaggg ttggtcttac gcctctttcg aaagtaacat acccgtattt    960
```

-continued

```
gacatttccc aagggaagca agacaacttg gacgttcttc tacatattct gaacgttttt   1020
caaccaagag agttctcgat gaccttttt accaaaaatt atcagaacca atccttccaa    1080
aaactactaa gcatcaacga gtcactgccc gactacatca agttagacaa aattgtttat   1140
gatctggacg actaccacct tttctatatg aaattgcaga agaaaatatg a            1191
```

<210> SEQ ID NO 22
<211> LENGTH: 421
<212> TYPE: PRT
<213> ORGANISM: Artificial
<220> FEATURE:
<223> OTHER INFORMATION: Corynebacterium glutamicum mutated

<400> SEQUENCE: 22

```
Met Ala Leu Val Val Gln Lys Tyr Gly Gly Ser Ser Leu Glu Ser Ala
1               5                   10                  15

Glu Arg Ile Arg Asn Val Ala Glu Arg Ile Val Ala Thr Lys Lys Ala
            20                  25                  30

Gly Asn Asp Val Val Val Cys Ser Ala Met Gly Asp Thr Thr Asp
        35                  40                  45

Glu Leu Leu Glu Leu Ala Ala Ala Val Asn Pro Val Pro Pro Ala Arg
    50                  55                  60

Glu Met Asp Met Leu Leu Thr Ala Gly Glu Arg Ile Ser Asn Ala Leu
65                  70                  75                  80

Val Ala Met Ala Ile Glu Ser Leu Gly Ala Glu Ala Gln Ser Phe Thr
                85                  90                  95

Gly Ser Gln Ala Gly Val Leu Thr Thr Glu Arg His Gly Asn Ala Arg
            100                 105                 110

Ile Val Asp Val Thr Pro Gly Arg Val Arg Glu Ala Leu Asp Glu Gly
        115                 120                 125

Lys Ile Cys Ile Val Ala Gly Phe Gln Gly Val Asn Lys Glu Thr Arg
    130                 135                 140

Asp Val Thr Thr Leu Gly Arg Gly Gly Ser Asp Thr Thr Ala Val Ala
145                 150                 155                 160

Leu Ala Ala Ala Leu Asn Ala Asp Val Cys Glu Ile Tyr Ser Asp Val
                165                 170                 175

Asp Gly Val Tyr Thr Ala Asp Pro Arg Ile Val Pro Asn Ala Gln Lys
            180                 185                 190

Leu Glu Lys Leu Ser Phe Glu Glu Met Leu Glu Leu Ala Ala Val Gly
        195                 200                 205

Ser Lys Ile Leu Val Leu Arg Ser Val Glu Tyr Ala Arg Ala Phe Asn
    210                 215                 220

Val Pro Leu Arg Val Arg Ser Ser Tyr Ser Asn Asp Pro Gly Thr Leu
225                 230                 235                 240

Ile Ala Gly Ser Met Glu Asp Ile Pro Val Glu Glu Ala Val Leu Thr
                245                 250                 255

Gly Val Ala Thr Asp Lys Ser Glu Ala Lys Val Thr Val Leu Gly Ile
            260                 265                 270

Ser Asp Lys Pro Gly Glu Ala Ala Lys Val Phe Arg Ala Leu Ala Asp
        275                 280                 285

Ala Glu Ile Asn Ile Asp Met Val Leu Gln Asn Val Ser Ser Val Glu
    290                 295                 300

Asp Gly Thr Thr Asp Ile Ile Phe Thr Cys Pro Arg Ser Asp Gly Arg
305                 310                 315                 320

Arg Ala Met Glu Ile Leu Lys Lys Leu Gln Val Gln Gly Asn Trp Thr
```

```
                  325                  330                  335
Asn Val Leu Tyr Asp Asp Gln Val Gly Lys Val Ser Leu Val Gly Ala
                340                  345                  350

Gly Met Lys Ser His Pro Gly Val Thr Ala Glu Phe Met Glu Ala Leu
                355                  360                  365

Arg Asp Val Asn Val Asn Ile Glu Leu Ile Ser Thr Ser Glu Ile Arg
            370                  375                  380

Ile Ser Val Leu Ile Arg Glu Asp Asp Leu Asp Ala Ala Ala Arg Ala
385                  390                  395                  400

Leu His Glu Gln Phe Gln Leu Gly Gly Glu Asp Glu Ala Val Val Tyr
                405                  410                  415

Ala Gly Thr Gly Arg
                420

<210> SEQ ID NO 23
<211> LENGTH: 880
<212> TYPE: DNA
<213> ORGANISM: Saccharomyces cerevisiae

<400> SEQUENCE: 23
atgtatgaag taatacagaa aaggaaaaca aaaataataa acgttttaca gagtcctgaa      60
ctcatgaggc tcatagagga cccatcaaat ctgggtattt ctttacattt tccagtaagt     120
tcactgctaa aaagtaataa gtgcacacca atgcctaaac tttctacgta tagtttggct     180
agtgggggat ttaaggattg gtgcgcgtga catccctcta gacgttccac cagagattga     240
tatcatcgat ttttactggg atgttatttt atgcatggaa tctcaattca tattagatta     300
caatgttccg tcaaaaaata aggggaacaa tcagaagtct gttgctaagc tgttgaaaaa     360
taagcttgta acgatatgaa aaactacgtt aaaaagacta attttataatg aaaataccaa     420 gcaatataaa aataataata gccacgatgg ttacaattgg agaaaactag gctcgcagta     480
tttcatactg tatcttcccc tatttacgca ggaactgatt tggtgtaaac ttaatgaaaa     540
ctatttccat gttgtattac catctttact gaatagtagg aacgttcatg ataaccacag     600
tacctatata aataaagatt ggttacttgc ccttttagag ctaacttcca acctgaacca     660
aaacttcaaa ttcgaataca tgaaattgag attgtatatt ttaagagatg atttaattaa     720
taatggtttg gatcttttga aaaatcttaa ctgggtcggt gggaaactga ttaaaaatga     780
agatagagaa gtcttgttga actcgaccga tttagctacg gattctattt ctcatttatt     840
aggtgatgaa actttgtta ttttagagtt tgaatgctaa                            880

<210> SEQ ID NO 24
<211> LENGTH: 338
<212> TYPE: PRT
<213> ORGANISM: Saccharomyces cerevisiae

<400> SEQUENCE: 24

Met Ser Thr Thr Ala Ser Thr Pro Ser Ser Leu Arg His Leu Ile Ser
1               5                   10                  15

Ile Lys Asp Leu Ser Asp Glu Glu Phe Arg Ile Leu Val Gln Arg Ala
                20                  25                  30

Gln His Phe Lys Asn Val Phe Lys Ala Asn Lys Thr Asn Asp Phe Gln
            35                  40                  45

Ser Asn His Leu Lys Leu Leu Gly Arg Thr Ile Ala Leu Ile Phe Thr
        50                  55                  60

Lys Arg Ser Thr Arg Thr Arg Ile Ser Thr Glu Gly Ala Ala Thr Phe
```

```
                65                  70                  75                  80
        Phe Gly Ala Gln Pro Met Phe Leu Gly Lys Glu Asp Ile Gln Leu Gly
                            85                  90                  95

Val Asn Glu Ser Phe Tyr Asp Thr Thr Lys Val Val Ser Ser Met Val
                        100                 105                 110

Ser Cys Ile Phe Ala Arg Val Asn Lys His Glu Asp Ile Leu Ala Phe
                    115                 120                 125

Cys Lys Asp Ser Ser Val Pro Ile Ile Asn Ser Leu Cys Asp Lys Phe
                130                 135                 140

His Pro Leu Gln Ala Ile Cys Asp Leu Leu Thr Ile Ile Glu Asn Phe
        145                 150                 155                 160

Asn Ile Ser Leu Asp Glu Val Asn Lys Gly Ile Asn Ser Lys Leu Lys
                        165                 170                 175

Met Ala Trp Ile Gly Asp Ala Asn Asn Val Ile Asn Asp Met Cys Ile
                    180                 185                 190

Ala Cys Leu Lys Phe Gly Ile Ser Val Ser Ile Ser Thr Pro Pro Gly
                195                 200                 205

Ile Glu Met Asp Ser Asp Ile Val Asp Glu Ala Lys Lys Val Ala Glu
            210                 215                 220

Arg Asn Gly Ala Thr Phe Glu Leu Thr His Asp Ser Leu Lys Ala Ser
        225                 230                 235                 240

Thr Asn Ala Asn Ile Leu Val Thr Asp Thr Phe Val Ser Met Gly Glu
                        245                 250                 255

Glu Phe Ala Lys Gln Ala Lys Leu Lys Gln Phe Lys Gly Phe Gln Ile
                    260                 265                 270

Asn Gln Glu Leu Val Ser Val Ala Asp Pro Asn Tyr Lys Phe Met His
                275                 280                 285

Cys Leu Pro Arg His Gln Glu Val Ser Asp Val Phe Tyr Gly
            290                 295                 300

Glu His Ser Ile Val Phe Glu Glu Ala Glu Asn Arg Leu Tyr Ala Ala
        305                 310                 315                 320

Met Ser Ala Ile Asp Ile Phe Val Asn Asn Lys Gly Asn Phe Lys Asp
                        325                 330                 335

Leu Lys

<210> SEQ ID NO 25
<211> LENGTH: 392
<212> TYPE: PRT
<213> ORGANISM: Leishmania infantum

<400> SEQUENCE: 25

Met Ser Val His Ser Ile Leu Phe Ser Ser Glu His Val Thr Glu Gly
        1               5                   10                  15

His Pro Asp Lys Leu Cys Asp Gln Val Ser Asp Ala Val Leu Asp Ala
                        20                  25                  30

Cys Leu Ala Gly Asp Pro Phe Ser Lys Val Ala Cys Glu Ser Cys Ala
                    35                  40                  45

Lys Thr Gly Met Val Met Val Phe Gly Glu Ile Thr Thr Lys Ala Val
                50                  55                  60

Leu Asp Tyr Gln Lys Ile Val Arg Asn Thr Ile Lys Asp Ile Gly Phe
        65                  70                  75                  80

Asp Ser Ala Asp Lys Gly Leu Asp Tyr Glu Ser Cys Asn Val Leu Val
                        85                  90                  95

Ala Ile Glu Gln Gln Ser Pro Asp Ile Cys Gln Gly Leu Gly Asn Phe
```

```
            100             105             110
Asp Ser Glu Asp Leu Gly Ala Gly Asp Gln Gly Met Met Phe Gly Tyr
        115                 120             125

Ala Thr Asp Glu Thr Glu Thr Leu Met Pro Leu Thr Tyr Glu Leu Ala
        130                 135             140

Arg Gly Leu Ala Lys Lys Tyr Ser Glu Leu Arg Asp Gly Ser Leu
145                 150                 155                 160

Glu Trp Ala Arg Pro Asp Ala Lys Thr Gln Val Thr Val Glu Tyr Asp
                165                 170                 175

Tyr Asp Thr Arg Glu Gly Lys Gln Val Leu Thr Pro Lys Arg Val Ala
            180                 185                 190

Val Val Leu Ile Ser Ala Gln His Asp Glu His Val Thr Asn Asp Lys
        195                 200                 205

Ile Ser Val Asp Leu Met Glu Lys Val Ile Lys Ala Val Ile Pro Ala
        210                 215                 220

Asn Met Leu Asp Ala Glu Thr Lys Tyr Trp Leu Asn Pro Ser Gly Arg
225                 230                 235                 240

Phe Val Arg Gly Gly Pro His Gly Asp Ala Gly Leu Thr Gly Arg Lys
                245                 250                 255

Ile Ile Val Asp Thr Tyr Gly Gly Trp Gly Ala His Gly Gly Gly Ala
                260                 265                 270

Phe Ser Gly Lys Asp Pro Ser Lys Val Asp Arg Ser Ala Ala Tyr Ala
            275                 280                 285

Ala Arg Trp Ile Ala Lys Ser Ile Val Ala Gly Gly Leu Ala Arg Arg
        290                 295                 300

Cys Leu Val Gln Leu Ala Tyr Ala Ile Gly Val Ala Glu Pro Leu Ser
305                 310                 315                 320

Met His Val Glu Thr Tyr Gly Thr Gly Lys Tyr Asp Asp Ala Lys Leu
                325                 330                 335

Leu Glu Ile Val Lys Gln Asn Phe Lys Leu Arg Pro Tyr Asp Ile Ile
            340                 345                 350

Gln Glu Leu Asn Leu Arg Arg Pro Ile Tyr Tyr Glu Thr Ser Arg Phe
        355                 360                 365

Gly His Phe Gly Arg Lys Asp Glu Leu Gly Thr Gly Phe Thr Trp
        370                 375                 380

Glu Val Pro Lys Lys Met Val Glu
385                 390

<210> SEQ ID NO 26
<211> LENGTH: 600
<212> TYPE: PRT
<213> ORGANISM: Saccharomyces cerevisiae

<400> SEQUENCE: 26

Met Lys Ile Thr Glu Lys Leu Glu Gln His Arg Gln Thr Ser Gly Lys
1               5                   10                  15

Pro Thr Tyr Ser Phe Glu Tyr Phe Val Pro Lys Thr Thr Gln Gly Val
                20                  25                  30

Gln Asn Leu Tyr Asp Arg Met Asp Arg Met Tyr Glu Ala Ser Leu Pro
            35                  40                  45

Gln Phe Ile Asp Ile Thr Trp Asn Ala Gly Gly Arg Leu Ser His
        50                  55                  60

Leu Ser Thr Asp Leu Val Ala Thr Ala Gln Ser Val Leu Gly Leu Glu
65                  70                  75                  80
```

-continued

```
Thr Cys Met His Leu Thr Cys Thr Asn Met Pro Ile Ser Met Ile Asp
                85                  90                  95
Asp Ala Leu Glu Asn Ala Tyr His Ser Gly Cys Gln Asn Ile Leu Ala
            100                 105                 110
Leu Arg Gly Asp Pro Pro Arg Asp Ala Glu Asn Trp Thr Pro Val Glu
        115                 120                 125
Gly Gly Phe Gln Tyr Ala Lys Asp Leu Ile Lys Tyr Ile Lys Ser Lys
    130                 135                 140
Tyr Gly Asp His Phe Ala Ile Gly Val Ala Gly Tyr Pro Glu Cys His
145                 150                 155                 160
Pro Glu Leu Pro Asn Lys Asp Val Lys Leu Asp Leu Glu Tyr Leu Lys
                165                 170                 175
Gln Lys Ile Asp Ala Gly Gly Asp Phe Ile Ile Thr Gln Met Phe Tyr
            180                 185                 190
Asp Val Asp Asn Phe Ile Asn Trp Cys Ser Gln Val Arg Ala Ala Gly
        195                 200                 205
Met Asp Val Pro Ile Ile Pro Gly Ile Met Pro Ile Thr Thr Tyr Ala
    210                 215                 220
Ala Phe Leu Arg Arg Ala Gln Trp Gly Gln Ile Ser Ile Pro Gln His
225                 230                 235                 240
Phe Ser Ser Arg Leu Asp Pro Ile Lys Asp Asp Glu Leu Val Arg
                245                 250                 255
Asp Ile Gly Thr Asn Leu Ile Val Glu Met Cys Gln Lys Leu Leu Asp
            260                 265                 270
Ser Gly Tyr Val Ser His Leu His Ile Tyr Thr Met Asn Leu Glu Lys
        275                 280                 285
Ala Pro Leu Met Ile Leu Glu Arg Leu Asn Ile Leu Pro Thr Glu Ser
    290                 295                 300
Glu Phe Asn Ala His Pro Leu Ala Val Leu Pro Trp Arg Lys Ser Leu
305                 310                 315                 320
Asn Pro Lys Arg Lys Asn Glu Glu Val Arg Pro Ile Phe Trp Lys Arg
                325                 330                 335
Arg Pro Tyr Ser Tyr Val Ala Arg Thr Ser Gln Trp Ala Val Asp Glu
            340                 345                 350
Phe Pro Asn Gly Arg Phe Gly Asp Ser Ser Pro Ala Phe Gly Asp
        355                 360                 365
Leu Asp Leu Cys Gly Ser Asp Leu Ile Arg Gln Ser Ala Asn Lys Cys
    370                 375                 380
Leu Glu Leu Trp Ser Thr Pro Thr Ser Ile Asn Asp Val Ala Phe Leu
385                 390                 395                 400
Val Ile Asn Tyr Leu Asn Gly Asn Leu Lys Cys Leu Pro Trp Ser Asp
                405                 410                 415
Ile Pro Ile Asn Asp Glu Ile Asn Pro Ile Lys Ala His Leu Ile Glu
            420                 425                 430
Leu Asn Gln His Ser Ile Ile Thr Ile Asn Ser Gln Pro Gln Val Asn
        435                 440                 445
Gly Ile Arg Ser Asn Asp Lys Ile His Gly Trp Gly Pro Lys Asp Gly
    450                 455                 460
Tyr Val Tyr Gln Lys Gln Tyr Leu Glu Phe Met Leu Pro Lys Thr Lys
465                 470                 475                 480
Leu Pro Lys Leu Ile Asp Thr Leu Lys Asn Asn Glu Phe Leu Thr Tyr
                485                 490                 495
Phe Ala Ile Asp Ser Gln Gly Asp Leu Leu Ser Asn His Pro Asp Asn
```

```
                    500                 505                 510
Ser Lys Ser Asn Ala Val Thr Trp Gly Ile Phe Pro Gly Arg Glu Ile
        515                 520                 525

Leu Gln Pro Thr Ile Val Glu Lys Ile Ser Phe Leu Ala Trp Lys Glu
        530                 535                 540

Glu Phe Tyr His Ile Leu Asn Glu Trp Lys Leu Asn Met Asn Lys Tyr
545                 550                 555                 560

Asp Lys Pro His Ser Ala Gln Phe Ile Gln Ser Leu Ile Asp Asp Tyr
                565                 570                 575

Cys Leu Val Asn Ile Val Asp Asn Asp Tyr Ile Ser Pro Asp Asp Gln
                580                 585                 590

Ile His Ser Ile Leu Leu Ser Leu
                595                 600

<210> SEQ ID NO 27
<211> LENGTH: 510
<212> TYPE: PRT
<213> ORGANISM: Saccharomyces cerevisiae

<400> SEQUENCE: 27

Met Cys Gly Ile Leu Gly Ile Val Leu Ala Asn Gln Thr Thr Pro Val
1               5                   10                  15

Ala Pro Glu Leu Cys Asp Gly Cys Ile Phe Leu Gln His Arg Gly Gln
            20                  25                  30

Asp Ala Ala Gly Ile Ala Thr Cys Gly Ser Arg Gly Arg Ile Tyr Gln
        35                  40                  45

Cys Lys Gly Asn Gly Met Ala Arg Asp Val Phe Thr Gln Gln Arg Val
    50                  55                  60

Ser Gly Leu Ala Gly Ser Met Gly Ile Ala His Leu Arg Tyr Pro Thr
65                  70                  75                  80

Ala Gly Ser Ser Ala Asn Ser Glu Ala Gln Pro Phe Tyr Val Asn Ser
                85                  90                  95

Pro Tyr Gly Ile Asn Leu Ala His Asn Gly Asn Leu Val Asn Thr Ala
            100                 105                 110

Ser Leu Lys Arg Tyr Met Asp Glu Asp Val His Arg His Ile Asn Thr
        115                 120                 125

Asp Ser Asp Ser Glu Leu Leu Leu Asn Ile Phe Ala Ala Glu Leu Glu
    130                 135                 140

Lys His Asn Lys Tyr Arg Val Asn Asn Glu Asp Val Phe His Ala Leu
145                 150                 155                 160

Glu Gly Val Tyr Arg Leu Cys Arg Gly Gly Tyr Ala Cys Val Gly Leu
                165                 170                 175

Leu Ala Gly Phe Ala Leu Phe Gly Phe Arg Asp Pro Asn Gly Ile Arg
            180                 185                 190

Pro Leu Leu Phe Gly Glu Arg Glu Asn Pro Asp Gly Thr Lys Asp Tyr
        195                 200                 205

Met Leu Ala Ser Glu Ser Val Val Phe Lys Ala His Asn Phe Thr Lys
    210                 215                 220

Tyr Arg Asp Leu Lys Pro Gly Glu Ala Val Ile Ile Pro Lys Asn Cys
225                 230                 235                 240

Ser Lys Gly Glu Pro Glu Phe Lys Gln Val Val Pro Ile Asn Ser Tyr
                245                 250                 255

Arg Pro Asp Leu Phe Glu Tyr Val Tyr Phe Ala Arg Pro Asp Ser Val
            260                 265                 270
```

Leu Asp Gly Ile Ser Val Tyr His Thr Arg Leu Ala Met Gly Ser Lys
            275                 280                 285

Leu Ala Glu Asn Ile Leu Lys Gln Leu Lys Pro Glu Asp Ile Asp Val
        290                 295                 300

Val Ile Pro Val Pro Asp Thr Ala Arg Thr Cys Ala Leu Glu Cys Ala
305                 310                 315                 320

Asn Val Leu Gly Lys Pro Tyr Arg Glu Gly Phe Val Lys Asn Arg Tyr
                325                 330                 335

Val Gly Arg Thr Phe Ile Met Pro Asn Gln Arg Glu Arg Val Ser Ser
            340                 345                 350

Val Arg Arg Lys Leu Asn Pro Met Glu Ser Glu Phe Lys Gly Lys Lys
        355                 360                 365

Val Leu Ile Val Asp Asp Ser Ile Val Arg Gly Thr Thr Ser Lys Glu
        370                 375                 380

Ile Val Asn Met Ala Lys Glu Ser Gly Ala Thr Lys Val Tyr Phe Ala
385                 390                 395                 400

Ser Ala Ala Pro Ala Ile Arg Tyr Asn His Ile Tyr Gly Ile Asp Leu
                405                 410                 415

Thr Asp Thr Lys Asn Leu Ile Ala Tyr Asn Arg Thr Asp Glu Glu Val
            420                 425                 430

Ala Glu Val Ile Gly Cys Glu Arg Val Ile Tyr Gln Ser Leu Glu Asp
        435                 440                 445

Leu Ile Asp Cys Cys Lys Thr Asp Lys Ile Thr Lys Phe Glu Asp Gly
        450                 455                 460

Val Phe Thr Gly Asn Tyr Val Thr Gly Val Glu Asp Gly Tyr Ile Gln
465                 470                 475                 480

Glu Leu Glu Glu Lys Arg Glu Ser Ile Ala Asn Asn Ser Ser Asp Met
                485                 490                 495

Lys Ala Glu Val Asp Ile Gly Leu Tyr Asn Cys Ala Asp Tyr
                500                 505                 510

<210> SEQ ID NO 28
<211> LENGTH: 505
<212> TYPE: PRT
<213> ORGANISM: Escherichia coli

<400> SEQUENCE: 28

Met Cys Gly Ile Val Gly Ile Ala Gly Val Met Pro Val Asn Gln Ser
1               5                   10                  15

Ile Tyr Asp Ala Leu Thr Val Leu Gln His Arg Gly Gln Asp Ala Ala
            20                  25                  30

Gly Ile Ile Thr Ile Asp Ala Asn Asn Cys Phe Arg Leu Arg Lys Ala
        35                  40                  45

Asn Gly Leu Val Ser Asp Val Phe Glu Ala Arg His Met Gln Arg Leu
    50                  55                  60

Gln Gly Asn Met Gly Ile Gly His Val Arg Tyr Pro Thr Ala Gly Ser
65                  70                  75                  80

Ser Ser Ala Ser Glu Ala Gln Pro Phe Tyr Val Asn Ser Pro Tyr Gly
                85                  90                  95

Ile Thr Leu Ala His Asn Gly Asn Leu Thr Asn Ala His Glu Leu Arg
            100                 105                 110

Lys Lys Leu Phe Glu Glu Lys Arg Arg His Ile Asn Thr Thr Ser Asp
        115                 120                 125

Ser Glu Ile Leu Leu Asn Ile Phe Ala Ser Glu Leu Asp Asn Phe Arg
    130                 135                 140

His Tyr Pro Leu Glu Ala Asp Asn Ile Phe Ala Ala Ile Ala Ala Thr
145                 150                 155                 160

Asn Arg Leu Ile Arg Gly Ala Tyr Ala Cys Val Ala Met Ile Ile Gly
            165                 170                 175

His Gly Met Val Ala Phe Arg Asp Pro Asn Gly Ile Arg Pro Leu Val
        180                 185                 190

Leu Gly Lys Arg Asp Ile Asp Glu Asn Arg Thr Glu Tyr Met Val Ala
            195                 200                 205

Ser Glu Ser Val Ala Leu Asp Thr Leu Gly Phe Asp Phe Leu Arg Asp
210                 215                 220

Val Ala Pro Gly Glu Ala Ile Tyr Ile Thr Glu Gly Gln Leu Phe
225                 230                 235                 240

Thr Arg Gln Cys Ala Asp Asn Pro Val Ser Asn Pro Cys Leu Phe Glu
            245                 250                 255

Tyr Val Tyr Phe Ala Arg Pro Asp Ser Phe Ile Asp Lys Ile Ser Val
            260                 265                 270

Tyr Ser Ala Arg Val Asn Met Gly Thr Lys Leu Gly Glu Lys Ile Ala
            275                 280                 285

Arg Glu Trp Glu Asp Leu Asp Ile Asp Val Val Ile Pro Ile Pro Glu
            290                 295                 300

Thr Ser Cys Asp Ile Ala Leu Glu Ile Ala Arg Ile Leu Gly Lys Pro
305                 310                 315                 320

Tyr Arg Gln Gly Phe Val Lys Asn Arg Tyr Val Gly Arg Thr Phe Ile
            325                 330                 335

Met Pro Gly Gln Gln Leu Arg Arg Lys Ser Val Arg Arg Lys Leu Asn
            340                 345                 350

Ala Asn Arg Ala Glu Phe Arg Asp Lys Asn Val Leu Leu Val Asp Asp
            355                 360                 365

Ser Ile Val Arg Gly Thr Thr Ser Glu Gln Ile Ile Glu Met Ala Arg
370                 375                 380

Glu Ala Gly Ala Lys Lys Val Tyr Leu Ala Ser Ala Ala Pro Glu Ile
385                 390                 395                 400

Arg Phe Pro Asn Val Tyr Gly Ile Asp Met Pro Ser Ala Thr Glu Leu
            405                 410                 415

Ile Ala His Gly Arg Glu Val Asp Glu Ile Arg Gln Ile Ile Gly Ala
            420                 425                 430

Asp Gly Leu Ile Phe Gln Asp Leu Lys Asp Leu Ile Asp Ala Val Arg
            435                 440                 445

Ala Glu Asn Pro Asp Ile Gln Gln Phe Glu Cys Ser Val Phe Asn Gly
            450                 455                 460

Val Tyr Val Thr Lys Asp Val Asp Gln Gly Tyr Leu Asp Phe Leu Asp
465                 470                 475                 480

Thr Leu Arg Asn Asp Asp Ala Lys Ala Val Gln Arg Gln Asn Glu Val
            485                 490                 495

Glu Asn Leu Glu Met His Asn Glu Gly
            500                 505

<210> SEQ ID NO 29
<211> LENGTH: 527
<212> TYPE: PRT
<213> ORGANISM: Saccharomyces cerevisiae

<400> SEQUENCE: 29

Met Pro Met Asp Phe Gln Pro Thr Ser Ser His Ser Asn Trp Val Val

-continued

```
1               5                   10                  15
Gln Lys Phe Gly Gly Thr Ser Val Gly Lys Phe Pro Val Gln Ile Val
                20                  25                  30
Asp Asp Ile Val Lys His Tyr Ser Lys Pro Asp Gly Pro Asn Asn Asn
                35                  40                  45
Val Ala Val Val Cys Ser Ala Arg Ser Ser Tyr Thr Lys Ala Glu Gly
    50                  55                  60
Thr Thr Ser Arg Leu Leu Lys Cys Cys Asp Leu Ala Ser Gln Glu Ser
65                  70                  75                  80
Glu Phe Gln Asp Ile Ile Glu Val Ile Arg Gln Asp His Ile Asp Asn
                85                  90                  95
Ala Asp Arg Phe Ile Leu Asn Pro Ala Leu Gln Ala Lys Leu Val Asp
                100                 105                 110
Asp Thr Asn Lys Glu Leu Glu Leu Val Lys Lys Tyr Leu Asn Ala Ser
                115                 120                 125
Lys Val Leu Gly Glu Val Ser Ser Arg Thr Val Asp Leu Val Met Ser
                130                 135                 140
Cys Gly Glu Lys Leu Ser Cys Leu Phe Met Thr Ala Leu Cys Asn Asp
145                 150                 155                 160
Arg Gly Cys Lys Ala Lys Tyr Val Asp Leu Ser His Ile Val Pro Ser
                165                 170                 175
Asp Phe Ser Ala Ser Ala Leu Asp Asn Ser Phe Tyr Thr Phe Leu Val
                180                 185                 190
Gln Ala Phe Lys Glu Lys Leu Ala Pro Phe Val Ser Ala Lys Glu Arg
                195                 200                 205
Ile Val Pro Val Phe Thr Gly Phe Gly Leu Val Pro Thr Gly Leu
                210                 215                 220
Leu Asn Gly Val Gly Arg Gly Tyr Thr Asp Leu Cys Ala Ala Leu Ile
225                 230                 235                 240
Ala Val Ala Val Asn Ala Asp Glu Leu Gln Val Trp Lys Glu Val Asp
                245                 250                 255
Gly Ile Phe Thr Ala Asp Pro Arg Lys Val Pro Glu Ala Arg Leu Leu
                260                 265                 270
Asp Ser Val Thr Pro Glu Glu Ala Ser Glu Leu Thr Tyr Tyr Gly Ser
                275                 280                 285
Glu Val Ile His Pro Phe Thr Met Glu Gln Val Ile Arg Ala Lys Ile
                290                 295                 300
Pro Ile Arg Ile Lys Asn Val Gln Asn Pro Leu Gly Asn Gly Thr Ile
305                 310                 315                 320
Ile Tyr Pro Asp Asn Val Ala Lys Lys Gly Glu Ser Thr Pro Pro His
                325                 330                 335
Pro Pro Glu Asn Leu Ser Ser Phe Tyr Glu Lys Arg Lys Arg Gly
                340                 345                 350
Ala Thr Ala Ile Thr Thr Lys Asn Asp Ile Phe Val Ile Asn Ile His
                355                 360                 365
Ser Asn Lys Lys Thr Leu Ser His Gly Phe Leu Ala Gln Ile Phe Thr
370                 375                 380
Ile Leu Asp Lys Tyr Lys Leu Val Asp Leu Ile Ser Thr Ser Glu
385                 390                 395                 400
Val His Val Ser Met Ala Leu Pro Ile Pro Asp Ala Asp Ser Leu Lys
                405                 410                 415
Ser Leu Arg Gln Ala Glu Glu Lys Leu Arg Ile Leu Gly Ser Val Asp
                420                 425                 430
```

Ile Thr Lys Lys Leu Ser Ile Val Ser Leu Val Gly Lys His Met Lys
            435                 440                 445

Gln Tyr Ile Gly Ile Ala Gly Thr Met Phe Thr Thr Leu Ala Glu Glu
            450                 455                 460

Gly Ile Asn Ile Glu Met Ile Ser Gln Gly Ala Asn Glu Ile Asn Ile
465                 470                 475                 480

Ser Cys Val Ile Asn Glu Ser Asp Ser Ile Lys Ala Leu Gln Cys Ile
            485                 490                 495

His Ala Lys Leu Leu Ser Glu Arg Thr Asn Thr Ser Asn Gln Phe Glu
            500                 505                 510

His Ala Ile Asp Glu Arg Leu Glu Gln Leu Lys Arg Leu Gly Ile
            515                 520                 525

<210> SEQ ID NO 30
<211> LENGTH: 1068
<212> TYPE: PRT
<213> ORGANISM: Saccharomyces cerevisiae

<400> SEQUENCE: 30

Met Arg Gly Leu Thr Pro Lys Asn Gly Val His Ile Glu Thr Gly Pro
1               5                   10                  15

Asp Thr Glu Ser Ser Ala Asp Ser Ser Asn Phe Ser Thr Gly Phe Ser
            20                  25                  30

Gly Lys Ile Arg Lys Pro Arg Ser Lys Val Ser Lys Ala Cys Asp Asn
            35                  40                  45

Cys Arg Lys Arg Lys Ile Lys Cys Asn Gly Lys Phe Pro Cys Ala Ser
50                  55                  60

Cys Glu Ile Tyr Ser Cys Glu Cys Thr Phe Ser Thr Arg Gln Gly Gly
65                  70                  75                  80

Ala Arg Ile Lys Asn Leu His Lys Thr Ser Leu Glu Gly Thr Thr Val
            85                  90                  95

Gln Val Lys Glu Glu Thr Asp Ser Ser Thr Ser Phe Ser Asn Pro
            100                 105                 110

Gln Arg Cys Thr Asp Gly Pro Cys Ala Val Glu Gln Pro Thr Lys Phe
            115                 120                 125

Phe Glu Asn Phe Lys Leu Gly Gly Arg Ser Ser Gly Asp Asn Ser Gly
            130                 135                 140

Ser Asp Gly Lys Asn Asp Asp Val Asn Arg Asn Gly Phe Tyr Glu
145                 150                 155                 160

Asp Asp Ser Glu Ser Gln Ala Thr Leu Thr Ser Leu Gln Thr Thr Leu
            165                 170                 175

Lys Asn Leu Lys Glu Met Ala His Leu Gly Thr His Val Thr Ser Ala
            180                 185                 190

Ile Glu Ser Ile Glu Leu Gln Ile Ser Asp Leu Leu Lys Arg Trp Glu
            195                 200                 205

Pro Lys Val Arg Thr Lys Glu Leu Ala Thr Thr Lys Phe Tyr Pro Asn
            210                 215                 220

Lys Ser Ile Glu Thr Gln Leu Met Lys Asn Lys Tyr Cys Asp Val Val
225                 230                 235                 240

His Leu Thr Arg Tyr Ala Ala Trp Ser Asn Asn Lys Lys Asp Gln Asp
            245                 250                 255

Thr Ser Ser Gln Pro Leu Ile Asp Glu Ile Phe Gly Leu Tyr Ser Pro
            260                 265                 270

Phe Gln Phe Leu Ser Leu Gln Gly Ile Gly Lys Cys Phe Gln Asn Tyr

```
              275                 280                 285
Arg Ser Lys Ser Lys Cys Glu Ile Phe Pro Arg Thr Ala Lys Glu Thr
290                 295                 300

Ile Tyr Ile Met Leu Arg Phe Phe Asp Val Cys Phe His His Ile Asn
305                 310                 315                 320

Gln Gly Cys Val Ser Ile Ala Asn Pro Leu Glu Asn Tyr Leu Gln Lys
                    325                 330                 335

Met Asn Leu Leu Pro Ser Thr Pro Ser Ser Ile Ser Ser Ala Gly Ser
                340                 345                 350

Pro Asn Thr Ala His Thr Lys Ser His Val Ala Leu Val Ile Asn His
            355                 360                 365

Leu Pro Gln Pro Phe Val Arg Asn Ile Thr Gly Ile Ser Asn Ser Glu
370                 375                 380

Leu Leu Ser Glu Met Asn Asn Asp Ile Ser Met Phe Gly Ile Leu Leu
385                 390                 395                 400

Lys Met Leu Asp Met His Lys Asn Ser Tyr Gln Asn Phe Leu Met Glu
                    405                 410                 415

Ile Thr Ser Asn Pro Ser Val Ala Lys Asn Thr Gln Ser Ile Asp Val
                420                 425                 430

Leu Gln Glu Phe Ile His Tyr Cys Gln Ala Gly Glu Ala Leu Ile Ala
            435                 440                 445

Leu Cys Tyr Ser Tyr Tyr Asn Ser Thr Leu Tyr Asn Tyr Val Asp Phe
450                 455                 460

Thr Cys Asp Ile Thr His Leu Glu Gln Leu Leu Tyr Phe Leu Asp Leu
465                 470                 475                 480

Leu Phe Trp Leu Ser Glu Ile Tyr Gly Phe Glu Lys Val Leu Asn Val
                    485                 490                 495

Ala Val His Phe Val Ser Arg Val Gly Leu Ser Arg Trp Glu Phe Tyr
                500                 505                 510

Val Gly Leu Asp Glu Asn Phe Ala Glu Arg Arg Arg Asn Leu Trp Trp
            515                 520                 525

Lys Ala Phe Tyr Phe Glu Lys Thr Leu Ala Ser Lys Leu Gly Tyr Pro
530                 535                 540

Ser Asn Ile Asp Asp Ser Lys Ile Asn Cys Leu Leu Pro Lys Asn Phe
545                 550                 555                 560

Arg Asp Val Gly Phe Leu Asp Asn Arg Asp Phe Ile Glu Asn Val His
                    565                 570                 575

Leu Val Arg Arg Ser Glu Ala Phe Asp Asn Met Cys Ile Ser Asp Leu
                580                 585                 590

Lys Tyr Tyr Gly Glu Leu Ala Val Leu Gln Ile Val Ser His Phe Ser
            595                 600                 605

Ser Ser Val Leu Phe Asn Glu Lys Phe Thr Ser Ile Arg Asn Thr Ser
610                 615                 620

Lys Pro Ser Val Val Arg Glu Lys Leu Phe Glu Val Leu Glu Ile
625                 630                 635                 640

Phe Asn Glu Thr Glu Met Lys Tyr Asp Ala Ile Lys Glu Gln Thr Gly
                    645                 650                 655

Lys Leu Phe Asp Ile Ala Phe Ser Lys Asp Ser Thr Leu Lys Val
                660                 665                 670

Ser Arg Glu Asp Lys Ile Met Ala Ser Lys Phe Val Leu Phe Tyr Glu
            675                 680                 685

His His Phe Cys Arg Met Val Asn Glu Ser Asp Asn Ile Val Ala Arg
690                 695                 700
```

Leu Cys Val His Arg Arg Pro Ser Ile Leu Ile Glu Asn Leu Lys Ile
705                 710                 715                 720

Tyr Leu His Lys Ile Tyr Lys Ser Trp Thr Asp Met Asn Lys Ile Leu
            725                 730                 735

Leu Asp Phe Asp Asn Asp Tyr Ser Val Tyr Arg Ser Phe Ala His Tyr
            740                 745                 750

Ser Ile Ser Cys Ile Ile Leu Val Ser Gln Ala Phe Ser Val Ala Glu
            755                 760                 765

Phe Ile Lys Val Asn Asp Val Val Asn Met Ile Arg Val Phe Lys Arg
770                 775                 780

Phe Leu Asp Ile Lys Ile Phe Ser Glu Asn Thr Asn Glu His Val
785                 790                 795                 800

Phe Asn Ser Gln Ser Phe Lys Asp Tyr Thr Arg Ala Phe Ser Phe Leu
            805                 810                 815

Thr Ile Val Thr Arg Ile Met Leu Leu Ala Tyr Gly Glu Ser Ser Ser
            820                 825                 830

Thr Asn Leu Asp Val Ile Ser Lys Tyr Ile Asp Glu Asn Ala Pro Asp
            835                 840                 845

Leu Lys Gly Ile Ile Glu Leu Val Leu Asp Thr Asn Ser Cys Ala Tyr
850                 855                 860

Arg Phe Leu Leu Glu Pro Val Gln Lys Ser Gly Phe His Leu Thr Val
865                 870                 875                 880

Ser Gln Met Leu Lys Asn Arg Lys Phe Gln Glu Pro Leu Met Ser Asn
            885                 890                 895

Glu Asp Asn Lys Gln Met Lys His Asn Ser Gly Lys Asn Leu Asn Pro
            900                 905                 910

Asp Leu Pro Ser Leu Lys Thr Gly Thr Ser Cys Leu Leu Asn Gly Ile
            915                 920                 925

Glu Ser Pro Gln Leu Pro Phe Asn Gly Arg Ser Ala Pro Ser Pro Val
930                 935                 940

Arg Asn Asn Ser Leu Pro Glu Phe Ala Gln Leu Pro Ser Phe Arg Ser
945                 950                 955                 960

Leu Ser Val Ser Asp Met Ile Asn Pro Asp Tyr Ala Gln Pro Thr Asn
            965                 970                 975

Gly Gln Asn Asn Thr Gln Val Gln Ser Asn Lys Pro Ile Asn Ala Gln
            980                 985                 990

Gln Gln Ile Pro Thr Ser Val Gln Val Pro Phe Met Asn Thr Asn Glu
            995                 1000                1005

Ile Asn Asn Asn Asn Asn Asn Asn Asn Asn Lys Asn Asn Ile
    1010                1015                1020

Asn Asn Ile Asn Asn Asn Asn Ser Asn Asn Phe Ser Ala Thr Ser
    1025                1030                1035

Phe Asn Leu Gly Thr Leu Asp Glu Phe Val Asn Asn Gly Asp Leu
    1040                1045                1050

Glu Asp Leu Tyr Ser Ile Leu Trp Ser Asp Val Tyr Pro Asp Ser
    1055                1060                1065

<210> SEQ ID NO 31
<211> LENGTH: 1081
<212> TYPE: PRT
<213> ORGANISM: Saccharomyces cerevisiae

<400> SEQUENCE: 31

Met Ser Ala Ala Pro Val Gln Asp Lys Asp Thr Leu Ser Asn Ala Glu

-continued

```
1               5                   10                  15
Arg Ala Lys Asn Val Asn Gly Leu Leu Gln Val Leu Met Asp Ile Asn
                20                  25                  30
Thr Leu Asn Gly Gly Ser Ser Asp Thr Ala Asp Lys Ile Arg Ile His
                35                  40                  45
Ala Lys Asn Phe Glu Ala Ala Leu Phe Ala Lys Ser Ser Lys Lys
 50                  55                  60
Glu Tyr Met Asp Ser Met Asn Glu Lys Val Ala Val Met Arg Asn Thr
 65                  70                  75                  80
Tyr Asn Thr Arg Lys Asn Ala Val Thr Ala Ala Ala Asn Asn
                85                  90                  95
Ile Lys Pro Val Glu Gln His His Ile Asn Asn Leu Lys Asn Ser Gly
                100                 105                 110
Asn Ser Ala Asn Asn Met Asn Val Asn Met Asn Leu Asn Pro Gln Met
                115                 120                 125
Phe Leu Asn Gln Gln Ala Gln Ala Arg Gln Gln Val Ala Gln Gln Leu
 130                 135                 140
Arg Asn Gln Gln Gln Gln Gln Gln Gln Gln Gln Gln Gln Arg Arg
 145                 150                 155                 160
Gln Leu Thr Pro Gln Gln Gln Leu Val Asn Gln Met Lys Val Ala
                165                 170                 175
Pro Ile Pro Lys Gln Leu Leu Gln Arg Ile Pro Asn Ile Pro Pro Asn
                180                 185                 190
Ile Asn Thr Trp Gln Gln Val Thr Ala Leu Ala Gln Gln Lys Leu Leu
                195                 200                 205
Thr Pro Gln Asp Met Glu Ala Ala Lys Glu Val Tyr Lys Ile His Gln
 210                 215                 220
Gln Leu Leu Phe Lys Ala Arg Leu Gln Gln Gln Ala Gln Ala Gln
 225                 230                 235                 240
Ala Gln Ala Asn Asn Asn Asn Gly Leu Pro Gln Asn Gly Asn Ile
                245                 250                 255
Asn Asn Asn Ile Asn Ile Pro Gln Gln Gln Met Gln Pro Pro Asn
                260                 265                 270
Ser Ser Ala Asn Asn Asn Pro Leu Gln Gln Gln Ser Ser Gln Asn Thr
 275                 280                 285
Val Pro Asn Val Leu Asn Gln Ile Asn Gln Ile Phe Ser Pro Glu Glu
                290                 295                 300
Gln Arg Ser Leu Leu Gln Glu Ala Ile Glu Thr Cys Lys Asn Phe Glu
 305                 310                 315                 320
Lys Thr Gln Leu Gly Ser Thr Met Thr Glu Pro Val Lys Gln Ser Phe
                325                 330                 335
Ile Arg Lys Tyr Ile Asn Gln Lys Ala Leu Arg Lys Ile Gln Ala Leu
                340                 345                 350
Arg Asp Val Lys Asn Asn Asn Ala Asn Asn Asn Gly Ser Asn Leu
                355                 360                 365
Gln Arg Ala Gln Asn Val Pro Met Asn Ile Ile Gln Gln Gln Gln
 370                 375                 380
Gln Asn Thr Asn Asn Asn Asp Thr Ile Ala Thr Ser Ala Thr Pro Asn
 385                 390                 395                 400
Ala Ala Ala Phe Ser Gln Gln Gln Asn Ala Ser Ser Lys Leu Tyr Gln
                405                 410                 415
Met Gln Gln Gln Gln Ala Gln Ala Gln Ala Gln Ala Gln
                420                 425                 430
```

```
Ala Gln Ala Gln Ala Gln Ala Gln Ala Gln Ala Gln Ala Gln
        435                 440                 445
Ala Gln Ala Gln Ala Gln Ala Gln Ala Gln Ala Gln Ala Gln
        450                 455                 460
Ala Gln Ala Gln Ala Gln Ala Gln Ala Gln Ala Gln Ala Gln
465                 470                 475                 480
Ala His Ala Gln His Gln Pro Ser Gln Pro Gln Ala Gln Gln
                        485                 490                 495
Gln Pro Asn Pro Leu His Gly Leu Thr Pro Thr Ala Lys Asp Val Glu
                500                 505                 510
Val Ile Lys Gln Leu Ser Leu Asp Ala Ser Lys Thr Asn Leu Arg Leu
                515                 520                 525
Thr Asp Val Thr Asn Ser Leu Ser Asn Glu Glu Lys Glu Lys Ile Lys
                530                 535                 540
Met Lys Leu Lys Gln Gly Gln Lys Leu Phe Val Gln Val Ser Asn Phe
545                 550                 555                 560
Ala Pro Gln Val Tyr Ile Ile Thr Lys Asn Glu Asn Phe Leu Lys Glu
                        565                 570                 575
Val Phe Gln Leu Arg Ile Phe Val Lys Glu Ile Leu Glu Lys Cys Ala
                580                 585                 590
Glu Gly Ile Phe Val Val Lys Leu Asp Thr Val Asp Arg Leu Ile Ile
                        595                 600                 605
Lys Tyr Gln Lys Tyr Trp Glu Ser Met Arg Ile Gln Ile Leu Arg Arg
                610                 615                 620
Gln Ala Ile Leu Arg Gln Gln Gln Gln Met Ala Asn Asn Asn Gly Asn
625                 630                 635                 640
Pro Gly Thr Thr Ser Thr Gly Asn Asn Asn Asn Ile Ala Thr Gln Gln
                        645                 650                 655
Asn Met Gln Gln Ser Leu Gln Gln Met Gln His Leu Gln Gln Leu Lys
                660                 665                 670
Met Gln Gln Gln Gln Gln Gln Gln Gln Gln Gln Gln Gln Gln
                675                 680                 685
Gln Gln Gln Gln Gln Gln Gln His Ile Tyr Pro Ser Ser Thr Pro
                690                 695                 700
Gly Val Ala Asn Tyr Ser Ala Met Ala Asn Ala Pro Gly Asn Asn Ile
705                 710                 715                 720
Pro Tyr Met Asn His Lys Asn Thr Ser Ser Met Asp Phe Leu Asn Ser
                        725                 730                 735
Met Glu Asn Thr Pro Lys Val Pro Val Ser Ala Ala Thr Pro Ser
                740                 745                 750
Leu Asn Lys Thr Ile Asn Gly Lys Val Asn Gly Arg Thr Lys Ser Asn
                755                 760                 765
Thr Ile Pro Val Thr Ser Ile Pro Ser Thr Asn Lys Lys Leu Ser Ile
        770                 775                 780
Ser Asn Ala Ala Ser Gln Gln Pro Thr Pro Arg Ser Ala Ser Asn Thr
785                 790                 795                 800
Ala Lys Ser Thr Pro Asn Thr Asn Pro Ser Pro Leu Lys Thr Gln Thr
                        805                 810                 815
Lys Asn Gly Thr Pro Asn Pro Asn Asn Met Lys Thr Val Gln Ser Pro
                820                 825                 830
Met Gly Ala Gln Pro Ser Tyr Asn Ser Ala Ile Ile Glu Asn Ala Phe
                        835                 840                 845
```

Arg Lys Glu Glu Leu Leu Lys Asp Leu Glu Ile Arg Lys Leu Glu
    850             855                 860

Ile Ser Ser Arg Phe Lys His Arg Gln Glu Ile Phe Lys Asp Ser Pro
865             870                 875                 880

Met Asp Leu Phe Met Ser Thr Leu Gly Asp Cys Leu Gly Ile Lys Asp
                885                 890                 895

Glu Glu Met Leu Thr Ser Cys Thr Ile Pro Lys Ala Val Val Asp His
            900                 905                 910

Ile Asn Gly Ser Gly Lys Arg Lys Pro Thr Lys Ala Ala Gln Arg Ala
            915                 920                 925

Arg Asp Gln Asp Ser Ile Asp Ile Ser Ile Lys Asp Asn Lys Leu Val
    930                 935                 940

Met Lys Ser Lys Phe Asn Lys Ser Asn Arg Ser Tyr Ser Ile Ala Leu
945             950                 955                 960

Ser Asn Val Ala Ala Ile Phe Lys Gly Ile Gly Asn Phe Lys Asp
                965                 970                 975

Leu Ser Thr Leu Val His Ser Ser Pro Ser Thr Ser Ser Asn Met
            980                 985                 990

Asp Val Gly Asn Pro Arg Lys Arg Lys Ala Ser Val Leu Glu Ile Ser
            995                 1000                1005

Pro Gln Asp Ser Ile Ala Ser Val Leu Ser Pro Asp Ser Asn Ile
    1010            1015                1020

Met Ser Asp Ser Lys Lys Ile Lys Val Asp Ser Pro Asp Asp Pro
    1025            1030                1035

Phe Met Thr Lys Ser Gly Ala Thr Thr Ser Glu Lys Gln Glu Val
    1040            1045                1050

Thr Asn Glu Ala Pro Phe Leu Thr Ser Gly Thr Ser Ser Glu Gln
    1055            1060                1065

Phe Asn Val Trp Asp Trp Asn Asn Trp Thr Ser Ala Thr
    1070            1075                1080

<210> SEQ ID NO 32
<211> LENGTH: 27
<212> TYPE: DNA
<213> ORGANISM: Artificial
<220> FEATURE:
<223> OTHER INFORMATION: Primer

<400> SEQUENCE: 32
gtatgaagta atacagaaaa ggaaaac                                    27

<210> SEQ ID NO 33
<211> LENGTH: 46
<212> TYPE: DNA
<213> ORGANISM: Artificial
<220> FEATURE:
<223> OTHER INFORMATION: Primer

<400> SEQUENCE: 33
gacctgcagc gtacgaagct tcagcaatct ctggtggaac gtctag               46

<210> SEQ ID NO 34
<211> LENGTH: 24
<212> TYPE: DNA
<213> ORGANISM: Artificial
<220> FEATURE:
<223> OTHER INFORMATION: Primer

<400> SEQUENCE: 34
ctgaagcttc gtacgctgca ggtc                                          24

<210> SEQ ID NO 35
<211> LENGTH: 24
<212> TYPE: DNA
<213> ORGANISM: Artificial
<220> FEATURE:
<223> OTHER INFORMATION: Primer

<400> SEQUENCE: 35
ggccactagt ggatctgata tcac                                          24

<210> SEQ ID NO 36
<211> LENGTH: 52
<212> TYPE: DNA
<213> ORGANISM: Artificial
<220> FEATURE:
<223> OTHER INFORMATION: Primer

<400> SEQUENCE: 36
gtgatatcag atccactagt ggcccctgaa ccaaaacttc aaattcgaat ac           52

<210> SEQ ID NO 37
<211> LENGTH: 25
<212> TYPE: DNA
<213> ORGANISM: Artificial
<220> FEATURE:
<223> OTHER INFORMATION: Primer

<400> SEQUENCE: 37
gcattcaaac tctaaaataa caaag                                         25

<210> SEQ ID NO 38
<211> LENGTH: 48
<212> TYPE: DNA
<213> ORGANISM: Artificial
<220> FEATURE:
<223> OTHER INFORMATION: Primer

<400> SEQUENCE: 38
gtgatatcag atccactagt ggccatagct tcaaaatgtt tctactcc                48

<210> SEQ ID NO 39
<211> LENGTH: 28
<212> TYPE: DNA
<213> ORGANISM: Artificial
<220> FEATURE:
<223> OTHER INFORMATION: Primer

<400> SEQUENCE: 39
tttgtaatta aaacttagat tagattgc                                      28

<210> SEQ ID NO 40
<211> LENGTH: 54
<212> TYPE: DNA
<213> ORGANISM: Artificial
<220> FEATURE:
<223> OTHER INFORMATION: Primer

<400> SEQUENCE: 40
gcaatctaat ctaagtttta attacaaaat gtctagtact caagtaggaa atgc         54

<210> SEQ ID NO 41
<211> LENGTH: 51
<212> TYPE: DNA
<213> ORGANISM: Artificial

```
<220> FEATURE:
<223> OTHER INFORMATION: Primer

<400> SEQUENCE: 41
gtgctagtgt ctcccgtctt ctgttcaatc gagttcagag tctatgtata c      51

<210> SEQ ID NO 42
<211> LENGTH: 24
<212> TYPE: DNA
<213> ORGANISM: Artificial
<220> FEATURE:
<223> OTHER INFORMATION: Primer

<400> SEQUENCE: 42
acagaagacg ggagacacta gcac                                    24

<210> SEQ ID NO 43
<211> LENGTH: 26
<212> TYPE: DNA
<213> ORGANISM: Artificial
<220> FEATURE:
<223> OTHER INFORMATION: Primer

<400> SEQUENCE: 43
attttcaaca tcgtattttc cgaagc                                  26

<210> SEQ ID NO 44
<211> LENGTH: 54
<212> TYPE: DNA
<213> ORGANISM: Artificial
<220> FEATURE:
<223> OTHER INFORMATION: Primer

<400> SEQUENCE: 44
gcttcggaaa atacgatgtt gaaatcctg aaccaaaact tcaaattcga atac     54

<210> SEQ ID NO 45
<211> LENGTH: 50
<212> TYPE: DNA
<213> ORGANISM: Artificial
<220> FEATURE:
<223> OTHER INFORMATION: Primer

<400> SEQUENCE: 45
gtgatatcag atccactagt ggcctgccgt aaaccactaa atcggaaccc         50

<210> SEQ ID NO 46
<211> LENGTH: 26
<212> TYPE: DNA
<213> ORGANISM: Artificial
<220> FEATURE:
<223> OTHER INFORMATION: Primer

<400> SEQUENCE: 46
tagggcccac aagcttacgc gtcgac                                  26

<210> SEQ ID NO 47
<211> LENGTH: 51
<212> TYPE: DNA
<213> ORGANISM: Artificial
<220> FEATURE:
<223> OTHER INFORMATION: Primer

<400> SEQUENCE: 47
gtcgacgcgt aagcttgtgg gccctactaa tttaattcct tggctgccca g       51
```

<210> SEQ ID NO 48
<211> LENGTH: 52
<212> TYPE: DNA
<213> ORGANISM: Artificial
<220> FEATURE:
<223> OTHER INFORMATION: Primer

<400> SEQUENCE: 48
ctacttttta caacaaatat aacaaaatgg cacaagaaat cactcaccca ac         52

<210> SEQ ID NO 49
<211> LENGTH: 26
<212> TYPE: DNA
<213> ORGANISM: Artificial
<220> FEATURE:
<223> OTHER INFORMATION: Primer

<400> SEQUENCE: 49
tttgttatat ttgttgtaaa aagtag                                       26

<210> SEQ ID NO 50
<211> LENGTH: 26
<212> TYPE: DNA
<213> ORGANISM: Artificial
<220> FEATURE:
<223> OTHER INFORMATION: Primer

<400> SEQUENCE: 50
acgcacagat attataacat ctgcac                                       26

<210> SEQ ID NO 51
<211> LENGTH: 50
<212> TYPE: DNA
<213> ORGANISM: Artificial
<220> FEATURE:
<223> OTHER INFORMATION: Primer

<400> SEQUENCE: 51
gtgcagatgt tataatatct gtgcgtatag cttcaaaatg tttctactcc            50

<210> SEQ ID NO 52
<211> LENGTH: 51
<212> TYPE: DNA
<213> ORGANISM: Artificial
<220> FEATURE:
<223> OTHER INFORMATION: Primer

<400> SEQUENCE: 52
cttcggaaaa tacgatgttg aaaatgttac tccgcaacgc ttttctgaac g          51

<210> SEQ ID NO 53
<211> LENGTH: 28
<212> TYPE: DNA
<213> ORGANISM: Artificial
<220> FEATURE:
<223> OTHER INFORMATION: Primer

<400> SEQUENCE: 53
taaagtaaga gcgctacatt ggtctacc                                     28

<210> SEQ ID NO 54
<211> LENGTH: 56
<212> TYPE: DNA
<213> ORGANISM: Artificial
<220> FEATURE:
<223> OTHER INFORMATION: Primer

```
<400> SEQUENCE: 54
ggtagaccaa tgtagcgctc ttactttatc atattttctt ctgcaatttc atatag          56

<210> SEQ ID NO 55
<211> LENGTH: 56
<212> TYPE: DNA
<213> ORGANISM: Artificial
<220> FEATURE:
<223> OTHER INFORMATION: Primer

<400> SEQUENCE: 55
gtttcgaata acacacata aacaaacaaa atgactgtca ccataaaaga attgac          56

<210> SEQ ID NO 56
<211> LENGTH: 30
<212> TYPE: DNA
<213> ORGANISM: Artificial
<220> FEATURE:
<223> OTHER INFORMATION: Primer

<400> SEQUENCE: 56
tttgtttgtt tatgtgtgtt tattcgaaac                                      30

<210> SEQ ID NO 57
<211> LENGTH: 26
<212> TYPE: DNA
<213> ORGANISM: Artificial
<220> FEATURE:
<223> OTHER INFORMATION: Primer

<400> SEQUENCE: 57
tcgagtttat cattatcaat actgcc                                          26

<210> SEQ ID NO 58
<211> LENGTH: 54
<212> TYPE: DNA
<213> ORGANISM: Artificial
<220> FEATURE:
<223> OTHER INFORMATION: Primer

<400> SEQUENCE: 58
ggcagtattg ataatgataa actcgacctg aaccaaaact tcaaattcga atac           54

<210> SEQ ID NO 59
<211> LENGTH: 54
<212> TYPE: DNA
<213> ORGANISM: Artificial
<220> FEATURE:
<223> OTHER INFORMATION: Primer

<400> SEQUENCE: 59
ggcagtattg ataatgataa actcgagttt aaagattacg gatatttaac ttac           54

<210> SEQ ID NO 60
<211> LENGTH: 34
<212> TYPE: DNA
<213> ORGANISM: Artificial
<220> FEATURE:
<223> OTHER INFORMATION: Primer

<400> SEQUENCE: 60
ttttagttta tgtatgtgtt ttttgtagtt atag                                 34

<210> SEQ ID NO 61
```

```
<211> LENGTH: 65
<212> TYPE: DNA
<213> ORGANISM: Artificial
<220> FEATURE:
<223> OTHER INFORMATION: Primer

<400> SEQUENCE: 61
gtgagggaga cctaactaca tagtgtttaa agattacgga tatttaactt acttagaata      60
atgcc                                                                 65

<210> SEQ ID NO 62
<211> LENGTH: 34
<212> TYPE: DNA
<213> ORGANISM: Artificial
<220> FEATURE:
<223> OTHER INFORMATION: Primer

<400> SEQUENCE: 62
ttttagttta tgtatgtgtt ttttgtagtt atag                                 34

<210> SEQ ID NO 63
<211> LENGTH: 61
<212> TYPE: DNA
<213> ORGANISM: Artificial
<220> FEATURE:
<223> OTHER INFORMATION: Primer

<400> SEQUENCE: 63
ctataactac aaaaaacaca tacataaact aaaaatgaag aatttgttga tcatcggtgc      60
t                                                                     61

<210> SEQ ID NO 64
<211> LENGTH: 64
<212> TYPE: DNA
<213> ORGANISM: Artificial
<220> FEATURE:
<223> OTHER INFORMATION: Primer

<400> SEQUENCE: 64
ctcattaaaa aactatatca attaatttga attaacttat tcacccaatg atggagtcat      60
ttcg                                                                  64

<210> SEQ ID NO 65
<211> LENGTH: 36
<212> TYPE: DNA
<213> ORGANISM: Artificial
<220> FEATURE:
<223> OTHER INFORMATION: Primer

<400> SEQUENCE: 65
gttaattcaa attaattgat atagtttttt aatgag                               36

<210> SEQ ID NO 66
<211> LENGTH: 35
<212> TYPE: DNA
<213> ORGANISM: Artificial
<220> FEATURE:
<223> OTHER INFORMATION: Primer

<400> SEQUENCE: 66
gataccgtcg acctcgagtc atgtaattag ttatg                                35

<210> SEQ ID NO 67
<211> LENGTH: 71
```

```
<212> TYPE: DNA
<213> ORGANISM: Artificial
<220> FEATURE:
<223> OTHER INFORMATION: Primer

<400> SEQUENCE: 67
cataactaat tacatgactc gaggtcgacg gtatcttaat ttcttaatga gtaatctta     60 taagaaaatt c                                                         71

<210> SEQ ID NO 68
<211> LENGTH: 63
<212> TYPE: DNA
<213> ORGANISM: Artificial
<220> FEATURE:
<223> OTHER INFORMATION: Primer

<400> SEQUENCE: 68
gtaattatct acttttttaca acaaatataa caaaatgttt tatgaaaaga ttcaaactcc   60
agc                                                                  63

<210> SEQ ID NO 69
<211> LENGTH: 34
<212> TYPE: DNA
<213> ORGANISM: Artificial
<220> FEATURE:
<223> OTHER INFORMATION: Primer

<400> SEQUENCE: 69
tttgttatat ttgttgtaaa aagtagataa ttac                                34

<210> SEQ ID NO 70
<211> LENGTH: 69
<212> TYPE: DNA
<213> ORGANISM: Artificial
<220> FEATURE:
<223> OTHER INFORMATION: Primer

<400> SEQUENCE: 70
ggatacccgg gtcgacgcgt aagcttgtgg gccctatttg taattaaaac ttagattaga    60
ttgctatgc                                                            69

<210> SEQ ID NO 71
<211> LENGTH: 63
<212> TYPE: DNA
<213> ORGANISM: Artificial
<220> FEATURE:
<223> OTHER INFORMATION: Primer

<400> SEQUENCE: 71
ctataactac aaaaaacaca tacataaact aaaaatgtct attttgcaaa ttggtgcagg    60
tgg                                                                  63

<210> SEQ ID NO 72
<211> LENGTH: 69
<212> TYPE: DNA
<213> ORGANISM: Artificial
<220> FEATURE:
<223> OTHER INFORMATION: Primer

<400> SEQUENCE: 72
ctcattaaaa aactatatca attaatttga attaacttat ttaacaactt gaatatctgg    60
ttgacctgg                                                            69
```

<210> SEQ ID NO 73
<211> LENGTH: 64
<212> TYPE: DNA
<213> ORGANISM: Artificial
<220> FEATURE:
<223> OTHER INFORMATION: Primer

<400> SEQUENCE: 73
cataactaat tacatgactc gaggtcgacg gtatcttatt caattgacca taaagacaaa    60
gttc    64

<210> SEQ ID NO 74
<211> LENGTH: 60
<212> TYPE: DNA
<213> ORGANISM: Artificial
<220> FEATURE:
<223> OTHER INFORMATION: Primer

<400> SEQUENCE: 74
gtaattatct acttttaca acaaatataa caaaatggaa actttgcaag atatcggtac    60

<210> SEQ ID NO 75
<211> LENGTH: 45
<212> TYPE: DNA
<213> ORGANISM: Artificial
<220> FEATURE:
<223> OTHER INFORMATION: Primer

<400> SEQUENCE: 75
cgtcctctcg aaaggtggtt taaagattac ggatatttaa cttac    45

<210> SEQ ID NO 76
<211> LENGTH: 56
<212> TYPE: DNA
<213> ORGANISM: Artificial
<220> FEATURE:
<223> OTHER INFORMATION: Primer

<400> SEQUENCE: 76
ctacaaaaaa cacatacata aactaaaaat gaacaggatt aagaatacat tttctg    56

<210> SEQ ID NO 77
<211> LENGTH: 53
<212> TYPE: DNA
<213> ORGANISM: Artificial
<220> FEATURE:
<223> OTHER INFORMATION: Primer

<400> SEQUENCE: 77
ggtcgacgcg taagcttgtg ggccctatta ccaatagttt ggaaataagt atc    53

<210> SEQ ID NO 78
<211> LENGTH: 38
<212> TYPE: DNA
<213> ORGANISM: Artificial
<220> FEATURE:
<223> OTHER INFORMATION: Primer

<400> SEQUENCE: 78
caggtggtca tggccctttg ccgtaaacca ctaaatcg    38

<210> SEQ ID NO 79
<211> LENGTH: 49
<212> TYPE: DNA
<213> ORGANISM: Artificial

```
<220> FEATURE:
<223> OTHER INFORMATION: Primer

<400> SEQUENCE: 79
ctacaaaaaa cacatacata aactaaaaat gaccttggca cccctagac          49

<210> SEQ ID NO 80
<211> LENGTH: 49
<212> TYPE: DNA
<213> ORGANISM: Artificial
<220> FEATURE:
<223> OTHER INFORMATION: Primer

<400> SEQUENCE: 80
ggtcgacgcg taagcttgtg ggccctatca gttcaaatca gtaacaacc          49

<210> SEQ ID NO 81
<211> LENGTH: 60
<212> TYPE: DNA
<213> ORGANISM: Artificial
<220> FEATURE:
<223> OTHER INFORMATION: Primer

<400> SEQUENCE: 81
cattaaaaaa ctatatcaat taatttgaat taacttacca atagtttgga aataagtatc    60

<210> SEQ ID NO 82
<211> LENGTH: 49
<212> TYPE: DNA
<213> ORGANISM: Artificial
<220> FEATURE:
<223> OTHER INFORMATION: Primer

<400> SEQUENCE: 82
catgactcga ggtcgacggt atctcagttc aaatcagtaa caacccttg          49

<210> SEQ ID NO 83
<211> LENGTH: 51
<212> TYPE: DNA
<213> ORGANISM: Artificial
<220> FEATURE:
<223> OTHER INFORMATION: Primer

<400> SEQUENCE: 83
cgaataaaca cacataaaca aacaaaatgg ctttggttgt tcaaaagtac g        51

<210> SEQ ID NO 84
<211> LENGTH: 56
<212> TYPE: DNA
<213> ORGANISM: Artificial
<220> FEATURE:
<223> OTHER INFORMATION: Primer

<400> SEQUENCE: 84
ctaaatcatt aaagtaactt aaggagttaa atttatctac cagtacctgc gtaaac    56

<210> SEQ ID NO 85
<211> LENGTH: 32
<212> TYPE: DNA
<213> ORGANISM: Artificial
<220> FEATURE:
<223> OTHER INFORMATION: Primer

<400> SEQUENCE: 85
atttaactcc ttaagttact ttaatgattt ag                            32
```

<210> SEQ ID NO 86
<211> LENGTH: 21
<212> TYPE: DNA
<213> ORGANISM: Artificial
<220> FEATURE:
<223> OTHER INFORMATION: Primer

<400> SEQUENCE: 86
gcgaatttct tatgatttat g                                     21

<210> SEQ ID NO 87
<211> LENGTH: 49
<212> TYPE: DNA
<213> ORGANISM: Artificial
<220> FEATURE:
<223> OTHER INFORMATION: Primer

<400> SEQUENCE: 87
cataaatcat aagaaattcg cttatttaac taacaattca gcaatttgg       49

<210> SEQ ID NO 88
<211> LENGTH: 48
<212> TYPE: DNA
<213> ORGANISM: Artificial
<220> FEATURE:
<223> OTHER INFORMATION: Primer

<400> SEQUENCE: 88
ctacttttta caacaaatat aacaaaatga ctacaattgc tgttgttg        48

<210> SEQ ID NO 89
<211> LENGTH: 49
<212> TYPE: DNA
<213> ORGANISM: Artificial
<220> FEATURE:
<223> OTHER INFORMATION: Primer

<400> SEQUENCE: 89
caatctaatc taagttttaa ttacaaaatg tcttcagttt ctttacaag       49

<210> SEQ ID NO 90
<211> LENGTH: 55
<212> TYPE: DNA
<213> ORGANISM: Artificial
<220> FEATURE:
<223> OTHER INFORMATION: Primer

<400> SEQUENCE: 90
cattaaaaaa ctatatcaat taatttgaat taacttaatt agcgtaatgt tcagc    55

<210> SEQ ID NO 91
<211> LENGTH: 55
<212> TYPE: DNA
<213> ORGANISM: Artificial
<220> FEATURE:
<223> OTHER INFORMATION: Primer

<400> SEQUENCE: 91
caggtggtca tggcccttga ttaatataat tatataaaaa tattatcttc ttttc    55

<210> SEQ ID NO 92
<211> LENGTH: 21
<212> TYPE: DNA
<213> ORGANISM: Artificial
<220> FEATURE:
<223> OTHER INFORMATION: Primer

```
<400> SEQUENCE: 92
cttgctttcc agttgaaaaa g                                              21

<210> SEQ ID NO 93
<211> LENGTH: 18
<212> TYPE: DNA
<213> ORGANISM: Artificial
<220> FEATURE:
<223> OTHER INFORMATION: Primer

<400> SEQUENCE: 93
gacagggaag gaagttgg                                                  18

<210> SEQ ID NO 94
<211> LENGTH: 17
<212> TYPE: DNA
<213> ORGANISM: Artificial
<220> FEATURE:
<223> OTHER INFORMATION: Primer

<400> SEQUENCE: 94
catttgacag cgtttgc                                                   17

<210> SEQ ID NO 95
<211> LENGTH: 47
<212> TYPE: DNA
<213> ORGANISM: Artificial
<220> FEATURE:
<223> OTHER INFORMATION: Primer

<400> SEQUENCE: 95
catgtcgaga tacgtgtatc tactttttt ttattattcg attgatg                   47

<210> SEQ ID NO 96
<211> LENGTH: 72
<212> TYPE: DNA
<213> ORGANISM: Artificial
<220> FEATURE:
<223> OTHER INFORMATION: Primer

<400> SEQUENCE: 96
gtagatacac gtatctcgac atgttttatt tttactatac atacataaaa ggtgattctg    60
ggtagaagat cg                                                        72

<210> SEQ ID NO 97
<211> LENGTH: 20
<212> TYPE: DNA
<213> ORGANISM: Artificial
<220> FEATURE:
<223> OTHER INFORMATION: Primer

<400> SEQUENCE: 97
catcgataag cttgatatcg                                                20

<210> SEQ ID NO 98
<211> LENGTH: 43
<212> TYPE: DNA
<213> ORGANISM: Artificial
<220> FEATURE:
<223> OTHER INFORMATION: Primer

<400> SEQUENCE: 98
cgatatcaag cttatcgatg gtagatacac gtatctcgac atg                      43
```

<210> SEQ ID NO 99
<211> LENGTH: 30
<212> TYPE: DNA
<213> ORGANISM: Artificial
<220> FEATURE:
<223> OTHER INFORMATION: Primer

<400> SEQUENCE: 99
ctgataatgg gttagtagtt tataattatg                                              30

<210> SEQ ID NO 100
<211> LENGTH: 52
<212> TYPE: DNA
<213> ORGANISM: Artificial
<220> FEATURE:
<223> OTHER INFORMATION: Primer

<400> SEQUENCE: 100
cataattata aactactaac ccattatcag atgagcacta aagttgttaa tg                     52

<210> SEQ ID NO 101
<211> LENGTH: 21
<212> TYPE: DNA
<213> ORGANISM: Artificial
<220> FEATURE:
<223> OTHER INFORMATION: Primer

<400> SEQUENCE: 101
cacaccagat atcctaccaa c                                                       21

<210> SEQ ID NO 102
<211> LENGTH: 21
<212> TYPE: DNA
<213> ORGANISM: Artificial
<220> FEATURE:
<223> OTHER INFORMATION: Primer

<400> SEQUENCE: 102
tgccgtaaac cactaaatcg g                                                       21

<210> SEQ ID NO 103
<211> LENGTH: 443
<212> TYPE: PRT
<213> ORGANISM: Escherichia coli

<400> SEQUENCE: 103

Met Val Lys Glu Arg Lys Thr Glu Leu Val Glu Gly Phe Arg Tyr Ser
1               5                   10                  15

Val Pro Tyr Ile Asn Thr His Arg Gly Lys Thr Phe Val Ile Met Leu
            20                  25                  30

Gly Gly Glu Ala Ile Glu His Glu Asn Phe Ser Ser Ile Val Asn Asp
        35                  40                  45

Ile Gly Leu Leu His Ser Leu Gly Ile Arg Leu Val Val Val Tyr Gly
    50                  55                  60

Ala Arg Pro Gln Ile Asp Ala Asn Leu Ala Ala His His His Glu Pro
65                  70                  75                  80

Leu Tyr His Lys Asn Ile Arg Val Thr Asp Ala Lys Thr Leu Glu Leu
                85                  90                  95

Val Lys Gln Ala Ala Gly Thr Leu Gln Leu Asp Ile Thr Ala Arg Leu
            100                 105                 110

Ser Met Ser Leu Asn Asn Thr Pro Leu Gln Gly Ala His Ile Asn Val
            115                 120                 125

Val Ser Gly Asn Phe Ile Ile Ala Gln Pro Leu Gly Val Asp Asp Gly
            130                 135                 140

Val Asp Tyr Cys His Ser Gly Arg Ile Arg Arg Ile Asp Glu Asp Ala
145                 150                 155                 160

Ile His Arg Gln Leu Asp Ser Gly Ala Ile Val Leu Met Gly Pro Val
                165                 170                 175

Ala Val Ser Val Thr Gly Glu Ser Phe Asn Leu Thr Ser Glu Glu Ile
            180                 185                 190

Ala Thr Gln Leu Ala Ile Lys Leu Lys Ala Glu Lys Met Ile Gly Phe
        195                 200                 205

Cys Ser Ser Gln Gly Val Thr Asn Asp Asp Gly Asp Ile Val Ser Glu
    210                 215                 220

Leu Phe Pro Asn Glu Ala Gln Ala Arg Val Glu Ala Gln Glu Glu Lys
225                 230                 235                 240

Gly Asp Tyr Asn Ser Gly Thr Val Arg Phe Leu Arg Gly Ala Val Lys
                245                 250                 255

Ala Cys Arg Ser Gly Val Arg Arg Cys His Leu Ile Ser Tyr Gln Glu
            260                 265                 270

Asp Gly Ala Leu Leu Gln Glu Leu Phe Ser Arg Asp Gly Ile Gly Thr
        275                 280                 285

Gln Ile Val Met Glu Ser Ala Glu Gln Ile Arg Arg Ala Thr Ile Asn
    290                 295                 300

Asp Ile Gly Gly Ile Leu Glu Leu Ile Arg Pro Leu Glu Gln Gln Gly
305                 310                 315                 320

Ile Leu Val Arg Arg Ser Arg Glu Gln Leu Glu Met Glu Ile Asp Lys
                325                 330                 335

Phe Thr Ile Ile Gln Arg Asp Asn Thr Thr Ile Ala Cys Ala Ala Leu
            340                 345                 350

Tyr Pro Phe Pro Glu Glu Lys Ile Gly Glu Met Ala Cys Val Ala Val
        355                 360                 365

His Pro Asp Tyr Arg Ser Ser Ser Arg Gly Glu Val Leu Leu Glu Arg
    370                 375                 380

Ile Ala Ala Gln Ala Lys Gln Ser Gly Leu Ser Lys Leu Phe Val Leu
385                 390                 395                 400

Thr Thr Arg Ser Ile His Trp Phe Gln Glu Arg Gly Phe Thr Pro Val
                405                 410                 415

Asp Ile Asp Leu Leu Pro Glu Ser Lys Lys Gln Leu Tyr Asn Tyr Gln
            420                 425                 430

Arg Lys Ser Lys Val Leu Met Ala Asp Leu Gly
        435                 440

<210> SEQ ID NO 104
<211> LENGTH: 388
<212> TYPE: PRT
<213> ORGANISM: Corynebacterium glutamicum

<400> SEQUENCE: 104

Met Ala Glu Lys Gly Ile Thr Ala Pro Lys Gly Phe Val Ala Ser Ala
1               5                   10                  15

Thr Thr Ala Gly Ile Lys Ala Ser Gly Asn Pro Asp Met Ala Leu Val
            20                  25                  30

Val Asn Gln Gly Pro Glu Phe Ser Ala Ala Val Phe Thr Arg Asn
        35                  40                  45

Arg Val Phe Ala Ala Pro Val Lys Val Ser Arg Glu Asn Val Ala Asp

```
                50                  55                  60
Gly Gln Ile Arg Ala Val Leu Tyr Asn Ala Gly Asn Ala Asn Ala Cys
 65                  70                  75                  80

Asn Gly Leu Gln Gly Glu Lys Asp Ala Arg Glu Ser Val Ser His Leu
                 85                  90                  95

Ala Gln Asn Leu Gly Leu Glu Asp Ser Asp Ile Gly Val Cys Ser Thr
            100                 105                 110

Gly Leu Ile Gly Glu Leu Leu Pro Met Asp Lys Leu Asn Ala Gly Ile
        115                 120                 125

Asp Gln Leu Thr Ala Glu Gly Ala Leu Gly Asp Asn Gly Ala Ala Ala
    130                 135                 140

Ala Lys Ala Ile Met Thr Thr Asp Thr Val Asp Lys Glu Thr Val Val
145                 150                 155                 160

Phe Ala Asp Gly Trp Thr Val Gly Gly Met Gly Lys Gly Val Gly Met
                165                 170                 175

Met Ala Pro Ser Leu Ala Thr Met Leu Val Cys Leu Thr Thr Asp Ala
            180                 185                 190

Ser Val Thr Gln Glu Met Ala Gln Ile Ala Leu Ala Asn Ala Thr Ala
        195                 200                 205

Val Thr Phe Asp Thr Leu Asp Ile Asp Gly Ser Thr Ser Thr Asn Asp
    210                 215                 220

Thr Val Phe Leu Leu Ala Ser Gly Ala Ser Gly Ile Thr Pro Thr Gln
225                 230                 235                 240

Asp Glu Leu Asn Asp Ala Val Tyr Ala Ala Cys Ser Asp Ile Ala Ala
                245                 250                 255

Lys Leu Gln Ala Asp Ala Glu Gly Val Thr Lys Arg Val Ala Val Thr
            260                 265                 270

Val Val Gly Thr Thr Asn Glu Gln Ala Ile Asn Ala Ala Arg Thr
        275                 280                 285

Val Ala Arg Asp Asn Leu Phe Lys Cys Ala Met Phe Gly Ser Asp Pro
    290                 295                 300

Asn Trp Gly Arg Val Leu Ala Ala Val Gly Met Ala Asp Ala Asp Met
305                 310                 315                 320

Glu Pro Glu Lys Ile Ser Val Phe Phe Asn Asp Gln Ala Val Cys Leu
                325                 330                 335

Asp Ser Thr Gly Ala Pro Gly Ala Arg Glu Val Asp Leu Ser Gly Ala
            340                 345                 350

Asp Ile Asp Val Arg Ile Asp Leu Gly Thr Ser Gly Glu Gly Gln Ala
        355                 360                 365

Thr Val Arg Thr Thr Asp Leu Ser Phe Ser Tyr Val Glu Ile Asn Ser
    370                 375                 380

Ala Tyr Ser Thr
385

<210> SEQ ID NO 105
<211> LENGTH: 258
<212> TYPE: PRT
<213> ORGANISM: Escherichia coli

<400> SEQUENCE: 105

Met Met Asn Pro Leu Ile Ile Lys Leu Gly Gly Val Leu Leu Asp Ser
 1               5                  10                  15

Glu Glu Ala Leu Glu Arg Leu Phe Ser Ala Leu Val Asn Tyr Arg Glu
             20                  25                  30
```

```
Ser His Gln Arg Pro Leu Val Ile Val His Gly Gly Cys Val Val
         35                  40                  45

Asp Glu Leu Met Lys Gly Leu Asn Leu Pro Val Lys Lys Asn Gly
 50                  55                  60

Leu Arg Val Thr Pro Ala Asp Gln Ile Asp Ile Thr Gly Ala Leu
65                  70                  75                  80

Ala Gly Thr Ala Asn Lys Thr Leu Leu Ala Trp Ala Lys Lys His Gln
                 85                  90                  95

Ile Ala Ala Val Gly Leu Phe Leu Gly Asp Gly Asp Ser Val Lys Val
                100                 105                 110

Thr Gln Leu Asp Glu Glu Leu Gly His Val Gly Leu Ala Gln Pro Gly
                115                 120                 125

Ser Pro Lys Leu Ile Asn Ser Leu Leu Glu Asn Gly Tyr Leu Pro Val
130                 135                 140

Val Ser Ser Ile Gly Val Thr Asp Glu Gly Gln Leu Met Asn Val Asn
145                 150                 155                 160

Ala Asp Gln Ala Ala Thr Ser Leu Ala Ala Thr Leu Gly Ala Asp Leu
                165                 170                 175

Ile Leu Leu Ser Asp Val Ser Gly Ile Leu Asp Gly Lys Gly Gln Arg
                180                 185                 190

Ile Ala Glu Met Thr Ala Ala Lys Ala Glu Gln Leu Ile Glu Gln Gly
                195                 200                 205

Ile Ile Thr Asp Gly Met Ile Val Lys Val Asn Ala Ala Leu Asp Ala
                210                 215                 220

Ala Arg Thr Leu Gly Arg Pro Val Asp Ile Ala Ser Trp Arg His Ala
225                 230                 235                 240

Glu Gln Leu Pro Ala Leu Phe Asn Gly Met Pro Met Gly Thr Arg Ile
                245                 250                 255

Leu Ala

<210> SEQ ID NO 106
<211> LENGTH: 317
<212> TYPE: PRT
<213> ORGANISM: Corynebacterium glutamicum

<400> SEQUENCE: 106

Met Asn Asp Leu Ile Lys Asp Leu Gly Ser Glu Val Arg Ala Asn Val
1                   5                  10                  15

Leu Ala Glu Ala Leu Pro Trp Leu Gln His Phe Arg Asp Lys Ile Val
                 20                  25                  30

Val Val Lys Tyr Gly Gly Asn Ala Met Val Asp Asp Leu Lys Ala
                 35                  40                  45

Ala Phe Ala Ala Asp Met Val Phe Leu Arg Thr Val Gly Ala Lys Pro
 50                  55                  60

Val Val Val His Gly Gly Gly Pro Gln Ile Ser Glu Met Leu Asn Arg
65                  70                  75                  80

Val Gly Leu Gln Gly Glu Phe Lys Gly Phe Arg Val Thr Thr Pro
                 85                  90                  95

Glu Val Met Asp Ile Val Arg Met Val Leu Phe Gly Gln Val Gly Arg
                100                 105                 110

Asp Leu Val Gly Leu Ile Asn Ser His Gly Pro Tyr Ala Val Gly Thr
                115                 120                 125

Ser Gly Glu Asp Ala Gly Leu Phe Thr Ala Gln Lys Arg Met Val Asn
                130                 135                 140
```

Ile Asp Gly Val Pro Thr Asp Ile Gly Leu Val Gly Asp Ile Ile Asn
145                 150                 155                 160

Val Asp Ala Ser Ser Leu Met Asp Ile Ile Glu Ala Gly Arg Ile Pro
            165                 170                 175

Val Val Ser Thr Ile Ala Pro Gly Glu Asp Gly Gln Ile Tyr Asn Ile
            180                 185                 190

Asn Ala Asp Thr Ala Ala Gly Ala Leu Ala Ala Ile Gly Ala Glu
        195                 200                 205

Arg Leu Leu Val Leu Thr Asn Val Glu Gly Leu Tyr Thr Asp Trp Pro
    210                 215                 220

Asp Lys Ser Ser Leu Val Ser Lys Ile Lys Ala Thr Glu Leu Glu Ala
225                 230                 235                 240

Ile Leu Pro Gly Leu Asp Ser Gly Met Ile Pro Lys Met Glu Ser Cys
            245                 250                 255

Leu Asn Ala Val Arg Gly Gly Val Ser Ala Ala His Val Ile Asp Gly
        260                 265                 270

Arg Ile Ala His Ser Val Leu Leu Glu Leu Leu Thr Met Gly Gly Ile
    275                 280                 285

Gly Thr Met Val Leu Pro Asp Val Phe Asp Arg Glu Asn Tyr Pro Glu
290                 295                 300

Gly Thr Val Phe Arg Lys Asp Lys Asp Gly Glu Leu
305                 310                 315

<210> SEQ ID NO 107
<211> LENGTH: 334
<212> TYPE: PRT
<213> ORGANISM: Escherichia coli

<400> SEQUENCE: 107

Met Leu Asn Thr Leu Ile Val Gly Ala Ser Gly Tyr Ala Gly Ala Glu
1               5                   10                  15

Leu Val Thr Tyr Val Asn Arg His Pro His Met Asn Ile Thr Ala Leu
            20                  25                  30

Thr Val Ser Ala Gln Ser Asn Asp Ala Gly Lys Leu Ile Ser Asp Leu
        35                  40                  45

His Pro Gln Leu Lys Gly Ile Val Asp Leu Pro Leu Gln Pro Met Ser
    50                  55                  60

Asp Ile Ser Glu Phe Ser Pro Gly Val Asp Val Val Phe Leu Ala Thr
65                  70                  75                  80

Ala His Glu Val Ser His Asp Leu Ala Pro Gln Phe Leu Glu Ala Gly
                85                  90                  95

Cys Val Val Phe Asp Leu Ser Gly Ala Phe Arg Val Asn Asp Ala Thr
            100                 105                 110

Phe Tyr Glu Lys Tyr Tyr Gly Phe Thr His Gln Tyr Pro Glu Leu Leu
        115                 120                 125

Glu Gln Ala Ala Tyr Gly Leu Ala Glu Trp Cys Gly Asn Lys Leu Lys
    130                 135                 140

Glu Ala Asn Leu Ile Ala Val Pro Gly Cys Tyr Pro Thr Ala Ala Gln
145                 150                 155                 160

Leu Ala Leu Lys Pro Leu Ile Asp Ala Asp Leu Leu Asp Leu Asn Gln
                165                 170                 175

Trp Pro Val Ile Asn Ala Thr Ser Gly Val Ser Gly Ala Gly Arg Lys
            180                 185                 190

Ala Ala Ile Ser Asn Ser Phe Cys Glu Val Ser Leu Gln Pro Tyr Gly
        195                 200                 205

```
Val Phe Thr His Arg His Gln Pro Glu Ile Ala Thr His Leu Gly Ala
    210                 215                 220

Asp Val Ile Phe Thr Pro His Leu Gly Asn Phe Pro Arg Gly Ile Leu
225                 230                 235                 240

Glu Thr Ile Thr Cys Arg Leu Lys Ser Gly Val Thr Gln Glu Gln Val
                245                 250                 255

Ala Gln Ala Leu Gln Gln Ala Tyr Ala His Lys Pro Leu Val Arg Leu
            260                 265                 270

Tyr Asp Lys Gly Val Pro Ala Leu Lys Asn Val Val Gly Leu Pro Phe
        275                 280                 285

Cys Asp Ile Gly Phe Ala Val Gln Gly Glu His Leu Ile Ile Val Ala
    290                 295                 300

Thr Glu Asp Asn Leu Leu Lys Gly Ala Ala Gln Ala Val Gln Cys
305                 310                 315                 320

Ala Asn Ile Arg Phe Gly Tyr Ala Glu Thr Gln Ser Leu Ile
            325                 330

<210> SEQ ID NO 108
<211> LENGTH: 357
<212> TYPE: PRT
<213> ORGANISM: Corynebacterium glutamicum

<400> SEQUENCE: 108

Met Ile Met His Asn Val Tyr Gly Val Thr Met Thr Ile Lys Val Ala
1               5                   10                  15

Ile Ala Gly Ala Ser Gly Tyr Ala Gly Gly Glu Ile Leu Arg Leu Leu
            20                  25                  30

Leu Gly His Pro Ala Tyr Ala Ser Gly Glu Leu Glu Ile Gly Ala Leu
        35                  40                  45

Thr Ala Ala Ser Thr Ala Gly Ser Thr Leu Gly Glu Leu Met Pro His
    50                  55                  60

Ile Pro Gln Leu Ala Asp Arg Val Ile Gln Asp Thr Thr Ala Glu Thr
65                  70                  75                  80

Leu Ala Gly His Asp Val Val Phe Leu Gly Leu Pro His Gly Phe Ser
                85                  90                  95

Ala Glu Ile Ala Leu Gln Leu Gly Pro Asp Val Thr Val Ile Asp Cys
            100                 105                 110

Ala Ala Asp Phe Arg Leu Gln Asn Ala Ala Asp Trp Glu Lys Phe Tyr
        115                 120                 125

Gly Ser Glu His Gln Gly Thr Trp Pro Tyr Gly Ile Pro Glu Met Pro
    130                 135                 140

Gly His Arg Glu Ala Leu Arg Gly Ala Lys Arg Val Ala Val Pro Gly
145                 150                 155                 160

Cys Phe Pro Thr Gly Ala Thr Leu Ala Leu Leu Pro Ala Val Gln Ala
                165                 170                 175

Gly Leu Ile Glu Pro Asp Val Ser Val Ser Ile Thr Gly Val Ser
            180                 185                 190

Gly Ala Gly Lys Lys Ala Ser Val Ala Leu Leu Gly Ser Glu Thr Met
        195                 200                 205

Gly Ser Leu Lys Ala Tyr Asn Thr Ser Gly Lys His Arg His Thr Pro
    210                 215                 220

Glu Ile Ala Gln Asn Leu Gly Glu Val Ser Asp Lys Pro Val Lys Val
225                 230                 235                 240

Ser Phe Thr Pro Val Leu Ala Pro Leu Pro Arg Gly Ile Leu Thr Thr
```

```
            245                 250                 255
Ala Thr Ala Pro Leu Lys Glu Gly Val Thr Ala Glu Gln Ala Arg Ala
            260                 265                 270

Val Tyr Glu Glu Phe Tyr Ala Gln Glu Thr Phe Val His Val Leu Pro
        275                 280                 285

Glu Gly Ala Gln Pro Gln Thr Gln Ala Val Leu Gly Ser Asn Met Cys
    290                 295                 300

His Val Gln Val Glu Ile Asp Glu Glu Ala Gly Lys Val Leu Val Thr
305                 310                 315                 320

Ser Ala Ile Asp Asn Leu Thr Lys Gly Thr Ala Gly Ala Ala Val Gln
                325                 330                 335

Cys Met Asn Leu Ser Val Gly Phe Asp Glu Ala Ala Gly Leu Pro Gln
                340                 345                 350

Val Gly Val Ala Pro
            355

<210> SEQ ID NO 109
<211> LENGTH: 406
<212> TYPE: PRT
<213> ORGANISM: Escherichia coli

<400> SEQUENCE: 109

Met Ala Ile Glu Gln Thr Ala Ile Thr Arg Ala Thr Phe Asp Glu Val
1               5                   10                  15

Ile Leu Pro Ile Tyr Ala Pro Ala Glu Phe Ile Pro Val Lys Gly Gln
                20                  25                  30

Gly Ser Arg Ile Trp Asp Gln Gln Gly Lys Glu Tyr Val Asp Phe Ala
            35                  40                  45

Gly Gly Ile Ala Val Thr Ala Leu Gly His Cys His Pro Ala Leu Val
        50                  55                  60

Asn Ala Leu Lys Thr Gln Gly Glu Thr Leu Trp His Ile Ser Asn Val
65                  70                  75                  80

Phe Thr Asn Glu Pro Ala Leu Arg Leu Gly Arg Lys Leu Ile Glu Ala
                85                  90                  95

Thr Phe Ala Glu Arg Val Val Phe Met Asn Ser Gly Thr Glu Ala Asn
                100                 105                 110

Glu Thr Ala Phe Lys Leu Ala Arg His Tyr Ala Cys Val Arg His Ser
            115                 120                 125

Pro Phe Lys Thr Lys Ile Ile Ala Phe His Asn Ala Phe His Gly Arg
        130                 135                 140

Ser Leu Phe Thr Val Ser Val Gly Gly Gln Pro Lys Tyr Ser Asp Gly
145                 150                 155                 160

Phe Gly Pro Lys Pro Ala Asp Ile Ile His Val Pro Phe Asn Asp Leu
                165                 170                 175

His Ala Val Lys Ala Val Met Asp Asp His Thr Cys Ala Val Val Val
                180                 185                 190

Glu Pro Ile Gln Gly Glu Gly Gly Val Thr Ala Ala Thr Pro Glu Phe
            195                 200                 205

Leu Gln Gly Leu Arg Glu Leu Cys Asp Gln His Gln Ala Leu Leu Val
        210                 215                 220

Phe Asp Glu Val Gln Cys Gly Met Gly Arg Thr Gly Asp Leu Phe Ala
225                 230                 235                 240

Tyr Met His Tyr Gly Val Thr Pro Asp Ile Leu Thr Ser Ala Lys Ala
                245                 250                 255
```

Leu Gly Gly Gly Phe Pro Ile Ser Ala Met Leu Thr Thr Ala Glu Ile
                260                 265                 270

Ala Ser Ala Phe His Pro Gly Ser His Gly Ser Thr Tyr Gly Gly Asn
            275                 280                 285

Pro Leu Ala Cys Ala Val Ala Gly Ala Ala Phe Asp Ile Ile Asn Thr
290                 295                 300

Pro Glu Val Leu Glu Gly Ile Gln Ala Lys Arg Gln Arg Phe Val Asp
305                 310                 315                 320

His Leu Gln Lys Ile Asp Gln Gln Tyr Asp Val Phe Ser Asp Ile Arg
                325                 330                 335

Gly Met Gly Leu Leu Ile Gly Ala Glu Leu Lys Pro Gln Tyr Lys Gly
            340                 345                 350

Arg Ala Arg Asp Phe Leu Tyr Ala Gly Ala Glu Ala Gly Val Met Val
            355                 360                 365

Leu Asn Ala Gly Pro Asp Val Met Arg Phe Ala Pro Ser Leu Val Val
370                 375                 380

Glu Asp Ala Asp Ile Asp Glu Gly Met Gln Arg Phe Ala His Ala Val
385                 390                 395                 400

Ala Lys Val Val Gly Ala
            405

<210> SEQ ID NO 110
<211> LENGTH: 391
<212> TYPE: PRT
<213> ORGANISM: Corynebacterium glutamicum

<400> SEQUENCE: 110

Met Ser Thr Leu Glu Thr Trp Pro Gln Val Ile Ile Asn Thr Tyr Gly
1               5                   10                  15

Thr Pro Pro Val Glu Leu Val Ser Gly Lys Gly Ala Thr Val Thr Asp
            20                  25                  30

Asp Gln Gly Asn Val Tyr Ile Asp Leu Leu Ala Gly Ile Ala Val Asn
        35                  40                  45

Ala Leu Gly His Ala His Pro Ala Ile Ile Glu Ala Val Thr Asn Gln
50                  55                  60

Ile Gly Gln Leu Gly His Val Ser Asn Leu Phe Ala Ser Arg Pro Val
65                  70                  75                  80

Val Glu Val Ala Glu Glu Leu Ile Lys Arg Phe Ser Leu Asp Asp Ala
                85                  90                  95

Thr Leu Ala Ala Gln Thr Arg Val Phe Phe Cys Asn Ser Gly Ala Glu
            100                 105                 110

Ala Asn Glu Ala Ala Phe Lys Ile Ala Arg Leu Thr Gly Arg Ser Arg
        115                 120                 125

Ile Leu Ala Ala Val His Gly Phe His Gly Arg Thr Met Gly Ser Leu
130                 135                 140

Ala Leu Thr Gly Gln Pro Asp Lys Arg Glu Ala Phe Leu Pro Met Pro
145                 150                 155                 160

Ser Gly Val Glu Phe Tyr Pro Tyr Gly Asp Thr Asp Tyr Leu Arg Lys
                165                 170                 175

Met Val Glu Thr Asn Pro Thr Asp Val Ala Ala Ile Phe Leu Glu Pro
            180                 185                 190

Ile Gln Gly Glu Thr Gly Val Val Pro Ala Pro Glu Gly Phe Leu Lys
        195                 200                 205

Ala Val Arg Glu Leu Cys Asp Glu Tyr Gly Ile Leu Met Ile Thr Asp
210                 215                 220

```
Glu Val Gln Thr Gly Val Gly Arg Thr Gly Asp Phe Phe Ala His Gln
225                 230                 235                 240

His Asp Gly Val Val Pro Asp Val Val Thr Met Ala Lys Gly Leu Gly
                245                 250                 255

Gly Gly Leu Pro Ile Gly Ala Cys Leu Ala Thr Gly Arg Ala Ala Glu
            260                 265                 270

Leu Met Thr Pro Gly Lys His Gly Thr Thr Phe Gly Gly Asn Pro Val
        275                 280                 285

Ala Cys Ala Ala Ala Lys Ala Val Leu Ser Val Val Asp Asp Ala Phe
    290                 295                 300

Cys Ala Glu Val Ala Arg Lys Gly Glu Leu Phe Lys Glu Leu Leu Ala
305                 310                 315                 320

Lys Val Asp Gly Val Val Asp Val Arg Gly Arg Gly Leu Met Leu Gly
                325                 330                 335

Val Val Leu Glu Arg Asp Val Ala Lys Gln Ala Val Leu Asp Gly Phe
            340                 345                 350

Lys His Gly Val Ile Leu Asn Ala Pro Ala Asp Asn Ile Ile Arg Leu
        355                 360                 365

Thr Pro Pro Leu Val Ile Thr Asp Glu Glu Ile Ala Asp Ala Val Lys
    370                 375                 380

Ala Ile Ala Glu Thr Ile Ala
385                 390

<210> SEQ ID NO 111
<211> LENGTH: 383
<212> TYPE: PRT
<213> ORGANISM: Escherichia coli

<400> SEQUENCE: 111

Met Lys Asn Lys Leu Pro Pro Phe Ile Glu Ile Tyr Arg Ala Leu Ile
1               5                   10                  15

Ala Thr Pro Ser Ile Ser Ala Thr Glu Glu Ala Leu Asp Gln Ser Asn
                20                  25                  30

Ala Asp Leu Ile Thr Leu Leu Ala Asp Trp Phe Lys Asp Leu Gly Phe
            35                  40                  45

Asn Val Glu Val Gln Pro Val Pro Gly Thr Arg Asn Lys Phe Asn Met
        50                  55                  60

Leu Ala Ser Ile Gly Gln Gly Ala Gly Gly Leu Leu Leu Ala Gly His
65                  70                  75                  80

Thr Asp Thr Val Pro Phe Asp Asp Gly Arg Trp Thr Arg Asp Pro Phe
                85                  90                  95

Thr Leu Thr Glu His Asp Gly Lys Leu Tyr Gly Leu Gly Thr Ala Asp
            100                 105                 110

Met Lys Gly Phe Phe Ala Phe Ile Leu Asp Ala Leu Arg Asp Val Asp
        115                 120                 125

Val Thr Lys Leu Lys Lys Pro Leu Tyr Ile Leu Ala Thr Ala Asp Glu
    130                 135                 140

Glu Thr Ser Met Ala Gly Ala Arg Tyr Phe Ala Glu Thr Thr Ala Leu
145                 150                 155                 160

Arg Pro Asp Cys Ala Ile Ile Gly Glu Pro Thr Ser Leu Gln Pro Val
                165                 170                 175

Arg Ala His Lys Gly His Ile Ser Asn Ala Ile Arg Ile Gln Gly Gln
            180                 185                 190

Ser Gly His Ser Ser Asp Pro Ala Arg Gly Val Asn Ala Ile Glu Leu
```

```
        195                 200                 205
Met His Asp Ala Ile Gly His Ile Leu Gln Leu Arg Asp Asn Leu Lys
    210                 215                 220

Glu Arg Tyr His Tyr Glu Ala Phe Thr Val Pro Tyr Pro Thr Leu Asn
225                 230                 235                 240

Leu Gly His Ile His Gly Gly Asp Ala Ser Asn Arg Ile Cys Ala Cys
                245                 250                 255

Cys Glu Leu His Met Asp Ile Arg Pro Leu Pro Gly Met Thr Leu Asn
                260                 265                 270

Glu Leu Asn Gly Leu Leu Asn Asp Ala Leu Ala Pro Val Ser Glu Arg
            275                 280                 285

Trp Pro Gly Arg Leu Thr Val Asp Glu Leu His Pro Ile Pro Gly
    290                 295                 300

Tyr Glu Cys Pro Pro Asn His Gln Leu Val Glu Val Val Glu Lys Leu
305                 310                 315                 320

Leu Gly Ala Lys Thr Glu Val Val Asn Tyr Cys Thr Glu Ala Pro Phe
                325                 330                 335

Ile Gln Thr Leu Cys Pro Thr Leu Val Leu Gly Pro Gly Ser Ile Asn
                340                 345                 350

Gln Ala His Gln Pro Asp Glu Tyr Leu Glu Thr Arg Phe Ile Lys Pro
            355                 360                 365

Thr Arg Glu Leu Ile Thr Gln Val Ile His His Phe Cys Trp His
    370                 375                 380
```

<210> SEQ ID NO 112
<211> LENGTH: 388
<212> TYPE: PRT
<213> ORGANISM: Corynebacterium glutamicum

<400> SEQUENCE: 112

```
Met Ala Glu Lys Gly Ile Thr Ala Pro Lys Gly Phe Val Ala Ser Ala
1               5                   10                  15

Thr Thr Ala Gly Ile Lys Ala Ser Gly Asn Pro Asp Met Ala Leu Val
                20                  25                  30

Val Asn Gln Gly Pro Glu Phe Ser Ala Ala Val Phe Thr Arg Asn
            35                  40                  45

Arg Val Phe Ala Ala Pro Val Lys Val Ser Arg Glu Asn Val Ala Asp
50                  55                  60

Gly Gln Ile Arg Ala Val Leu Tyr Asn Ala Gly Asn Ala Asn Ala Cys
65                  70                  75                  80

Asn Gly Leu Gln Gly Glu Lys Asp Ala Arg Glu Ser Val Ser His Leu
                85                  90                  95

Ala Gln Asn Leu Gly Leu Glu Asp Ser Asp Ile Gly Val Cys Ser Thr
            100                 105                 110

Gly Leu Ile Gly Glu Leu Leu Pro Met Asp Lys Leu Asn Ala Gly Ile
        115                 120                 125

Asp Gln Leu Thr Ala Glu Gly Ala Leu Gly Asp Asn Gly Ala Ala Ala
    130                 135                 140

Ala Lys Ala Ile Met Thr Thr Asp Thr Val Asp Lys Glu Thr Val Val
145                 150                 155                 160

Phe Ala Asp Gly Trp Thr Val Gly Gly Met Gly Lys Gly Val Gly Met
                165                 170                 175

Met Ala Pro Ser Leu Ala Thr Met Leu Val Cys Leu Thr Thr Asp Ala
            180                 185                 190
```

```
Ser Val Thr Gln Glu Met Ala Gln Ile Ala Leu Ala Asn Ala Thr Ala
        195                 200                 205
Val Thr Phe Asp Thr Leu Asp Ile Asp Gly Ser Thr Ser Thr Asn Asp
210                 215                 220
Thr Val Phe Leu Leu Ala Ser Gly Ala Ser Gly Ile Thr Pro Thr Gln
225                 230                 235                 240
Asp Glu Leu Asn Asp Ala Val Tyr Ala Ala Cys Ser Asp Ile Ala Ala
                245                 250                 255
Lys Leu Gln Ala Asp Ala Glu Gly Val Thr Lys Arg Val Ala Val Thr
                260                 265                 270
Val Val Gly Thr Thr Asn Asn Glu Gln Ala Ile Asn Ala Ala Arg Thr
            275                 280                 285
Val Ala Arg Asp Asn Leu Phe Lys Cys Ala Met Phe Gly Ser Asp Pro
290                 295                 300
Asn Trp Gly Arg Val Leu Ala Ala Val Gly Met Ala Asp Ala Asp Met
305                 310                 315                 320
Glu Pro Glu Lys Ile Ser Val Phe Phe Asn Gly Gln Ala Val Cys Leu
                325                 330                 335
Asp Ser Thr Gly Ala Pro Gly Ala Arg Glu Val Asp Leu Ser Gly Ala
            340                 345                 350
Asp Ile Asp Val Arg Ile Asp Leu Gly Thr Ser Gly Glu Gly Gln Ala
            355                 360                 365
Thr Val Arg Thr Thr Asp Leu Ser Phe Ser Tyr Val Glu Ile Asn Ser
370                 375                 380
Ala Tyr Ser Ser
385

<210> SEQ ID NO 113
<211> LENGTH: 574
<212> TYPE: PRT
<213> ORGANISM: Saccharomyces cerevisiae

<400> SEQUENCE: 113

Met Trp Arg Arg Ile Phe Ala His Glu Leu Lys Tyr Asp Gln Pro Asn
1               5                   10                  15
Ala Ser Ser Lys Asn Leu Ile Leu Ser Val Leu Asn Thr Thr Ala Thr
                20                  25                  30
Lys Arg Glu Ala Lys Asp Tyr Leu Ser Lys Tyr Thr Asn Asp Ser Gly
            35                  40                  45
Gln His Asn His Cys Leu Phe Phe Ile Arg Asp Leu His Lys Val Ala
        50                  55                  60
Pro Ala Ile Leu Ser Gln Phe Ser Ser Val Ile Lys Arg Leu Gly Met
65                  70                  75                  80
Leu Gly Leu Arg Pro Met Phe Val Ile Pro Pro Ser Pro Thr His Val
                85                  90                  95
Asn Ile Gln Ala Glu Leu Leu Asp Ser Ile Val Thr Glu Ala Asp Leu
                100                 105                 110
Lys Pro Leu His Leu Lys Glu Gly Leu Thr Lys Ser Arg Thr Gly Leu
            115                 120                 125
Tyr His Ser Val Phe Ser Gln Glu Ser Arg Phe Phe Asp Ile Gly Asn
        130                 135                 140
Ser Asn Phe Ile Pro Ile Val Lys Pro Tyr Val Tyr Asn Glu Glu Thr
145                 150                 155                 160
Ala Ser Glu Phe Met Thr Lys Asp Val Val Lys Phe Met Asp Cys Leu
                165                 170                 175
```

Cys Gln Gly Asn Ile Pro His Ile Asp Lys Phe Phe Ile Leu Asn Asn
            180                 185                 190

Ala Gly Gly Ile Pro Ser Gly Glu Arg Asn Asp Asn Ala His Val Phe
            195                 200                 205

Ile Asn Leu Ser Gln Glu Leu Glu His Leu Ser Ser Ser Leu Ser His
210                 215                 220

Asn Ile Ser Thr Leu Thr Lys Arg Glu Pro Arg Ser Gln Asn Leu Leu
225                 230                 235                 240

His Arg Met Glu Val Tyr Val Lys Lys Asp Glu Ile Ser Ser Leu Glu
            245                 250                 255

Cys Glu Tyr His Asp His Leu Glu Asn Leu Leu Leu Met Asp Lys Val
            260                 265                 270

Leu Ser Asn Leu Ala Ala Thr Ala Thr Gly Leu Ile Thr Thr Val Lys
            275                 280                 285

Ala Ala Ala Leu Ser Ser Asp Arg Lys Asn Pro Leu Val Tyr Asn Leu
            290                 295                 300

Leu Thr Asp Arg Ser Leu Ile Ser Ser Ser Leu Pro Arg Phe Lys Lys
305                 310                 315                 320

Lys Asp Gly Glu Ile Asp Ser Pro Ala Asn Met Phe Asp Asp His Ala
            325                 330                 335

Trp Tyr Glu Leu Pro Ser Gln Gln Val Asn Ala Ala Pro Ser Asn Ser
            340                 345                 350

Asp Ala Val Leu Val Thr Thr Val Leu Lys Lys Gly Val His Ile Lys
            355                 360                 365

Thr Tyr Asp Tyr Lys Thr Leu Thr Gln Phe Asn Ser Ile Gly Leu Pro
            370                 375                 380

Lys Lys Phe His Val Pro Glu Lys Gly Ala Lys Pro Ser Ser Asn Ser
385                 390                 395                 400

Pro Lys Leu Asp Ile Asn Lys Phe Lys Ser Ile Ile Asp Gln Ser Phe
            405                 410                 415

Lys Arg Ser Leu Asp Leu His Asp Tyr Ile Lys Arg Ile Asn Gly Lys
            420                 425                 430

Ile Ala Thr Ile Ile Val Ile Gly Asp Tyr Glu Gly Ile Ala Ile Leu
            435                 440                 445

Thr Tyr Glu Gly Ser Glu Glu Asn Ser Phe Val Tyr Leu Asp Lys Phe
450                 455                 460

Ala Val Leu Pro His Leu Lys Gly Ser Leu Gly Ile Ser Asp Ile Ile
465                 470                 475                 480

Phe Asn Leu Met Phe Lys Lys Phe Pro Asn Glu Ile Leu Trp Arg Ser
            485                 490                 495

Arg Lys Asp Asn Val Val Asn Lys Trp Tyr Phe Gln Arg Ser Val Ala
            500                 505                 510

Val Leu Asp Leu Ser Ile Asp Leu Asp Pro Glu His Cys Asp Glu Lys
            515                 520                 525

Gln Ser Gln Phe Lys Leu Phe Tyr Tyr Gly Asn Pro Gln Tyr Ala Lys
            530                 535                 540

Arg Ala Leu Arg Asp Lys Lys Arg Leu Arg Glu Phe Met Arg Ser Val
545                 550                 555                 560

Arg Asp Ile Lys Pro Ser Trp Glu Asn Glu Lys Asn Ile Ser
            565                 570

<210> SEQ ID NO 114
<211> LENGTH: 863

<212> TYPE: PRT
<213> ORGANISM: Saccharomyces cerevisiae

<400> SEQUENCE: 114

```
Met Pro Ser Ala Ser Leu Leu Val Ser Thr Lys Arg Leu Asn Ala Ser
1               5                   10                  15

Lys Phe Gln Lys Phe Val Ser Ser Leu Asn Lys Ser Thr Ile Ala Gly
            20                  25                  30

Phe Ala Ser Val Pro Leu Arg Ala Pro Pro Ser Val Ala Phe Thr Arg
        35                  40                  45

Lys Lys Val Gly Tyr Ser Lys Arg Tyr Val Ser Ser Thr Asn Gly Phe
    50                  55                  60

Ser Ala Thr Arg Ser Thr Val Ile Gln Leu Leu Asn Asn Ile Ser Thr
65                  70                  75                  80

Lys Arg Glu Val Glu Gln Tyr Leu Lys Tyr Phe Thr Val Ser Val Gln
                85                  90                  95

Gln Gln Phe Ala Val Ile Lys Val Gly Gly Ala Ile Ile Ser Asp Asn
            100                 105                 110

Leu His Glu Leu Ala Ser Cys Leu Ala Phe Leu Tyr His Val Gly Leu
        115                 120                 125

Tyr Pro Ile Val Leu His Gly Thr Gly Pro Gln Val Asn Gly Arg Leu
    130                 135                 140

Glu Ala Gln Gly Ile Glu Pro Asp Tyr Ile Asp Gly Ile Arg Ile Thr
145                 150                 155                 160

Asp Glu His Thr Met Ala Val Val Arg Lys Cys Phe Leu Glu Gln Asn
                165                 170                 175

Leu Lys Leu Val Thr Ala Leu Glu Gln Leu Gly Val Arg Ala Arg Pro
            180                 185                 190

Ile Thr Ser Gly Val Phe Thr Ala Asp Tyr Leu Asp Lys Asp Lys Tyr
        195                 200                 205

Lys Leu Val Gly Asn Ile Lys Ser Val Thr Lys Glu Pro Ile Glu Ala
    210                 215                 220

Ser Ile Lys Ala Gly Ala Leu Pro Ile Leu Thr Ser Leu Ala Glu Thr
225                 230                 235                 240

Ala Ser Gly Gln Met Leu Asn Val Asn Ala Asp Val Ala Ala Gly Glu
                245                 250                 255

Leu Ala Arg Val Phe Glu Pro Leu Lys Ile Val Tyr Leu Asn Glu Lys
            260                 265                 270

Gly Gly Ile Ile Asn Gly Ser Thr Gly Glu Lys Ile Ser Met Ile Asn
        275                 280                 285

Leu Asp Glu Glu Tyr Asp Asp Leu Met Lys Gln Ser Trp Val Lys Tyr
    290                 295                 300

Gly Thr Lys Leu Lys Ile Arg Glu Ile Lys Glu Leu Leu Asp Tyr Leu
305                 310                 315                 320

Pro Arg Ser Ser Ser Val Ala Ile Ile Asn Val Gln Asp Leu Gln Lys
                325                 330                 335

Glu Leu Phe Thr Asp Ser Gly Ala Gly Thr Met Ile Arg Arg Gly Tyr
            340                 345                 350

Lys Leu Val Lys Arg Ser Ser Ile Gly Glu Phe Pro Ser Ala Asp Ala
        355                 360                 365

Leu Arg Lys Ala Leu Gln Arg Asp Ala Gly Ile Ser Ser Gly Lys Glu
    370                 375                 380

Ser Val Ala Ser Tyr Leu Arg Tyr Leu Glu Asn Ser Asp Phe Val Ser
385                 390                 395                 400
```

```
Tyr Ala Asp Glu Pro Leu Glu Ala Val Ala Ile Val Lys Lys Asp Thr
            405                 410                 415

Asn Val Pro Thr Leu Asp Lys Phe Val Cys Ser Asp Ala Ala Trp Leu
            420                 425                 430

Asn Asn Val Thr Asp Asn Val Phe Asn Val Leu Arg Arg Asp Phe Pro
            435                 440                 445

Ala Leu Gln Trp Val Val Ser Glu Asn Asp Ala Asn Ile Ala Trp His
450                 455                 460

Phe Asp Lys Ser Gln Gly Ser Tyr Leu Lys Gly Lys Val Leu Phe
465                 470                 475                 480

Trp Tyr Gly Ile Asp Asp Ile Asn Thr Ile Ser Glu Leu Val Glu Asn
            485                 490                 495

Phe Val Lys Ser Cys Asp Thr Ala Ser Thr Leu Asn Ser Ser Ala Ser
            500                 505                 510

Ser Gly Val Phe Ala Asn Lys Lys Ser Ala Arg Ser Tyr Ser Thr Arg
        515                 520                 525

Ser Thr Pro Arg Pro Glu Gly Val Asn Thr Asn Pro Gly Arg Val Ala
        530                 535                 540

Leu Ile Gly Ala Arg Gly Tyr Thr Gly Lys Asn Leu Val Ser Leu Ile
545                 550                 555                 560

Asn Gly His Pro Tyr Leu Glu Val Ala His Val Ser Ser Arg Glu Leu
            565                 570                 575

Lys Gly Gln Lys Leu Gln Asp Tyr Thr Lys Ser Glu Ile Ile Tyr Glu
            580                 585                 590

Ser Leu Gln Ile Gln Asp Ile Arg Lys Leu Glu Gln Asn Ala Val
        595                 600                 605

Asp Phe Trp Val Met Ala Leu Pro Asn Lys Val Cys Glu Pro Phe Val
610                 615                 620

Glu Thr Ile Gln Ser Val His Gly Lys Ser Lys Ile Ile Asp Leu Ser
625                 630                 635                 640

Ala Asp His Arg Phe Val Ser Glu Ser Asp Trp Ala Tyr Gly Leu Pro
            645                 650                 655

Glu Leu Asn Asp Arg Ala Lys Ile Ala Asn Ala Ala Lys Ile Ala Asn
            660                 665                 670

Pro Gly Cys Tyr Ala Thr Gly Ser Gln Leu Thr Ile Ser Pro Leu Thr
        675                 680                 685

Lys Tyr Ile Asn Gly Leu Pro Thr Val Phe Gly Val Ser Gly Tyr Ser
        690                 695                 700

Gly Ala Gly Thr Lys Pro Ser Pro Lys Asn Asp Pro Lys Phe Leu Asn
705                 710                 715                 720

Asn Asn Leu Ile Pro Tyr Ala Leu Ser Asp His Ile His Glu Arg Glu
            725                 730                 735

Ile Ser Ala Arg Ile Gly His Asn Val Ala Phe Met Pro His Val Gly
            740                 745                 750

Gln Trp Phe Gln Gly Ile Ser Leu Thr Val Ser Ile Pro Ile Lys Lys
        755                 760                 765

Gly Ser Leu Ser Ile Asp Glu Ile Arg Lys Leu Tyr Arg Asn Phe Tyr
770                 775                 780

Glu Asp Glu Lys Leu Val His Val Ile Asp Ile Pro Leu Val Lys
785                 790                 795                 800

Asp Ile Glu Gly Thr His Gly Val Val Ile Gly Gly Phe Lys Leu Asn
            805                 810                 815
```

Asp Ala Glu Asp Arg Val Val Cys Ala Thr Ile Asp Asn Leu Leu
            820                 825                 830

Lys Gly Ala Ala Thr Gln Cys Leu Gln Asn Ile Asn Leu Ala Met Gly
        835                 840                 845

Tyr Gly Glu Tyr Ala Gly Ile Pro Glu Asn Lys Ile Ile Gly Val
    850                 855                 860

<210> SEQ ID NO 115
<211> LENGTH: 423
<212> TYPE: PRT
<213> ORGANISM: Saccharomyces cerevisiae

<400> SEQUENCE: 115

Met Phe Lys Arg Tyr Leu Ser Ser Thr Ser Arg Arg Phe Thr Ser
1               5                   10                  15

Ile Leu Glu Glu Lys Ala Phe Gln Val Thr Thr Tyr Ser Arg Pro Glu
            20                  25                  30

Asp Leu Cys Ile Thr Arg Gly Lys Asn Ala Lys Leu Tyr Asp Asp Val
        35                  40                  45

Asn Gly Lys Glu Tyr Ile Asp Phe Thr Ala Gly Ile Ala Val Thr Ala
    50                  55                  60

Leu Gly His Ala Asn Pro Lys Val Ala Glu Ile Leu His His Gln Ala
65                  70                  75                  80

Asn Lys Leu Val His Ser Ser Asn Leu Tyr Phe Thr Lys Glu Cys Leu
                85                  90                  95

Asp Leu Ser Glu Lys Ile Val Glu Lys Thr Lys Gln Phe Gly Gly Gln
            100                 105                 110

His Asp Ala Ser Arg Val Phe Leu Cys Asn Ser Gly Thr Glu Ala Asn
        115                 120                 125

Glu Ala Ala Leu Lys Phe Ala Lys Lys His Gly Ile Met Lys Asn Pro
    130                 135                 140

Ser Lys Gln Gly Ile Val Ala Phe Glu Asn Ser Phe His Gly Arg Thr
145                 150                 155                 160

Met Gly Ala Leu Ser Val Thr Trp Asn Ser Lys Tyr Arg Thr Pro Phe
                165                 170                 175

Gly Asp Leu Val Pro His Val Ser Phe Leu Asn Leu Asn Asp Glu Met
            180                 185                 190

Thr Lys Leu Gln Ser Tyr Ile Glu Thr Lys Lys Asp Glu Ile Ala Gly
        195                 200                 205

Leu Ile Val Glu Pro Ile Gln Gly Glu Gly Gly Val Phe Pro Val Glu
    210                 215                 220

Val Glu Lys Leu Thr Gly Leu Lys Lys Ile Cys Gln Asp Asn Asp Val
225                 230                 235                 240

Ile Val Ile His Asp Glu Ile Gln Cys Gly Leu Gly Arg Ser Gly Lys
                245                 250                 255

Leu Trp Ala His Ala Tyr Leu Pro Ser Glu Ala His Pro Asp Ile Phe
            260                 265                 270

Thr Ser Ala Lys Ala Leu Gly Asn Gly Phe Pro Ile Ala Ala Thr Ile
        275                 280                 285

Val Asn Glu Lys Val Asn Asn Ala Leu Arg Val Gly Asp His Gly Thr
    290                 295                 300

Thr Tyr Gly Gly Asn Pro Leu Ala Cys Ser Val Ser Asn Tyr Val Leu
305                 310                 315                 320

Asp Thr Ile Ala Asp Glu Ala Phe Leu Lys Gln Val Ser Lys Lys Ser
                325                 330                 335

-continued

```
Asp Ile Leu Gln Lys Arg Leu Arg Glu Ile Gln Ala Lys Tyr Pro Asn
                    340                 345                 350

Gln Ile Lys Thr Ile Arg Gly Lys Gly Leu Met Leu Gly Ala Glu Phe
                355                 360                 365

Val Glu Pro Pro Thr Glu Val Ile Lys Lys Ala Arg Glu Leu Gly Leu
370                 375                 380

Leu Ile Ile Thr Ala Gly Lys Ser Thr Val Arg Phe Val Pro Ala Leu
385                 390                 395                 400

Thr Ile Glu Asp Glu Leu Ile Glu Gly Met Asp Ala Phe Glu Lys
                405                 410                 415

Ala Ile Glu Ala Val Tyr Ala
                420

<210> SEQ ID NO 116
<211> LENGTH: 441
<212> TYPE: PRT
<213> ORGANISM: Saccharomyces cerevisiae

<400> SEQUENCE: 116

Met Arg Ile Ser Ser Thr Leu Leu Gln Arg Ser Lys Gln Leu Ile Asp
1               5                   10                  15

Lys Tyr Ala Leu Tyr Val Pro Lys Thr Gly Ser Phe Pro Lys Gly Phe
                20                  25                  30

Glu Val Gly Tyr Thr Ala Ser Gly Val Lys Lys Asn Gly Ser Leu Asp
            35                  40                  45

Leu Gly Val Ile Leu Asn Thr Asn Lys Ser Arg Pro Ser Thr Ala Ala
50                  55                  60

Ala Val Phe Thr Thr Asn Lys Phe Lys Ala Ala Pro Val Leu Thr Ser
65                  70                  75                  80

Lys Lys Val Leu Glu Thr Ala Arg Gly Lys Asn Ile Asn Ala Ile Val
                85                  90                  95

Val Asn Ser Gly Cys Ala Asn Ser Val Thr Gly Asp Leu Gly Met Lys
            100                 105                 110

Asp Ala Gln Val Met Ile Asp Leu Val Asn Asp Lys Ile Gly Gln Lys
        115                 120                 125

Asn Ser Thr Leu Val Met Ser Thr Gly Val Ile Gly Gln Arg Leu Gln
130                 135                 140

Met Asp Lys Ile Ser Thr Gly Ile Asn Lys Ile Phe Gly Glu Glu Lys
145                 150                 155                 160

Phe Gly Ser Asp Phe Asn Ser Trp Leu Asn Val Ala Lys Ser Ile Cys
                165                 170                 175

Thr Thr Asp Thr Phe Pro Lys Leu Val Thr Ser Arg Phe Lys Leu Pro
            180                 185                 190

Ser Gly Thr Glu Tyr Thr Leu Thr Gly Met Ala Lys Gly Ala Gly Met
        195                 200                 205

Ile Cys Pro Asn Met Ala Thr Leu Leu Gly Phe Ile Val Thr Asp Leu
210                 215                 220

Pro Ile Glu Ser Lys Ala Leu Gln Lys Met Leu Thr Phe Ala Thr Thr
225                 230                 235                 240

Arg Ser Phe Asn Cys Ile Ser Val Asp Gly Asp Met Ser Thr Asn Asp
                245                 250                 255

Thr Ile Cys Met Leu Ala Asn Gly Ala Ile Asp Thr Lys Glu Ile Asn
            260                 265                 270

Glu Asp Ser Lys Asp Phe Glu Gln Val Lys Leu Gln Val Thr Glu Phe
```

```
                275                 280                 285
Ala Gln Arg Leu Ala Gln Leu Val Val Arg Asp Gly Glu Gly Ser Thr
        290                 295                 300
Lys Phe Val Thr Val Asn Val Lys Asn Ala Leu His Phe Glu Asp Ala
305                 310                 315                 320
Lys Ile Ile Ala Glu Ser Ile Ser Asn Ser Met Leu Val Lys Thr Ala
                325                 330                 335
Leu Tyr Gly Gln Asp Ala Asn Trp Gly Arg Ile Leu Cys Ala Ile Gly
            340                 345                 350
Tyr Ala Lys Leu Asn Asp Leu Lys Ser Leu Asp Val Asn Lys Ile Asn
                355                 360                 365
Val Ser Phe Ile Ala Thr Asp Asn Ser Glu Pro Arg Glu Leu Lys Leu
        370                 375                 380
Val Ala Asn Gly Val Pro Gln Leu Glu Ile Asp Glu Thr Arg Ala Ser
385                 390                 395                 400
Glu Ile Leu Ala Leu Asn Asp Leu Glu Val Ser Val Asp Leu Gly Thr
                405                 410                 415
Gly Asp Gln Ala Ala Gln Phe Trp Thr Cys Asp Leu Ser His Glu Tyr
            420                 425                 430
Val Thr Ile Asn Gly Asp Tyr Arg Ser
                435                 440

<210> SEQ ID NO 117
<211> LENGTH: 424
<212> TYPE: PRT
<213> ORGANISM: Saccharomyces cerevisiae

<400> SEQUENCE: 117

Met Ser Glu Ala Thr Leu Ser Ser Lys Gln Thr Ile Glu Trp Glu Asn
1               5                   10                  15
Lys Tyr Ser Ala His Asn Tyr His Pro Leu Pro Val Val Phe His Lys
                20                  25                  30
Ala Lys Gly Ala His Val Trp Asp Pro Glu Gly Lys Leu Tyr Leu Asp
            35                  40                  45
Phe Leu Ser Ala Tyr Ser Ala Val Asn Gln Gly His Cys His Pro His
        50                  55                  60
Ile Ile Lys Ala Leu Thr Glu Gln Ala Gln Thr Leu Thr Leu Ser Ser
65                  70                  75                  80
Arg Ala Phe His Asn Asp Val Tyr Ala Gln Phe Ala Lys Phe Val Thr
                85                  90                  95
Glu Phe Phe Gly Phe Glu Thr Val Leu Pro Met Asn Thr Gly Ala Glu
                100                 105                 110
Ala Val Glu Thr Ala Leu Lys Leu Ala Arg Arg Trp Gly Tyr Met Lys
            115                 120                 125
Lys Asn Ile Pro Gln Asp Lys Ala Ile Ile Leu Gly Ala Glu Gly Asn
        130                 135                 140
Phe His Gly Arg Thr Phe Gly Ala Ile Ser Leu Ser Thr Asp Tyr Glu
145                 150                 155                 160
Asp Ser Lys Leu His Phe Gly Pro Phe Val Pro Asn Val Ala Ser Gly
                165                 170                 175
His Ser Val His Lys Ile Arg Tyr Gly His Ala Glu Asp Phe Val Pro
            180                 185                 190
Ile Leu Glu Ser Pro Glu Gly Lys Asn Val Ala Ala Ile Ile Leu Glu
        195                 200                 205
```

```
Pro Ile Gln Gly Glu Ala Gly Ile Val Val Pro Ala Asp Tyr Phe
    210                 215                 220

Pro Lys Val Ser Ala Leu Cys Arg Lys His Asn Val Leu Leu Ile Val
225                 230                 235                 240

Asp Glu Ile Gln Thr Gly Ile Gly Arg Thr Gly Glu Leu Leu Cys Tyr
                245                 250                 255

Asp His Tyr Lys Ala Glu Ala Lys Pro Asp Ile Val Leu Leu Gly Lys
                260                 265                 270

Ala Leu Ser Gly Gly Val Leu Pro Val Ser Cys Val Leu Ser Ser His
                275                 280                 285

Asp Ile Met Ser Cys Phe Thr Pro Gly Ser His Gly Ser Thr Phe Gly
290                 295                 300

Gly Asn Pro Leu Ala Ser Arg Val Ala Ile Ala Ala Leu Glu Val Ile
305                 310                 315                 320

Arg Asp Glu Lys Leu Cys Gln Arg Ala Ala Gln Leu Gly Ser Ser Phe
                325                 330                 335

Ile Ala Gln Leu Lys Ala Leu Gln Ala Lys Ser Asn Gly Ile Ile Ser
                340                 345                 350

Glu Val Arg Gly Met Gly Leu Leu Thr Ala Ile Val Ile Asp Pro Ser
                355                 360                 365

Lys Ala Asn Gly Lys Thr Ala Trp Asp Leu Cys Leu Leu Met Lys Asp
370                 375                 380

His Gly Leu Leu Ala Lys Pro Thr His Asp His Ile Ile Arg Leu Ala
385                 390                 395                 400

Pro Pro Leu Val Ile Ser Glu Glu Asp Leu Gln Thr Gly Val Glu Thr
                405                 410                 415

Ile Ala Lys Cys Ile Asp Leu Leu
                420

<210> SEQ ID NO 118
<211> LENGTH: 411
<212> TYPE: PRT
<213> ORGANISM: Saccharomyces cerevisiae

<400> SEQUENCE: 118

Met Ser Leu Glu Ala Ile Val Phe Asp Arg Ser Glu Pro Glu Asn Val
1               5                   10                  15

Ser Val Lys Val Leu Asp Gln Leu Leu Leu Pro Tyr Thr Thr Lys Tyr
                20                  25                  30

Val Pro Ile His Thr Ile Asp Asp Gly Tyr Ser Val Ile Lys Ser Met
            35                  40                  45

Gln Val Arg Gly Ala Pro Ala Ile Ala Ile Val Gly Ser Leu Ser Val
        50                  55                  60

Leu Thr Glu Val Gln Leu Ile Lys His Asn Pro Thr Ser Asp Val Ala
65                  70                  75                  80

Thr Leu Tyr Ser Leu Val Asn Trp Glu Ser Thr Lys Thr Val Leu Asn
                85                  90                  95

Lys Arg Leu Asp Phe Leu Leu Ser Ser Arg Pro Thr Ala Val Asn Leu
                100                 105                 110

Ser Asn Ser Leu Val Glu Ile Lys Asn Ile Leu Lys Ser Ser Ser Asp
            115                 120                 125

Leu Lys Ala Phe Asp Gly Ser Leu Tyr Asn Tyr Val Cys Glu Leu Ile
        130                 135                 140

Asp Glu Asp Leu Ala Asn Asn Met Lys Met Gly Asp Asn Gly Ala Lys
145                 150                 155                 160
```

Tyr Leu Ile Asp Val Leu Gln Lys Asp Gly Phe Lys Asp Glu Phe Ala
            165                 170                 175

Val Leu Thr Ile Cys Asn Thr Gly Ser Leu Ala Thr Ser Gly Tyr Gly
            180                 185                 190

Thr Ala Leu Gly Val Ile Arg Ser Leu Trp Lys Asp Ser Leu Ala Lys
            195                 200                 205

Thr Asp Lys Ala Asp Ser Gly Leu Asp Asn Glu Lys Cys Pro Arg Met
        210                 215                 220

Gly His Val Phe Pro Leu Glu Thr Arg Pro Tyr Asn Gln Gly Ser Arg
225                 230                 235                 240

Leu Thr Ala Tyr Glu Leu Val Tyr Asp Lys Ile Pro Ser Thr Leu Ile
                245                 250                 255

Thr Asp Ser Ser Ile Ala Tyr Arg Ile Arg Thr Ser Pro Ile Pro Ile
            260                 265                 270

Lys Ala Ala Phe Val Gly Ala Asp Arg Ile Val Arg Asn Gly Asp Thr
        275                 280                 285

Ala Asn Lys Ile Gly Thr Leu Gln Leu Ala Val Ile Cys Lys Gln Phe
    290                 295                 300

Gly Ile Lys Phe Val Val Ala Pro Lys Thr Thr Ile Asp Asn Val
305                 310                 315                 320

Thr Glu Thr Gly Asp Asp Ile Ile Val Glu Glu Arg Asn Pro Glu Glu
                325                 330                 335

Phe Lys Val Val Thr Gly Thr Val Ile Asn Pro Glu Asn Gly Ser Leu
            340                 345                 350

Ile Leu Asn Glu Ser Gly Glu Pro Ile Thr Gly Lys Val Gly Ile Ala
        355                 360                 365

Pro Leu Glu Ile Asn Val Cys Asn Pro Ala Phe Asp Ile Thr Pro His
370                 375                 380

Glu Leu Ile Asp Gly Ile Ile Thr Glu Glu Gly Val Phe Thr Lys Asn
385                 390                 395                 400

Ser Ser Gly Glu Phe Gln Leu Glu Ser Leu Phe
                405                 410

<210> SEQ ID NO 119
<211> LENGTH: 244
<212> TYPE: PRT
<213> ORGANISM: Saccharomyces cerevisiae

<400> SEQUENCE: 119

Met Ser Ser Gln Asp Val Leu Ile His Ser Asp Pro Cys His Pro
1               5                   10                  15

Ala Asn Leu Ile Cys Thr Leu Cys Lys Gln Phe Phe His Asn Asn Trp
            20                  25                  30

Cys Thr Gly Thr Gly Gly Ile Ser Ile Lys Asp Pro Asn Thr Asn
        35                  40                  45

Tyr Tyr Tyr Leu Ala Pro Ser Gly Val Gln Lys Glu Lys Met Thr Pro
    50                  55                  60

Glu Asp Leu Phe Val Met Asp Ala Gln Thr Leu Glu Tyr Leu Arg Ser
65                  70                  75                  80

Pro Lys Leu Tyr Lys Pro Ser Ala Cys Thr Pro Leu Phe Leu Ala Cys
                85                  90                  95

Tyr Gln Lys Lys Asp Ala Gly Ala Ile Ile His Thr His Ser Gln Asn
            100                 105                 110

Ala Val Ile Cys Ser Leu Val Phe Gly Asp Glu Phe Arg Ile Ala Asn

```
            115                 120                 125
Ile Glu Gln Ile Lys Ala Ile Pro Ser Gly Lys Val Asp Pro Val Thr
130                 135                 140

Lys Lys Pro Met Thr Leu Ser Phe Phe Asp Thr Leu Lys Ile Pro Ile
145                 150                 155                 160

Ile Glu Asn Met Ala His Glu Asp Glu Leu Ile Asp Asp Leu His Lys
                165                 170                 175

Thr Phe Lys Asp Tyr Pro Asp Thr Cys Ala Val Ile Val Arg Arg His
                180                 185                 190

Gly Ile Phe Val Trp Gly Pro Thr Ile Asp Lys Ala Lys Ile Phe Asn
                195                 200                 205

Glu Ala Ile Asp Tyr Leu Met Glu Leu Ala Ile Lys Met Tyr Gln Met
210                 215                 220

Gly Ile Pro Pro Asp Cys Gly Ile Gly Glu Lys Lys His Leu Lys
225                 230                 235                 240

Met Ala Ser Pro

<210> SEQ ID NO 120
<211> LENGTH: 227
<212> TYPE: PRT
<213> ORGANISM: Saccharomyces cerevisiae

<400> SEQUENCE: 120

Met Gly Asp Asn Tyr Ser Thr Tyr Leu Leu Asp Ile Glu Gly Thr Val
1               5                   10                  15

Cys Pro Ile Ser Phe Val Lys Glu Thr Leu Phe Pro Tyr Phe Thr Asn
                20                  25                  30

Lys Val Pro Gln Leu Val Gln Gln Asp Thr Arg Asp Ser Pro Val Ser
            35                  40                  45

Asn Ile Leu Ser Gln Phe His Ile Asp Asn Lys Glu Gln Leu Gln Ala
        50                  55                  60

His Ile Leu Glu Leu Val Ala Lys Asp Val Lys Asp Pro Ile Leu Lys
65                  70                  75                  80

Gln Leu Gln Gly Tyr Val Trp Ala His Gly Tyr Glu Ser Gly Gln Ile
                85                  90                  95

Lys Ala Pro Val Tyr Ala Asp Ala Ile Asp Phe Ile Lys Arg Lys Lys
                100                 105                 110

Arg Val Phe Ile Tyr Ser Ser Gly Ser Val Lys Ala Gln Lys Leu Leu
            115                 120                 125

Phe Gly Tyr Val Gln Asp Pro Asn Ala Pro Ala His Asp Ser Leu Asp
130                 135                 140

Leu Asn Ser Tyr Ile Asp Gly Tyr Phe Asp Ile Asn Thr Ser Gly Lys
145                 150                 155                 160

Lys Thr Glu Thr Gln Ser Tyr Ala Asn Ile Leu Arg Asp Ile Gly Ala
                165                 170                 175

Lys Ala Ser Glu Val Leu Phe Leu Ser Asp Asn Pro Leu Glu Leu Asp
                180                 185                 190

Ala Ala Ala Gly Val Gly Ile Ala Thr Gly Leu Ala Ser Arg Pro Gly
                195                 200                 205

Asn Ala Pro Val Pro Asp Gly Gln Lys Tyr Gln Val Tyr Lys Asn Phe
            210                 215                 220

Glu Thr Leu
225
```

-continued

<210> SEQ ID NO 121
<211> LENGTH: 179
<212> TYPE: PRT
<213> ORGANISM: Saccharomyces cerevisiae

<400> SEQUENCE: 121

Met Val Lys Val Tyr Ile His Asp Asn Lys Val Asp Ser Asp Tyr Arg
1               5                   10                  15

Ala Pro His Asn Ser Gly Thr Glu Leu Ser Leu Asp Glu Leu Ala Lys
                20                  25                  30

Leu Gly Val Ile Tyr Lys Tyr Cys Ala Asn Glu Glu Glu Val Asn Glu
            35                  40                  45

Ile Ala Arg Gln Arg Glu Tyr Lys Asn Arg Asp Val Val Asn Ile Cys
        50                  55                  60

Glu Gly Ser Phe Lys Ser Glu Ala Glu Phe Asn Glu Lys Leu Ala Thr
65                  70                  75                  80

Phe Tyr Gln Glu His Leu His Glu Asp Glu Glu Ile Arg Tyr Cys Leu
                85                  90                  95

Glu Gly Ala Gly Tyr Phe Asp Val Arg Asp Ala Ser Thr Pro Glu Asn
            100                 105                 110

Trp Ile Arg Cys Leu Val Glu Ser Gly Asp Leu Ile Leu Pro Pro
        115                 120                 125

Gly Ile Tyr His Arg Phe Thr Leu Thr Thr Ser Asn His Ile Lys Ala
    130                 135                 140

Leu Arg Leu Phe Lys Asp Glu Pro Lys Trp Gln Ala Ile Asn Arg Ser
145                 150                 155                 160

Asn Gln Ala Asp Ser Leu Pro Val Arg Lys Asp Tyr Ile Ala Leu Ile
                165                 170                 175

Asn Gln Tyr

<210> SEQ ID NO 122
<211> LENGTH: 500
<212> TYPE: PRT
<213> ORGANISM: Saccharomyces cerevisiae

<400> SEQUENCE: 122

Met Thr Leu Pro Glu Ser Lys Asp Phe Ser Tyr Leu Phe Ser Asp Glu
1               5                   10                  15

Thr Asn Ala Arg Lys Pro Ser Pro Leu Lys Thr Cys Ile His Leu Phe
                20                  25                  30

Gln Asp Pro Asn Ile Ile Phe Leu Gly Gly Gly Leu Pro Leu Lys Asp
            35                  40                  45

Tyr Phe Pro Trp Asp Asn Leu Ser Val Asp Ser Pro Lys Pro Pro Phe
        50                  55                  60

Pro Gln Gly Ile Gly Ala Pro Ile Asp Glu Gln Asn Cys Ile Lys Tyr
65                  70                  75                  80

Thr Val Asn Lys Asp Tyr Ala Asp Lys Ser Ala Asn Pro Ser Asn Asp
                85                  90                  95

Ile Pro Leu Ser Arg Ala Leu Gln Tyr Gly Phe Ser Ala Gly Gln Pro
            100                 105                 110

Glu Leu Leu Asn Phe Ile Arg Asp His Thr Lys Ile Ile His Asp Leu
        115                 120                 125

Lys Tyr Lys Asp Trp Asp Val Leu Ala Thr Ala Gly Asn Thr Asn Ala
    130                 135                 140

Trp Glu Ser Thr Leu Arg Val Phe Cys Asn Arg Gly Asp Val Ile Leu
145                 150                 155                 160

Val Glu Ala His Ser Phe Ser Ser Leu Ala Ser Glu Ala Gln
                165                 170                 175

Gly Val Ile Thr Phe Pro Val Pro Ile Asp Ala Asp Gly Ile Ile Pro
            180                 185                 190

Glu Lys Leu Ala Lys Val Met Glu Asn Trp Thr Pro Gly Ala Pro Lys
        195                 200                 205

Pro Lys Leu Leu Tyr Thr Ile Pro Thr Gly Gln Asn Pro Thr Gly Thr
    210                 215                 220

Ser Ile Ala Asp His Arg Lys Glu Ala Ile Tyr Lys Ile Ala Gln Lys
225                 230                 235                 240

Tyr Asp Phe Leu Ile Val Glu Asp Glu Pro Tyr Tyr Phe Leu Gln Met
                245                 250                 255

Asn Pro Tyr Ile Lys Asp Leu Lys Glu Arg Glu Lys Ala Gln Ser Ser
            260                 265                 270

Pro Lys Gln Asp His Asp Glu Phe Leu Lys Ser Leu Ala Asn Thr Phe
        275                 280                 285

Leu Ser Leu Asp Thr Glu Gly Arg Val Ile Arg Met Asp Ser Phe Ser
    290                 295                 300

Lys Val Leu Ala Pro Gly Thr Arg Leu Gly Trp Ile Thr Gly Ser Ser
305                 310                 315                 320

Lys Ile Leu Lys Pro Tyr Leu Ser Leu His Glu Met Thr Ile Gln Ala
                325                 330                 335

Pro Ala Gly Phe Thr Gln Val Leu Val Asn Ala Thr Leu Ser Arg Trp
            340                 345                 350

Gly Gln Lys Gly Tyr Leu Asp Trp Leu Leu Gly Leu Arg His Glu Tyr
        355                 360                 365

Thr Leu Lys Arg Asp Cys Ala Ile Asp Ala Leu Tyr Lys Tyr Leu Pro
    370                 375                 380

Gln Ser Asp Ala Phe Val Ile Asn Pro Pro Ile Ala Gly Met Phe Phe
385                 390                 395                 400

Thr Val Asn Ile Asp Ala Ser Val His Pro Glu Phe Lys Thr Lys Tyr
                405                 410                 415

Asn Ser Asp Pro Tyr Gln Leu Glu Gln Ser Leu Tyr His Lys Val Val
            420                 425                 430

Glu Arg Gly Val Leu Val Pro Gly Ser Trp Phe Lys Ser Glu Gly
        435                 440                 445

Glu Thr Glu Pro Pro Gln Pro Ala Glu Ser Lys Glu Val Ser Asn Pro
    450                 455                 460

Asn Ile Ile Phe Phe Arg Gly Thr Tyr Ala Ala Val Ser Pro Glu Lys
465                 470                 475                 480

Leu Thr Glu Gly Leu Lys Arg Leu Gly Asp Thr Leu Tyr Glu Glu Phe
                485                 490                 495

Gly Ile Ser Lys
            500

<210> SEQ ID NO 123
<211> LENGTH: 513
<212> TYPE: PRT
<213> ORGANISM: Saccharomyces cerevisiae

<400> SEQUENCE: 123

Met Thr Ala Gly Ser Ala Pro Pro Val Asp Tyr Ala Ser Leu Lys Lys
1               5                   10                  15

Asn Phe Gln Pro Phe Leu Ser Arg Arg Val Glu Asn Arg Ser Leu Lys

-continued

```
                20                  25                  30
Ser Phe Trp Asp Ala Ser Asp Ile Ser Asp Val Ile Lys Leu Ala
            35                  40                  45
Gly Gly Met Pro Asn Glu Arg Phe Pro Ile Glu Ser Met Asp Leu
        50                  55                  60
Lys Ile Ser Lys Val Pro Phe Asn Asp Asn Pro Lys Trp His Asp Ser
65                  70                  75                  80
Phe Thr Thr Ala His Leu Asp Leu Gly Ser Pro Ser Glu Leu Pro Ile
                85                  90                  95
Ala Arg Ser Phe Gln Tyr Ala Glu Thr Lys Gly Leu Pro Pro Leu Leu
            100                 105                 110
His Phe Val Lys Asp Phe Val Ser Arg Ile Asn Arg Pro Ala Phe Ser
        115                 120                 125
Asp Glu Thr Glu Ser Asn Trp Asp Val Ile Leu Ser Gly Gly Ser Asn
        130                 135                 140
Asp Ser Met Phe Lys Val Phe Glu Thr Ile Cys Asp Glu Ser Thr Thr
145                 150                 155                 160
Val Met Ile Glu Glu Phe Thr Phe Thr Pro Ala Met Ser Asn Val Glu
                165                 170                 175
Ala Thr Gly Ala Lys Val Ile Pro Ile Lys Met Asn Leu Thr Phe Asp
            180                 185                 190
Arg Glu Ser Gln Gly Ile Asp Val Glu Tyr Leu Thr Gln Leu Leu Asp
        195                 200                 205
Asn Trp Ser Thr Gly Pro Tyr Lys Asp Leu Asn Lys Pro Arg Val Leu
        210                 215                 220
Tyr Thr Ile Ala Thr Gly Gln Asn Pro Thr Gly Met Ser Val Pro Gln
225                 230                 235                 240
Trp Lys Arg Glu Lys Ile Tyr Gln Leu Ala Gln Arg His Asp Phe Leu
                245                 250                 255
Ile Val Glu Asp Asp Pro Tyr Gly Tyr Leu Tyr Phe Pro Ser Tyr Asn
            260                 265                 270
Pro Gln Glu Pro Leu Glu Asn Pro Tyr His Ser Ser Asp Leu Thr Thr
        275                 280                 285
Glu Arg Tyr Leu Asn Asp Phe Leu Met Lys Ser Phe Leu Thr Leu Asp
        290                 295                 300
Thr Asp Ala Arg Val Ile Arg Leu Glu Thr Phe Ser Lys Ile Phe Ala
305                 310                 315                 320
Pro Gly Leu Arg Leu Ser Phe Ile Val Ala Asn Lys Phe Leu Leu Gln
                325                 330                 335
Lys Ile Leu Asp Leu Ala Asp Ile Thr Thr Arg Ala Pro Ser Gly Thr
            340                 345                 350
Ser Gln Ala Ile Val Tyr Ser Thr Ile Lys Ala Met Ala Glu Ser Asn
        355                 360                 365
Leu Ser Ser Ser Leu Ser Met Lys Glu Ala Met Phe Glu Gly Trp Ile
        370                 375                 380
Arg Trp Ile Met Gln Ile Ala Ser Lys Tyr Asn His Arg Lys Asn Leu
385                 390                 395                 400
Thr Leu Lys Ala Leu Tyr Glu Thr Glu Ser Tyr Gln Ala Gly Gln Phe
                405                 410                 415
Thr Val Met Glu Pro Ser Ala Gly Met Phe Ile Ile Lys Ile Asn
            420                 425                 430
Trp Gly Asn Phe Asp Arg Pro Asp Asp Leu Pro Gln Gln Met Asp Ile
            435                 440                 445
```

```
Leu Asp Lys Phe Leu Val Lys Asn Gly Val Lys Leu Val Leu Gly Tyr
        450                 455                 460

Lys Met Ala Val Cys Pro Asn Tyr Ser Lys Gln Asn Ser Asp Phe Leu
465                 470                 475                 480

Arg Leu Thr Ile Ala Tyr Ala Arg Asp Asp Gln Leu Ile Glu Ala
            485                 490                 495

Ser Lys Arg Ile Gly Ser Gly Ile Lys Glu Phe Phe Asp Asn Tyr Lys
            500                 505                 510

Ser

<210> SEQ ID NO 124
<211> LENGTH: 393
<212> TYPE: PRT
<213> ORGANISM: Saccharomyces cerevisiae

<400> SEQUENCE: 124

Met Leu Gln Arg His Ser Leu Lys Leu Gly Lys Phe Ser Ile Arg Thr
1               5                   10                  15

Leu Ala Thr Gly Ala Pro Leu Asp Ala Ser Lys Leu Lys Ile Thr Arg
            20                  25                  30

Asn Pro Asn Pro Ser Lys Pro Arg Pro Asn Glu Glu Leu Val Phe Gly
        35                  40                  45

Gln Thr Phe Thr Asp His Met Leu Thr Ile Pro Trp Ser Ala Lys Glu
    50                  55                  60

Gly Trp Gly Thr Pro His Ile Lys Pro Tyr Gly Asn Leu Ser Leu Asp
65                  70                  75                  80

Pro Ser Ala Cys Val Phe His Tyr Ala Phe Glu Leu Phe Glu Gly Leu
                85                  90                  95

Lys Ala Tyr Arg Thr Pro Gln Asn Thr Ile Thr Met Phe Arg Pro Asp
            100                 105                 110

Lys Asn Met Ala Arg Met Asn Lys Ser Ala Ala Arg Ile Cys Leu Pro
        115                 120                 125

Thr Phe Glu Ser Glu Glu Leu Ile Lys Leu Thr Gly Lys Leu Ile Glu
    130                 135                 140

Gln Asp Lys His Leu Val Pro Gln Gly Asn Gly Tyr Ser Leu Tyr Ile
145                 150                 155                 160

Arg Pro Thr Met Ile Gly Thr Ser Lys Gly Leu Gly Val Gly Thr Pro
                165                 170                 175

Ser Glu Ala Leu Leu Tyr Val Ile Thr Ser Pro Val Gly Pro Tyr Tyr
            180                 185                 190

Lys Thr Gly Phe Lys Ala Val Arg Leu Glu Ala Thr Asp Tyr Ala Thr
        195                 200                 205

Arg Ala Trp Pro Gly Gly Val Gly Asp Lys Lys Leu Gly Ala Asn Tyr
    210                 215                 220

Ala Pro Cys Ile Leu Pro Gln Leu Gln Ala Ala Lys Arg Gly Tyr Gln
225                 230                 235                 240

Gln Asn Leu Trp Leu Phe Gly Pro Glu Lys Asn Ile Thr Glu Val Gly
                245                 250                 255

Thr Met Asn Val Phe Phe Val Phe Leu Asn Lys Val Thr Gly Lys Lys
            260                 265                 270

Glu Leu Val Thr Ala Pro Leu Asp Gly Thr Ile Leu Glu Gly Val Thr
        275                 280                 285

Arg Asp Ser Val Leu Thr Leu Ala Arg Asp Lys Leu Asp Pro Gln Glu
    290                 295                 300
```

```
Trp Asp Ile Asn Glu Arg Tyr Tyr Thr Ile Thr Glu Val Ala Thr Arg
305                 310                 315                 320

Ala Lys Gln Gly Glu Leu Leu Glu Ala Phe Gly Ser Gly Thr Ala Ala
            325                 330                 335

Val Val Ser Pro Ile Lys Glu Ile Gly Trp Asn Asn Gly Asp Ile His
        340                 345                 350

Val Pro Leu Leu Pro Gly Glu Gln Cys Gly Ala Leu Thr Lys Gln Val
    355                 360                 365

Ala Gln Trp Ile Ala Asp Ile Gln Tyr Gly Arg Val Asn Tyr Gly Asn
370                 375                 380

Trp Ser Lys Thr Val Ala Asp Leu Asn
385                 390

<210> SEQ ID NO 125
<211> LENGTH: 1178
<212> TYPE: PRT
<213> ORGANISM: Saccharomyces cerevisiae

<400> SEQUENCE: 125

Met Ser Gln Arg Lys Phe Ala Gly Leu Arg Asp Asn Phe Asn Leu Leu
1               5                   10                  15

Gly Glu Lys Asn Lys Ile Leu Val Ala Asn Arg Gly Glu Ile Pro Ile
            20                  25                  30

Arg Ile Phe Arg Thr Ala His Glu Leu Ser Met Gln Thr Val Ala Ile
        35                  40                  45

Tyr Ser His Glu Asp Arg Leu Ser Thr His Lys Gln Lys Ala Asp Glu
    50                  55                  60

Ala Tyr Val Ile Gly Glu Val Gly Gln Tyr Thr Pro Val Gly Ala Tyr
65                  70                  75                  80

Leu Ala Ile Asp Glu Ile Ile Ser Ile Ala Gln Lys His Gln Val Asp
                85                  90                  95

Phe Ile His Pro Gly Tyr Gly Phe Leu Ser Glu Asn Ser Glu Phe Ala
            100                 105                 110

Asp Lys Val Val Lys Ala Gly Ile Thr Trp Ile Gly Pro Pro Ala Glu
        115                 120                 125

Val Ile Asp Ser Val Gly Asp Lys Val Ser Ala Arg Asn Leu Ala Ala
    130                 135                 140

Lys Ala Asn Val Pro Thr Val Pro Gly Thr Pro Gly Pro Ile Glu Thr
145                 150                 155                 160

Val Glu Glu Ala Leu Asp Phe Val Asn Glu Tyr Gly Tyr Pro Val Ile
                165                 170                 175

Ile Lys Ala Ala Phe Gly Gly Gly Gly Arg Gly Met Arg Val Val Arg
            180                 185                 190

Glu Gly Asp Asp Val Ala Asp Ala Phe Gln Arg Ala Thr Ser Glu Ala
        195                 200                 205

Arg Thr Ala Phe Gly Asn Gly Thr Cys Phe Val Glu Arg Phe Leu Asp
    210                 215                 220

Lys Pro Lys His Ile Glu Val Gln Leu Leu Ala Asp Asn His Gly Asn
225                 230                 235                 240

Val Val His Leu Phe Glu Arg Asp Cys Ser Val Gln Arg Arg His Gln
                245                 250                 255

Lys Val Val Glu Val Ala Pro Ala Lys Thr Leu Pro Arg Glu Val Arg
            260                 265                 270

Asp Ala Ile Leu Thr Asp Ala Val Lys Leu Ala Lys Glu Cys Gly Tyr
```

```
                275                 280                 285
Arg Asn Ala Gly Thr Ala Glu Phe Leu Val Asp Asn Gln Asn Arg His
290                 295                 300

Tyr Phe Ile Glu Ile Asn Pro Arg Ile Gln Val Glu His Thr Ile Thr
305                 310                 315                 320

Glu Glu Ile Thr Gly Ile Asp Ile Val Ala Ala Gln Ile Gln Ile Ala
                325                 330                 335

Ala Gly Ala Ser Leu Pro Gln Leu Gly Leu Phe Gln Asp Lys Ile Thr
            340                 345                 350

Thr Arg Gly Phe Ala Ile Gln Cys Arg Ile Thr Thr Glu Asp Pro Ala
        355                 360                 365

Lys Asn Phe Gln Pro Asp Thr Gly Arg Ile Glu Val Tyr Arg Ser Ala
    370                 375                 380

Gly Gly Asn Gly Val Arg Leu Asp Gly Asn Ala Tyr Ala Gly Thr
385                 390                 395                 400

Ile Ile Ser Pro His Tyr Asp Ser Met Leu Val Lys Cys Ser Cys Ser
                405                 410                 415

Gly Ser Thr Tyr Glu Ile Val Arg Arg Lys Met Ile Arg Ala Leu Ile
            420                 425                 430

Glu Phe Arg Ile Arg Gly Val Lys Thr Asn Ile Pro Phe Leu Leu Thr
        435                 440                 445

Leu Leu Thr Asn Pro Val Phe Ile Glu Gly Thr Tyr Trp Thr Thr Phe
    450                 455                 460

Ile Asp Asp Thr Pro Gln Leu Phe Gln Met Val Ser Ser Gln Asn Arg
465                 470                 475                 480

Ala Gln Lys Leu Leu His Tyr Leu Ala Asp Val Ala Val Asn Gly Ser
                485                 490                 495

Ser Ile Lys Gly Gln Ile Gly Leu Pro Lys Leu Lys Ser Asn Pro Ser
            500                 505                 510

Val Pro His Leu His Asp Ala Gln Gly Asn Val Ile Asn Val Thr Lys
        515                 520                 525

Ser Ala Pro Pro Ser Gly Trp Arg Gln Val Leu Leu Glu Lys Gly Pro
    530                 535                 540

Ala Glu Phe Ala Arg Gln Val Arg Gln Phe Asn Gly Thr Leu Leu Met
545                 550                 555                 560

Asp Thr Thr Trp Arg Asp Ala His Gln Ser Leu Leu Ala Thr Arg Val
                565                 570                 575

Arg Thr His Asp Leu Ala Thr Ile Ala Pro Thr Thr Ala His Ala Leu
            580                 585                 590

Ala Gly Arg Phe Ala Leu Glu Cys Trp Gly Gly Ala Thr Phe Asp Val
        595                 600                 605

Ala Met Arg Phe Leu His Glu Asp Pro Trp Glu Arg Leu Arg Lys Leu
    610                 615                 620

Arg Ser Leu Val Pro Asn Ile Pro Phe Gln Met Leu Leu Arg Gly Ala
625                 630                 635                 640

Asn Gly Val Ala Tyr Ser Ser Leu Pro Asp Asn Ala Ile Asp His Phe
                645                 650                 655

Val Lys Gln Ala Lys Asp Asn Gly Val Asp Ile Phe Arg Val Phe Asp
            660                 665                 670

Ala Leu Asn Asp Leu Glu Gln Leu Lys Val Gly Val Asp Ala Val Lys
        675                 680                 685

Lys Ala Gly Gly Val Val Glu Ala Thr Val Cys Phe Ser Gly Asp Met
    690                 695                 700
```

```
Leu Gln Pro Gly Lys Lys Tyr Asn Leu Asp Tyr Tyr Leu Glu Ile Ala
705                 710                 715                 720

Glu Lys Ile Val Gln Met Gly Thr His Ile Leu Gly Ile Lys Asp Met
            725                 730                 735

Ala Gly Thr Met Lys Pro Ala Ala Lys Leu Leu Ile Gly Ser Leu
                740                 745                 750

Arg Ala Lys Tyr Pro Asp Leu Pro Ile His Val His Thr His Asp Ser
            755                 760                 765

Ala Gly Thr Ala Val Ala Ser Met Thr Ala Cys Ala Leu Ala Gly Ala
        770                 775                 780

Asp Val Val Asp Val Ala Ile Asn Ser Met Ser Gly Leu Thr Ser Gln
785                 790                 795                 800

Pro Ser Ile Asn Ala Leu Leu Ala Ser Leu Glu Gly Asn Ile Asp Thr
                805                 810                 815

Gly Ile Asn Val Glu His Val Arg Glu Leu Asp Ala Tyr Trp Ala Glu
                820                 825                 830

Met Arg Leu Leu Tyr Ser Cys Phe Glu Ala Asp Leu Lys Gly Pro Asp
        835                 840                 845

Pro Glu Val Tyr Gln His Glu Ile Pro Gly Gly Gln Leu Thr Asn Leu
    850                 855                 860

Leu Phe Gln Ala Gln Gln Leu Gly Leu Gly Glu Gln Trp Ala Glu Thr
865                 870                 875                 880

Lys Arg Ala Tyr Arg Glu Ala Asn Tyr Leu Leu Gly Asp Ile Val Lys
                885                 890                 895

Val Thr Pro Thr Ser Lys Val Val Gly Asp Leu Ala Gln Phe Met Val
            900                 905                 910

Ser Asn Lys Leu Thr Ser Asp Asp Val Arg Arg Leu Ala Asn Ser Leu
        915                 920                 925

Asp Phe Pro Asp Ser Val Met Asp Phe Phe Glu Gly Leu Ile Gly Gln
    930                 935                 940

Pro Tyr Gly Gly Phe Pro Glu Pro Phe Arg Ser Asp Val Leu Arg Asn
945                 950                 955                 960

Lys Arg Arg Lys Leu Thr Cys Arg Pro Gly Leu Glu Leu Glu Pro Phe
                965                 970                 975

Asp Leu Glu Lys Ile Arg Glu Asp Leu Gln Asn Arg Phe Gly Asp Val
            980                 985                 990

Asp Glu Cys Asp Val Ala Ser Tyr Asn Met Tyr Pro Arg Val Tyr Glu
        995                 1000                1005

Asp Phe Gln Lys Met Arg Glu Thr Tyr Gly Asp Leu Ser Val Leu
    1010                1015                1020

Pro Thr Arg Ser Phe Leu Ser Pro Leu Glu Thr Asp Glu Glu Ile
    1025                1030                1035

Glu Val Val Ile Glu Gln Gly Lys Thr Leu Ile Ile Lys Leu Gln
    1040                1045                1050

Ala Val Gly Asp Leu Asn Lys Lys Thr Gly Glu Arg Glu Val Tyr
    1055                1060                1065

Phe Asp Leu Asn Gly Glu Met Arg Lys Ile Arg Val Ala Asp Arg
    1070                1075                1080

Ser Gln Lys Val Glu Thr Val Thr Lys Ser Lys Ala Asp Met His
    1085                1090                1095

Asp Pro Leu His Ile Gly Ala Pro Met Ala Gly Val Ile Val Glu
    1100                1105                1110
```

```
Val Lys Val His Lys Gly Ser Leu Ile Lys Gly Gln Pro Val
1115                1120                1125

Ala Val Leu Ser Ala Met Lys Met Glu Met Ile Ile Ser Ser Pro
1130                1135                1140

Ser Asp Gly Gln Val Lys Glu Val Phe Val Ser Asp Gly Glu Asn
1145                1150                1155

Val Asp Ser Ser Asp Leu Leu Val Leu Leu Glu Asp Gln Val Pro
1160                1165                1170

Val Glu Thr Lys Ala
1175

<210> SEQ ID NO 126
<211> LENGTH: 1180
<212> TYPE: PRT
<213> ORGANISM: Saccharomyces cerevisiae

<400> SEQUENCE: 126

Met Ser Ser Ser Lys Lys Leu Ala Gly Leu Arg Asp Asn Phe Ser Leu
1               5                   10                  15

Leu Gly Glu Lys Asn Lys Ile Leu Val Ala Asn Arg Gly Glu Ile Pro
                20                  25                  30

Ile Arg Ile Phe Arg Ser Ala His Glu Leu Ser Met Arg Thr Ile Ala
            35                  40                  45

Ile Tyr Ser His Glu Asp Arg Leu Ser Met His Arg Leu Lys Ala Asp
        50                  55                  60

Glu Ala Tyr Val Ile Gly Glu Gly Gln Tyr Thr Pro Val Gly Ala
65                  70                  75                  80

Tyr Leu Ala Met Asp Glu Ile Ile Glu Ile Ala Lys Lys His Lys Val
                85                  90                  95

Asp Phe Ile His Pro Gly Tyr Gly Phe Leu Ser Glu Asn Ser Glu Phe
            100                 105                 110

Ala Asp Lys Val Val Lys Ala Gly Ile Thr Trp Ile Gly Pro Pro Ala
        115                 120                 125

Glu Val Ile Asp Ser Val Gly Asp Lys Val Ser Ala Arg His Leu Ala
130                 135                 140

Ala Arg Ala Asn Val Pro Thr Val Pro Gly Thr Pro Gly Pro Ile Glu
145                 150                 155                 160

Thr Val Gln Glu Ala Leu Asp Phe Val Asn Glu Tyr Gly Tyr Pro Val
                165                 170                 175

Ile Ile Lys Ala Ala Phe Gly Gly Gly Gly Arg Gly Met Arg Val Val
            180                 185                 190

Arg Glu Gly Asp Asp Val Ala Asp Ala Phe Gln Arg Ala Thr Ser Glu
        195                 200                 205

Ala Arg Thr Ala Phe Gly Asn Gly Thr Cys Phe Val Glu Arg Phe Leu
210                 215                 220

Asp Lys Pro Lys His Ile Glu Val Gln Leu Leu Ala Asp Asn His Gly
225                 230                 235                 240

Asn Val Val His Leu Phe Glu Arg Asp Cys Ser Val Gln Arg Arg His
                245                 250                 255

Gln Lys Val Glu Val Ala Pro Ala Lys Thr Leu Pro Arg Glu Val
            260                 265                 270

Arg Asp Ala Ile Leu Thr Asp Ala Val Lys Leu Ala Lys Val Cys Gly
        275                 280                 285

Tyr Arg Asn Ala Gly Thr Ala Glu Phe Leu Val Asp Asn Gln Asn Arg
290                 295                 300
```

```
His Tyr Phe Ile Glu Ile Asn Pro Arg Ile Gln Val Glu His Thr Ile
305                 310                 315                 320

Thr Glu Glu Ile Thr Gly Ile Asp Ile Val Ser Ala Gln Ile Gln Ile
            325                 330                 335

Ala Ala Gly Ala Thr Leu Thr Gln Leu Gly Leu Leu Gln Asp Lys Ile
                340                 345                 350

Thr Thr Arg Gly Phe Ser Ile Gln Cys Arg Ile Thr Thr Glu Asp Pro
            355                 360                 365

Ser Lys Asn Phe Gln Pro Asp Thr Gly Arg Leu Glu Val Tyr Arg Ser
        370                 375                 380

Ala Gly Gly Asn Gly Val Arg Leu Asp Gly Asn Ala Tyr Ala Gly
385                 390                 395                 400

Ala Thr Ile Ser Pro His Tyr Asp Ser Met Leu Val Lys Cys Ser Cys
                405                 410                 415

Ser Gly Ser Thr Tyr Glu Ile Val Arg Arg Lys Met Ile Arg Ala Leu
            420                 425                 430

Ile Glu Phe Arg Ile Arg Gly Val Lys Thr Asn Ile Pro Phe Leu Leu
        435                 440                 445

Thr Leu Leu Thr Asn Pro Val Phe Ile Glu Gly Thr Tyr Trp Thr Thr
450                 455                 460

Phe Ile Asp Asp Thr Pro Gln Leu Phe Gln Met Val Ser Ser Gln Asn
465                 470                 475                 480

Arg Ala Gln Lys Leu Leu His Tyr Leu Ala Asp Leu Ala Val Asn Gly
                485                 490                 495

Ser Ser Ile Lys Gly Gln Ile Gly Leu Pro Lys Leu Lys Ser Asn Pro
            500                 505                 510

Ser Val Pro His Leu His Asp Ala Gln Gly Asn Val Ile Asn Val Thr
            515                 520                 525

Lys Ser Ala Pro Pro Ser Gly Trp Arg Gln Val Leu Leu Glu Lys Gly
        530                 535                 540

Pro Ser Glu Phe Ala Lys Gln Val Arg Gln Phe Asn Gly Thr Leu Leu
545                 550                 555                 560

Met Asp Thr Thr Trp Arg Asp Ala His Gln Ser Leu Leu Ala Thr Arg
                565                 570                 575

Val Arg Thr His Asp Leu Ala Thr Ile Ala Pro Thr Thr Ala His Ala
            580                 585                 590

Leu Ala Gly Ala Phe Ala Leu Glu Cys Trp Gly Gly Ala Thr Phe Asp
        595                 600                 605

Val Ala Met Arg Phe Leu His Glu Asp Pro Trp Glu Arg Leu Arg Lys
        610                 615                 620

Leu Arg Ser Leu Val Pro Asn Ile Pro Phe Gln Met Leu Leu Arg Gly
625                 630                 635                 640

Ala Asn Gly Val Ala Tyr Ser Ser Leu Pro Asp Asn Ala Ile Asp His
                645                 650                 655

Phe Val Lys Gln Ala Lys Asp Asn Gly Val Asp Ile Phe Arg Val Phe
            660                 665                 670

Asp Ala Leu Asn Asp Leu Glu Gln Leu Lys Val Gly Val Asn Ala Val
        675                 680                 685

Lys Lys Ala Gly Gly Val Val Glu Ala Thr Val Cys Tyr Ser Gly Asp
        690                 695                 700

Met Leu Gln Pro Gly Lys Lys Tyr Asn Leu Asp Tyr Tyr Leu Glu Val
705                 710                 715                 720
```

```
Val Glu Lys Ile Val Gln Met Gly Thr His Ile Leu Gly Ile Lys Asp
            725                 730                 735

Met Ala Gly Thr Met Lys Pro Ala Ala Ala Lys Leu Leu Ile Gly Ser
            740                 745                 750

Leu Arg Thr Arg Tyr Pro Asp Leu Pro Ile His Val His Ser His Asp
            755                 760                 765

Ser Ala Gly Thr Ala Val Ala Ser Met Thr Ala Cys Ala Leu Ala Gly
            770                 775                 780

Ala Asp Val Val Asp Val Ala Ile Asn Ser Met Ser Gly Leu Thr Ser
785                 790                 795                 800

Gln Pro Ser Ile Asn Ala Leu Leu Ala Ser Leu Glu Gly Asn Ile Asp
            805                 810                 815

Thr Gly Ile Asn Val Glu His Val Arg Glu Leu Asp Ala Tyr Trp Ala
            820                 825                 830

Glu Met Arg Leu Leu Tyr Ser Cys Phe Glu Ala Asp Leu Lys Gly Pro
            835                 840                 845

Asp Pro Glu Val Tyr Gln His Glu Ile Pro Gly Gly Gln Leu Thr Asn
            850                 855                 860

Leu Leu Phe Gln Ala Gln Gln Leu Gly Leu Gly Glu Gln Trp Ala Glu
865                 870                 875                 880

Thr Lys Arg Ala Tyr Arg Glu Ala Asn Tyr Leu Leu Gly Asp Ile Val
            885                 890                 895

Lys Val Thr Pro Thr Ser Lys Val Val Gly Asp Leu Ala Gln Phe Met
            900                 905                 910

Val Ser Asn Lys Leu Thr Ser Asp Asp Ile Arg Arg Leu Ala Asn Ser
            915                 920                 925

Leu Asp Phe Pro Asp Ser Val Met Asp Phe Phe Glu Gly Leu Ile Gly
930                 935                 940

Gln Pro Tyr Gly Gly Phe Pro Glu Pro Leu Arg Ser Asp Val Leu Arg
945                 950                 955                 960

Asn Lys Arg Arg Lys Leu Thr Cys Arg Pro Gly Leu Glu Leu Glu Pro
            965                 970                 975

Phe Asp Leu Glu Lys Ile Arg Glu Asp Leu Gln Asn Arg Phe Gly Asp
            980                 985                 990

Ile Asp Glu Cys Asp Val Ala Ser Tyr Asn Met Tyr Pro Arg Val Tyr
            995                 1000                1005

Glu Asp Phe Gln Lys Ile Arg Glu Thr Tyr Gly Asp Leu Ser Val
            1010                1015                1020

Leu Pro Thr Lys Asn Phe Leu Ala Pro Ala Glu Pro Asp Glu Glu
            1025                1030                1035

Ile Glu Val Thr Ile Glu Gln Gly Lys Thr Leu Ile Ile Lys Leu
            1040                1045                1050

Gln Ala Val Gly Asp Leu Asn Lys Lys Thr Gly Gln Arg Glu Val
            1055                1060                1065

Tyr Phe Glu Leu Asn Gly Glu Leu Arg Lys Ile Arg Val Ala Asp
            1070                1075                1080

Lys Ser Gln Asn Ile Gln Ser Val Ala Lys Pro Lys Ala Asp Val
            1085                1090                1095

His Asp Thr His Gln Ile Gly Ala Pro Met Ala Gly Val Ile Ile
            1100                1105                1110

Glu Val Lys Val His Lys Gly Ser Leu Val Lys Lys Gly Glu Ser
            1115                1120                1125

Ile Ala Val Leu Ser Ala Met Lys Met Glu Met Val Val Ser Ser
```

```
                     1130                1135                1140

Pro Ala Asp Gly Gln Val Lys Asp Val Phe Ile Lys Asp Gly Glu
        1145                1150                1155

Ser Val Asp Ala Ser Asp Leu Leu Val Val Leu Glu Glu Glu Thr
    1160                1165                1170

Leu Pro Pro Ser Gln Lys Lys
    1175                1180

<210> SEQ ID NO 127
<211> LENGTH: 359
<212> TYPE: PRT
<213> ORGANISM: Saccharomyces cerevisiae

<400> SEQUENCE: 127

Met Ser Thr Lys Val Val Asn Val Ala Val Ile Gly Ala Gly Val Val
1               5                   10                  15

Gly Ser Ala Phe Leu Asp Gln Leu Leu Ala Met Lys Ser Thr Ile Thr
                20                  25                  30

Tyr Asn Leu Val Leu Leu Ala Glu Ala Glu Arg Ser Leu Ile Ser Lys
            35                  40                  45

Asp Phe Ser Pro Leu Asn Val Gly Ser Asp Trp Lys Ala Ala Leu Ala
    50                  55                  60

Ala Ser Thr Thr Lys Thr Leu Pro Leu Asp Asp Leu Ile Ala His Leu
65                  70                  75                  80

Lys Thr Ser Pro Lys Pro Val Ile Leu Val Asp Asn Thr Ser Ser Ala
                85                  90                  95

Tyr Ile Ala Gly Phe Tyr Thr Lys Phe Val Glu Asn Gly Ile Ser Ile
            100                 105                 110

Ala Thr Pro Asn Lys Lys Ala Phe Ser Ser Asp Leu Ala Thr Trp Lys
        115                 120                 125

Ala Leu Phe Ser Asn Lys Pro Thr Asn Gly Phe Val Tyr His Glu Ala
    130                 135                 140

Thr Val Gly Ala Gly Leu Pro Ile Ile Ser Phe Leu Arg Glu Ile Ile
145                 150                 155                 160

Gln Thr Gly Asp Glu Val Glu Lys Ile Glu Gly Ile Phe Ser Gly Thr
                165                 170                 175

Leu Ser Tyr Ile Phe Asn Glu Phe Ser Thr Ser Gln Ala Asn Asp Val
            180                 185                 190

Lys Phe Ser Asp Val Val Lys Val Ala Lys Lys Leu Gly Tyr Thr Glu
        195                 200                 205

Pro Asp Pro Arg Asp Asp Leu Asn Gly Leu Asp Val Ala Arg Lys Val
    210                 215                 220

Thr Ile Val Gly Arg Ile Ser Gly Val Glu Val Glu Ser Pro Thr Ser
225                 230                 235                 240

Phe Pro Val Gln Ser Leu Ile Pro Lys Pro Leu Glu Ser Val Lys Ser
                245                 250                 255

Ala Asp Glu Phe Leu Glu Lys Leu Ser Asp Tyr Asp Lys Asp Leu Thr
            260                 265                 270

Gln Leu Lys Lys Glu Ala Ala Thr Glu Asn Lys Val Leu Arg Phe Ile
        275                 280                 285

Gly Lys Val Asp Val Ala Thr Lys Ser Val Ser Val Gly Ile Glu Lys
    290                 295                 300

Tyr Asp Tyr Ser His Pro Phe Ala Ser Leu Lys Gly Ser Asp Asn Val
305                 310                 315                 320
```

Ile Ser Ile Lys Thr Lys Arg Tyr Thr Asn Pro Val Val Ile Gln Gly
            325                 330                 335

Ala Gly Ala Gly Ala Ala Val Thr Ala Ala Gly Val Leu Gly Asp Val
        340                 345                 350

Ile Lys Ile Ala Gln Arg Leu
    355

<210> SEQ ID NO 128
<211> LENGTH: 300
<212> TYPE: PRT
<213> ORGANISM: Saccharomyces cerevisiae

<400> SEQUENCE: 128

Met Val Asn Asn Ser Gln His Pro Tyr Ile Lys Asp Gly Trp Phe Arg
1               5                   10                  15

Glu Ile Asn Asp Lys Ser Phe Pro Gly Gln Ala Phe Thr Met Thr Val
            20                  25                  30

Asp Ser Ile Leu Tyr Glu Ala Arg Ser Glu Phe Gln Asp Ile Leu Ile
        35                  40                  45

Phe Arg Asn Lys Val Tyr Gly Thr Val Leu Val Leu Asp Gly Ile Val
    50                  55                  60

Gln Cys Thr Glu Phe Asp Glu Phe Ala Tyr Gln Glu Met Ile Thr His
65                  70                  75                  80

Ile Ala Met Phe Ala His Ser Asn Pro Lys Arg Val Leu Ile Ile Gly
                85                  90                  95

Gly Gly Asp Gly Gly Val Leu Arg Glu Val Ala Lys His Ser Cys Val
            100                 105                 110

Glu Asp Ile Thr Met Val Glu Ile Asp Ser Ser Val Ile Glu Leu Ser
        115                 120                 125

Arg Lys Phe Leu Pro Thr Leu Ser Asn Gly Ala Phe Asp Asp Glu Arg
    130                 135                 140

Leu Asp Leu Lys Leu Cys Asp Gly Phe Lys Phe Leu Gln Asp Ile Gly
145                 150                 155                 160

Ala Ser Asp Val His Lys Lys Phe Asp Val Ile Ile Thr Asp Ser Ser
                165                 170                 175

Asp Pro Glu Gly Pro Ser Glu Ala Phe Phe Gln Glu Arg Tyr Phe Glu
            180                 185                 190

Leu Leu Lys Asp Ala Leu Asn Pro Asn Gly Val Val Ile Met Gln Ser
        195                 200                 205

Ser Glu Asn Phe Trp Leu Asn Leu Lys Tyr Leu His Asp Leu Lys Asn
    210                 215                 220

Thr Ala Lys Lys Val Phe Pro Asn Thr Glu Tyr Cys Tyr Thr Met Val
225                 230                 235                 240

Pro Thr Tyr Thr Ser Gly Gln Leu Gly Leu Ile Val Cys Ser Asn Asn
                245                 250                 255

Ala Asn Ile Pro Leu Asn Ile Ala Gln Arg Lys Ile Ser Glu Gln Glu
            260                 265                 270

Gln Gly Lys Leu Lys Tyr Tyr Asn Pro Gln Ile His Ser Ser Ala Phe
        275                 280                 285

Val Leu Pro Thr Trp Ala Asp Lys Val Ile Asn Glu
    290                 295                 300

<210> SEQ ID NO 129
<211> LENGTH: 810
<212> TYPE: PRT
<213> ORGANISM: Saccharomyces cerevisiae

```
<400> SEQUENCE: 129

Met Lys Arg Arg Ser Asp Ala Leu Leu Gly Ser Phe Gln Ala Thr Asn
1               5                   10                  15

Val Thr Pro Pro Ser Asp Asn Ser Asn Ser Thr Ala Gly Gly Ala Asn
            20                  25                  30

Gly Ser Asn Ser Gly Thr Pro Thr Ser Thr Ser Gly Lys Lys Arg Asn
        35                  40                  45

Lys Leu Ile Lys Ser Cys Gly Phe Cys Arg Arg Lys Leu Arg Cys
    50                  55                  60

Asp Gln Gln Lys Pro Met Cys Ser Thr Cys Ile Ser Arg Asn Leu Thr
65                  70                  75                  80

Thr Cys Gln Tyr Ala Glu Glu Phe Asn Lys Asn Ile Glu Lys Lys Ala
                85                  90                  95

Thr Tyr Gly Pro Tyr Pro Asn Ala Asp Leu Leu Lys Lys Val Glu Glu
                100                 105                 110

Leu Glu Asn Lys Ile Arg Ile Leu Glu Ala Glu Lys Asn Thr Asn Ser
            115                 120                 125

Ser Ala Ser Ser Met Tyr Thr Ser Pro Asn Phe Pro Pro Leu Gly Thr
    130                 135                 140

Ser Val Gly Arg Gly Ser Thr Glu Thr Ser Ser Pro Leu Pro Asp Gly
145                 150                 155                 160

Val Ile Asn Pro Tyr Ala Asp Arg Tyr Tyr Leu Gln Ser Lys His Ser
                165                 170                 175

Gly Arg Ser Thr Leu Tyr Gly Pro Thr Ser Met Arg Thr Gln Ile Ala
            180                 185                 190

Asn Ser Asn Trp Gly Phe Ile Glu Lys Tyr Lys Gln Leu Trp Ala Lys
        195                 200                 205

Val Lys Val Glu Arg Asn Lys Trp Lys Gln Asn Asn Gln Lys Thr Met
    210                 215                 220

Cys Arg Glu Leu Gly Leu Leu Asp Glu Ser Asp Trp Gln Pro Asp Pro
225                 230                 235                 240

Leu Ile Lys Gln Ile Cys Arg Phe Leu Pro Ser Tyr Asn Lys Ala Leu
                245                 250                 255

Ser Ile Leu Asp Asp Phe Phe Asn Asp Gly Ala Cys Asn Glu Ile Asn
            260                 265                 270

Val Ile Leu Asp Lys Ala Lys Val Arg Arg Asp Phe Leu Asp Tyr Phe
        275                 280                 285

Met Pro Glu Lys Glu Val Lys Ala Glu Gly Asp Arg Ser Ile Val Tyr
    290                 295                 300

Ile Leu Ser Asn Pro Lys Lys Asn Tyr Lys Ala Ala Val Ile Leu
305                 310                 315                 320

Leu Ile Leu Cys Leu Lys Tyr Phe His Thr Asp Val Pro Thr Pro Ile
                325                 330                 335

Glu Lys Phe Phe Thr Leu Leu Lys Gly Ala Ser Thr Ala Lys Val Phe
            340                 345                 350

Tyr Ile Glu Arg Ala Gln Met Leu Ile Leu Phe Tyr Tyr His Arg Glu
        355                 360                 365

Thr Tyr Ser Phe Gly Gly Asp Gly Ser Asp Leu Val Asn Ile Asn Glu
    370                 375                 380

Cys Leu Val Thr Thr Val Thr Thr Ile Gly Leu His Leu Asn Ile Arg
385                 390                 395                 400

Glu Thr Phe Lys Glu His Glu Val Phe Met Gly Ser Ile Glu Ser Leu
```

405                 410                 415
Glu Asn Val Trp Leu Met Ala Ile Phe Ile Asp Tyr Asn Ile Ser Cys
                420                 425                 430

Asn Val Gly Arg Pro Leu Leu Ile Asn Lys Phe Tyr Leu Asp Glu Asn
                435                 440                 445

Gln Asp His Cys Ile Leu Asn Ser Lys Ser Lys Thr Tyr Glu Gly Lys
            450                 455                 460

Leu Lys Arg Tyr Leu Lys Leu Thr Arg Pro Met Leu Leu Thr Leu Tyr
465                 470                 475                 480

Asp Arg Asp Lys Phe Pro Asp Leu Lys Ala Tyr Ser Lys Arg Ile Ile
                485                 490                 495

Asn Phe Val Glu Glu Leu Gly Pro Leu Gly His Tyr Thr Gly Glu
                500                 505                 510

Asn Ile Ser Glu Glu Val Pro Leu Arg Glu Ser Arg Ile Leu Ser Met
                515                 520                 525

Ala Val Gly Leu Leu Leu Ser Phe Tyr Ala Leu Ile His Ser Val Leu
            530                 535                 540

Lys Val Arg Asn Ile Glu Ser Lys Asn Asn Thr Phe Gln Leu Val Leu
545                 550                 555                 560

Ile Asn Phe Ser Ile Ile Val Asn Thr Thr Ile Arg Cys Tyr Arg Ile
                565                 570                 575

Asp Lys Ala Leu Tyr Pro Glu Lys Phe Glu Ala Ser Asn Pro His Leu
            580                 585                 590

Pro Pro His Met Ala Leu Ser Met Ser Leu Thr Ala Gly Leu Phe Ser
            595                 600                 605

Lys Thr Leu Val Phe Phe Cys Ser Leu Ile Tyr Phe Lys Leu Thr Leu
610                 615                 620

Phe Glu Asn Gly Leu Cys Leu Ser Asn Asp Met Glu Val Gly Trp Ser
625                 630                 635                 640

Asp Leu Thr Lys Leu Thr Val Pro Leu Asp Lys Asp Leu Ser Leu Gly
                645                 650                 655

Thr Ala Met Ser Leu Tyr Ser Ser Ile Phe Asp Arg Leu Phe Thr Val
                660                 665                 670

Gly Asn Lys Glu Leu Ile Arg Thr Met His Arg Ser Ser Gln Phe Val
            675                 680                 685

Ile Glu Leu Ala Ile Glu Arg Thr Tyr Arg Thr Ile Leu Gly Asn Val
            690                 695                 700

Ile Glu Phe Arg Lys Leu Thr Glu Glu Thr Trp Leu Ala Gln Ile Lys
705                 710                 715                 720

Gln Glu Leu Asp Pro Gln Ser Asp Asn Pro Ser Ser Glu Ala Lys Ile
                725                 730                 735

Val Ser Asp Arg Gln Arg Asp Leu Ser Leu Ala Val Pro Thr Pro Thr
                740                 745                 750

Pro Ser Ile Ile Pro Met Leu Pro Ser Pro Gly Glu Thr Lys Asn His
            755                 760                 765

Ala Lys Ser Gln Ser Glu Ile Ile Gln Met Leu Thr Asp Glu Phe Trp
            770                 775                 780

Ala Asn Tyr Asn Ser Gly Trp Glu Glu Leu Ile Asn Gln Ser Glu Phe
785                 790                 795                 800

Ser Thr Leu Phe Asp Asp Tyr Lys Asp Asn
                805                 810

<210> SEQ ID NO 130

```
<211> LENGTH: 23
<212> TYPE: DNA
<213> ORGANISM: Artificial
<220> FEATURE:
<223> OTHER INFORMATION: Primer

<400> SEQUENCE: 130
gacctgttgt ttctagaaaa aca                                              23

<210> SEQ ID NO 131
<211> LENGTH: 22
<212> TYPE: DNA
<213> ORGANISM: Artificial
<220> FEATURE:
<223> OTHER INFORMATION: Primer

<400> SEQUENCE: 131
ctagcctaac aacctcgagt ta                                               22

<210> SEQ ID NO 132
<211> LENGTH: 37
<212> TYPE: DNA
<213> ORGANISM: Artificial
<220> FEATURE:
<223> OTHER INFORMATION: Primer

<400> SEQUENCE: 132
gttgtttcta gaaaacaat gtctgctgct cctgtcc                                37

<210> SEQ ID NO 133
<211> LENGTH: 36
<212> TYPE: DNA
<213> ORGANISM: Artificial
<220> FEATURE:
<223> OTHER INFORMATION: Primer

<400> SEQUENCE: 133
gttgttggat cctcaagtag cacttgtcca attatt                                36

<210> SEQ ID NO 134
<211> LENGTH: 38
<212> TYPE: DNA
<213> ORGANISM: Artificial
<220> FEATURE:
<223> OTHER INFORMATION: Primer

<400> SEQUENCE: 134
gttgtttcta gaaaacaat gcgaggcttg acacctaa                               38

<210> SEQ ID NO 135
<211> LENGTH: 35
<212> TYPE: DNA
<213> ORGANISM: Artificial
<220> FEATURE:
<223> OTHER INFORMATION: Primer

<400> SEQUENCE: 135
gttgttggat ccttaactat ctggataaac gtcgc                                 35

<210> SEQ ID NO 136
<211> LENGTH: 39
<212> TYPE: DNA
<213> ORGANISM: Artificial
<220> FEATURE:
<223> OTHER INFORMATION: Primer

<400> SEQUENCE: 136
```

```
gttgttggat ccaaaacaat gaaaagaaga agcgatgct                              39

<210> SEQ ID NO 137
<211> LENGTH: 36
<212> TYPE: DNA
<213> ORGANISM: Artificial
<220> FEATURE:
<223> OTHER INFORMATION: Primer

<400> SEQUENCE: 137
gttgttctcg agttaattgt ctttgtaatc atcgaa                                 36

<210> SEQ ID NO 138
<211> LENGTH: 1266
<212> TYPE: DNA
<213> ORGANISM: Artificial
<220> FEATURE:
<223> OTHER INFORMATION: Synthetic construct

<400> SEQUENCE: 138
gttgtttcta gaaaaacaat gtctcgtaga ttgttcactt ctgaatctgt tactgaaggt       60
cacccagaca gaatcgctga ccaaatctct gacactatct tggacgctcc attgagagaa      120
gacccaactt ctcgtgttgc tgttgaaact ttgatcacta ctggtttggt tcacgttgct      180
ggtgaagtta ctactaaggc ttacgctcca gttgctcaat ggttagaga aaagatcttg       240
gaaatcggtt acgactcttc taagaagggt ttcgacggtg cttcttgtgg tgtttctgtt      300
tctatcggtg ctcaatctcc agacatcgct caaggtgttg acactgctta cgaatctcgt      360
gttgaaggtg acgaagacga attggacaga caaggtgctg gtgaccaagg tttgatgttc      420
ggttacgctt gtgacgaaac tccagaattg atgccattgc caatccactt ggctcacaga      480
ttgtctcgta gattgtctga agttagaaag aacggtacta tcccatactt gagaccagac      540
ggtaagactc aagttactat cgaatacgac ggtgacaagg ctgttagatt ggacactgtt      600
gttgtttctt ctcaacacgc ttctgacatc gacttggaat ctttgttggc tccagacatc      660
agagaattcg ttgttgaacc agaattgaag gctttggttg aagacggtat caagttggaa      720
actgaaggtt acagattgtt ggttaaccca actggtagat tcgaaatcgg tggtccaatg      780
ggtgacgctg gtttgactgg tagaaagatc atcatcgaca cttacggtgg tatgtctcgt      840
cacggtggtg gtgctttctc tggtaaggac ccatctaagg ttgacagatc tgctgcttac      900
gctatgagat gggttgctaa gaacgttgtt gctgctggtt tggcttctcg ttgtgaagtt      960
caagttgctt acgctatcgg taaggctgaa ccagttggtt gttcgttga acttttcggt     1020
actaacacta tcgacactgg taagatcgaa caagctatct ctgaagtttt cgacttgaga     1080
ccagctgcta tcatcagaga cttggacttg ttgagaccaa tctactctca aactgctgct     1140
tacggtcact tcggtagatc tttgccagaa ttcacttggg aaaagactga cagagttgac     1200
ggttgtggta gaccaccagt ttggagagct gacttgttgc cattggttca ctaactcgag     1260
gttgtt                                                                1266

<210> SEQ ID NO 139
<211> LENGTH: 1209
<212> TYPE: DNA
<213> ORGANISM: Artificial
<220> FEATURE:
<223> OTHER INFORMATION: Synthetic construct

<400> SEQUENCE: 139
```

| | |
|---|---|
| gttgtttcta gaaaaacaat gtctgttcac tctatcttgt tctcttctga acacgttact | 60 |
| gaaggtcacc cagacaagtt gtgtgaccaa gtttctgacg ctgttttgga cgcttgtttg | 120 |
| gctggtgacc cattctctaa ggttgcttgt gaatcttgtg ctaagactgg tatggttatg | 180 |
| gttttcggtg aaatcactac taaggctgtt ttggactacc aaaagatcgt tagaaacact | 240 |
| atcaaggaca tcggtttcga ctctgctgac aagggtttgg actacgaatc ttgtaacgtt | 300 |
| ttggttgcta tcgaacaaca atctccagac atctgtcaag gtttgggtaa cttcgactct | 360 |
| gaagacttgg gtgctggtga ccaaggtatg atgttcggtt acgctactga cgaaactgaa | 420 |
| actttgatgc cattgactta cgaattggct agaggtttgg ctaagaagta ctctgaattg | 480 |
| agaagagacg gttctttgga atgggctaga ccagacgcta agactcaagt tactgttgaa | 540 |
| tacgactacg acactagaga aggtaagcaa gttttgactc aaagagagt tgctgttgtt | 600 |
| ttgatctctg ctcaacacga cgaacacgtt actaacgaca agatctctgt tgacttgatg | 660 |
| gaaaaggtta tcaaggctgt tatcccagct aacatgttgg acgctgaaac taagtactgg | 720 |
| ttgaacccat ctggtagatt cgttagaggt ggtccacacg tgacgctgg tttgactggt | 780 |
| agaaagatca tcgttgacac ttacggtggt tggggtgctc acggtggtgg tgctttctct | 840 |
| ggtaaggacc catctaaggt tgacagatct gctgcttacg ctgctagatg gatcgctaag | 900 |
| tctatcgttg ctggtggttt ggctagaaga tgtttggttc aattggctta cgctatcggt | 960 |
| gttgctgaac cattgtctat gcacgttgaa acttacggta ctggtaagta cgacgacgct | 1020 |
| aagttgttgg aaatcgttaa gcaaaacttc aagttgagac catacgacat catccaagaa | 1080 |
| ttgaacttga aagaccaat ctactacgaa acttctcgtt tcggtcactt cggtagaaag | 1140 |
| gacgaattgg gtactggtgg tttcacttgg gaagttccaa agaagatggt tgaataactc | 1200 |
| gaggttgtt | 1209 |

<210> SEQ ID NO 140
<211> LENGTH: 1815
<212> TYPE: DNA
<213> ORGANISM: Artificial
<220> FEATURE:
<223> OTHER INFORMATION: Synthetic construct

<400> SEQUENCE: 140

| | |
|---|---|
| gttgtttcta gaaaaacaat gaagatcact gaaaagttgg aacaacacag acaaacttct | 60 |
| ggtaagccaa cttactcttt cgaatacttc gttccaaaga ctactcaagg tgttcaaaac | 120 |
| ttgtacgaca gaatggacag aatgtacgaa gcttcttttgc cacaattcat cgacatcact | 180 |
| tggaacgctg gtggtggtag attgtctcac ttgtctactg acttggttgc tactgctcaa | 240 |
| tctgttttgg gtttggaaac ttgtatgcac ttgacttgta ctaacatgcc aatctctatg | 300 |
| atcgacgacg ctttggaaaa cgcttaccac tctggttgtc aaaacatctt ggctttgaga | 360 |
| ggtgacccac caagagacgc tgaaaactgg actccagttg aaggtggttt ccaatacgct | 420 |
| aaggacttga tcaagtacat caagtctaag tacggtgacc acttcgctat cggtgttgct | 480 |
| ggttacccag aatgtcaccc agaattgcca acaaggacg ttaagttgga cttggaatac | 540 |
| ttgaagcaaa agatcgacgc tgtggtgac ttcatcatca ctcaaatgtt ctacgacgtt | 600 |
| gacaacttca tcaactggtg ttctcaagtt agagctgctg gtatggacgt tccaatcatc | 660 |
| ccaggtatca tgccaatcac tacttacgct gctttcttga agagcgca atggggtcaa | 720 |
| atctctatcc cacaacactt ctcttctcgt ttggacccaa tcaaggacga cgacgaattg | 780 |
| gttagagaca tcggtactaa cttgatcgtt gaaatgtgtc aaaagttgtt ggactctggt | 840 |

-continued

```
tacgtttctc acttgcacat ctacactatg aacttggaaa aggctccatt gatgatcttg      900
gaaagattga acatcttgcc aactgaatct gaattcaacg ctcacccatt ggctgttttg      960
ccatggagaa agtctttgaa cccaaagaga agaacgaag aagttagacc aatcttctgg     1020
gctaacagac caaagtctta catctctcgt actaagggtt ggaacgactt cccacacggt     1080
agatggggtg actctcactc tgctgcttac tctactttgt ctgactacca attcgctaga     1140
ccaaagggta gagacaagaa gttgcaacaa gaatgggttg ttccattgaa gtctatcgaa     1200
gacgttcaag aaaagttcaa ggaattgtgt atcggtaact tgaagtcttc tccatggtct     1260
gaattggacg gtttgcaacc agaaactaag atcatcaacg aacaattggg taagatcaac     1320
tctaacggtt tcttgactat caactctcaa ccatctgtta acgctgctaa gtctgactct     1380
ccagctatcg gttggggtgg tccaggtggt tacgtttacc aaaaggctta cttggaattc     1440
ttctgttcta aggacaagtt ggacactttg gttgaaaagt ctaaggcttt cccatctatc     1500
acttacatgg ctgttaacaa gtctgaaaac tgggtttcta acactggtga atctgacgtt     1560
aacgctgtta cttggggtgt tttcccagct aaggaagtta ccaaccaac tatcgttgac     1620
ccagcttctt tcaaggtttg gaaggacgaa gctttcgaaa tctggtctcg ttcttgggct     1680
aacttgtacc agaagacga cccatctcgt aagttgttgg aagaagttaa gaactcttac     1740
tacttggttt ctttggttga caacaactac atcaacggtg acatcttctc tgttttcgct     1800
taactcgagg ttgtt                                                      1815
```

<210> SEQ ID NO 141
<211> LENGTH: 3207
<212> TYPE: DNA
<213> ORGANISM: Saccharomyces cerevisiae

<400> SEQUENCE: 141

```
atgcgaggct tgacacctaa gaacggtgta catattgaga cgggtccgga tacagaatcg       60
tccgcggact ccagcaactt ttctacaggt ttcagcggca agattcgtaa gccaaggtcg      120
aaagtaagta agcgtgcga taactgtaga aaaagaaaga taaatgtaa tgggaagttt        180
ccctgcgcaa gctgtgagat atattcatgt gagtgcacgt tcagcactag acaaggtggc      240
gctcgaataa aaaaccttca caagacgagt ttggaaggta caaccgtaca agtcaaagag      300
gaaacagatt ccagttcgac ttcttttct aatcctcagc gatgtacaga cgggccatgc       360
gcagtggaac aaccaacgaa attttttgag aatttcaagc taggtggtcg tagtagtggt      420
gataatagcg gaagtgatgg gaagaatgac gacgatgtga atagaaacgg tttttatgaa      480
gacgatagcg aatcacaggc aactttgaca tctctacaaa ccactctgaa aaatttgaag      540
gagatggctc atttaggtac acatgtaacc tcagccatcg agagcattga acttcagata      600
agtgacttgc ttaagcgatg ggaacccaaa gtgaggacca agaattagc acaacgaaa        660
ttttacccta ataaatcaat agaaactcaa ttgatgaaaa acaaatactg tgatgtggta      720
catttgacaa gatatgccgc ttggtcaaac aataagaagg accaagatac ttctagtcaa     780
cctttgatcg acgaaatctt tggttttgtac tctccttttcc aattttttgtc acttcaaggt  840
attggtaaat gtttccaaaa ttatagatcc aaatccaaat gcgagatttt tcccaggacc     900
gccaaggaaa ccatatacat catgttaagg ttttcgacg tttgtttca tcacatcaac       960
caaggctgtg tctccatagc taatcccctg gaaaactacc tacagaaaat gaatctttta   1020
ccttcaaccc catcttcgat atcatctgca gggagcccga atacagcaca cacaaaatcg   1080
```

-continued

```
catgttgcgt tagtgataaa tcacttaccg cagccctttg tgagaaatat aaccggaata    1140
agtaattctg agctactaag cgaaatgaat aatgatatca gcatgtttgg cattttattg    1200
aagatgttgg atatgcataa aaattcctac cagaacttcc taatggaaat cacatctaac    1260
ccctccgtgg ctaaaaacac gcagtcaatt gatgtcttgc aggaattcat ccattattgt    1320
caagctggag aggcgctaat cgccttatgt tacagctatt ataattctac attatacaac    1380
tacgtggact tcacatgcga cataacgcat ttagagcaac ttctatactt tttggatctg    1440
ctattttggc tatcggaaat atacggtttt gaaaaagtct tgaacgtagc agttcatttt    1500
gtttcaagag ttggtttatc aaggtgggaa ttttacgtgg gtcttgatga aaactttgct    1560
gaaagaagaa gaaatctctg gtggaaagct ttctatttcg agaaaacttt agcctctaaa    1620
cttggctatc cttcgaacat tgatgactcc aaaatcaatt gtttattacc taagaatttt    1680
cgagatgttg ggttcttgga taatagagat tttatcgaga acgtccactt agttcgcagg    1740
agcgaagctt ttgacaacat gtgcatatcc gacttaaaat actatggcga attagctgtc    1800
ttacaaatag tcagccattt ctcatcatct gtttttattca atgaaaaatt cacgtcaatt    1860
aggaatacat caaaaccatc tgttgttaga gagaaactac tcttcgaggt actcgagatt    1920
tttaacgaaa cagaaatgaa atatgatgct atcaaagagc aaactggaaa attgttcgat    1980
attgcattct ctaaagatag tactgaactc aaagtttcaa gagaggataa gattatggct    2040
tcaaaatttg ttctatttta cgagcaccat ttctgcagaa tggttaacga atctgataat    2100
attgtcgcca gattatgcgt gcacagaagg ccctcaatac taattgaaaa cttgaaaata    2160
taccttcaca agatttacaa atcatggacc gatatgaaca aaatcttatt agactttgac    2220
aacgattatt ccgtataccg ttcgttcgcc cattattcta tcagttgcat tatttttggta    2280
tcacaagcat tctcagtggc cgaattcatt aaagtaaatg acgttgtgaa tatgattaga    2340
gtcttcaaaa gattttttgga tataaaaatt ttttccgaaa atgagaccaa tgagcatgtc    2400
ttcaacagcc aaagctttaa agactataca agagcttttt ctttcctgac aatcgtcact    2460
cgtatcatgc ttttggcata cggagagtcc tctagcacca acctcgatgt tatctccaaa    2520
tatattgatg agaatgcgcc agatttaaaa ggtataatag aacttgtctt ggatacaaac    2580
tcttgcgctt atcgatttt attagaacct gttcagaagt caggattcca tttaacggtc    2640
tcacaaatgt tgaaaatag aaagtttcag gaaccactaa tgtcaaatga agataataag    2700
cagatgaagc ataattcggg aaaaaatttg aatccggatc tcccaagtct taagacgggc    2760
acttcatgct tactaaatgg cattgaatcg cctcaattgc cattcaatgg tcgctcagca    2820
ccttccccag tgagaaacaa ctcactaccg gagtttgcac aattgccttc atttaggtca    2880
ttatccgtgt ctgatatgat caatcccgat tacgcgcaac caacaaatgg gcaaaataat    2940
acgcaagtcc aatctaataa accaatcaat gctcagcagc aaatacccac ttcagtacaa    3000
gtaccattta tgaacacaaa tgaaatcaat aacaacaaca acaacaacaa caacaataaa    3060
aacaatatta acaatattaa caacaacaac agtaacaatt tttctgcaac tagttttaat    3120
ttggggacac tagatgaatt tgttaataac ggtgatcttg aggacctcta cagtatcctg    3180
tggagcgacg tttatccaga tagttaa                                       3207
```

<210> SEQ ID NO 142
<211> LENGTH: 2433
<212> TYPE: DNA
<213> ORGANISM: Saccharomyces cerevisiae

<400> SEQUENCE: 142

```
atgaaagaa gaagcgatgc tttgttggga agtttccagg ccaccaacgt tacgccgcca        60
agcgataata gtaatagtac ggccggtgga gccaatggaa gtaactcagg aacaccaact       120
tctactagcg gtaagaagag aaacaagctt ataaaatctt gtggcttttg cagaaggaga       180
aaacttcgtt gtgatcagca aaaacctatg tgttctacat gcatttctag aaacttaaca       240
acctgtcaat atgctgaaga attcaacaaa acatcgaaa agaaagctac ctatggtccc        300
tatcctaacg ccgatttact taagaaagtt gaagaactag aaaacaaaat acgtattcta       360
gaagctgaaa aaaacactaa ttcgtctgcg agctccatgt acacttcgcc aaatttccct       420
cctttaggca ctagtgtagg tagaggttct actgaaactt catctccatt acccgatggt       480
gtaataaatc catatgccga ccggtactac ctacaaagta acattccgg aagatcaaca        540 ctatacggcc ccacttctat gagaacccaa attgcaaata gtaattgggg gttcattgaa       600
aaatataaac aattatgggc gaaggttaaa gtagaaagaa ataaatggaa gcaaaacaac       660
caaaaaacga tgtgcaggga actaggcctt ttggatgagt cggattggca gccagatcca       720
ttaatcaaac agatatgtcg tttcctacca tcatataaca aagctttgtc tattttagat       780
gatttcttta atgatggagc atgcaatgag atcaacgtga ttcttgataa ggcaaaagtt       840
agaagagact ttttagatta tttcatgccc gaaaaagagg taaaggcgga aggtgacaga       900
tccatagttt atattttatc caatccaaag aaaaattatt acaaagctgc tgtgatacta       960
ttaatcctat gtctgaaata cttccataca gatgtcccaa ccccaattga aagttctt       1020 acttactaa aggggcctc caccgctaag gtgttctaca ttgagcgtgc acaaatgtta       1080
atacttttct actaccatcg tgaaacatat tcattcggtg gagatggctc cgatttggtt       1140
aatataaatg aatgtttagt tactacggtt actacaatag ggttgcattt aaacattaga       1200
gaaactttca aggaacatga ggtttttatg ggtagcatcg aaagtttaga aaatgtctgg       1260
ttaatggcaa tatttatcga ttataacata tcttgtaacg ttggtagacc cttattgatt       1320 aacaaattt atctagacga aaccaagat cattgcatat tgaatagtaa aagtaaaaca       1380
tatgagggga agctgaaaag atatttaaaa cttacaaggc caatgttgtt aactcttat       1440 gatagagata aattcccgga tttgaaagct tattccaagc gaattatcaa ttttgtagaa       1500
gaagaacttg gtccacttgg acattacaca ggtgaaaata tatcggaaga agttccatta       1560
agggaaagta gaatttaag tatggcagtc ggactattat tgtcgtttta tgcactaata       1620
cattctgtgc tgaaagtcag aaacatagaa tccaaaaata atacgtttca attggttttg       1680 atcaatttt ccatcattgt gaataccaca attcgatgct atcgtatcga caaagcactt       1740
tacccagaga aattcgaagc ctccaacccg cacttaccgc cacatatggc gttatcaatg       1800
agcctcacgg cagggctttt ttccaaaaca ttggtgtttt tttgttctct gatctacttt       1860
aagttgacgc ttttcgaaaa tggactatgt ctatccaacg atatggaagt tggatggtcg       1920
gatttgacga aattgactgt tcctttagac aaggatctat ctttaggtac agcaatgagc       1980
ttgtactcgt caatcttcga tcgcttgttc acggtcggaa ataaagaatt aatacgcaca       2040
atgcatagat catcacaatt tgtgatagag ctagctattg aaaggaccta taggactatt       2100
cttggcaacg ttattgaatt cagaaagttg accgaggaaa catggctagc acaaatcaaa       2160
caagaactag atccgcagag cgataatcca tcatcagaag ctaaaattgt gagtgatagg       2220
cagcgggatc tcagccttgc agttccaacg cccacgccct caataattcc aatgttaccc       2280
tcgcctggtg aaactaagaa ccatgcaaag agtcaatcag agatcattca gatgctgaca       2340
```

```
gatgaatttt gggcaaatta taactcaggc tgggaagagt tgattaatca atctgaattt   2400
tccactcttt tcgatgatta caaagacaat taa                                2433

<210> SEQ ID NO 143
<211> LENGTH: 3246
<212> TYPE: DNA
<213> ORGANISM: Saccharomyces cerevisiae

<400> SEQUENCE: 143
atgtctgctg ctcctgtcca agacaaagac actctgtcca atgccgagcg tgcgaagaac     60
gtcaacgggt tgcttcaggt gctcatggac attaacactc tgaacggagg gagctccgac    120
actgctgata agataagaat tcatgccaaa aacttcgagg cagctttgtt cgcaaagagc    180
tcttcaaaga aagaatacat ggacagcatg aacgaaaaag ttgctgtcat gcgcaacacg    240
tacaatacga ggaaaaacgc cgttactgct gctgccgcta ataacaacat taaacccgtg    300
gaacagcacc atattaacaa cttgaaaaat tctggcaaca gcgccaataa tatgaatgtc    360
aatatgaatc taaacccaca gatgttcttg aatcagcagg ctcaggcaag gcaacaggtt    420
gcgcaacaat taagaaatca acaacaacaa caacaacagc agcagcagca acagaggcgt    480
caattgactc ctcaacaaca acaattagtg aaccagatga agtggcaccc tattcccaaa    540
caattactgc aaagaattcc taacattcca cccaatatca cacctggca gcaggtcact    600 gctttggctc aacaaaagct attgacacct caggatatgg aagctgcgaa ggaagtctac    660
aagattcacc agcagttgct attcaaagca aggctacagc aacaacaagc acaggctcaa    720
gcacaagcta ataacaacaa caacggcctc cccaaaatg gtaatattaa caataacata    780
aatattcctc aacagcagca aatgcaacct cccaattcaa gtgcgaacaa caaccctttg    840
caacagcaat catcacaaaa taccgtacca acgtcctca accaaattaa ccaaatcttt    900
tctccagagg agcaacgcag cttattacaa gaagccatcg aaacctgcaa gaattttgaa    960
aaaacacaat gggtagtac gatgacggaa cctgtcaagc aaagttttat taggaaatac   1020
attaaccaaa aggccctgag aaaaatccaa gctttgagag atgttaagaa caacaataac   1080
gctaacaaca acggctcgaa ccttcagaga gcccaaaatg tccctatgaa tatcatccaa   1140
caacaacaac aacagaacac gaacaataat gacaccattg ccacttctgc tacacctaat   1200
gctgccgctt tctctcagca acagaacgca agttctaaat tatatcagat gcaacaacag   1260
caacaagctc aagctcaagc tcaagctcaa gctcaggcac aggctcaagc acaagctcaa   1320
gcacaggcgg cacaagcggc gcaagcgcaa gcacaagcac aagcacaagc acaagcacag   1380
gcacaggcac aggcacaagc ccaggcgcag gcccaagccc aagcccaagc acaagcacaa   1440
gcacacgctc agcaccagcc ctcccaacaa ccacaacaag ctcagcaaca acctaaccca   1500
ctacatgggt tgacacctac tgcaaaggat gtcgaagtaa ttaagcaatt gtccttggat   1560
gcttctaaga ccaacctaag gcttacggac gtaacaaatt ctttatccaa tgaagaaaag   1620
gaaaaaatta aaatgaagtt aaagcaaggt caaaagcttt tgttcaggt gagtaatttc   1680 gccccacaag tctacatcat cacaaagaat gaaaacttct gaaggaagt ttttcagtta   1740 agaatctttg taaagagat cctagaaaaa tgtgccgagg gtatatttgt tgttaaatta   1800
gacaccgttg acaggttaat tattaagtat caaaaatatt gggaaagtat gagaattcaa   1860
attttaagaa gacaagctat tttaagacaa caacagcaaa tggcaaacaa caatgggaac   1920
ccaggcacta cttctactgg aaacaataat aatattgcaa ctcagcaaaa tatgcaacag   1980
tcactacagc aaatgcagca tttacagcaa ttgaaaatgc agcagcaaca acaacagcag   2040
```

| | | | | | |
|---|---|---|---|---|---|
| caacaacaac | agcagcaaca | acaacagcag | caacaacaac | agcaacagca | catatatccc | 2100 |
| tcctcgactc | ctggtgtggc | taattattcg | gcaatggcta | atgcacccgg | taacaatatc | 2160 |
| ccatatatga | accataaaaa | tacctctagc | atggattttt | tgaactctat | ggaaaataca | 2220 |
| ccaaaagttc | ccgtatccgc | tgcggcaacc | ccatcactga | caagacgat | caacggtaag | 2280 |
| gtgaatggca | ggacaaaatc | taatacgata | cctgttacca | gcattccatc | aacaaataag | 2340 |
| aaactatcaa | tttcaaatgc | cgctagtcaa | caacccactc | ctaggtctgc | atcaaatacc | 2400 |
| gctaagtcaa | ccccaaatac | aaatccttct | ccactgaaaa | cccaaactaa | aaatggcaca | 2460 |
| ccaaacccca | ataatgaa | gactgtacag | tctcctatgg | gtgcacaacc | atcatataat | 2520 |
| agtgccatta | tagagaatgc | attcagaaag | gaagaactct | tgttaaaaga | tttggaaatc | 2580 |
| aggaagttgg | agatatcttc | tcgttttaaa | catcgccaag | aaattttcaa | agattctcct | 2640 |
| atggatttgt | ttatgagtac | gctgggtgat | tgcttaggta | tcaaagatga | agagatgctt | 2700 |
| acgtcatgca | ctatcccaaa | ggctgtggtt | gatcacatca | acggctctgg | caaaaggaag | 2760 |
| cctacaaaag | cggctcaaag | ggctcgcgat | caagattcca | ttgacatttc | cataaaagac | 2820 |
| aacaaattgg | ttatgaagag | taaattcaat | aagagcaata | ggtcgtattc | gatagcgttg | 2880 |
| tccaatgtag | ctgctatatt | caagggtatc | ggtggtaact | ttaaagactt | gtccactttg | 2940 |
| gttcattcat | catcgccgtc | cacatcttct | aatatggatg | tcggcaaccc | aagaaaaaga | 3000 |
| aaagccagcg | tattagaaat | aagcccgcaa | gattcgatag | cctcggtgct | atcaccagat | 3060 |
| tcaaatataa | tgagtgattc | taaaaaaatt | aaagtagatt | ctcctgatga | cccattcatg | 3120 |
| acaaaatcag | gagccacaac | tagtgaaaaa | caagaagtaa | caaatgaagc | tccattttta | 3180 |
| acttctggga | ctagttcaga | acaattcaat | gtatgggatt | ggaataattg | gacaagtgct | 3240 |
| acttga | | | | | 3246 |

<210> SEQ ID NO 144
<211> LENGTH: 903
<212> TYPE: DNA
<213> ORGANISM: Saccharomyces cerevisiae

<400> SEQUENCE: 144

| | | | | | |
|---|---|---|---|---|---|
| atggttaata | attcacagca | tccttacatc | aaagatggat | ggtttagaga | gattaatgat | 60 |
| aaaagttttc | cgggccaggc | ctttactatg | accgtggact | caatacttta | tgaagcccgc | 120 |
| agtgaatttc | aggacatctt | aatcttccgt | aacaaggtat | acggtactgt | tttggtcctc | 180 |
| gatggtattg | tccaatgtac | ggaatttgat | gagtttgcct | atcaagagat | gatcacccac | 240 |
| attgccatgt | ttgcgcattc | taatcccaag | cgtgtactta | tcattggcgg | tggggacgga | 300 |
| ggtgtcttaa | gggaagtagc | caagcacagc | tgtgtagaag | atatcactat | ggtagaaatt | 360 |
| gactcatcag | tgatcgaatt | atcccgtaag | ttcttgccca | cattgagtaa | tggtgctttc | 420 |
| gatgacgaaa | ggttggactt | gaacttggc | gatggcttca | agttcttaca | agatataggt | 480 |
| gcttccgacg | tccataagaa | atttgacgtc | attattacag | atagttctga | tcctgaaggt | 540 |
| ccagctgaag | cgttttttca | agagaggtat | ttcgaactat | tgaaagatgc | tttaaatcct | 600 |
| aatggcgttg | ttattatgca | aagctctgaa | attttttggt | taaatttaaa | atacttacat | 660 |
| gatttgaaaa | atacagccaa | aaaggtattt | cctaatacag | aatattgcta | taccatggtt | 720 |
| ccaacctata | catctggcca | attaggttta | attgtttgca | gtaataacgc | caatataccg | 780 |
| ttgaacattc | cgcaaagaaa | gatatctgag | caagaacaag | ggaagctgaa | gtactataat | 840 |

```
cctcaaatac attctagtgc gtttgttttg cctacttggg cagacaaggt cattaatgaa    900
tga                                                                  903

<210> SEQ ID NO 145
<211> LENGTH: 867
<212> TYPE: DNA
<213> ORGANISM: Escherichia coli

<400> SEQUENCE: 145
atggccgaaa aaaacagtg gcatgaaacg ctacacgacc agtttgggca gtactttgcg     60
gtagataacg ttctgtatca tgaaaagacc gatcaccagg atctgatcat ttttgagaac   120
gctgcatttg gtcgcgtaat ggcgctggat ggcgtagtac aaaccaccga gcgcgacgag   180
tttatctatc atgagatgat gacccatgtt ccgctactgg cccatggtca cgcgaaacat   240
gtgctgatta tcggcggcgg cgacggtgcc atgctgcgtg aagtaacccg acataaaaac   300
gttgagtcaa tcacgatggt ggaaatcgat gcgggtgtcg tatcgttctg ccgtcagtat   360
ctacccaacc ataacgccgg tagctacgac gatccgcgct ttaagctggt gatcgacgat   420
ggcgtcaatt tcgttaatca aaccagccag acctttgatg tcattatctc cgactgcacc   480
gatcctatcg gtcccggcga aagccttttc acttcggcat tttatgaagg ctgcaaacgt   540
tgcctgaatc ctggcggtat cttcgtcgca caaaacggcg tctgcttttt acagcaggaa   600
gaagccatcg acagccatcg caaactcagc cattacttca gcgacgttgg cttttatcag   660
gcggcgatcc cgacctatta cggcggtatc atgacttttg catgggcgac agataacgac   720
gccttacgcc atctctcaac cgaaattatt caggcgcgtt ttctcgcctc tggcctgaaa   780
tgccgttatt acaatccggc aatccatacg gcagcttttg ccttacctca gtatctgcaa   840
gacgcactgg cttcacagcc gtcctaa                                       867

<210> SEQ ID NO 146
<211> LENGTH: 795
<212> TYPE: DNA
<213> ORGANISM: Escherichia coli

<400> SEQUENCE: 146
atgaaaaaac tgaaactgca tggctttaat aatctgacca aaagtctgag ttttgtatt    60 tacgatatct gctacgccaa aactgccgaa gagcgcgacg gttatattgc ttatatcgat   120
gaactctata tgccaaccg tctgaccgaa atcctgtcag aaacctgttc cattatcggg   180
gctaatattc ttaacatcgc ccgccaggat tacgaaccac agggtgccag cgtcactatt   240
ctggtgagtg aagaaccggt tgacccgaaa ctcatcgaca aaacagaaca ccccggccca   300
ctgccagaaa cggtcgttgc ccatctcgat aaaagtcata tttgcgtaca tacctacccg   360
gaaagtcatc ctgaaggcgg tttatgtacc ttccgcgccg atattgaagt ctctacctgc   420
ggcgtgattt ctccgctgaa ggcgctgaat tacctgatcc accagcttga gtccgatatc   480
gtaaccattg attatcgcgt gcgcggtttt acccgcgaca ttaacggtat gaagcacttt   540
atcgaccatg agattaattc gattcagaac tttatgtctg acgatatgaa ggcgctgtat   600
gacatggtgg atgtaaacgt ctatcaggaa atatcttcc ataccaagat gttgcttaaa   660
gagttcgacc ttaagcacta catgttccac accaaaccgg aagatttaac cgacagcgag   720
cgccaggaaa ttaccgctgc gctgtggaaa gaaatgcgcg agatttatta cgggcgcaat   780
atgccagctg tttaa                                                    795
```

<210> SEQ ID NO 147
<211> LENGTH: 337
<212> TYPE: PRT
<213> ORGANISM: Saccharomyces cerevisiae

<400> SEQUENCE: 147

```
Met Asn Arg Ile Lys Asn Thr Phe Ser Val Ala Lys Arg Leu Lys Leu
1               5                   10                  15

Ser Lys Val Met Thr Asn Ser Glu Leu Pro Ser Ile Phe Glu Gly Thr
            20                  25                  30

Val Asp Leu Gly Ile Ile Gly Thr Gly Leu Tyr Asn Leu Asp Cys
        35                  40                  45

Leu Glu Pro Ile Ala Leu Leu Pro Pro Met Val Thr Pro Trp Gly Thr
    50                  55                  60

Thr Ser Ser Pro Val Thr Ile Ser Gln Phe Val Gly Thr Asn Ser His
65                  70                  75                  80

Phe His Val Ala Phe Ile Ala Arg His Gly Ile Asn His Glu Tyr Pro
                85                  90                  95

Pro Thr Lys Val Pro Phe Arg Ala Asn Met Ala Ala Leu Lys Asn Leu
            100                 105                 110

Asn Cys Lys Ala Val Leu Ser Phe Ser Ala Val Gly Ser Leu Gln Pro
        115                 120                 125

His Ile Lys Pro Arg Asp Phe Val Leu Pro Gln Gln Ile Ile Asp Arg
    130                 135                 140

Thr Lys Gly Ile Arg His Ser Ser Tyr Phe Asn Asp Glu Gly Leu Val
145                 150                 155                 160

Gly His Val Gly Phe Gly Gln Pro Phe Ser Gln Lys Phe Ala Glu Tyr
                165                 170                 175

Ile Tyr Gln Phe Lys Asn Glu Ile Thr Asn Pro Glu Ser Glu Glu Pro
            180                 185                 190

Cys His Leu His Tyr Asp Lys Asp Met Thr Val Val Cys Met Glu Gly
        195                 200                 205

Pro Gln Phe Ser Thr Arg Ala Glu Ser Lys Met Tyr Arg Met Phe Gly
    210                 215                 220

Gly His Val Ile Asn Met Ser Val Ile Pro Glu Ala Lys Leu Ala Arg
225                 230                 235                 240

Glu Cys Glu Leu Pro Tyr Gln Met Ile Cys Met Ser Thr Asp Tyr Asp
                245                 250                 255

Ala Trp Arg Asp Glu Ala Glu Pro Val Thr Val Glu Thr Val Ile Gly
            260                 265                 270

Asn Leu Thr Asn Asn Gly Arg Asn Ala Asn Ile Leu Ala Ser Lys Ile
        275                 280                 285

Ile Val Ser Met Ala Lys Glu Ile Pro Glu Phe Met His Thr Gly Asp
    290                 295                 300

Gly Leu Arg Gly Ser Ile Lys Lys Ser Ile Ser Thr Lys Pro Glu Ala
305                 310                 315                 320

Met Ser Lys Glu Thr Leu Glu Arg Leu Arg Tyr Leu Phe Pro Asn Tyr
                325                 330                 335

Trp
```

<210> SEQ ID NO 148
<211> LENGTH: 376
<212> TYPE: PRT
<213> ORGANISM: Saccharomyces cerevisiae

<400> SEQUENCE: 148

```
Met Thr Leu Ala Pro Leu Asp Ala Ser Lys Val Lys Ile Thr Thr Thr
1               5                   10                  15

Gln His Ala Ser Lys Pro Lys Pro Asn Ser Glu Leu Val Phe Gly Lys
            20                  25                  30

Ser Phe Thr Asp His Met Leu Thr Ala Glu Trp Thr Ala Glu Lys Gly
        35                  40                  45

Trp Gly Thr Pro Glu Ile Lys Pro Tyr Gln Asn Leu Ser Leu Asp Pro
    50                  55                  60

Ser Ala Val Val Phe His Tyr Ala Phe Glu Leu Phe Glu Gly Met Lys
65                  70                  75                  80

Ala Tyr Arg Thr Val Asp Asn Lys Ile Thr Met Phe Arg Pro Asp Met
                85                  90                  95

Asn Met Lys Arg Met Asn Lys Ser Ala Gln Arg Ile Cys Leu Pro Thr
            100                 105                 110

Phe Asp Pro Glu Glu Leu Ile Thr Leu Ile Gly Lys Leu Ile Gln Gln
        115                 120                 125

Asp Lys Cys Leu Val Pro Glu Gly Lys Gly Tyr Ser Leu Tyr Ile Arg
    130                 135                 140

Pro Thr Leu Ile Gly Thr Thr Ala Gly Leu Gly Val Ser Thr Pro Asp
145                 150                 155                 160

Arg Ala Leu Leu Tyr Val Ile Cys Cys Pro Val Gly Pro Tyr Tyr Lys
                165                 170                 175

Thr Gly Phe Lys Ala Val Arg Leu Glu Ala Thr Asp Tyr Ala Thr Arg
            180                 185                 190

Ala Trp Pro Gly Gly Cys Gly Asp Lys Lys Leu Gly Ala Asn Tyr Ala
        195                 200                 205

Pro Cys Val Leu Pro Gln Leu Gln Ala Ala Ser Arg Gly Tyr Gln Gln
    210                 215                 220

Asn Leu Trp Leu Phe Gly Pro Asn Asn Ile Thr Glu Val Gly Thr
225                 230                 235                 240

Met Asn Ala Phe Phe Val Phe Lys Asp Ser Lys Thr Gly Lys Lys Glu
                245                 250                 255

Leu Val Thr Ala Pro Leu Asp Gly Thr Ile Leu Glu Gly Val Thr Arg
            260                 265                 270

Asp Ser Ile Leu Asn Leu Ala Lys Glu Arg Leu Glu Pro Ser Glu Trp
        275                 280                 285

Thr Ile Ser Glu Arg Tyr Phe Thr Ile Gly Glu Val Thr Glu Arg Ser
    290                 295                 300

Lys Asn Gly Glu Leu Leu Glu Ala Phe Gly Ser Gly Thr Ala Ala Ile
305                 310                 315                 320

Val Ser Pro Ile Lys Glu Ile Gly Trp Lys Gly Glu Gln Ile Asn Ile
                325                 330                 335

Pro Leu Leu Pro Gly Glu Gln Thr Gly Pro Leu Ala Lys Glu Val Ala
            340                 345                 350

Gln Trp Ile Asn Gly Ile Gln Tyr Gly Glu Thr Glu His Gly Asn Trp
        355                 360                 365

Ser Arg Val Val Thr Asp Leu Asn
    370                 375

<210> SEQ ID NO 149
<211> LENGTH: 401
<212> TYPE: PRT
<213> ORGANISM: Campylobacter jejuni
```

<400> SEQUENCE: 149

```
Met Lys Asn Leu Leu Ile Ile Gly Ala Gly Gly Val Ser Arg Val Ala
1               5                   10                  15

Thr Val Lys Cys Ala Met Asn Ser Asp Thr Phe Ser Lys Ile Thr Leu
            20                  25                  30

Ala Ser Arg Thr Lys Ser Lys Cys Asp Glu Ile Ala Ala Phe Ile Lys
        35                  40                  45

Glu Arg Leu Gly Val Gln Ile Glu Thr Ala Gln Ile Asp Ala Asp Asp
    50                  55                  60

Ser Asn Ala Val Val Glu Leu Ile Lys Lys Thr Gly Ala Gln Ile Leu
65                  70                  75                  80

Leu Asn Val Ala Leu Pro Tyr Gln Asp Leu Ser Leu Met Asp Ala Cys
                85                  90                  95

Ile Lys Ala Gly Ile Asp Tyr Val Asp Thr Ala Asn Tyr Glu His Pro
            100                 105                 110

Asp Leu Ala Lys Phe Glu Tyr Lys Glu Gln Trp Ala Arg Asn Asp Glu
        115                 120                 125

Phe Lys Gln Ala Gly Ile Leu Gly Leu Leu Gly Ser Gly Phe Asp Pro
    130                 135                 140

Gly Val Thr Asn Val Phe Cys Ala Tyr Ala Gln Gln Asn Leu Phe Asp
145                 150                 155                 160

Glu Ile Ser Tyr Ile Asp Ile Leu Asp Cys Asn Ala Gly Asp His Gly
                165                 170                 175

Tyr Ala Phe Ala Thr Asn Phe Asn Pro Glu Ile Asn Leu Arg Glu Val
            180                 185                 190

Ser Ala Lys Gly Arg Tyr Trp Glu Asn Gly Lys Trp Ile Glu Thr Gln
        195                 200                 205

Pro Met Glu Ile Lys Met Glu Trp Asp Tyr Pro Glu Val Gly Val Lys
    210                 215                 220

Asp Ser Tyr Leu Leu Tyr His Glu Glu Leu Glu Ser Leu Val Lys Asn
225                 230                 235                 240

Ile Lys Gly Leu Lys Arg Ile Arg Phe Phe Met Thr Phe Gly Gln Ser
                245                 250                 255

Tyr Leu Thr His Met Lys Cys Leu Glu Asn Val Gly Met Leu Gly Ile
            260                 265                 270

Lys Pro Val Met His Gln Gly Lys Glu Ile Pro Ile Glu Phe Leu
        275                 280                 285

Lys Thr Leu Leu Pro Asp Pro Ala Ser Leu Gly Pro Arg Thr Lys Gly
    290                 295                 300

Tyr Thr Asn Ile Gly Cys Val Ile Arg Gly Lys Lys Asp Gly Lys Asp
305                 310                 315                 320

Lys Gln Val Tyr Ile Tyr Asn Val Cys Asn His Glu Glu Cys Tyr Lys
                325                 330                 335

Glu Thr Gly Ala Gln Ala Val Ser Tyr Thr Thr Gly Val Pro Ala Met
            340                 345                 350

Ile Gly Thr Lys Leu Ile Ala Lys Gly Ile Trp Gln Gly Lys Gly Val
        355                 360                 365

Phe Asn Met Glu Glu Phe Asp Ala Lys Pro Phe Met Glu Glu Leu Asn
    370                 375                 380

Ser Gln Gly Leu Pro Trp Lys Ile Ile Glu Met Thr Pro Ser Leu Gly
385                 390                 395                 400

Glu
```

<210> SEQ ID NO 150
<211> LENGTH: 382
<212> TYPE: PRT
<213> ORGANISM: Campylobacter jejuni

<400> SEQUENCE: 150

```
Met Phe Tyr Glu Lys Ile Gln Thr Pro Ala Tyr Ile Leu Glu Glu Asp
1               5                   10                  15

Lys Leu Arg Lys Asn Cys Glu Leu Leu Ala Ser Ile Gly Glu Lys Ser
            20                  25                  30

Gly Ala Lys Val Leu Leu Ala Leu Lys Gly Phe Ala Phe Ser Gly Ala
        35                  40                  45

Met Lys Ile Val Gly Glu Tyr Leu Lys Gly Cys Thr Cys Ser Gly Leu
    50                  55                  60

Trp Glu Ala Lys Phe Ala Lys Glu Tyr Met Asp Lys Glu Ile His Thr
65                  70                  75                  80

Tyr Ser Pro Ala Phe Lys Glu Asp Glu Ile Gly Glu Ile Ala Ser Leu
                85                  90                  95

Ser His His Ile Val Phe Asn Ser Leu Ala Gln Phe His Lys Phe Gln
            100                 105                 110

Ser Lys Thr Gln Lys Asn Ser Leu Gly Leu Arg Cys Asn Val Glu Phe
        115                 120                 125

Ser Leu Ala Pro Lys Glu Leu Tyr Asn Pro Cys Gly Arg Tyr Ser Arg
    130                 135                 140

Leu Gly Ile Arg Ala Lys Asp Phe Glu Asn Val Asp Leu Ser Thr Ile
145                 150                 155                 160

Glu Gly Leu His Phe His Ala Leu Cys Glu Glu Ser Ala Asp Ala Leu
                165                 170                 175

Glu Ala Val Leu Lys Val Phe Glu Glu Lys Phe Gly Lys Trp Ile Gly
            180                 185                 190

Gln Met Lys Trp Val Asn Phe Gly Gly His His Ile Thr Lys Lys
        195                 200                 205

Gly Tyr Asp Val Glu Lys Leu Ile Ala Leu Cys Lys Asn Phe Ser Asp
    210                 215                 220

Lys Tyr Gly Val Gln Val Tyr Leu Glu Pro Gly Glu Ala Val Gly Trp
225                 230                 235                 240

Gln Thr Gly Asn Leu Val Ala Ser Val Val Asp Ile Ile Glu Asn Glu
                245                 250                 255

Lys Gln Ile Ala Ile Leu Asp Thr Ser Ser Glu Ala His Met Pro Asp
            260                 265                 270

Thr Ile Ile Met Pro Tyr Thr Ser Glu Val Leu Asn Ala Arg Ile Leu
        275                 280                 285

Ala Thr Arg Glu Asn Glu Lys Ile Ser Asp Leu Lys Glu Asn Glu Phe
    290                 295                 300

Ala Tyr Leu Leu Thr Gly Asn Thr Cys Leu Ala Gly Asp Val Met Gly
305                 310                 315                 320

Glu Tyr Ala Phe Asp Lys Lys Leu Lys Ile Gly Asp Lys Ile Ile Phe
                325                 330                 335

Leu Asp Gln Ile His Tyr Thr Ile Val Lys Asn Thr Thr Phe Asn Gly
            340                 345                 350

Ile Arg Leu Pro Asn Leu Met Leu Leu Asp His Lys Asn Glu Leu Gln
        355                 360                 365

Met Ile Arg Glu Phe Ser Tyr Lys Asp Tyr Ser Leu Arg Asn
    370                 375                 380
```

<210> SEQ ID NO 151
<211> LENGTH: 414
<212> TYPE: PRT
<213> ORGANISM: Vibrio cholerae

<400> SEQUENCE: 151

Met Ser Ile Leu Gln Ile Gly Ala Gly Gly Val Gly Trp Val Val Ala
1               5                   10                  15

His Lys Ala Ala Gln Asn Asn Asp Val Leu Gly Asp Ile Thr Ile Ala
            20                  25                  30

Ser Arg Ser Ile Ala Lys Cys Glu Lys Ile Ile Glu Ser Ile Lys Gly
        35                  40                  45

Lys Asn Asn Leu Lys Asp Ser Ser Lys Leu Glu Ala Arg Gln Val
    50                  55                  60

Asn Ala Asp Asp Ile Glu Ser Leu Val Lys Leu Ile Asn Glu Val Lys
65                  70                  75                  80

Pro Asp Leu Val Ile Asn Ala Gly Pro Pro Trp Val Asn Val Ala Ile
                85                  90                  95

Met Glu Ala Cys Tyr Gln Ala Lys Val Ser Tyr Leu Asp Thr Ser Val
            100                 105                 110

Ser Val Asp Leu Cys Ser Lys Gly Gln Gln Val Pro Glu Ala Tyr Asp
        115                 120                 125

Ala Gln Trp Ala Phe Arg Asp Lys Phe Lys Gln Ala Gly Ile Thr Ala
    130                 135                 140

Ile Leu Ser Ala Gly Phe Asp Pro Gly Val Val Ser Val Phe Ala Ala
145                 150                 155                 160

Tyr Ala Ala Lys Tyr Leu Phe Asp Glu Ile Asp Thr Ile Asp Val Leu
                165                 170                 175

Asp Ile Asn Ala Gly Asp His Gly Lys Lys Phe Ala Thr Asn Phe Asp
            180                 185                 190

Pro Glu Thr Asn Leu Leu Glu Ile Gln Gly Asp Ser Ile Tyr Trp Asp
        195                 200                 205

Ala Gly Glu Trp Lys Arg Val Pro Cys His Thr Arg Met Leu Glu Phe
    210                 215                 220

Asp Phe Pro Lys Cys Gly Lys Phe Lys Val Tyr Ser Met Ser His Asp
225                 230                 235                 240

Glu Leu Arg Ser Leu Lys Glu Phe Ile Pro Ala Lys Arg Ile Glu Phe
                245                 250                 255

Trp Met Gly Phe Gly Asp Arg Tyr Leu Asn Tyr Phe Asn Val Met Arg
            260                 265                 270

Asp Ile Gly Leu Leu Ser Pro Glu Pro Leu Thr Leu Gln Asp Gly Thr
        275                 280                 285

Val Val Lys Pro Leu Gln Val Leu Lys Ala Met Leu Pro Asp Pro Thr
    290                 295                 300

Ser Leu Ala Pro Gly Tyr Lys Gly Leu Thr Cys Ile Gly Thr Trp Val
305                 310                 315                 320

Gln Gly Lys Lys Asp Gly Lys Ala Arg Ser Val Phe Ile Tyr Asn His
                325                 330                 335

Ala Asp His Glu Val Ala Tyr His Asp Val Glu His Gln Ala Ile Ala
            340                 345                 350

Tyr Thr Thr Gly Val Pro Ala Ile Thr Ala Ala Leu Gln Phe Phe Arg
        355                 360                 365

Gly Glu Trp Ala Glu Pro Gly Val Phe Asn Met Glu Gln Leu Asn Pro

```
                    370             375             380
Asp Pro Phe Leu Glu Thr Met Pro Ser Ile Gly Leu Gly Trp Asp Val
385                 390             395                 400

Met Glu Leu Glu Pro Gly Gln Pro Asp Ile Gln Val Val Lys
                405             410
```

<210> SEQ ID NO 152
<211> LENGTH: 387
<212> TYPE: PRT
<213> ORGANISM: Vibrio cholerae

<400> SEQUENCE: 152

```
Met Glu Thr Leu Gln Asp Ile Gly Thr Asn Met Leu Lys Asp Glu Leu
1               5                   10                  15

Arg Thr Pro Tyr Phe Met Ile Asp Glu Ala Lys Leu Ile Ala Asn Leu
                20                  25                  30

Glu Ile Ala Lys His Leu Lys Glu Ile Ser Gly Val Lys Met Val Leu
                35                  40                  45

Ala Leu Lys Cys Phe Ser Thr Trp Gly Val Phe Asp Ile Ile Lys Pro
            50                  55                  60

Tyr Leu Asp Gly Thr Thr Ser Ser Gly Pro Phe Glu Val Lys Leu Gly
65                  70                  75                  80

Tyr Glu Thr Phe Gly Gly Glu Thr His Ala Tyr Ser Val Gly Tyr Ser
                85                  90                  95

Glu Glu Asp Val Lys Glu Val Ile Asp Ile Cys Asp Lys Met Ile Phe
                100                 105                 110

Asn Ser Gln Ser Gln Leu Ala Ala Tyr Arg His Leu Val Glu Gly Lys
                115                 120                 125

Ala Ser Leu Gly Leu Arg Ile Asn Pro Gly Val Ser Tyr Ala Gly Gln
            130                 135                 140

Asp Leu Ala Asn Pro Ala Arg Gln Phe Ser Arg Leu Gly Val Gln Ala
145                 150                 155                 160

Asp His Ile Asp Glu Ser Val Phe Asp Ser Ile Asn Gly Val Met Phe
                165                 170                 175

His Met Asn Cys Glu Asn Lys Asp Val Asp Ala Phe Ile Gly Leu Leu
                180                 185                 190

Asp Ala Ile Ser Glu Arg Phe Gly Arg Tyr Leu Asp Lys Leu Asp Trp
            195                 200                 205

Val Ser Leu Gly Gly Gly Val Phe Phe Thr Trp Pro Gly Tyr Asp Val
210                 215                 220

Glu Lys Leu Gly Ala Ala Leu Lys Ala Phe Ala Glu Arg His Ala Val
225                 230                 235                 240

Gln Leu Tyr Leu Glu Pro Gly Glu Ala Ile Ile Thr Lys Thr Thr Asp
                245                 250                 255

Leu Val Val Thr Val Val Asp Ile Val Glu Asn Gly Met Lys Thr Ala
                260                 265                 270

Ile Val Asp Ser Ala Thr Glu Ala His Arg Leu Asp Thr Leu Ile Tyr
            275                 280                 285

Lys Glu Pro Ala Ser Val Leu Glu Ala Ser Asp Lys Gly Gln His Glu
            290                 295                 300

Tyr Val Ile Gly Ser Cys Ser Cys Leu Ala Gly Asp Gln Phe Cys Val
305                 310                 315                 320

Ala Lys Phe Asp Glu Pro Leu Gln Val Gly Gln Lys Leu His Ile Leu
                325                 330                 335
```

-continued

```
Asp Ser Ala Gly Tyr Thr Met Val Lys Leu Asn Trp Phe Asn Gly Leu
            340                 345                 350

Lys Met Pro Ser Val Tyr Cys Glu Arg Lys Asn Gly Gln Ile Gln Lys
            355                 360                 365

Ile Asn Gln Phe Gly Tyr Glu Asp Phe Lys Arg Thr Leu Ser Leu Trp
        370                 375                 380

Ser Ile Glu
385
```

MICROBIAL CELLS FOR SPERMIDINE PRODUCTION

TECHNICAL FIELD

The present invention relates generally to the development of genetically engineered microorganisms. More specifically the invention relates to microbial cells able to produce the pro-longevity compound spermidine in an economic fashion.

BACKGROUND

Spermidine is a low molecular weight aliphatic nitrogen compound that is found ubiquitously in microorganisms, plants, and animals. Intracellularly, it is derived from L-ornithine, an intermediate in L-arginine biosynthesis. Recent years have shown this compound to promote longevity in a variety of organisms ranging from microbes to mammals. In addition, spermidine uptake has also been shown to alleviate or protect against a variety of age-associated conditions including cancer, multiple sclerosis, osteoporosis, cardiovascular disease, memory impairment, skin ageing and hair loss. Therefore, growing interest exists obtaining an economic, reliable and sustainable supply of this compound.

Several inventions have described the chemical synthesis of spermidine. However, these methods either suffer from issues of expensive substrates, poor enantiopure purity or are environmental unfriendly.

Spermidine can also be derived from biological sources, such as wheat germ. However, even the highest spermidine-producing natural sources only produce spermidine at levels of approximately 200 μg/g, making it very expensive to obtain a pure product.

Production of spermidine from microbial sources could overcome these issues. However, microbial sources naturally produce only low levels of spermidine and therefore additional engineering is required to obtain economically feasible production levels. To date, only a few studies have described engineering of microbial cells to over-produce spermidine.

Qin et al [1] have described engineering of the ornithine metabolism in a yeast cell in combination with over-expression of spermidine-producing genes to over-produce spermidine, resulting in 35 mg/L of spermidine.

Kim et al [2] and Kim et al [3] reported engineering yeast cells for enhanced production of intracellular spermidine. In these cells OAZ1, encoding ornithine decarboxylase (ODC) antizyme, a protein involved in feedback inhibition of the spermidine biosynthesis pathway, and TPO1 coding for the polyamine transport protein were disrupted to increase intracellular spermidine levels through alleviation of feedback inhibition on ODC and prevention of spermidine excretion, respectively. Combined with spermidine synthesis genes, this led to increase in the cellular spermidine contents, with content of 1.1 mg spermidine per gram dry cell weight (DCW).

Kim et al [4] have reported overexpression of spermidine synthesis genes in a yeast, combined with disruption of OAZ1, expression of the transporter TPO1 and fermentation optimization, resulting in 63.6 mg/L of spermidine in batch, and up to 224 mg/L in fed-batch (2.2 mg/g sugars).

There is, however, still room for improvements in the field of spermidine production in microbial cells.

SUMMARY

A primary object of the present invention is to provide an improved microbial cell for spermidine production. Such cell can be used for fermentation-based production of spermidine. The microbial cell and the method disclosed herein combine the over-expression of spermidine pathway genes with modifications in the pathway related to synthesis and regeneration of cofactors or co-substrates involved in spermidine production, in particular S-adenosylmethionine (SAM). SAM can be subsequently converted to S-adenosylmethioninamine (dSAM) and used in spermidine synthesis.

An aspect of the embodiments relates to a microbial cell capable of producing spermidine. The microbial cell is genetically modified for overexpression of S-adenosylmethionine decarboxylase and/or spermidine synthase. The microbial cell is also genetically modified for enhanced SAM biosynthesis.

Another aspect of the embodiments relates to a method for producing spermidine. The method comprises culturing a microbial cell according to the embodiments in a culture medium and in culture conditions suitable for production of spermidine from the microbial cell. The method also comprises collecting spermidine from the culture medium and/or the microbial cell.

A further aspect of the embodiments relates to use of a microbial cell according to the embodiments as a food additive.

Previous efforts to increase spermidine production in microbial cells have combined overexpression of genes that convert putrescine to spermidine with overexpression of SAM decarboxylase. While it was shown that increased levels of dSAM are beneficial for spermidine production, no studies have reported that SAM itself is a limiting factor for spermidine production. We have surprisingly found that SAM itself is indeed limiting for spermidine production. This was surprising because unlike dSAM, which is mainly involved in production of spermidine and spermine, SAM is a common co-substrate in the cell. By increasing the precursor pools of this co-substrate, and/or increasing recycling of SAM, we could significantly increase spermidine production. By combining this strategy with the strategies previously reported, we were able to produce a record >1 g/L and >30 mg/g DCW of spermidine, representing a significant improvement over previous processes.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
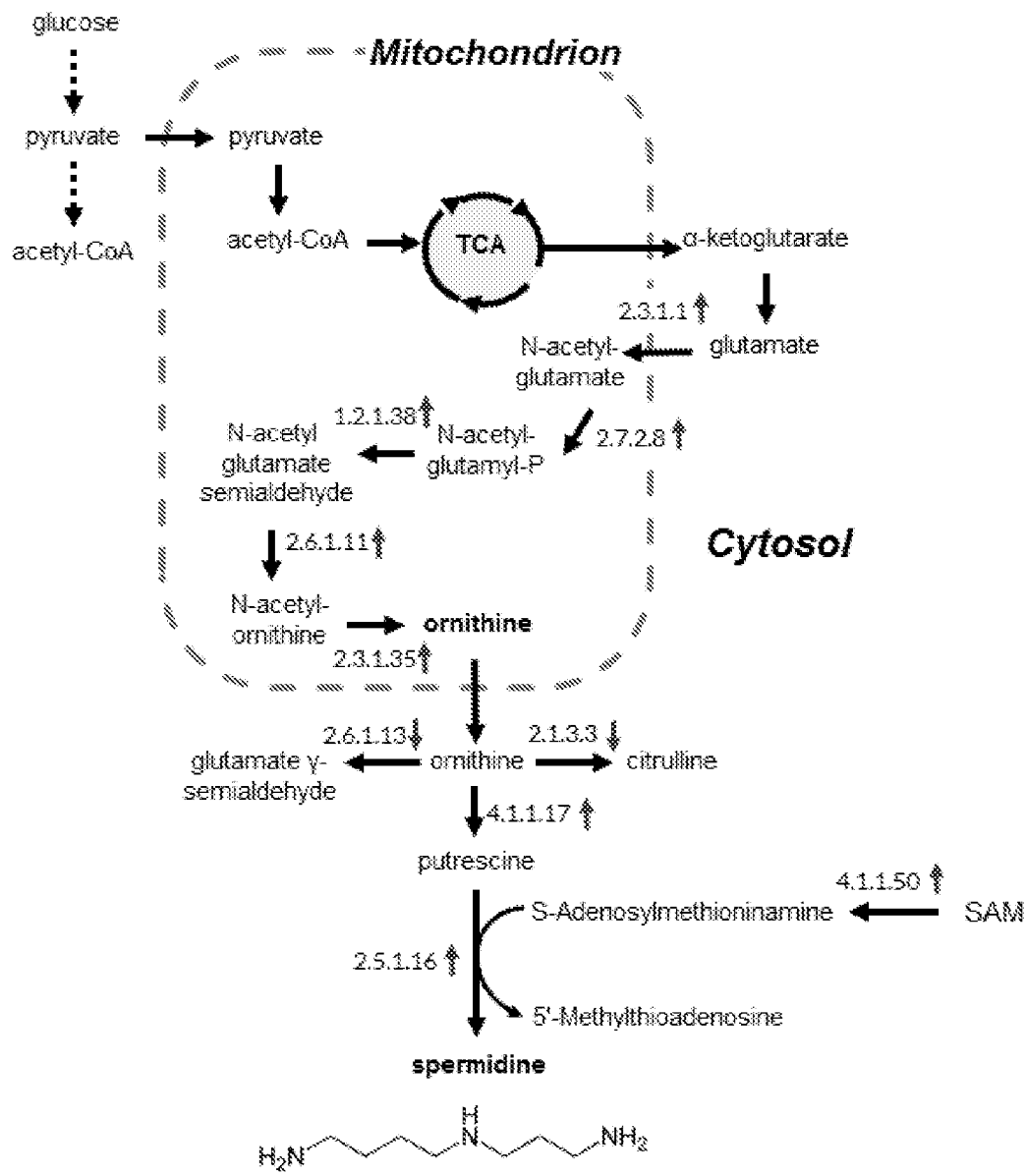
FIG. 1: Overview of the native pathway leading to production of spermidine from glucose in eukaryotic microbial cells, such as Saccharomyces cerevisiae. Similar reactions also occur in prokaryotic microbes, albeit without the compartmentalization. EC numbers are shown for important reactions that can be targeted to increase spermidine production via the ornithine route. Upward grey arrows next to EC numbers represent reactions that are increased via genetic modification, while downward arrows represent reactions that are decreased.

The present invention now will be described hereinafter with reference to the accompanying drawings and examples, in which embodiments of the invention are shown. This description is not intended to be a detailed catalogue of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. Thus, the invention contemplates that in some embodiments of the invention, any feature or combination of features set forth herein can be excluded or omitted. In addition, numerous variations and additions to the various embodiments suggested herein will be apparent to those skilled in the art in light of the instant disclosure, which do not depart from the instant invention. Hence, the following descriptions are intended to illustrate some particular embodiments of the invention, and not to exhaustively specify all permutations, combinations and variations thereof.

Unless otherwise defined herein, scientific and technical terms used herein will have the meanings that are commonly understood by those of ordinary skill in the art.

Generally, nomenclatures used in connection with techniques of biochemistry, enzymology, molecular and cellular biology, microbiology, genetics and protein and nucleic acid chemistry and hybridization, described herein, are those well-known and commonly used in the art.

Conventional methods and techniques mentioned herein are explained in more detail, for example, in Molecular Cloning, a laboratory manual [second edition] Sambrook et al. Cold Spring Harbor Laboratory, 1989, for example in Sections 1.21 "Extraction And Purification Of Plasmid DNA", 1.53 "Strategies For Cloning In Plasmid Vectors", 1.85 "Identification Of Bacterial Colonies That Contain Recombinant Plasmids", 6 "Gel Electrophoresis Of DNA", 14 "In vitro Amplification Of DNA By The Polymerase Chain Reaction", and 17 "Expression Of Cloned Genes In *Escherichia coli*" thereof.

Enzyme Commission (EC) numbers (also called "classes" herein), referred to throughout this specification, are according to the Nomenclature Committee of the International Union of Biochemistry and Molecular Biology (NC-IUBMB) in its resource "Enzyme Nomenclature" (1992, including Supplements 6-17) available, for example, as "Enzyme nomenclature 1992: recommendations of the Nomenclature Committee of the International Union of Biochemistry and Molecular Biology on the nomenclature and classification of enzymes", Webb, E. C. (1992), San Diego: Published for the International Union of Biochemistry and Molecular Biology by Academic Press (ISBN 0-12-227164-5). This is a numerical classification scheme based on the chemical reactions catalyzed by each enzyme class.

The terminology used in the description of the invention herein is for the purpose of describing particular embodiments only and is not intended to be limiting of the invention.

All publications, patent applications, patents and other references cited herein are incorporated by reference in their entireties for the teachings relevant to the sentence and/or paragraph in which the reference is presented.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a composition comprises components A, B and C, it is specifically intended that any of A, B or C, or a combination thereof, can be omitted and disclaimed singularly or in any combination.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Throughout the description and claims of this specification, the words "comprise" and "contain" and variations of the words, for example "comprising" and "comprises", mean "including but not limited to" and do not exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

As used herein, the transitional phrase "consisting" essentially of means that the scope of a claim is to be interpreted to encompass the specified materials or steps recited in the claim and those that do not materially affect the basic and novel characteristic(s) of the claimed invention. Thus, the term "consisting" essentially of when used in a claim of this invention is not intended to be interpreted to be equivalent to "comprising."

To facilitate understanding of the invention, a number of terms are defined below.

As used herein, the term "polyamine" refers to an organic compound having two or more primary amino groups. Examples for polyamines include putrescine, cadavarine, spermidine and spermine.

Also as used herein, the terms "nucleotide sequence" "nucleic acid," "nucleic acid molecule," "oligonucleotide" and "polynucleotide" refer to RNA or DNA, including cDNA, a DNA fragment or portion, genomic DNA, synthetic DNA, plasmid DNA, mRNA, and antisense RNA, any of which can be single stranded or double stranded, linear or branched, or a hybrid thereof. Nucleic acid molecules and/or nucleotide sequences provided herein are presented herein in the 5' to 3' direction, from left to right and are represented using the standard code for representing the nucleotide characters as set forth in the U.S. sequence rules, 37 CFR §§ 1.821-1.825 and the World Intellectual Property Organization (WIPO) Standard ST.25. When dsRNA is produced synthetically, less common bases, such as inosine, 5-methylcytosine, 6-methyladenine, hypoxanthine and others can also be used for antisense, dsRNA, and ribozyme pairing. For example, polynucleotides that contain C-5 propyne analogues of uridine and cytidine have been shown to bind RNA with high affinity and to be potent antisense inhibitors of gene expression. Other modifications, such as modification to the phosphodiester backbone, or the 2'-hydroxy in the ribose sugar group of the RNA can also be made.

As used herein the term "recombinant" when used means that a particular nucleic acid (DNA or RNA) is the product of various combinations of cloning, restriction, and/or ligation steps resulting in a construct having a structural coding or non-coding sequence distinguishable from endogenous nucleic acids found in natural systems.

As used herein, the term "gene" refers to a nucleic acid molecule capable of being used to produce mRNA, antisense RNA, miRNA, anti-microRNA antisense oligodeoxyribonucleotide (AMO) and the like. Genes may or may not be capable of being used to produce a functional protein or gene product. Genes can include both coding and non-coding regions, e.g. introns, regulatory elements, promoters, enhancers, termination sequences and/or 5' and 3' untranslated regions. A gene may be "isolated" by which is meant a nucleic acid that is substantially or essentially free from components normally found in association with the nucleic acid in its natural state. Such components include other cellular material, culture medium from recombinant production, and/or various chemicals used in chemically synthesizing the nucleic acid.

A "disrupted gene" as defined herein involves any mutation or modification to a gene resulting in a partial or fully non-functional gene and gene product. Such a mutation or modification includes, but is not limited to, a missense mutation, a nonsense mutation, a deletion, a substitution, an insertion, addition of a targeting sequence and the like. Furthermore, a disruption of a gene can be achieved also, or alternatively, by mutation or modification of control elements controlling the transcription of the gene, such as mutation or modification in a promoter, terminator and/or enhancement elements. In such a case, such a mutation or modification results in partially or fully loss of transcription of the gene, i.e. a lower or reduced transcription as compared to native and non-modified control elements. As a result a reduced, if any, amount of the gene product will be available following transcription and translation. Furthermore, disruption of a gene could also entail adding or removing a localization signal from the gene, resulting in decreased presence of the gene product in its native subcellular compartment.

The objective of gene disruption is to reduce the available amount of the gene product, including fully preventing any production of the gene product, or to express a gene product that lacks or having lower enzymatic activity as compared to the native or wild type gene product.

As used herein the term "deletion" or "knock-out" refers to a gene that is inoperative or knocked out.

The term "attenuated activity" when related to an enzyme refers to a decrease in the activity of the enzyme in its native compartment compared to a control or wildtype state. Manipulations that result in attenuated activity of an enzyme include, but are not limited to, a missense mutation, a nonsense mutation, a deletion, a substitution, an insertion, addition of a targeting sequence, removal of a targeting sequence, or the like. Furthermore, attenuation of enzyme activity can be achieved also, or alternatively, by mutation or modification of control elements controlling the transcription of the gene encoding the enzyme, such as mutation or modification in a promoter, terminator and/or enhancement elements. A cell that contains modifications that result in attenuated enzyme activity will have a lower activity of the enzyme compared to a cell that does not contain such modifications. Attenuated activity of an enzyme may be achieved by encoding a nonfunctional gene product, e.g., a polypeptide having essentially no activity, e.g., less than about 10% or even 5% as compared to the activity of the wild type polypeptide.

A codon optimized version of a gene refers to an exogenous gene introduced into a cell and where the codons of the gene have been optimized with regard to the particular cell. Generally, not all tRNAs are expressed equally or at the same level across species. Codon optimization of a gene sequence thereby involves changing codons to match the most prevalent tRNAs, i.e. to change a codon recognized by a low prevalent tRNA with a synonymous codon recognized by a tRNA that is comparatively more prevalent in the given cell. This way the mRNA from the codon optimized gene will be more efficiently translated. The codon and the synonymous codon preferably encode the same amino acid.

As used herein, the term "allele" refers to a variant form of a given gene. This can include a mutated form of a gene where one or more of the amino acids encoded by the gene have been removed or substituted by a different amino acid.

As used herein, the terms "peptide", "polypeptide", and "protein" are used interchangeably to indicate to a polymer of amino acid residues. The terms "peptide", "polypeptide" and "protein" also includes modifications including, but not limited to, lipid attachment, glycosylation, glycosylation, sulfation, hydroxylation, γ-carboxylation of L-glutamic acid residues and ADP-ribosylation.

As used herein, the term "enzyme" is defined as a protein which catalyses a chemical or a biochemical reaction in a cell. Usually, according to the present invention, the nucleotide sequence encoding an enzyme is operably linked to a nucleotide sequence (promoter) that causes sufficient expression of the corresponding gene in the cell to confer to the cell the ability to produce spermidine.

As used herein, the term "open reading frame (ORF)" refers to a region of RNA or DNA encoding polypeptide, a peptide, or protein.

As used herein, the term "genome" encompasses both the plasmids and chromosomes in a host cell. For instance, encoding nucleic acids of the present disclosure which are introduced into host cells can be portion of the genome whether they are chromosomally integrated or plasmids-localized.

As used herein, the term "promoter" refers to a nucleic acid sequence which has functions to control the transcription of one or more genes, which is located upstream with respect to the direction of transcription of the transcription initiation site of the gene. Suitable promoters in this context include both constitutive and inducible natural promoters as well as engineered promoters, which are well known to the person skilled in the art.

Suitable promoters for use in eukaryotic host cells, such as yeast cells, may be the promoters of PDC, GPD1, TEF1, PGK1 and TDH. Other suitable promoters include the promoters of GAL1, GAL2, GAL10, GAL 7, CUP1, HIS3, CYC1, ADH1, PGL, GAPDH, ADC1, URA3, TRP1, LEU2, TP1, AOX1 and ENO1.

Suitable promoters for the use in prokaryotic host cells include a bacteriophage T7 RNA polymerase promoter, a trp promoter, a lac operon promoter, the trc promoter, the lambda promoter and the like. Non limiting example of suitable strong promoter for the use in prokaryotic cells include lacUV5 promoter, T5, T7, Trc, Tac and the like. When *Bacillus subtilis* is chosen as the host cell, exemplary promoters include Pr promoter, Spol promoter, Tac promoter, and Lad promoter As used herein, the term "terminator" refers to a "transcription termination signal" if not otherwise noted. Terminators are sequences that hinder or stop transcription of a polymerase. As used herein, "recombinant eukaryotic cells" according to the present disclose is defined as cells which contain additional copies or copy of an endogenous nucleic acid sequence or are transformed or genetically modified with polypeptide or a nucleotide sequence that does not naturally occur in the eukaryotic cells. The wildtype eukaryotic cells are defined as the parental cells of the recombinant eukaryotic cells, as used herein.

As used herein, "recombinant prokaryotic cells" according to the present disclose is defined as cells which contain additional copies or copy of an endogenous nucleic acid sequence or are transformed or genetically modified with polypeptide or a nucleotide sequence that does not naturally occur in the prokaryotic cells. The wildtype prokaryotic cells are defined as the parental cells of the recombinant prokaryotic cells, as used herein.

As used herein, the terms "increase," "increases," "increased," "increasing," "enhance," "enhanced," "enhancing," and "enhancement" (and grammatical variations thereof) indicate an elevation of at least about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 150%, 200%, 300%, 400%, 500% or more, or any range therein, as compared to a control.

As used herein, the terms "reduce," "reduces," "reduced," "reduction," "diminish," "suppress," and "decrease" and similar terms mean a decrease of at least about, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 150%, 200%, 300%, 400%, 500% or more, or any range therein, as compared to a control.

A reduced expression of a gene as used herein involves a genetic modification that reduces the transcription of the gene, reduces the translation of the mRNA transcribed from the gene and/or reduces post-translational processing of the protein translated from the mRNA. Such genetic modification includes insertion(s), deletion(s), replacement s) or mutation(s) applied to the control sequence, such as a promoter and enhancer, of the gene. For instance, the promoter of the gene could be replaced by a less active or inducible promoter to thereby result in a reduced transcription of the gene. Also a knock-out of the promoter would result in reduced, typically zero, expression of the gene.

As used herein, the term "portion" or "fragment" of a nucleotide sequence of the invention will be understood to mean a nucleotide sequence of reduced length relative to a reference nucleic acid or nucleotide sequence and comprising, consisting essentially of and/or consisting of a nucleotide sequence of contiguous nucleotides identical or almost identical, e.g. 80%, 81%, 82%, 83%, 84%, 85%, 86%, 87%, 88%, 89%, 90%, 91%, 92%, 93%, 94%, 95%, 96%, 98%, 99% identical, to the reference nucleic acid or nucleotide sequence. Such a nucleic acid fragment or portion according to the invention may be, where appropriate, included in a larger polynucleotide of which it is a constituent.

Different nucleic acids or proteins having homology are referred to herein as "homologues." The term homologue includes homologous sequences from the same and other species and orthologous sequences from the same and other species. "Homology" refers to the level of similarity between two or more nucleic acid and/or amino acid sequences in terms of percent of positional identity, i.e. sequence similarity or identity. Homology also refers to the concept of similar functional properties among different nucleic acids or proteins. Thus, the compositions and methods of the invention further comprise homologues to the nucleotide sequences and polypeptide sequences of this invention. "Orthologous," as used herein, refers to homologous nucleotide sequences and/or amino acid sequences in different species that arose from a common ancestral gene during speciation. A homologue of a nucleotide sequence of this invention has a substantial sequence identity, e.g. at least about 70%, 75%, 80%, 81%, 82%, 83%, 84%, 85%, 86%, 87%, 88%, 89%, 90%, 91%, 92%, 93%, 94%, 95%, 96%, 97%, 98%, 99%, and/or 100%, to said nucleotide sequence.

The term "overexpress," "overexpresses" or "overexpression" as used herein refers to higher levels of activity of a gene, e.g. transcription of the gene; higher levels of translation of mRNA into protein; and/or higher levels of production of a gene product, e.g. polypeptide, than would be in the cell in its native or control, e.g. not transformed with the particular heterologous or recombinant polypeptides being overexpressed, state. A typical example of an overexpressed gene is a gene under transcription control of another promoter as compared to the native promoter of the gene. Also, or alternatively, other changes in the control elements of a gene, such as enhancers, could be used to overexpress the particular gene. Furthermore, modifications that affect, i.e. increase, the translation of the mRNA transcribed from the gene could, alternatively or in addition, be used to achieve an overexpressed gene as used herein. These terms can also refer to an increase in the number of copies of a gene and/or an increase in the amount of mRNA and/or gene product in the cell. Overexpression can result in levels that are 25%, 50%, 100%, 200%, 500%, 1000%, 2000% or higher in the cell, or any range therein, as compared to control levels.

As used herein, the terms "exogenous" or "heterologous" when used with respect to a nucleic acid (RNA or DNA), protein or gene refer to a nucleic acid, protein or gene which occurs non-naturally as part of the cell, organism, genome, RNA or DNA sequence into which it is introduced, including non-naturally occurring multiple copies of a naturally occurring nucleotide sequence. Such an exogenous gene could be a gene from another species or strain, a modified, mutated or evolved version of a gene naturally occurring in the host cell or a chimeric version of a gene naturally occurring in the host cell or fusion genes. In these former cases, the modification, mutation or evolution causes a change in the nucleotide sequence of the gene to thereby obtain a modified, mutated or evolved gene with another nucleotide sequence as compared to the gene naturally occurring in the host cell. Evolved gene refers to genes encoding evolved genes and obtained by genetic modification, such as mutation or exposure to an evolutionary pressure, to derive a new gene with a different nucleotide sequence as compared to the wild type or native gene. A chimeric gene is formed through the combination of portions of one or more coding sequences to produce a new gene. These modifications are distinct from a fusion gene, which merges whole gene sequences into a single reading frame and often retain their original functions.

An "endogenous", "native" or "wild type" nucleic acid, nucleotide sequence, polypeptide or amino acid sequence refers to a naturally occurring or endogenous nucleic acid, nucleotide sequence, polypeptide or amino acid sequence. Thus, for example, a "wild type mRNA" is an mRNA that is naturally occurring in or endogenous to the organism. A "homologous" nucleic acid sequence is a nucleotide sequence naturally associated with a host cell into which it is introduced.

As used herein, the term "modified", when it is used with respect to an organism, refers to a host organism that has been modified to increase production of spermidine, as compared with an otherwise identical host organism that has not been so modified. In principle, such "modification" in accordance with the present disclosure may comprise any physiological, genetic, chemical, or other modification that appropriately alters production of spermidine in a host organism as compared with such production in an otherwise identical organism which is not subject to the said modification. In most of the embodiments, however, the modification will comprise a genetic modification. In certain embodiments, as described herein, the modification comprises introducing genes into a host cell. In some embodiments, a modification comprises at least one physiological, chemical, genetic, or other modification; in other embodiments, a modification comprises more than one chemical, genetic, physiological, or other modification. In certain aspects where more than one modification is made use of, such modifications can include any combinations of physiological, genetic, chemical, or other modification (e.g., one or more genetic, chemical and/or physiological modification(s)). Genetic modifications which boost the activity of a polypeptide include, but are not limited to: introducing one or more copies of a gene encoding the polypeptide (which may distinguish from any gene already present in the host cell encoding a polypeptide having the same activity); altering a gene present in the cell to increase transcription or translation of the gene (e.g., altering, adding additional sequence to, replacement of one or more nucleotides, deleting sequence from, or swapping for example, regulatory, a promoter or other sequence); and altering the sequence (e.g. non-coding or coding) of a gene encoding the polypeptide to boost activity (e.g., by increasing enzyme activity, decrease feedback inhibition, targeting a specific subcellular location, boost mRNA stability, boost protein stability). Genetic modifications that reduce activity of a polypeptide include, but are not limited to: deleting a portion or all of a gene encoding the polypeptide; inserting a nucleic acid sequence which disrupts a gene encoding the polypeptide; changing a gene present in the cell to reduce transcription or translation of the gene or stability of the mRNA or polypeptide encoded by the gene (for example, by adding additional sequence to, altering, deleting sequence from, replacement of one or more nucleotides, or swapping for example, replacement of one or more nucleotides, a promoter, regulatory or other sequence).

The term "overproducing" is used herein in reference to the production of spermidine in a host cell and indicates that the host cell is producing more of spermidine by virtue of the introduction of nucleic acid sequences which encode different polypeptides involved in the host cell's metabolic pathways or as a result of other modifications as compared with the unmodified host cell or wild-type cell.

As used herein, the term "flux", "metabolic flux" or "carbon flux" refers to the rate of turnover of molecules through a given reaction or a set of reactions. Flux in a metabolic pathway is regulated by the enzymes involved in the pathway. Pathways or reactions characterized by a state of increased flux compared to a control have an increased rate of generation of products from given substrates. Pathways or reactions characterized by a state of decreased flux compared to a control have a decreased rate of generation of products from given substrates. Flux towards products of interest can be increased by removing or decreasing competitive reactions or by increasing the activities of enzymes involved in generation of said products.

As used herein the term "putrescine biosynthetic pathway", "putrescine biosynthesis pathway" or "putrescine pathway" refers to enzymatic reactions that drive flux towards synthesis of putrescine from a carbon source, such as glucose, as well as competitive reactions and inhibitive reactions that reduce putrescine formation. Enzymatic reactions that drive flux towards the synthesis of putrescine include, but are not limited to, reactions that convert pyruvate to acetyl-CoA, acetyl-CoA to α-ketoglutarate, α-ketoglutarate to ornithine and ornithine to putrescine, see FIG. 1. Competitive reactions that drain intermediates from this pathway include enzymatic reactions catalyzed by ornithine carbamoyltransferase [EC 2.1.3.3] and L-ornithine transaminase [EC 2.6.1.13]. Furthermore, inhibitive reactions include the production of ornithine decarboxylase antizyme (OAZ), which is an inhibitor of ornithine decarboxylase that otherwise catalyzes the decarboxylation of ornithine into putrescine. Increase in putrescine biosynthesis can be achieved by overexpression of any of the enzymatic steps that drive flux towards putrescine and/or downregulation of competitive reactions and inhibitive reactions.

As used herein the term "spermidine biosynthetic pathway", "spermidine biosynthesis pathway" or "spermidine pathway" refers to the combination of reactions involved in the putrescine biosynthetic pathway with enzymes that convert putrescine into spermidine. Non-limiting examples of enzymes involved in these reactions are spermidine synthase (SPDS) [EC 2.5.1.16], S-adenosylmethionine decarboxylase [EC 4.1.1.50], carboxy(nor)spermidine dehydrogenase (CASDH/CANSDH) [EC 1.5.1.43] and carboxy(nor)spermidine decarboxylase (CASDC/CANSDC) [EC 4.1.1.96]. This term does not encompass reactions involved in S-adenosyl methionine (SAM) formation.

Figure 2:
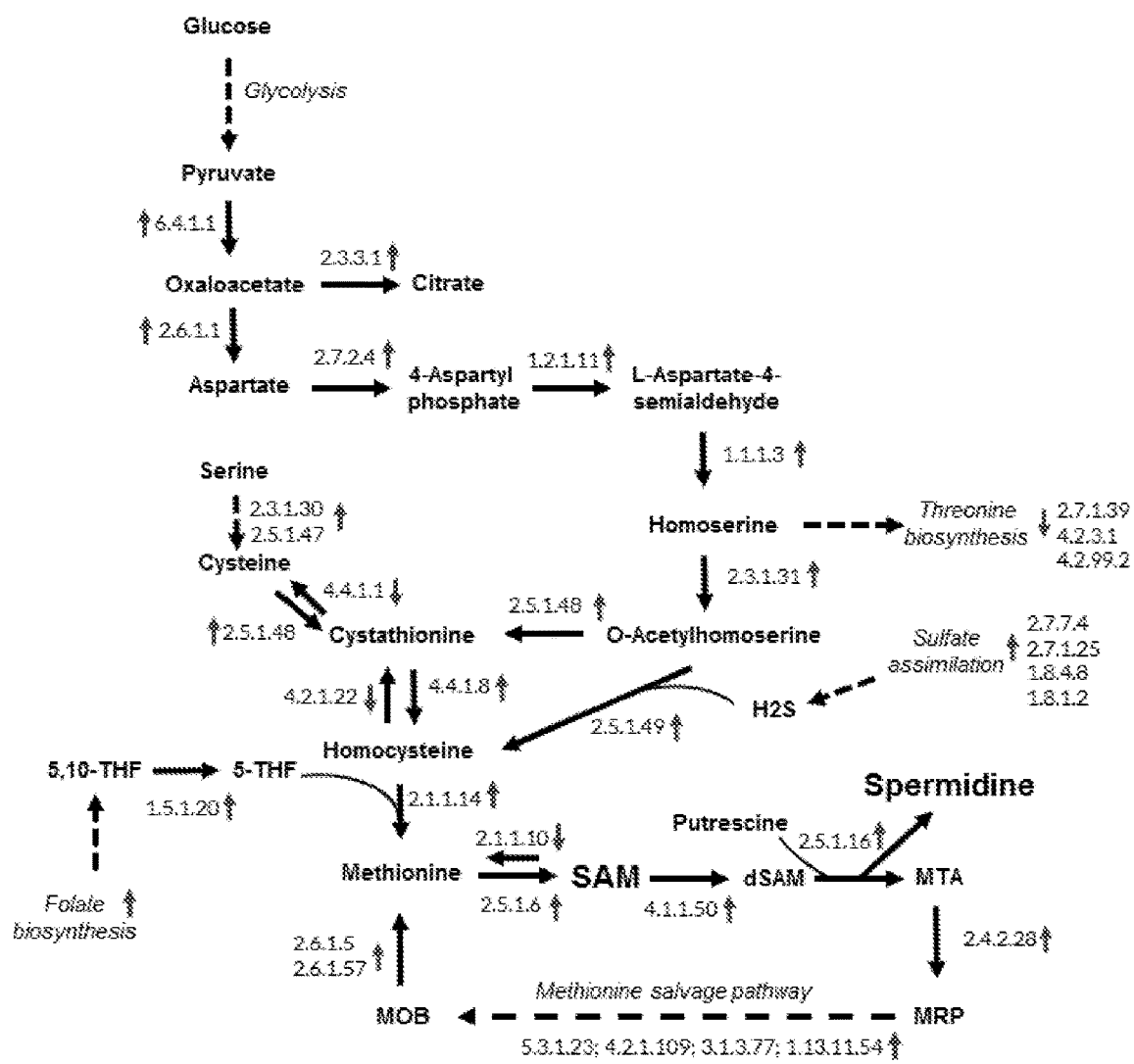
FIG. 2: Overview of reactions targeted in the present invention to increase spermidine production via the SAM route. EC numbers are shown for important reactions. Upward grey arrows next to EC numbers represent reactions that are increased via genetic modification, while downward arrows represent reactions that are decreased. Abbreviations: SAM: S-Adenosylmethionine, dSAM: S-Adenosylmethioninamine, MTA: 5'-Methylthioadenosine, MRP: S-Methyl- 5-thio-D-ribose 1-phosphate, MOB: 4-Methylthio-2-oxobutanoate, THF: methylenetetrahydrofolate, H2 S: Hydrogen sulfide.

As used herein the term "enzymes involved in the synthesis of S-adenosylmethionine (SAM)", "S-adenosylmethionine pathway" or "S-adenosylmethionine biosynthetic pathway" refers to enzymatic reactions required for the synthesis of S-adenosylmethionine from a carbon source, such as glucose. This includes but is not limited to reactions involved in the conversion of pyruvate to oxaloacetate, oxaloacetate to aspartate, aspartate to L-Aspartate-4-semialdehyde, L-Aspartate-4-semialdehyde to methionine and methionine to S-adenosylmethionine. In addition, this includes reactions involved in the methionine salvage pathway, reactions involved in folate synthesis and conversion to 5-methyltetrahydrofolate, and reactions involved in sulfate assimilation (FIG. 2). This term does not encompass reactions involved in decarboxylation of SAM to S-adenosylmethioninamine (dSAM).

As used herein the term "vector" is defined as a linear or circular DNA molecule comprising a polynucleotide encoding a polypeptide of the invention, and which is operably linked to additional nucleotides that ensure its expression.

"Introducing" in the context of a yeast cell means contacting a nucleic acid molecule with the cell in such a manner that the nucleic acid molecule gains access to the interior of the cell. Accordingly, polynucleotides and/or nucleic acid molecules can be introduced yeast cells in a single transformation event, in separate transformation events. Thus, the term "transformation" as used herein refers to the introduction of a heterologous nucleic acid into a cell. Transformation of a yeast cell can be stable or transient.

"Transient transformation" in the context of a polynucleotide means that a polynucleotide is introduced into the cell and does not integrate into the genome of the cell.

By "stably introducing" or "stably introduced" in the context of a polynucleotide introduced into a cell, it is intended that the introduced polynucleotide is stably incorporated into the genome of the cell, and thus the cell is stably transformed with the polynucleotide. "Stable transformation" or "stably transformed" as used herein means that a nucleic acid molecule is introduced into a cell and integrates into the genome of the cell. As such, the integrated nucleic acid molecule is capable of being inherited by the progeny thereof, more particularly, by the progeny of multiple successive generations. Stable transformation as used herein can also refer to a nucleic acid molecule that is maintained extrachromasomally, for example, as a minichromosome.

Transient transformation may be detected by, for example, an enzyme-linked immunosorbent assay (ELISA) or Western blot, which can detect the presence of a peptide or polypeptide encoded by one or more nucleic acid molecules introduced into an organism. Stable transformation of a cell can be detected by, for example, a Southern blot hybridization assay of genomic DNA of the cell with nucleic acid sequences which specifically hybridize with a nucleotide sequence of a nucleic acid molecule introduced into an organism (e.g., a yeast). Stable transformation of a cell can be detected by, for example, a Northern blot hybridization assay of RNA of the cell with nucleic acid sequences which specifically hybridize with a nucleotide sequence of a nucleic acid molecule introduced into a yeast or other organism. Stable transformation of a cell can also be detected by, e.g., a polymerase chain reaction (PCR) or other amplification reaction as are well known in the art, employing specific primer sequences that hybridize with target sequence(s) of a nucleic acid molecule, resulting in amplification of the target sequence(s), which can be detected according to standard methods Transformation can also be detected by direct sequencing and/or hybridization protocols well known in the art.

Embodiments of the present invention also encompass variants of the polypeptides as defined herein. As used herein, a "variant" means a polypeptide in which the amino acid sequence differs from the base sequence from which it is derived in that one or more amino acids within the sequence are substituted for other amino acids. For example, a variant of SEQ ID NO:1 may have an amino acid sequence at least about 50% identical to SEQ ID NO:1, for example, at least about 55%, 60%, 65%, 70%, 75%, 80%, 85%, 90%, 91%, 92%, 93%, 94%, 95%, 96%, 97%, 98%, 99% or about 100% identical. The variants and/or fragments are functional variants/fragments in that the variant sequence has similar or identical functional enzyme activity characteristics to the enzyme having the non-variant amino acid sequence specified herein (and this is the meaning of the term "functional variant" as used throughout this specification).

A "functional variant" or "functional fragment" of any of the presented amino acid sequences, therefore, is any amino acid sequence which remains within the same enzyme category (i.e., has the same EC number) as the non-variant sequences. Methods of determining whether an enzyme falls within a particular category are well known to the skilled person, who can determine the enzyme category without use of inventive skill. Suitable methods may, for example, be obtained from the International Union of Biochemistry and Molecular Biology.

Amino acid substitutions may be regarded as "conservative" where an amino acid is replaced with a different amino acid with broadly similar properties. Non-conservative substitutions are where amino acids are replaced with amino acids of a different type.

By "conservative substitution" is meant the substitution of an amino acid by another amino acid of the same class, in which the classes are defined as follows:

Class Amino Acid Examples

Nonpolar: A, V, L, I, P, M, F, W
Uncharged polar: G, S, T, C, Y, N, Q
Acidic: D, E
Basic: K, R, H.

As it is well known to those skilled in the art, altering the primary structure of a polypeptide by a conservative substitution may not significantly alter the activity of that polypeptide because the side-chain of the amino acid which is inserted into the sequence may be able to form similar bonds and contacts as the side chain of the amino acid which has been substituted out. This is so even when the substitution is in a region which is critical in determining the polypeptide's conformation.

In embodiments of the present invention, non-conservative substitutions are possible provided that these do not interrupt the enzyme activities of the polypeptides, as defined elsewhere herein. The substituted versions of the enzymes must retain characteristics such that they remain in the same enzyme class as the non-substituted enzyme, as determined using the NC-IUBMB nomenclature discussed above.

Broadly speaking, fewer non-conservative substitutions than conservative substitutions will be possible without altering the biological activity of the polypeptides. Determination of the effect of any substitution (and, indeed, of any amino acid deletion or insertion) is wholly within the routine capabilities of the skilled person, who can readily determine whether a variant polypeptide retains the enzyme activity according to aspects of the invention. For example, when determining whether a variant of the polypeptide falls within the scope of the invention (i.e., is a "functional variant or fragment" as defined above), the skilled person will determine whether the variant or fragment retains the substrate converting enzyme activity as defined with reference to the NC-IUBMB nomenclature mentioned elsewhere herein. All such variants are within the scope of the invention.

Using the standard genetic code, further nucleic acid sequences encoding the polypeptides may readily be conceived and manufactured by the skilled person, in addition to those disclosed herein. The nucleic acid sequence may be DNA or RNA, and where it is a DNA molecule, it may for example comprise a cDNA or genomic DNA. The nucleic acid may be contained within an expression vector, as described elsewhere herein.

Embodiments of the invention, therefore, encompass variant nucleic acid sequences encoding the polypeptides contemplated by embodiments of the invention. The term "variant" in relation to a nucleic acid sequence means any substitution of, variation of, modification of, replacement of, deletion of, or addition of one or more nucleotide(s) from or to a polynucleotide sequence, providing the resultant polypeptide sequence encoded by the polynucleotide exhibits at least the same or similar enzymatic properties as the polypeptide encoded by the basic sequence. The term includes allelic variants and also includes a polynucleotide (a "probe sequence") which substantially hybridizes to the polynucleotide sequence of embodiments of the present invention. Such hybridization may occur at or between low and high stringency conditions. In general terms, low stringency conditions can be defined as hybridization in which the washing step takes place in a 0.330-0.825 M NaCl buffer solution at a temperature of about 40-48° C. below the calculated or actual melting temperature (Tm) of the probe sequence (for example, about ambient laboratory temperature to about 55° C.), while high stringency conditions involve a wash in a 0.0165-0.0330 M NaCl buffer solution at a temperature of about 5-10° C. below the calculated or actual Tm of the probe sequence (for example, about 65° C.). The buffer solution may, for example, be SSC buffer (0.15M NaCl and 0.015M tri-sodium citrate), with the low stringency wash taking place in 3×SSC buffer and the high stringency wash taking place in 0.1×SSC buffer. Steps involved in hybridization of nucleic acid sequences have been described for example in Molecular Cloning, a laboratory manual [second edition] Sambrook et al. Cold Spring Harbor Laboratory, 1989, for example in Section 11 "Synthetic Oligonucleotide Probes" thereof (herein incorporated by reference)

Preferably, nucleic acid sequence variants have about 55% or more of the nucleotides in common with the nucleic acid sequence of embodiments of the present invention, more preferably at least 60%, 65%, 70%, 80%, 85%, or even 90%, 95%, 98% or 99% or greater sequence identity.

Variant nucleic acids of the invention may be codon-optimized for expression in a particular host cell.

As used herein, "sequence identity" refers to sequence similarity between two nucleotide sequences or two peptide or protein sequences. The similarity is determined by sequence alignment to determine the structural and/or functional relationships between the sequences.

Sequence identity between amino acid sequences can be determined by comparing an alignment of the sequences using the Needleman-Wunsch Global Sequence Alignment Tool available from the National Center for Biotechnology Information (NCBI), Bethesda, Md., USA, for example via http://blast.ncbi.nlm.nih.gov/Blast.cgi, using default parameter settings (for protein alignment, Gap costs Existence: 11 Extension: 1). Sequence comparisons and percentage identities mentioned in this specification have been determined using this software. When comparing the level of sequence identity to, for example, SEQ ID NO:1, this, preferably should be done relative to the whole length of SEQ ID NO:1 (i.e., a global alignment method is used), to avoid short regions of high identity overlap resulting in a high overall assessment of identity. For example, a short polypeptide fragment having, for example, five amino acids might have a 100% identical sequence to a five amino acid region within the whole of SEQ ID NO:1, but this does not provide a 100% amino acid identity unless the fragment forms part of a longer sequence which also has identical amino acids at other positions equivalent to positions in SEQ ID NO:1. When an equivalent position in the compared sequences is occupied by the same amino acid, then the molecules are identical at that position. Scoring an alignment as a percentage of identity is a function of the number of identical amino acids at positions shared by the compared sequences. When comparing sequences, optimal alignments may require gaps to be introduced into one or more of the sequences, to take into consideration possible insertions and deletions in the sequences. Sequence comparison methods may employ gap penalties so that, for the same number of identical molecules in sequences being compared, a sequence alignment with as few gaps as possible, reflecting higher relatedness between the two compared sequences, will achieve a higher score than one with many gaps. Calculation of maximum percent identity involves the production of an optimal alignment, taking into consideration gap penalties. As mentioned above, the percentage sequence identity may be determined using the Needleman-Wunsch Global Sequence Alignment tool, using default parameter settings. The Needleman-Wunsch algorithm was published in J. Mol. Biol. (1970) vol. 48:443-53.

An aspect of the embodiments relates to a microbial cell capable of producing spermidine. The microbial cell is genetically modified for enhanced putrescine biosynthesis. The microbial cell is also genetically modified for enhanced S-adenosylmethionine (SAM) biosynthesis.

Thus, an aspect of the embodiments relates to a microbial cell capable of producing spermidine. The microbial cell is genetically modified for overexpression of at least one enzyme selected from a group consisting of S-adenosylmethionine decarboxylase [EC 4.1.1.50] and spermidine synthase [EC 2.5.1.16]. The microbial cell is also genetically modified for enhanced SAM biosynthesis.

The present embodiments relates to a microbial cell having capacity of producing high levels of spermidine. In a general embodiment, the microbial cell is genetically modified for enhanced conversion of putrescine into spermidine and for enhanced SAM biosynthesis. Further gene modifications according to various embodiments as disclosed herein include down-regulation or attenuation of specially selected genes, wherein the genes encode enzymes involved in the spermidine consumption and/or degradation pathways. Further spermidine production ability is improved by down-regulation, attenuation, deletion or over-expression of specially selected genes, wherein the genes encode enzymes and/or proteins involved in the spermidine synthesis pathway, 5'-methylthioadenosine (MTA) cycle, L-ornithine synthesis and/or L-glutamate synthesis pathways. In further embodiments, spermidine overproduction is obtained by combining the above modifications with modifications in the pathway leading to biosynthesis of the propylamine donor acting as a cofactor for spermidine formation. Such modifications can include overexpression of endogenous or heterologous genes encoding enzymatic steps responsible for production of the propylamine donor and down-regulation of competing and/or inhibitory reactions. Further spermidine production ability is improved by overexpression of genes encoding polyamine export proteins, down-regulation of genes encoding polyamine uptake proteins and modification of expression of various proteins associated with polyamine toxicity, giving a very effective overall process.

In the following, various embodiments of the present invention will be described in more detail.

In an embodiment, the microbial cell is an eukaryotic cell selected from a group consisting of *Saccharomyces, Kluyveromyces, Zygosaccharomyces, Candida, Hansenula, Torulopsis, Kloeckera, Pichia, Schizosaccharomyces, Trigonopsis, Brettanomyces, Debaromyces, Nadsonia, Lipomyces, Cryptococcus, Aureobasidium, Trichosporon, Lipomyces, Rhodotorula, Yarrowia, Rhodosporidium, Phaffia, Schwanniomyces, Aspergillus* and *Ashbya*. In a particular embodiment, the fungal cell can be *Saccharomyces cerevisiae, Saccharomyces boulardii, Zygosaccharomyces baili, Kluyveromyces lactis, Rhodosporidium toruloides, Yarrowia lipolytica, Schizosaccharomyces pombe, Pichia pastoris, Hansenula anomala, Candida sphaerica*, or *Schizosaccharomyces malidevorans*. *Saccharomyces cerevisiae* is a preferred yeast species.

In certain embodiments the microbial cell is a prokaryotic cell, such as a bacterial cell or archaeal cell. The bacterial cell could be gram positive or gram negative bacteria. The bacteria may also be photosynthetic bacteria, e.g. cyanobacteria.

In an embodiment, the microbial cell is a prokaryotic cell selected from a group consisting of *Neisseria, Spirillum, Pasteurella, Brucella, Yersinia, Francisella, Haemophilus, Bordetella, Escherichia, Salmonella, Shigella, Klebsiella, Proteus, Vibrio, Pseudomonas, Bacteroides, Acetobacter, Aerobacter, Agrobacterium, Azotobacter, Spirilla, Serratia, Vibrio, Rhizobium, Chlamydia, Rickettsia, Treponema, Fusobacterium, Actinomyces, Bacillus, Clostridium, Corynebacterium, Erysipelothrix, Lactobacillus, Listeria, Mycobacterium, Myxococcus, Nocardia, Staphylococcus, Streptococcus*, and *Streptomyces*. Examples of prokaryotic cells that can be used include *Escherichia coli, Bacillus subtilis* and/*Corynebacterium glutamicum*.

The objective of the invention disclosed is to provide for microbial cells engineered for increased spermidine production. Previous efforts to increase spermidine production in microbial cells have reported that modifications to the cell's ornithine and putrescine production pathways resulted in improved spermidine production, suggesting that those precursors were limiting. While limitation in putrescine might be strain specific, to ensure that putrescine was not limiting when evaluating our invention and to achieve high titers of spermidine, we chose to test SAM biosynthesis pathways in a strain that has previously been engineered to produce higher levels of putrescine. This strain included modifications to increase flux toward ornithine, a precursor to putrescine and putrescine, including downregulation of ornithine carbamoyltransferase, deletion of ornithine aminotransferase, overexpression of the mitochondrial amino acid transporter AGC1, overexpression of the mitochondrial ornithine importer ORT1, overexpression of the NADP+-dependent glutamate dehydrogenase, deletion of the gene encoding ornithine decarboxylase (ODC) antizyme and overexpression of ornithine decarboxylase. While in previous studies we have found that these modifications improved ornithine and putrescine production in the used background strain background, other modifications could instead or also be used to achieve similar effects (as has been shown by [5] and others). Therefore, the inventive modifications presented herein improve spermidine production even in a strain lacking the modifications above, for example microbial strains that have different modifications to increase flux towards putrescine, strains that can naturally produce high levels of putrescine, or strains that are fed with putrescine.

In an embodiment, the ability of the microbial cell to convert putrescine to spermidine is increased. This can be achieved by increasing the activity of spermidine synthase (SPDS) [EC 2.5.1.16]. For instance, the increased activity of SPDS could be achieved by overexpressing the encoding gene of SPDS. The SPDS encoding gene can be from any known species, for instance *Triticum aestivum*. In an embodiment, the SPDS from *Triticum aestivum* (SEQ ID NO: 19) is introduced into *S. cerevisiae* or *E. coli*. Other heterologous SPDS, e.g. from *Streptomyces spectabilis, Oryza sativa, Glycine max, Citrus sinesis, Homo sapiens, Rattus norvegicus, Thermotoga maritima, Caenorhabditis elegans*, could also be overexpressed in a eukaryotic or prokaryotic cell. Alternatively, or in addition, the endogenous SPDS could be overexpressed. The increased activity of spermidine synthase could also be combined with increased activity of S-adenosylmethionine decarboxylase [EC 4.1.1.50]. This could be achieved by overexpressing the gene encoding S-adenosylmethionine decarboxylase. Alternatively, such overexpression of the gene encoding S-adenosylmethionine decarboxylase could be used instead of increased activity of spermidine synthase. For example, the endogenous S-adenosylmethionine decarboxylase gene (SPE2; SEQ ID NO: 21) could be overexpressed in *S. cerevisiae*. Alternatively, the endogenous speD gene could be overexpressed in *E. coli*. Other heterologous S-adenosylmethionine decarboxylase, e.g. from *Streptomyces griseochromogenes, Zea mays, Streptomyces spectabilis, Oryza sativa, Glycine max, Citrus sinesis, Homo sapiens, Rattus norvegicus, Mus musculus, Thermotoga maritima, Trypanosoma cruzi, Trypanosoma brucei, Caenorhabditis elegans*, could also be overexpressed in a eukaryotic or prokaryotic cell.

Thus, in an embodiment, the microbial cell is genetically modified for overexpression of at least one enzyme selected from a group consisting of S-adenosylmethionine decarboxylase [EC 4.1.1.50] and spermidine synthase [EC 2.5.1.16]. As is shown in FIG. 1, S-adenosylmethionine decarboxylase catalyzes the synthesis of S-adenosylmethioninamine from SAM. Spermidine synthase uses this S-adenosylmethioninamine together with putrescine to produce the desired product spermidine.

In an embodiment, conversion of L-ornithine into putrescine is increased. This can be achieved by increasing the activity of Ornithine decarboxylase (ODC) [EC 4.1.1.17]. In an embodiment, the activity of ODC can be increased by overexpression of the native gene encoding ODC. For example, SPE1 (SEQ ID NO: 20) could be overexpressed in *S. cerevisiae*, or speC (Genbank accession: NP_417440) could be overexpressed in *E. coli*. Alternatively, heterologous ODC could be expressed, e.g. from *Escherichia coli, Streptomyces spectabilis, Triticum aestivum, Oryza sativa, Glycine max, Citrus sinesis, Homo sapiens, Rattus norvegicus, Nicotiana glutinosa, Trypanosoma brucei, Neurospora crassa, Entamoeba histolytica, Physarum polycephalum, Mus musculus, Plasmodium falciparum*.

In addition, or alternatively, conversion of ornithine to putrescine could also be increased by reducing the activity of the ornithine decarboxylase antizyme (OAZ). OAZ is a regulator of ODC which binds to ODC to stimulate ubiquitin-independent degradation by the proteasome. Therefore, reduction of the activity of OAZ could facilitate increased ODC levels. Reduction of OAZ activity could be achieved, for example by disrupting or downregulating the native gene encoding OAZ. For example, in an embodiment, the native gene encoding OAZ (OAZ1; SEQ ID NO: 23) is disrupted in *S. cerevisiae*.

Furthermore, spermidine levels could be increased by increasing the L-ornithine concentration in the cell. This can be achieved, for example by decreasing the activity of ornithine-utilizing reactions in the cell. For example, the activity of Ornithine carbamoyltransferase [EC 2.1.3.3], which converts ornithine to citrulline can be decreased. This can be achieved by down-regulating the expression of the native gene encoding Ornithine carbamoyltransferase. For example, in an embodiment, the native ARG3 gene encoding Ornithine carbamoyltransferase (SEQ ID NO: 24) could be down-regulated in *S. cerevisiae*. In another embodiment, the activity of L-ornithine transaminase [EC 2.6.1.13], which catalyzes the conversion of ornithine to L-glutamate α-semialdehyde, is decreased. This can be achieved, for example, by disrupting the endogenous gene encoding L-ornithine transaminase activity, e.g. CAR2 in *S. cerevisiae* (SEQ ID NO: 117).

Other strategies for increased production of cytosolic L-ornithine, could include increase in the flux through the L-ornithine production pathway from glutamate, for example by increasing the activities of Acetylglutamate synthase [EC 2.3.1.1], Acetylglutamate kinase [EC 2.7.2.8] and N-acetyl-gamma-glutamyl-phosphate reductase [EC 1.2.1.38], Acetylornithine aminotransferase [EC 2.6.1.11], acetylornithine deacetylase [EC 3.5.1.16] and/or ornithine acetyltransferase [EC 2.3.1.35]. In a preferred embodiment, the activities of these enzymes are increased in the cytosol. This could be achieved, for example, by expression/overexpression of bacterial L-ornithine biosynthetic genes encoding these activities, e.g. argA (SEQ ID NO: 103-104), argB (SEQ ID NO: 105-106), argC (SEQ ID NO: 107-108), argD (SEQ ID NO: 109-110) argJ/argE (SEQ ID NO: 111-112), from *E. coli* or *C. glutamicum*, in a cell, or the targeting of the endogenous *S. cerevisiae* ornithine biosynthetic genes, e.g. ARG2 (SEQ ID NO: 113), ARG5,6 (SEQ ID NO: 114), ARG8 (SEQ ID NO: 115) and/or ARG7 (SEQ ID NO: 116), to the cytosol.

Thus, in an embodiment, the microbial cell is genetically modified for overexpression of at least one enzyme selected from a group consisting of ornithine decarboxylase (ODC) [EC 4.1.1.17]; N-acetylglutamate synthase (NAGS) [EC 2.3.1.1], also referred to as amino-acid-N-acetyltransferase; acetylglutamate kinase [EC 2.7.2.8]; N-acetyl-gamma-glutamyl-phosphate reductase [EC 1.2.1.38]; acetylornithine aminotransferase [EC 2.6.1.11], also referred to as acetylornithine transaminase; acetylornithine deacetylase [EC 3.5.1.16] and ornithine acetyltransferase [EC 2.3.1.35], also referred to as glutamate N-acetyltransferase.

As is more clearly shown in FIG. 1, the above mentioned enzymes are involved in the putrescine biosynthesis pathway involving synthesis of putrescine from a carbon source, such as glucose. In more detail, the above mentioned enzymes are involved in the synthesis of putrescine from α-ketoglutarate, which in turn is the output of the tricarboxylic acid (TCA) cycle.

In an embodiment, the microbial cell is genetically modified for attenuated activity of ornithine decarboxylase antizyme (OAZ); L-ornithine transaminase [EC 2.6.1.13], also referred to as ornithine aminotransferase; and/or ornithine carbamoyltransferase (OTC) [EC 2.1.3.3] or deletion or disruption of at least one gene selected from a group consisting of a gene encoding OAZ, a gene encoding L-ornithine transaminase and a gene encoding OTC.

OTC and L-ornithine transaminase are enzymes involved in the conversion of ornithine into citrulline and glutamate γ-semialdehyde, see FIG. 1. Hence, these two enzymes are involved in pathways draining the intermediate ornithine and thereby competes with ODC in using ornithine as substrate. Attenuated activity of these enzymes or deletion or disruption of the genes encoding these enzymes would thereby result in higher amounts of ornithine for ODC and thereby enhanced production of putrescine in the microbial cell.

OAZ is an inhibitor of ODC and thereby reduces the activity of ODC in synthesizing putrescine from ornithine.

In an embodiment, any of the above modifications could be further combined with a pathway leading to increased levels of SAM, or this pathway may be used independent of the above modifications. SAM can then be decarboxylated by S-adenosylmethionine decarboxylase to dSAM, which serves as the propylamine donor for spermidine formation. For example, in a preferred embodiment, increased biosynthesis of SAM can be achieved by increasing the activity of S-adenosylmethionine synthetase (MAT) [EC 2.5.1.6], which catalyzes the transfer of the adenosyl group of ATP to the sulfur atom of methionine to form SAM. For instance, the increased activity of MAT could be achieved by overexpressing the encoding gene of MAT. The MAT encoding gene can be from any known species, for instance *S. cerevisiae*. In one preferred embodiment the overexpression of the native SAM2 gene which encodes MAT is achieved in *S. cerevisiae*. The native SAM1 gene could also be overexpressed. Alternatively, the endogenous *E. coli* metK gene which encodes MAT could be overexpressed in *E. coli* or *S. cerevisiae*. In addition, heterologous MAT from other eukaryotic or prokaryotic sources can be expressed in a cell, e.g. from *Streptomyces spectabilis, Triticum aestivum, Oryza sativa, Glycine max, Citrus sinesis, Homo sapiens, Rattus norvegicus, Cryptosporidium parvum, Leishmania donovani, Leishmania infantum, Sus scrofa*. For example, in an embodiment, heterologous MAT from *Leishmania infantum* (SEQ ID NO: 25) is overexpressed in a microbial cell. In another embodiment, a mutated allele of MAT is expressed. For example, MAT from *Streptomyces spectabilis* wherein lysine 18, leucine 31, isoleucine 65 and/or aspartic acid 341 are mutated into arginine, proline, valine and/or glycine, respectively (K18R, L31P, I65V, D341G) (SEQ ID NO: 1) can be expressed in a microbial cell. Similarly, MAT from *S. cerevisiae* with a mutation in lysine 21, preferably into arginine (K21R) (SEQ ID NO: 2), could also be expressed.

Thus, in an embodiment, the microbial cell is genetically modified for overexpression of S-adenosylmethionine synthetase (MAT) [EC 2.5.1.6], also referred to as methionine adenosyltransferase.

MAT is involved in the synthesis of SAM from methionine as shown in FIG. 2.

In an embodiment increased S-adenosylmethionine (SAM) levels are increased by increasing the activity of Methylenetetrahydrofolate reductase (MTHFR) [EC 1.5.1.20], which catalyzes the reduction of 5,10-methylenetetrahydrofolate to 5-methyltetrahydrofolate used to methylate homocysteine in methionine biosynthesis. For instance, the increased activity of MTHFR could be achieved by overexpressing the encoding gene of MTHFR. The MTHFR encoding gene can be from any known species, for instance *S. cerevisiae*. In one preferred embodiment the overexpression of the native MET13 (SEQ ID NO: 26) and/or MET12 genes which encode MTHFR is achieved in the modified *S. cerevisiae*. In another embodiment, a chimeric MTHFR which is not subject to repression due to accumulation of high levels of SAM can be expressed in a microbial cell. Such a chimeric MTHFR could, for example be comprised of the yeast Met13p N-terminal catalytic domain and the *Arabidopsis thaliana* MTHFR (AtMTHFR-1)C-terminal regulatory domain (SEQ ID NO: 3). In addition, heterologous MTHFR from other eukaryotic or prokaryotic sources can be expressed/overexpressed in a microbial cell, e.g. from *Escherichia coli, Streptomyces spectabilis, Triticum aestivum, Oryza sativa, Glycine max, Citrus sinesis, Arabidopsis* sp., *Homo sapiens, Sus scrofa, Rattus norvegicus* or *Clostridium formicaceticum*.

Thus, in an embodiment, the microbial cell is genetically modified for overexpression of methylenetetrahydrofolate reductase (MTHFR) [EC 1.5.1.20].

5,10-Methylenetetrahydrofolate (N5,N10-methylenetetrahydrofolate; 5,10-CH$_2$-THF) is the substrate used by MTHFR to generate 5-methyltetrahydrofolate (5-MTHF, or levomefolic acid), which is in turn a substrate in the production of methionine, see FIG. 2.

In a particular embodiment, the microbial cell is genetically modified for overexpression of a chimeric MTHFR comprising the yeast Met13p N-terminal catalytic domain and the *Arabidopsis thaliana* MTHFR C-terminal regulatory domain.

In another embodiment, levels of S-adenosylmethionine (SAM) are increased by increasing folate levels. This can be achieved, for example, by folate supplementation. This can also be realized by increasing flux through the folate synthesis pathway, for example by increasing the activities of enzymes in this pathway. For example, the activities of 3-deoxydarabino-heptulosonate-7-phosphate synthase [DAHPS] [EC 2.5.1.54], Pentafunctional AROM protein [EC 4.2.3.4, 4.2.1.10, 1.1.1.25, 2.7.1.71, 2.5.1.19], Chorismate synthase [EC 4.2.3.5], Para-aminobenzoate (PABA) synthase [EC 6.3.5.8], Aminodeoxychorismate lyase [EC 4.1.3.38], Folic acid synthesis protein [EC 4.1.2.25, 2.7.6.3, 2.5.1.15], GTP-cyclohydrolase I [EC 3.5.4.16], Dihydrofolate synthetase [EC 6.3.2.12], Dihydrofolate reductase [EC 1.5.1.3], Serine hydroxymethyltransferase [EC 2.1.2.1), or Glycine cleavage complex. This can be achieved by overexpressing the endogenous genes encoding for these activities. For example, the endogenous genes ARO3, ARO4, ARO1, ARO2, ABZ1, ABZ2, FOL1, FOL2, FOL3, DFR1, SHM2, SHM1, LPD1, GCV2, GCV1 or GCV3 could be overexpressed in a *S. cerevisiae* cell.

In another embodiment, S-adenosylmethionine (SAM) levels are increased by increasing the flux through the purine biosynthesis pathway, which can supply cofactors, such as ATP and GTP. This can be achieved by increasing the activities of enzymes in the pathways. For example, the activity of PRPP amidotransferase [EC 2.4.2.14], which catalyses the first committed step in purine biosynthesis can be increased. This can be achieved by overexpression of the endogenous gene encoding for this enzyme. For example, the endogenous ADE4 gene (SEQ ID NO: 27) can be overexpressed in *S. cerevisiae*. Alternatively, the endogenous purF gene (SEQ ID NO: 28) could be overexpressed in *E. coli*. Alternatively, a mutated allele of the gene encoding PRPP amidotransferase that is not subject to feedback regulation can be expressed. For example, ADE4 from *Ashbya gossypii* where aspartic acid 310, lysine 333 and/or alanine 417 are replaced, preferably by valine, glutamine and tryptophan, respectively (D310V, K333Q, A417W, SEQ ID NO: 4) could be expressed in a eukaryotic or prokaryotic cell. Alternatively, mutated PurF from *Bacillus subtilis*, where aspartic acid 293, lysine 316 and/or Serine 400 are replaced, preferably by valine, glutamine and tryptophan (D293, K316, S400W, SEQ ID NO: 5), can be expressed in a microbial cell.

Thus, in an embodiment, the microbial cell is genetically modified for overexpression of phosphoribosyldiphosphate (PRPP) 5-amidotransferase [EC 2.4.2.14], also referred to as amidophosphoribosyltransferase. The overexpression of this enzyme would generally lead to increase in ATP and/or GTP levels in the microbial cell. The increased levels of ATP and/or GRP can in turn be used, for instance, in the SAM biosynthesis in the microbial cell.

In a particular embodiment, the microbial cell comprises the *Ashbya gossypii* ADE4 gene with at least one mutation in an amino acid residue selected from a group consisting of D310V, K333Q and A417W. In another particular embodiment, the microbial cell comprises the *Bacillus subtillis* PurF gene with at least one mutation selected from a group consisting of D293V, K316Q and S400W.

In another embodiment, S-adenosylmethionine (SAM) levels are increased by recycling of the 5'-methylthioadenosine formed from polyamine synthesis via the methionine salvage pathway. For example, the flux through the methionine salvage pathway can be increased. This can be done by increasing the activities of enzymes in this pathway, such as methylthioadenosine phosphorylase (MTAP) [EC 2.4.2.28], 5'-methylthioribose-1-phosphate isomerase (MRI) [EC 5.3.1.23], 5'-methylthioribulose-1-phosphate dehydratase (MDE) [EC 4.2.1.109], 2,3-dioxomethiopentane-1-phosphate enolase/phosphatase [EC 3.1.3.77], acireductone dioxygenase [EC 1.13.11.54] or branched-chain amino acid transaminase (BAT) [EC 2.6.1.5, EC 2.6.1.57, EC 2.6.1.42]. For instance, the increased activity of MTAP could be achieved by overexpressing the encoding gene of MTAP. The MTAP encoding gene can be from any known species, for instance *S. cerevisiae*. In one preferred embodiment the overexpression of the native MEU1 gene (SEQ ID NO: 17) which encodes MTAP is achieved in the modified *S. cerevisiae*. Alternatively, the *S. cerevisiae* MEU1 gene could also be expressed in *E. coli*. In another preferred embodiment, the overexpression of the native BAT2 gene (SEQ ID NO: 18), which encodes Branched-chain Amino acid Transaminase could be achieved in the modified *S. cerevisiae*. In addition, the genes MRI1 (SEQ ID NO: 118), MDE1 (SEQ ID NO: 119), UTR4 (SEQ ID NO: 120), ADI1 (SEQ ID NO: 121), ARO8 (SEQ ID NO: 122), ARO9 (SEQ ID NO: 123) or BAT1 (SEQ ID NO: 124), which encode 5-methylthioribose-1-phosphate isomerase, methylthioribulose-1-phosphate dehydratase, 2,3-dioxomethiopentane-1-phosphate enolase/phosphatase, acireductone dioxygenase, aromatic aminotransferase I, aromatic aminotransferase II and mitochondrial branched-chain amino acid (BCAA) aminotransferase (respectively), could also be overexpressed. This pathway could also be overexpressed in a prokaryotic host. For example, the enzymatic steps in the pathway could be introduced into *E. coli*. This could potentially be combined with the endogenous tyrB gene, which encodes BAT in *E. coli*. In addition, heterologous genes from other eukaryotic or prokaryotic sources can be expressed, e.g. from *Streptomyces spectabilis, Triticum aestivum, Oryza sativa, Glycine max, Citrus sinesis, Homo sapiens, Arabidopsis thaliana, Bos taurus, Pyrococcus furiosus, Sulfolobus solfataricus*.

Thus, in an embodiment, the microbial cell is genetically modified for overexpression of at least one enzyme in the methionine salvage pathway selected from a group consisting of methylthioadenosine phosphorylase (MTAP) [EC 2.4.2.28], also referred to as S-methyl-5'-thioadenosine phosphorylase; 5-methylthioribose-1-phosphate isomerase (MRI) [EC 5.3.1.23], also referred to as S-methyl-5-thioribose-1-phosphate isomerase; methylthioribulose-1-phosphate dehydratase (MDE) [EC 4.2.1.109]; 2,3-dioxomethiopentane-1-phosphate enolase/phosphatase [EC 3.1.3.77], also referred to as acireductone synthase; acireductone dioxygenase [EC 1.13.11.54]; and branched-chain amino acid transaminase (BAT) [EC 2.6.1.42], also referred to as tyrosine transaminase [EC 2.6.1.5], and aromatic-amino-acid transaminase [EC 2.6.1.57]. In a particular embodiment, the microbial cell is genetically modified for overexpression of MTAP and/or BAT.

As is shown in FIG. 2, the methionine salvage pathway comprises the synthesis of methionine from 5'-methylthioadenosine (MTA) via 5'-methylthioribose (MRP) and 4-methylthio-2-oxobutyrate (MOB). The salvaged methionine can then be used as substrate for production of SAM.

In another embodiment, S-adenosylmethionine (SAM) levels are increased by increasing intracellular methionine availability for SAM production. This can be achieved, for example, by methionine supplementation. Alternatively, intracellular methionine can be derived from the intermediate L-Aspartate-4-semialdehyde. For example, the flux through the pathway responsible for methionine formation from L-Aspartate-4-semialdehyde can be increased. This can be done by increasing the activities of the enzymes in the pathway, such as Homoserine dehydrogenase [EC 1.1.1.3], homoserine O-acetyltransferase [EC 2.3.1.31], 0-acetylhomoserine (thiol)-lyase [EC 2.5.1.49] and N5-methyltetrahydropteroyltriglutamate-homocysteine methyltransferase (METE) [EC 2.1.1.14]. For instance, in a preferred embodiment, the activity of O-acetylhomoserine (thiol)-lyase can be increased by overexpressing the endogenous genes encoding O-acetylhomoserine (thiol)-lyase (MET17 or STR2) in *S. cerevisiae*. In another preferred embodiment, heterologous genes encoding O-acetylhomoserine (thiol)-lyase from other organisms, such as *Corynebacterium acetophilum, Geobacillus stearothermophilus, Brevibacterium flavum, Thermus thermophiles* (oah1), *Pseudomonas* sp. or *Corynebacterium glutamicum* (metY), could also be overexpressed in a yeast or bacterial cell. In another preferred embodiment, the activity of N5-methyltetrahydropteroyltriglutamate-homocysteine methyltransferase can also be increased. This can be done, for example, by overexpressing the endogenous gene encoding METE (MET6) in *S. cerevisiae*. In another preferred embodiment, heterologous genes encoding METE from other organisms, such as *Catharanthus roseus* (MetE), *Neurospora crassa* (me-8) or *E. coli* (metE) can be overexpressed in a microbial cell. In another embodiment, the activities of Homoserine dehydrogenase and homoserine O-acetyltransferase [EC 2.3.1.31] can also be increased by overexpressing the endogenous genes HOME (SEQ ID NO: 127) and/or MET2 in *S. cerevisiae*. In another embodiment, the activities of these enzymes can be increased by overexpressing heterologous genes encoding these enzymes from other sources, such as *Haemophilus influenzae, Paenibacillus polymyxa, Bacillus cereus, Thermotoga maritima, Bacillus cereus, Schizosaccharomyces pombe* or *Cryptococcus neoformans* in a microbial cell. In a preferred embodiment, Homoserine dehydrogenase from *Zea mays* is overexpressed in *S. cerevisiae* or *E. coli*. In addition, genes from other eukaryotic or prokaryotic sources can be expressed, e.g. from *Escherichia coli, Streptomyces spectabilis, Triticum aestivum, Oryza sativa, Glycine max, Citrus sinesis, Homo sapiens*.

Thus, in an embodiment, the microbial cell is genetically modified for enhanced conversion of L-aspartate-4-semialdehyde to methionine.

In a particular embodiment, the microbial cell is genetically modified for overexpression of at least one enzyme selected from a group consisting of: homoserine dehydrogenase [EC 1.1.1.3]; homoserine O-acetyltransferase [EC 2.3.1.31]; O-acetylhomoserine (thiol)-lyase [EC 2.5.1.49], also referred to as O-acetylhomoserine aminocarboxypropyltransferase; and 5-methyltetrahydropteroyltriglutamate-homocysteine S-methyltransferase (METE) [EC 2.1.1.14].

This conversion of L-asparatate-4-semialdehyde into methionine is shown in FIG. 2 and involves the above-mentioned enzymes. This synthesis pathway thereby increased the amount of the substrate methionine in the microbial cell to be used in the production of SAM.

In another embodiment, the methionine needed for SAM synthesis can be derived from cysteine. This can be done, for example, by increasing the activity of cystathionine gamma-synthase (CGS) [EC 2.5.1.48], which converts cysteine into cystathionine. This can be achieved by the overexpression of the endogenous gene encoding CGS in S. cerevisiae (STR2), in E. coli (metB), or in C. glutamicum (Cgl2446). The activity of Cystathione beta lyase [EC 4.4.1.8] (CBL), which converts Cystathione to Homocysteine could also, or alternatively, be increased. This can be done by overexpressing the endogenous genes encoding for Cystathione beta lyase activity, such as IRC7 or STR3 in S. cerevisiae, malY or metC in E. coli, or Cgl2309 in C. glutamicum. Genes encoding CGS and CBL from other sources, e.g. Triticum aestivum, Oryza sativa, Glycine max, Citrus sinesis, Homo sapiens, Arabidopsis thaliana or Lysinibacillus sphaericus, could also be expressed.

Thus, in an embodiment, the microbial cell is genetically modified for enhanced conversion of cysteine to methionine by overexpression of at least one enzyme selected from a group consisting of cystathionine gamma-synthase [EC 2.5.1.48] and cystathione beta-lyase (CBL) [EC 4.4.1.8]. This synthesis pathway thereby increased the amount of the substrate methionine in the microbial cell to be used in the production of SAM.

The above modifications could also be combined with enzymes that convert Serine to Cysteine. For example, through combination of the activities of Serine acetyltransferase [EC 2.3.1.30] and Cysteine synthase A [EC 2.5.1.47]. This can be done by expressing/overexpressing genes encoding these activities. For example, the genes cysE and cysK from E. coli could be overexpressed in a prokaryotic or eukaryotic cell.

In another embodiment S-adenosylmethionine (SAM) levels can be increased by reducing the activity of endogenous Cystathionine beta-synthase (CBS) [EC 4.2.1.22], which catalyzes the synthesis of cystathionine from serine and homocysteine. This can be done, for example, by downregulating the native gene encoding Cystathionine beta-synthase (CYS4) in S. cerevisiae. Alternatively, the activity of Cystathionine gamma-lyase (CGS) [EC 4.4.1.1], which catalyzes the conversion of cystathione to cysteine could be reduced. This can be done, for example, by downregulating the native gene encoding Cystathionine gamma-lyase (CYS3) in S. cerevisiae. Thus, in an embodiment, the microbial cell is genetically modified for attenuated activity of cystathionine beta-synthase (CBS) [EC 4.2.1.22] or deletion or disruption of a gene encoding CBS.

This enzyme catalyzes the conversion of homocysteine into cystathionine, i.e., the opposite reaction path as compared to CBL. Accordingly, CBS depletes homocysteine, which in turn decreases the levels of methionine in the microbial cell.

In another embodiment, S-adenosylmethionine (SAM) levels can be increased by increasing the conversion of pyruvate to L-Aspartate-4-semialdehyde. This can be done by increasing the activities of Pyruvate carboxylase [EC 6.4.1.1], aspartate aminotransferase [EC 2.6.1.1], aspartate kinase (AK) [EC 2.7.2.4] and/or aspartic beta semi-aldehyde dehydrogenase [EC 1.2.1.11]. For instance, in a preferred embodiment, the activity of AK can be increased by overexpressing the endogenous HOM3 gene encoding AK in S. cerevisiae (SEQ ID NO: 29) or the metL/LysC/thrA genes in E. coli. Alternatively, a mutated version of AK can be introduced. For example, a mutated allele of HOM3, where Ser399 has been exchanged (to e.g. phenylalanine; S399F; SEQ ID NO: 6) can be expressed. This allele is not subject to feedback regulation and could therefore result in accumulation of higher levels of L-4-Aspartyl-phosphate. Furthermore, feedback-resistant alleles from other organisms can be expressed. For example, metL from Xenorhabdus bovienii with mutation in glutamic acid 257 (to e.g. lysine; E257K; SEQ ID NO: 7) or the lysine-sensitive aspartokinase 3 from the same species with mutation in either threonine 359 (to e.g. isoleucine; T359I) or glutamic acid 257 (to e.g. lysine; E257K), or both (SEQ ID NO: 8), could be introduced into a microbial cell. In addition, a feedback resistant AK from Corynebacterium glutamicum (encoded by the lysC gene) where threonine 311 is exchanged (to e.g. Isoleucine; T311I; SEQ ID NO: 22) could also be expressed. Furthermore, genes encoding AK from other organisms, e.g. Arabidopsis thaliana, Panicum miliaceum, Escherichia coli, Streptomyces spectabilis, Triticum aestivum, Oryza sativa, Glycine max, Citrus sinesis, Homo sapiens, could also be expressed in a microbial cell.

The activities of other enzymes involved in the conversion of pyruvate to L-Aspartate-4-semialdehyde could be increased. For example, the activity of pyruvate carboxylase [EC 6.4.1.1], which converts pyruvate to oxaloacetate, could be increased by overexpressing the endogenous S. cerevisiae gene encoding pyruvate carboxylase (PYC1 and/or PYC2; SEQ ID NO: 125 and SEQ ID NO: 126, respectively) or mutated versions, such as C. glutamicum pyc where proline 458 has been replaced with serine (P458C). Genes encoding Pyruvate carboxylase from other organisms, e.g. Gallus gallus, Mycobacterium smegmatis, Escherichia coli, Streptomyces spectabilis, Triticum aestivum, Oryza sativa, Glycine max, Citrus sinesis, Homo sapiens, could also be expressed.

Alternatively, or in addition, the intermediate oxaloacetate could be generated by increasing the activity of Phosphoenolpyruvate (PEP) carboxylase [EC 4.1.1.31]. This could be achieved by overexpressing a gene encoding PEP carboxylase. For example, the S. cerevisiae PCK1 gene or the E. coli Ppc gene could be overexpressed in a microbial cell. Alternatively, a mutant version of Ppc, where leucine 620 is replaced (by e.g. serine, L620S) could be expressed in a microbial cell. In another embodiment, the activity of aspartate aminotransferase (AAT) [EC 2.6.1.1] could be increased. This could be done by overexpressing the endogenous gene encoding aspartate aminotransferase, for example AAT1 and/or AAT2 in S. cerevisiae. Genes encoding Aspartate aminotransferase from other organisms, e.g. Arabidopsis thaliana, Panicum miliaceum, Escherichia coli, Streptomyces spectabilis, Triticum aestivum, Oryza sativa, Glycine max, Citrus sinesis, Homo sapiens, could also be introduced. In another embodiment, the activity of aspartic beta semi-aldehyde dehydrogenase [EC 1.2.1.11] could be increased by overexpressing the endogenous gene encoding aspartic beta semi-aldehyde dehydrogenase (HOM2) in S. cerevisiae. Genes encoding aspartic beta semi-aldehyde dehydrogenase from other organisms, e.g. Gallus gallus, Mycobacterium smegmatis, Escherichia coli, Streptomyces

*spectabilis, Triticum aestivum, Oryza sativa, Glycine max, Citrus sinesis, Homo sapiens*, could also be expressed.

Thus, in an embodiment, the microbial cell is genetically modified for enhanced conversion of pyruvate to L-aspartate-4-semialdehyde.

In a particular embodiment, the microbial cell is genetically modified for overexpression of at least one enzyme selected from a group consisting of pyruvate carboxylase [EC 6.4.1.1], aspartate aminotransferase [EC 2.6.1.1], aspartate kinase (AK) [EC 2.7.2.4] and aspartic beta semialdehyde dehydrogenase [EC 1.2.1.11], also referred to as aspartate-semialdehyde dehydrogenase.

As is shown in FIG. 2, these enzymes catalyze the conversion of pyruvate into L-aspartate-4-semialdehyde, which may be further converted, as described above, into methionine and then into SAM.

In a particular embodiment, the microbial cell comprises at least one gene encoding AK selected from a group consisting of *Saccharomyces cerevisiae* HOM3 with a mutation in amino acid serine 399, *Xenorhabdus bovienii* AK with a mutation in amino acid threonine 359 and/or glutamic acid 257 and *Corynebacterium glutamicum* AK with a mutation in threonine 311.

In another embodiment, spermidine can be formed by first condensing putrescine with L-Aspartate-4-semialdehyde to form carboxyspermidine, followed by decarboxylation to form spermidine. For example, the modifications described above to enhance levels of L-Aspartate-4-semialdehyde in a microbial cell can be combined with expression of heterologous genes encoding enzymes able to condense L-Aspartate-4-semialdehyde and putrescine to form carboxyspermidine, such as carboxy(nor)spermidine dehydrogenase (CASDH/CANSDH) [EC 1.5.1.43]. Carboxyspermidine can then be converted to spermidine via carboxy(nor)spermidine decarboxylase (CASDC/CANSDC) [EC 4.1.1.96]. For example, CASDH/CANSDH and CASDC/CANSDC from *Campylobacter jejuni* (nucleotide sequences are SEQ ID NO: 10-11, respectively; protein sequences are SEQ ID NO: 149-150, respectively), *Vibrio cholera, Vibrio vulnificus*, or *Vibrio alginolyticus* can be expressed in a *S. cerevisiae* or *E. coli* cell. This can also be combined with reduction of flux to competitive reactions. For example, in another embodiment, conversion of L-Aspartate-4-semialdehyde to homoserine is reduced. This can be achieved by downregulating the endogenous enzyme encoding homoserine dehydrogenase [EC 1.1.1.3]. For example, the endogenous HOME (SEQ ID NO: 127) gene in *S. cerevisiae* can be down-regulated.

In another embodiment, the above modifications are combined with a reduced flux to the threonine production pathway, or this pathway may be used independent of the above modifications. This can be achieved by decreasing the activities of homoserine kinase [EC 2.7.1.39] and/or threonine synthase [EC 4.2.3.1; 4.2.99.2]. For example, the endogenous THR1 gene encoding homoserine kinase or the endogenous THR4 gene encoding threonine synthase could be down-regulated or disrupted in *S. cerevisiae*. Alternatively, the endogenous thrB or thrC genes (encoding these activities) could be down-regulated or disrupted in *E. coli*. In addition, the activity of Diaminopimelate decarboxylase [EC 4.1.1.20] could be reduced, for example, by downregulating the endogenous lysA gene in *E. coli*.

Thus, in an embodiment, the microbial cell is genetically modified for attenuated activity of endogenous homoserine kinase [EC 2.7.1.39] and/or endogenous threonine synthase [EC 4.2.3.1 and previously also known as EC 4.2.99.2] or by deletion or disruption of an endogenous gene encoding homoserine kinase and/or an endogenous gene encoding threonine synthase.

These enzymes are involved in the threonine biosynthesis pathway, which uses homoserine as substrate as indicated in FIG. 2. Thus, by attenuating activity of these enzymes or deletion or disruption of the genes encoding these enzymes, homoserine is not depleted in the threonine biosynthesis pathway but can rather be further converted into o-acetyl-homoserine.

In another embodiment, conversion of SAM back to methionine can be reduced. This can be done by reducing the activity of S-adenosylmethionine-homocysteine methyltransferase [EC 2.1.1.10]. For example, the endogenous gene encoding S-adenosylmethionine-homocysteine methyltransferase (SAM4 or MHT1) could be down-regulated or disrupted in *S. cerevisiae*.

In another embodiment, SAM levels are increased by reducing the conversion of oxaloacetate to citrate. This can be achieved by reducing the activity of endogenous citrate synthase [EC 2.3.3.1]. This can be done, for example, by downregulating the endogenous gene encoding citrate synthase, such as CIT1, CIT2 or CIT3 in *S. cerevisiae*.

In another embodiment the uptake of oxaloacetate into the mitochondria is increased. This can be done by overexpression of the transporter protein that transports oxaloacetate into the mitochondria. For example, the *S. cerevisiae* gene OAC1 encoding a mitochondrial inner membrane transporter for oxaloacetate could be overexpressed in a eukaryotic cell.

In another embodiment, transport of aspartate from the mitochondria into the cytosol is increased. This can be achieved by increasing the activity of aspartate transporters. For example, the endogenous AGC1, which encodes a mitochondrial amino acid transporter, could be overexpressed in *S. cerevisiae*. Alternatively, synthesis of aspartate in the cytosol could be promoted by expressing cytosolic versions of AAT, e.g. *S. cerevisiae* AAT2 or prokaryotic AAT. This could also be combined with increasing oxaloacetate in the cytosol by reducing expression of mitochondrial oxaloacetate transporters (e.g. OAC1 in *S. cerevisiae*). In addition, transport of pyruvate into the mitochondria could be decreased by decreasing the expression of mitochondrial pyruvate transport proteins, e.g. MPC1, MPC2 or MPC3 in *S. cerevisiae*.

In another embodiment, flux can be increased from aspartate to L-aspartate-4-phosphate by reducing other endogenous reactions that utilize aspartate. Examples for such reactions include arginosuccinate synthetase [EC 6.3.4.5], Asparagine synthetase [EC 6.3.5.4], phosphoribosyl amino imidazolesuccinocarbozamide synthetase [EC 6.3.2.6], adenylosuccinate synthetase [EC 6.3.4.4] and aspartate transcarbamylase [EC 2.1.3.2]. This can be accomplished by downregulating the endogenous genes encoding the enzymes that catalyse these reactions. For example, the genes encoding arginosuccinate synthetase (ARG1), Asparagine synthetase (ASN1 or ASN2), phosphoribosyl amino imidazolesuccinocarbozamide synthetase (ADE1), adenylosuccinate synthetase (ADE12) and/or aspartate transcarbamylase (URA2) can be downregulated in a *S. cerevisiae* cell.

In another embodiment, SAM levels are increased by increasing the formation of hydrogen sulfide (H2S), a precursor of SAM. This can be achieved by increasing the flux through the sulfate assimilation pathway by increasing the activities of ATP sulfurylase [EC 2.7.7.4], Adenylylsulfate kinase [EC 2.7.1.25], phosphoadenylyl-sulfate (PAPS)

reductase [EC 1.8.4.8] and/or Sulfite reductase [EC 1.8.1.2]. This can achieved by overexpression endogenous genes encoding for these enzymes activities. For example, METS, MET14, MET16, METS, MET10 and/or ECM17 could be overexpressed in *S. cerevisiae*. Thioredoxin could also be expressed. Genes encoding these activities from heterologous sources, e.g. *Gallus gallus, Mycobacterium smegmatis, Escherichia coli, Streptomyces spectabilis, Triticum aestivum, Oryza sativa, Glycine max, Citrus sinesis, Homo sapiens, Salmonella enterica* subsp. *enterica serovar Typhimurium, Saccharomyces bayanus, Rattus norvegicus, Penicillium chrysogenum, Synechococcus* sp., *Thiobacillus denitrificans, Spinacia oleracea, Spinacia oleracea, Euglena gracilis*, could also be expressed. Formation of H2S could also be increased by increasing the concentration of sulfate in the media. In another embodiment, sulfate uptake from the media can be increased by increasing the expression of sulfate transporters. For example, the endogenous sulfate permeases of *S. cerevisiae* (SUL1, SUL2 and/or SUL3) could be overexpressed. In addition, heterologous sulfate transporters could be introduced. Furthermore, sulphite efflux could be reduced by disruption/downregulation of endogenous efflux transporters (e.g. SSU1 in *S. cerevisiae*). In another embodiment, transcriptional regulators that activate sulfate assimilation could be overexpressed. For example, the endogenous genes MET28 and MET32 could be overexpressed in *S. cerevisiae*.

In another embodiment, SAM availability for spermidine formation is increased by decreasing other cellular reactions that utilize SAM. For example, reactions involved in ergosterol biosynthesis can be downregulated. This can be achieved by disrupting/downregulating the endogenous enzymes involved in these reactions. For example, the endogenous genes encoding Delta(24)-sterol C-methyltransferase [EC 2.1.1.41; ERG6] and/or C-24(28) sterol reductase [EC 1.3.1.71; ERG4] can be downregulated in *S. cerevisiae*.

Thus, in an embodiment, the microbial cell is genetically modified for attenuated activity of endogenous delta(24)-sterol C-methyltransferase [EC 2.1.1.41], also referred to as sterol 24-C-methyltransferase, and/or endogenous C-24(28) sterol reductase [EC 1.3.1.71], also referred to as delta(24 (24(1)))-sterol reductase or by deletion or disruption of an endogenous gene encoding delta(24)-sterol C-methyltransferase and/or an endogenous gene encoding C-24(28) sterol reductase.

Delta(24)-sterol C-methyltransferase catalyses the reaction he chemical reaction S-adenosyl-L-methionine+5 alpha-cholesta-8,24-dien-3beta-ol→S-adenosyl-L-homocysteine+24-methylene-5alpha-cholest-8-en-3beta-ol. Thus, this enzyme depletes SAM and thereby it is preferably attenuated or its gene is preferably deleted or disrupted in the microbial cell. Disruption of endogenous C-24(28) sterol reductase has been linked to increased SAM accumulation.

In further embodiments, the activity of the endogenous glycogen-branching enzyme [EC. 2.4.1.18] could be reduced. For example the endogenous GLC3 gene could be downregulated in *S. cerevisiae*.

In an embodiment, the microbial cell is genetically modified for attenuated activity of endogenous glycogen-branching enzyme or by deletion or disruption of an endogenous gene encoding glycogen-branching enzyme.

In another embodiment, SAM levels can be increasing by introducing haemoglobin in order to promote better oxygen availability, cell growth and protein expression. For example, haemoglobin from *Vitreoscilla* (VHb) (SEQ ID NO: 9) could be expressed in *S. cerevisiae*.

Thus, in an embodiment, the microbial cell is genetically modified for overexpression of haemoglobin, preferably *Vitreoscilla* haemoglobin.

Any of the above described embodiments of increasing SAM levels can be combined in the microbial cell.

In another embodiment, any of the modifications described above could be used to produce other polyamines, such as spermine. This can be achieved, by increasing the activity of spermine synthase [EC 2.5.1.22], which can be done, for example, by overexpressing the *S. cerevisiae* gene encoding spermine synthase (SPE4, SEQ ID NO: 128) in *S. cerevisiae* or *E. coli*. Alternatively, spermine synthase from other organisms, e.g. *Triticum aestivum, Oryza sativa, Glycine max, Citrus sinesis, Homo sapiens, Bos taurus*, could also be expressed. In addition, conversion of spermine back to spermidine can be reduced by reducing the activity of Polyamine oxidase [EC 1.5.3.17], for example by disrupting the native gene encoding this enzyme, e.g. FMS1 in *S. cerevisiae*.

Thus, in an embodiment, the microbial cell is genetically modified for enhanced spermine biosynthesis. In a particular embodiment, the microbial cell is genetically modified for overexpression of spermine synthase [EC 2.5.1.22].

In another embodiment, export of polyamines to the media can be facilitated. This can be accomplished by overexpression of different export proteins, such as yeast TPO1, TPO2, TPO3, TPO4 and TPO5; *Escherichia coli* MdtJI, *Shigella* MdtJI, mammalian SLC3A2, *Bacillus* subtillis Blt transporter and/or mammalian MDR1. In addition, genes associated with polyamine uptake, such as yeast DUR3, SAM3, AGP2 and/or GAP1 can be down-regulated or deleted. Alternatively, increased intracellular presence of polyamines could be achieved by down-regulation or deletion of the polyamine transporters TPO1, TPO2, TPO3, TPO4 or TPO5.

Thus, in an embodiment, the microbial cell is genetically modified for enhanced polyamine export by overexpression of at least one polyamine export protein selected from the group consisting of *Saccharomyces cerevisiae* TPO1, TPO2, TPO3, TPO4 and TPO5, *Escherichia coli* MdtJI, mammalian SLC3A2, *Bacillus* subtillis Blt transporter and mammalian MDR1.

In another embodiment, the microbial cell is a *Saccharomyces cerevisiae* cell and is genetically modified for reduced polyamine uptake by downregulation of at least one polyamine uptake protein selected from the group consisting of *Saccharomyces cerevisiae* DUR3, SAM3, AGP2 and GAP1.

In another embodiment of the invention, the export of polyamines into the media is increased by the overexpression of transcription factors responsible for regulating exporters involved in the pleiotropic drug response. For example, the genes PDR1 (SEQ ID NO: 30) and/or PDR2 (SEQ ID NO: 129) could be overexpressed in *S. cerevisiae*.

Thus, in an embodiment, the microbial cell is genetically modified for overexpression of *Saccharomyces cerevisiae* PDR1 and/or PDR2.

In another embodiment, the resistance of the above strains to polyamine toxicity is increased. Downregulation and/or deletion of several genes have been associated with increased resistance to polyamine toxicity in yeast. This includes SR protein kinase (SRPK) (encoded by SKY1), Putative serine/threonine protein kinase (encoded by PTK2), BRP1 and FES1. In addition, overexpression of several native genes has been associated with increased resistance to polyamine toxicity. This includes QDR3 and YAP1. The above genes can be overexpressed and/or down-regulated in various combinations to allow for optimal resistance to polyamine toxicity in yeast.

Thus, in an embodiment, the microbial cell is a *Saccharomyces cerevisiae* cell and is genetically modified for downregulation of at least one gene selected from a group consisting of SKY1 encoding SR protein kinase (SRPK), PTK2 encoding putative serine/threonine protein kinase, BRP1 and FES1.

In another embodiment, the microbial cell is genetically modified for overexpression of *Saccahromyces cerevisiae* QDR3 and/or YAP1.

In an a further embodiment, the microbial cell is genetically modified for overexpression of a member of the multi-drug and toxin extrusion (MATE) family, preferably overexpression of the *Saccharomyces cerevisiae* gene ERC1, and more preferably a gene encoding *S. cerevisiae* ERC1 comprising at least one mutation selected from a group consisting of S51N, V263I, and N545I.

In another embodiment, the levels of S-adenosylmethionine are increased by overexpression of subunits of the RNA Polymerase II mediator complex. For example, GAL11 (SEQ ID NO: 31) could be overexpressed in *S. cerevisiae*.

Thus, in an embodiment, the microbial cell is genetically modified for overexpression of subunits of the RNA Polymerase II mediator complex, preferably overexpression of *Saccharomyces cerevisiae* GAL11.

In an embodiment, the microbial cell is capable of producing more than 100 mg of spermidine per L of culture medium, and/or more than 10 mg of spermidine per g DCW.

In a particular embodiment, the microbial cell is capable of producing more than 250 mg, preferably more than 500 mg, and more preferably more than 750 mg, such as more than 1 g of spermidine per L of culture medium.

In an alternative or additional particular embodiment, the microbial cell is capable of producing more than 15 mg, preferably more than 25 mg, and more preferably more than 30 mg spermidine per g DCW.

The above described embodiments may be combined.

Another aspect of the embodiments, which optionally may be combined with any of the above described embodiments, relates to a microbial cell capable of producing spermidine. The microbial cell comprises at least one heterologous gene encoding an enzyme selected from a group consisting of carboxy(nor)spermidine dehydrogenase (CASDH/CANSDH) [EC 1.5.1.43], also referred to as carboxynorspermidine synthase; and carboxynorspermidine decarboxylase (CANSDC) [EC 4.1.1.96].

This aspect of the embodiments thereby provides a microbial cell capable of producing spermidine through the condensation of putrescine and L-aspartate-4-semialdehyde. In particular, CASDH catalyzes the following reaction L-aspartate 4-semialdehyde+putrescine+NADPH+H$^+$→carboxyspermidine+H$_2$O+NADP$^+$. CANSDC then catalyzes the conversion of carboxyspermidine into spermidine carboxyspermidine→spermidine+CO$_2$.

In a particular embodiment of this aspect, the microbial cell is genetically modified for attenuated activity of endogenous homoserine dehydrogenase [EC 1.1.1.3] or by deletion or disruption of an endogenous gene encoding homoserine dehydrogenase.

A further aspect of the embodiments relates to a method for producing spermidine. The method comprises culturing a microbial cell according to any of the embodiments in a culture medium and in culture conditions suitable for production of spermidine from the microbial cell. The method also comprises collecting spermidine from the culture medium and/or the microbial cell.

In an embodiment, the culture medium comprises methionine.

Yet another aspect of the embodiments relates to use of a microbial cell according to any of the embodiments as a food additive.

Spermidine has, as mentioned in the foregoing, positive effects including, for instance, promoting longevity and alleviating or protecting against a variety of age-associated conditions, such as cancer, multiple sclerosis, osteoporosis, cardiovascular disease, memory impairment, skin ageing and hair loss. Accordingly, a spermidine producing microbial cell according to the embodiment can then be used as a food additive. In such a case, the microbial cell is a microbial cell generally recognized as safe (GRAS). The microbial cell could be used as food additive to any food suitable to be enriched by microbial cells. A non-limiting, but illustrative, example is yogurt.

EXAMPLES

Example 1

Increasing Spermidine Production in a Microbial Cell by Increased Flux Towards Putrescine with Expression of Heterologous Genes Able to Convert Putrescine and L-Aspartate-4-Semialdehyde to Spermidine The present example demonstrates that introduction of heterologous enzymes able to convert putrescine and L-aspartate-4-semialdehyde into spermidine further increases spermidine production in a microbial cell previously engineered to produce high levels of putrescine. The modifications introduced rely primarily on yeast strains previously engineered to produce high levels of L-ornithine, a direct precursor to putrescine (Qin et al [5]). These strains were modified to further increase flux towards putrescine, and further by overexpression of heterologous carboxyspermidine dehydrogenase (CASDH, also known as carboxynorspermidine synthase) [EC 1.5.1.43] and carboxyspermidine decarboxylase (CASDC) [EC 4.1.1.96].

Putrescine can be synthesized from ornithine via the actions of ornithine decarboxylase (ODC). In yeast, ODC is regulated via the ODC antizyme (OAZ), which binds to ODC and targets it for degradation. Therefore, we increased flux towards putrescine by simultaneously deleting OAZ (encoded by the gene OAZ1) and overexpressing ODC (encoded by the gene SPE1). The experimental procedure for strain construction was as follows: The SPE1 gene was PCR amplified from CEN.PK113-11C genomic DNA (with primer pairs 9/10) and fused to promoter TEF1p (with primer pairs 7/8) and terminator PRM9t (with primer pairs 11/12). The resulting fragment TEF1p-SPE1-PRM9t was fused to the 3' site of KanMX cassette, which is PCR amplified from plasmid PUCE, resulting in fragment KanMX-TEF1p-SPE1-PRM9t (primer pairs 3/12). To integrate SPE1 in the OAZ1 locus and simultaneously delete the OAZ1 gene, the 300 bp of the 5'ORF of OAZ1 (with primer pairs 1/2) and the 300 bp 3'ORF of OAZ1 (with primer pairs 13/6) were PCR amplified from CEN.PK113-11C genomic DNA, resulting in DNA fragments OAZ1-UP and OAZ1-DOWN respectively. Then, fusion PCR was used to fuse OAZ1-UP and OAZ1-DOWN to fragment KanMX-TEF1p-SPE1-PRM9t (with primer pairs 1/6), resulting in fragment OAZ1-UP-KanMX-TEF1p-SPE1-PRM9t-OAZ1-DOWN.

The fragment was used for transformation via the LiAc/SS carrier DNA/PEG method (Gietz et al [8]) of ornithine over-producing strain ORN-L (MATa SUC2 MAL2-8c ura3-52 his3-Δ1 ARG3p::KEX2p car2Δ::LoxP-CTC1t-AGC1-tHXT7p-TPIp-ORT1-pYX212t ura3::LoxP-TEF1p-GDH1-DIT1t) (Qin et al [5]). The transformants were selected on G418 plates and were verified by colony PCR, resulting in putrescine over-producing strain PUT-B(KanMX) (MATa SUC2 MAL2-8c ura3-52 his3-Δ1 ARG3p::KEX2p car2Δ::LoxP-CTC1t-AGC1-tHXT7p-TPIp-ORT1-pYX212t ura3::LoxP-TEF1p-GDH1-DIT1toaz1Δ::LoxP-KanMX-LoxP-TEF1p-SPE1-PRM9t). All primers used in this implementation are listed in Table 4.

To enable over-production of spermidine with the so-called carboxyspermidine spermidine pathway, CASDH and CASDC from either *Campylobacter jejuni* (CjCASDH and CjCASDC) or *Vibrio cholera* (VcCASDH and VcCASDC) were evaluated. All genes used were codon-optimized for expression in *S. cerevisiae* by Genscript (Piscataway, NJ, USA).

The DNA assembler method (Shao et al [6]) was used for construction of plasmids YP1 (expressing CjCASDH and CjCASDC) and YP2 (expressing VcCASDH and VcCASDC). For construction of plasmid YP1, CjCASDH (nucleotide SEQ ID NO: 10; corresponding protein SEQ ID NO: 149) and CjCASDC (nucleotide SEQ ID NO: 11; corresponding protein SEQ ID NO: 150) were amplified (with primer pairs 132/133 and 137/136, respectively) from pUC57-CjCASDH and pUC57-CjCASDH respectively. Promoters TPI1p (with primer pairs 130/131), PGK1p (with primer pairs 18/19), TEF1p (with primer pairs 20/8) were amplified from CEN.PK113-11C genomic DNA. The terminators FBA1t-CYC1t (with primer pairs 134/135) were amplified from plasmid GO4 (Qin et al [5]). The terminator pYX212t was amplified from plasmid pYX212 (with primer pairs 9/294). TPI1p, CjCASDH, FBA1t, CYC1t which has overhangs to each other were fused by fusion PCR resulting in the fragment TPI1p-CjCASDH-FBA1t-CYC1t. Following the same fusion PCR procedure, FBA1t, CYC1t, CjCASDC, PGK1p, TEF1p and pYX212t were fused to construct the fragment FBA1t-CYC1t-CjCASDC-PGK1p-TEF1p-pYX212t). A yeast 2μ vector pYX212 containing a URA3 selection marker was used and linearized by digestion with restriction enzyme Sph I and EcoR I. The linearized vector accompanied with fragments TPI1p-CjCASDH-FBA1t-CYC1t and FBA1t-CYC1t-CjCASDC-PGK1p-TEF1p-pYX212t were transformed into *S. cerevisiae* BY4741 and selected on the uracil free plates ("SC-URA") following a LiAc/SS carrier DNA/PEG method. Cell density (OD at 600 nm) was measured by GENESYS 20 spectrophotometer (Thermo Scientific). Plasmids extracted from transformants by Zymoprep Yeast Plasmid Miniprep II kit were transformed into *E. coli* DH5a and purified after overnight cultivation, yielding plasmid YP1.

For construction of plasmid YP2, VcCASDH (nucleotide SEQ ID NO: 12, corresponding protein SEQ ID NO: 151) and VcCASDC (nucleotide SEQ ID NO: 13; corresponding protein SEQ ID NO: 152) were amplified (with primer pairs 140/141 and 143/142, respectively) from pUC57-VcCASDH and pUC57-VcCASDH respectively. Promoters TPI1p, PGK1p, TEF1p, terminators FBA1t, CYC1t were amplified from CEN.PK113-11C genomic DNA with primers listed in Table 4 as described above. The terminator pYX212t was amplified from plasmid pYX212 with primers listed in Table 4 as described above. TPI1p, VcCASDH, FBA1t, CYC1t which has overhangs to each other were fused by fusion PCR resulting in the fragment TPI1p-VcCASDH-FBA1t-CYC1t. Following the same fusion PCR procedure as for plasmid YP1, CYC1t, VcCASDC, PGK1p, TEF1p and pYX212t were fused to construct the fragment CYC1t-VcCASDC-PGK1p-TEF1p-pYX212t. A yeast 2μ vector pYX212 containing a URA3 selection marker was used and linearized by digestion with restriction enzyme Sph1 and EcoRI. The linearized vector accompanied with fragments TPI1p-VcCASDH-FBA1t-CYC1t and CYC1t-VcCASDC-PGK1p-TEF1p-pYX212t were transformed into *S. cerevisiae* BY4741 and selected on the uracil free plates ("SC-URA") following a LiAc/SS carrier DNA/PEG method. Cell density (OD at 600 nm) was measured by GENESYS 20 spectrophotometer (Thermo Scientific). Plasmids extracted from transformants by Zymoprep Yeast Plasmid Miniprep II kit were transformed into *E. coli* DH5α and purified after overnight cultivation yielding plasmid YP2. All plasmids were verified by restriction digest and sequencing.

The strain PUT-B(KanMX) (described above) was then transformed with either two empty plasmids (pYX212+p423GPD) to act as control (resulting in strain SPDC3), YP1 and p423GPD to evaluate CjCASDH/CjCASDC (resulting in strain SPD11), or YP2 and p423GPD to evaluate VcCASDH/VcCASDC (resulting in strain SPD12). All strains were verified by PCR.

The performance of the strains was compared in triplicates via shake-flask cultivations. For shake-flask cultivations, Delft medium(H) was used consisting of the following (per liter): $(NH_4)_2SO_4$, 7.5 g; $KH_2PO_4$, 14.4 g; $MgSO_4 \cdot 7H_2O$, 0.50 g; trace metals, 1 ml and vitamins, 1 ml. The trace metal solution consisted of the following (per liter): $Na_2EDTA \cdot 5H_2O$, 19.0 g; $ZnSO_4 \cdot 7H_2O$, 0.45 g; $MnCl_2 \cdot 4H_2O$, 1 g; $CoCl_2 \cdot 6H_2O$, 0.3 g; $CuSO_4 \cdot 5H_2O$, 0.3 g; $Na_2MoO_4 \cdot 2H_2O$, 0.4 g; $CaCl_2 \cdot 2H_2O$, 0.45 g; $FeSO_4 \cdot 7H_2O$, 0.3 g; $H_3BO_3$, 1 g and KI, 0.10 g. The pH of the trace metal solution was adjusted to 4.0 with 2 M NaOH prior to heat sterilization. The vitamin solution contained (per liter): d-biotin, 0.05 g; p-amino benzoic acid, 0.2 g; nicotinic acid, 1 g; Ca-pantothenate, 1 g; pyridoxine-HCl, 1 g; thiamine-HCl, 1 g and myo-inositol, 25 g. The pH of the vitamin solution was adjusted to 6.5 with 2 M NaOH. The vitamin solution was filter sterilized and stored at 4° C. This medium was supplemented with 20 g/liter glucose. Single colonies were initially inoculated into 2 ml liquid medium and cultivated for 24 to 36 hours. The cells were then grown in 100 ml shake flasks with 20 ml medium for 5 days (120 hours) with the initial OD 0.05 at 200 rpm, 30° C.

Fermentation sample was prepared by taking 0.1 ml of liquid culture. Fermentation sample was subject to Hot Water (HW) Extraction (Canelas et al [9]). Tubes containing 0.9 ml of Delft medium were preheated in a water bath at 100° C. for 10 min. Then, the hot Delft medium was quickly poured over the 0.1 ml of fermentation sample; the mixture was immediately vortexed, and the sample was placed in the water bath. After 30 min, each tube was placed on ice for 5 min. After centrifugation, the supernatant was directly used for derivatization. For derivatization, the procedure was adapted from (Kim et al [2]). In brief, 0.25 ml of saturated $NaHCO_3$ solution and 0.5 ml of dansyl chloride solution (5 mg/ml in acetone) were added to 0.5 ml of sample. Then the reaction mixture was incubated at 40° C. for 1 h in the dark with occasional shaking. The reaction was stopped by adding 0.1 ml 25% ammonium hydroxide; followed by 0.3 ml of MeOH. Samples filtered through a 25 mm syringe filter (0.45 μm Nylon) were used for HPLC detection which is equipped with a Kinetex® 2.6 μm C18 100 Å column (100×4.6 mm, Phenomenex, Torrance, USA). The following chromatographic condition are used: excitation wavelength 340 nm, emission wavelength 515 nm, sample injected was 10 µl, column temperature 40° C., detector sensitivity 7, acquisition started at 3.4 min. The mobile phase was water and methanol with the speed of 1 ml/min. The elution program was as follows: from 0 to 5 min, 50% to 65% MeOH; from 5 to 7.5 min, 65% to 75% MeOH; from 7.5 to 9.5 min, 75% to 87.5% MeOH; from 9.5 to 10.5 min, 87.5% to 100% MeOH; from 10.5 to 11.5 min, 100% MeOH; from 11.5-13.5 min, 100% to 50% MeOH; from 13.5 to 16 50% MeOH. The results are shown in Table 6.

Figure 3:
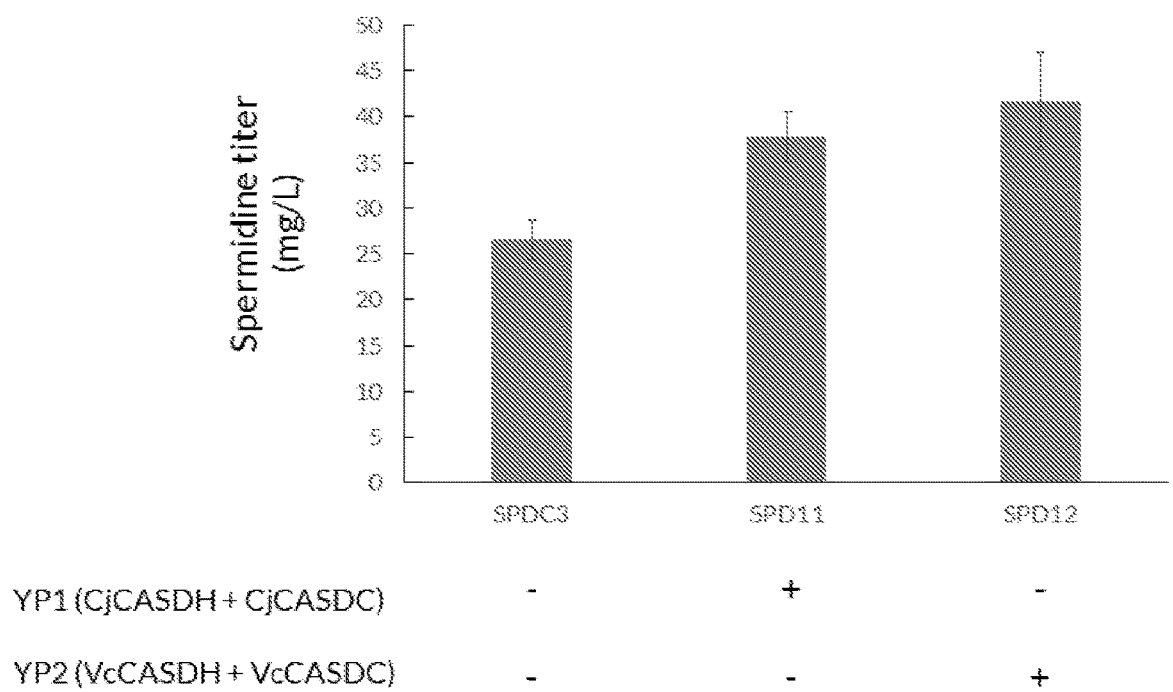
FIG. 3: Production of spermidine in a microbial cell by overexpression of heterologous pathway genes. In this example, spermidine is produced from the condensation of putrescine and L-aspartate-4-semialdehyde. The heterologous enzymes carboxy(nor)spermidine dehydrogenase (CASDH/CANSDH) [EC 1.5.1.43] and carboxy(nor)spermidine decarboxylase (CASDC/CANSDC) [EC 4.1.1.96] are over-expressed in a yeast cell. Enzymes are taken from either *Campylobacter jejuni* (plasmid YP1) or *Vibrio cholera* (plasmid YP2). Overexpression of these enzymes in yeast results in increased spermidine production.

The results showed that overexpression of either CjC-ASDH and CjCASDC or VcCASDH and VcCASDC had a positive effect on spermidine production (FIG. 3), with the best-producing strain (SPD12), producing 42 mg/L of spermidine.

Example 2

Increasing Spermidine Production in a Microbial Cell by Increasing Metabolic Flux Towards L-Aspartate-4-Semialdehyde The present example demonstrates that spermidine production in a microbial cell can be further increased by increasing the metabolic flux towards L-aspartate-4-semialdehyde. This is achieved by overexpressing a three-step pathway to convert oxaloacetic acid into L-aspartate-4-semialdehyde, in combination with reduction of flux to a competitive reaction catalysed by Homoserine dehydrogenase, which catalyze the step converting L-aspartate-4-semialdehyde into homoserine.

In order to increase flux from oxaloacetic acid to L-aspartate-4-semialdehyde, Aspartate aminotransferase [EC 2.6.1.1] encoding gene aspB (CgaspB) (SEQ ID NO: 14), aspartate kinase [EC 2.7.2.4] with mutation T311I encoding gene lysC (Cglycm) (SEQ ID NO: 15) and aspartate-4-semialdehyde dehydrogenase [EC 1.2.1.11] encoding gene asd (Cgasd) (SEQ ID NO: 16) were chosen to be overexpressed in a yeast cell. All genes were codon-optimized and synthesized by Genscript (Piscataway, NJ, USA). The Gibson assembly method (Gibson et al [7]) was used for construction of plasmid GP1 which overexpresses Cglycm, Cgasd and CgaspB. To construct plasmid GP1, the genes Cglycm, Cgasd and CgaspB were amplified from PUC57-Cglycm, PUC57-Cgasd and PUC57-CgaspB respectively (using the primer pairs 180/181, 185/184 and 186/187, respectively). The promoters TDH3p, PGK1p and TEF1p were amplified from yeast CEN.PK113-11C genomic DNA with the primer pairs 25/26, 18/19 and 20/8, respectively. The terminators TDH2t-ADH1t and FBA1t-TPI1t were amplified from plasmids GO4/YO4 (Qin et al [5]) with the primer pairs 182/183 and 134/194, respectively. TDH3p, Cglycm, TDH2t and ADH1t which have overhangs to each other were fused by fusion PCR resulting in the fragment TDH3p-Cglycm-TDH2t-ADH1t. Following the same fusion PCR procedure, Cgasd, PGK1p, TEF1p, CgaspB, FBA1t and TPI1t were fused to construct the fragment Cgasd-PGK1p-TEF1p-CgaspB-FBA1t-TPI1t. A yeast 2µ vector p423GPD containing a HIS3 selection marker was used as the backbone plasmid. These fragment were assembled together to form plasmid GP1 by Gibson Assembly Master Mix (New England BioLabs) according to manufacturer's instructions. The plasmids extracted from E. coli were verified by restriction digestion and sequencing. All primers used in this implementation are listed in Table 4.

Figure 4:
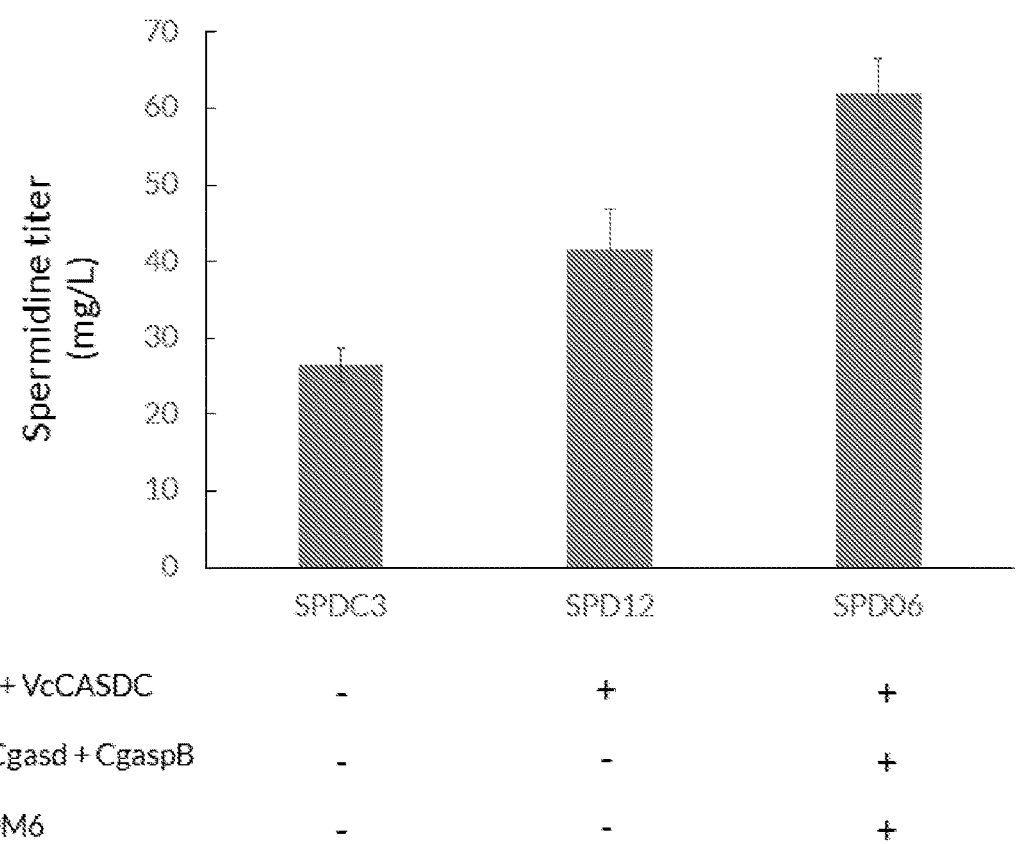
FIG. 4: Production of spermidine in a microbial cell by combining overexpression of spermidine synthetic genes and upregulation of the pathway leading to L-aspartate-4-semialdehyde formation. Increasing the flux towards L-aspartate-4-semialdehyde was achieved by overexpression of heterologous Aspartate kinase (Cglyc$_m$), Aspartate-semialdehyde dehydrogenase (Cgasd) and Aspartate aminotransferase (CgaspB). In addition, flux towards the competitive Homoserine dehydrogenase reaction was decreased by inserting a weak Kex2p promoter in front of the endogenous gene encoding Homoserine dehydrogenase (HOME). All modifications were performed in the yeast *S. cerevisiae*. The figure shows that increasing the flux towards L-aspartate-4-semialdehyde and decreasing flux to competitive reactions resulted in increased production of spermidine compared to overexpression of the spermidine biosynthetic genes alone.

In order to decrease flux towards the competitive reaction that converts L-aspartate-4-semialdehyde to homoserine, we set to decrease the activity of the homoserine dehydrogenase enzyme that catalyzes this reaction by inserting a weaker promoter in front of the native gene encoding this reaction (HOM6 in S. cerevisiae). The weak promoter chosen was the KEX2 promoter (KEX2p). Seamless gene insertion was performed by using Kluyveromyces lactis URA3 (K1URA3) as a selection marker, which was looped out by homologous recombination of direct repeats, and selection on SC+5-FOA plates. The promoter insertion cassettes were constructed by fusion PCR. The KEX2p which is amplified from CEN.PK113-11C genomic DNA (with primer pairs 201/202) was fused to the 3' of the K1URA3 (with primer pairs 199/200) with fusion PCR resulting in fragment K1URA3-KEX2p. The promoter region, the 5' part of the HOM6 ORF was amplified from CEN.PK113-11C genomic DNA. These fragments were fused together by fusion PCR resulting in the promoter insertion fragment HOM6p-Repeat-K1URA3-KEX2p-5'HOM6 (with primer pairs 197/204). The fragment was then used to transform to putrescine producing strain PUT-B(KanMX)(MATa SUC2 MAL2-8c ura3-52 his3-Δ1 ARG3p::KEX2p car2Δ::LoxP-CTC1t-AGC1-tHXT7p-TPIp-ORT1-pYX212t ura3::LoxP-TEF1p-GDH1-DIT1t oaz1Δ::LoxP-KanMX-LoxP-TEF1p-SPE1-PRM9t). Clones were verified by colony PCR. Subsequently, 3-5 clones with correct module integration were cultivated overnight in YPD liquid medium and then plated on SC-5-FOA plates to loop out K1URA3. Once again, the right clones were verified with colony PCR resulting in strain PUT-B(KanMX)-HOM6 (MATa SUC2 MAL2-8c ura3-52 his3-Δ1 ARG3p::KEX2p car2Δ::LoxP-CTC1t-AGC1-tHXT7p-TPIp-ORT1-pYX212t ura3::LoxP-TEF1p-GDH1-DIT1t oaz1Δ::LoxP-KanMX-LoxP-TEF1p-SPE1-PRM9t HOM6p::KEX2p). Plasmid GP1 together with plasmid YP2 were co-transformed into strain PUT-B(KanMX)-HOM6 resulting in spermidine producing strain SPD06. All primers used in this implementation are listed in Table 4. The strains were cultivated and analyzed as described in Example 1 above. We found that the strain SPD06 could produce significantly more spermidine than a similar strain without engineering to increase flux towards L-aspartate-4-semialdehyde (FIG. 4).

Example 3

Increasing Spermidine Production in a Microbial Cell by Increasing Metabolic Flux in the Methionine Salvage Pathway The present example demonstrates that spermidine production in a spermidine overproducer can be significantly improved by increasing the flux in the methionine salvage pathway. Specifically, this was done by increasing the activities of the rate-controlling enzymes in this pathway, Methylthioadenosine phosphorylase (MTAP) and Branched-chain Amino acid Transaminase (BAT). Increasing the flux in the methionine salvage pathway allowed for higher levels of SAM, resulting in increased amounts of decarboxylated S-adenosylmethionine (dSAM), which acts as an aminopropyl donor for spermidine synthesis. We have tested the effects of enhanced methionine salvage pathway on spermidine production in yeast strains previously engineered for spermidine accumulation.

To increase MTAP [EC 2.4.2.28] activity, the endogenous MEU1 gene (nucleotide SEQ ID NO: 17; corresponding protein SEQ ID NO: 147) was chosen for overexpression in yeast via the plasmid YP6. The plasmid was constructed by the DNA assembler method. First, MEU1 and promoter TPIp were amplified from CEN.PK113-11C genomic DNA using the primer pairs 157/162 and 156/29, respectively. The terminator pYX212t was amplified from plasmid pYX212 (with primer pairs 15/159). TPI1p, MEU1 and pYX212t which has overhangs to each other were fused by fusion PCR, resulting the fragment TPI1p-MEU1-pYX212t (with primer pairs 156/159). A yeast 2μ vector pYX212 containing a URA3 selection marker was used and linearized by digestion with the restriction enzymes Sph1 and EcoRI. The linearized vector accompanied with fragments TPI1p-MEU1-pYX212t were transformed into S. cerevisiae BY4741 and selected on the uracil free plates ("SC-URA") following a LiAc/SS carrier DNA/PEG method. Cell density (OD at 600 nm) was measured by GENESYS 20 spectrophotometer (Thermo Scientific). Plasmids extracted from transformants by Zymoprep Yeast Plasmid Miniprep II kit were transformed into E. coli DH5α and purified, yielding plasmid YP6.

To increase BAT [EC 2.6.1.42] activity, the endogenous BAT2 gene (nucleotide SEQ ID NO: 18; corresponding protein SEQ ID NO: 148) was chosen for overexpression in yeast via the plasmid YP7. The DNA assembler method was used for construction of plasmid YP7. BAT2 and the promoter TPI1p were amplified from CEN.PK113-11C genomic DNA with the primer pairs 160/161 and 156/29, respectively. The terminator pYX212t was amplified from plasmid pYX212 (with primer pairs 15/159). TPI1p, BAT2 and pYX212t which have overhangs to each other were fused by fusion PCR, resulting the fragment TPI1p-BAT2-pYX212t. A yeast 2μ vector pYX212 containing a URA3 selection marker was used and linearized by digestion with the restriction enzymes Sph1 and EcoRI. The linearized vector accompanied with fragments TPI1p-BAT2-pYX212t were transformed into S. cerevisiae BY4741 and selected on the uracil free plates ("SC-URA") following a LiAc/SS carrier DNA/PEG method. Cell density (OD at 600 nm) was measured by GENESYS 20 spectrophotometer (Thermo Scientific). Plasmids extracted from transformants by Zymoprep Yeast Plasmid Miniprep II kit were transformed into E. coli DH5α and purified, yielding plasmid YP7. All plasmids were verified by digestion and sequencing.

Figure 5:
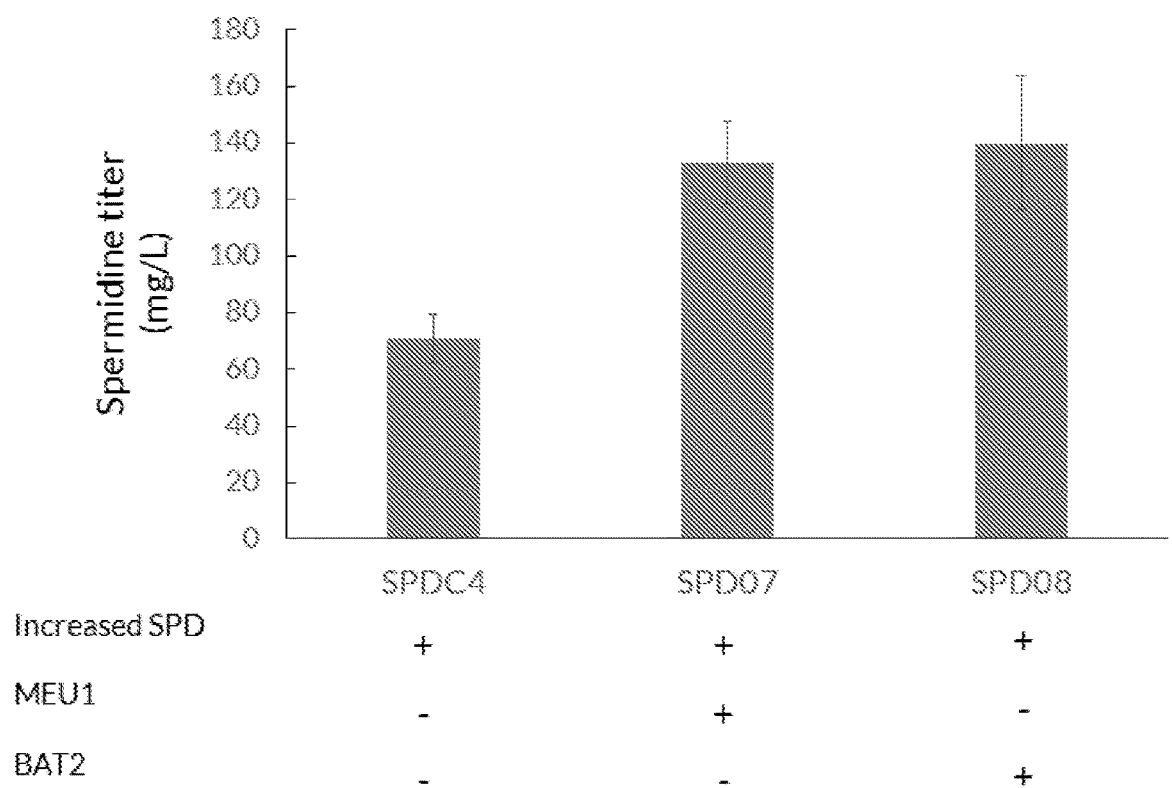
FIG. 5: Production of spermidine in a microbial cell by combining overexpression of spermidine synthetic genes including S-adenosylmethionine decarboxylase (EC 4.1.1.50) and spermidine synthase (EC 2.5.1.16), as well as putrescine biosynthetic pathway ("increased SPD") and upregulation of the methionine salvage pathway. Increasing the activity of either methylthioadenosine phosphorylase (MTAP) [EC 2.4.2.28] through overexpression of the endogenous MEU1 gene, or branched-chain amino acid transaminase (BAT) [EC 2.6.1.42] through overexpression of the endogenous BAT2 gene in *S. cerevisiae* allowed for increased flux through the methionine salvage pathway, and increased spermidine production.

The plasmids YP6 or YP7 were evaluated in the strain SPD-B(KanMX) (MATa SUC2 MAL2-8c ura3-52 his3-Δ1 ARG3p::KEX2p car2Δ::LoxP-CTC1t-AGC1-tHXT7p-TPIp-ORT1-pYX212t ura3::LoxP-TEF1p-GDH1-DIT1t oaz1Δ::LoxP-KanMX-LoxP-pYX212t-SPE3-PGK1p-TEF1p-SPE1-PRM9t-DIT1t-SPE2-TDH3p) which was previously engineered for increased putrescine production as well as increased conversion of putrescine to spermidine via overexpression of spermidine synthase and S-adenosylmethionine decarboxylase. This strain was constructed using the same procedure as described in Example 1. The strain SPD-B(KanMX) was transformed with either pYX212 and GO4 (an empty plasmid and a plasmid encoding biosynthetic steps for ornithine production, respectively), YP6 and G04, or YP7 and GO4. This resulted in the strains SPDC4, SPD07 and SPD08, respectively. All strains were verified by sequencing and evaluation by cultivation and analytics as described in Example 1 above. The results showed that while SPDC4 could already produce high levels of spermidine, spermidine production could be doubled by increasing flux through the methionine salvage pathway via overexpression of either MEU1 or BAT2 (FIG. 5).

Example 4

Further Increasing Spermidine Production by Overexpression of a Heterologous Spermidine Synthase and Fed-Batch Fermentation The present example demonstrates that the modifications described so far can be further combined with overexpression of a heterologous spermidine synthase [EC 2.5.1.16] from Triticum aestivum (TaSPDS), which is more efficient than the native yeast SPDS to further increase spermidine production. Furthermore, subjecting the best-producing strain to fed-batch fermentation allowed for a very strong increase in spermidine production titers.

Thus spermidine synthase encoding gene TaSPDS from Triticum aestivum (wheat) was chosen to be codon-optimized and synthesized by Genscript (Piscataway, NJ, USA). TaSPDS (SEQ ID NO: 19) accompanied with SPE1 (SEQ ID NO: 20) and SPE2 (SEQ ID NO: 21) were subject to co-overexpression based on chromosomal integration in the OAZ1 loci. Fragments contain promoters, terminators, TaSPDS (with primer pairs 283/282), SPE1, SPE2, KanMX cassette, ~300 bp of 5' OAZ ORF and ~300 bp of 3' OAZ1 ORF were fused together following the method as described in example 1. All the related fragments were co-transformed in to L-ornithine platform strains ORN-L (MATa SUC2 MAL2-8c ura3-52 his3-Δ1 ARG3p::KEX2p car2Δ::LoxP-CTC1t-AGC1-tHXT7p-TPIp-ORT1-pYX212t ura3::LoxP-TEF1p-GDH1-DIT1t) (Qin et al [5]). The transformations were selected on G418 plates. Clones were verified by colony PCR, resulting strain in SPD-D (KanMX) (MATa SUC2 MAL2-8c ura3-52 his3-Δ1 ARG3p::KEX2p car2Δ:: LoxP-CTC1t-AGC1-tHXT7p-TPIp-ORT1-pYX212t ura3:: LoxP-TEF1p-GDH1-DIT1t oaz14::LoxP-KanMX-LoxP-pYX212t-TaSPDS-PGK1p-TEF1p-SPE1-PRM9t-DIT1t-SPE2-TDH3p).

Next, the genes MEU1 and BAT2 above were combined into a single plasmid (YP8), which was constructed via the DNA assembler method. MEU1, BAT2, promoter TPI1p, TEF1p and PGK1p, the terminator FBA1t and CYC1t were amplified from CEN.PK113-11C genomic DNA with primers listed in Table 4 as described in Example 3 above. The terminator pYX212t were amplified from plasmid pYX212 with primers listed in Table 4 as described in Example 3 above. TPI1p, MEU1, FBA1t, CYC1t, BAT2, PGK1p, TEF1p and pYX212t which has overhangs to each other were fused by fusion PCR, resulting in the fragment TPI1p-MEU1-FBA1t-CYC1t-BAT2-PGK1p-TEF1p-pYX212t. A yeast 2μ vector pYX212 containing a URA3 selection marker was used and linearized by digestion with restriction enzyme Sph1 and EcoRI. The linearized vector accompanied with fragments TPI1p-MEU1-FBA1t-CYC1t-BAT2-PGK1p-TEF1p-pYX212t were transformed into S. cerevisiae BY4741 and selected on the uracil free plates ("SC-URA") following a LiAc/SS carrier DNA/PEG method. Plasmids extracted from transformants by Zymoprep Yeast Plasmid Miniprep II kit were transformed into E. coli DH5α and purified, yielding plasmid YP8. The plasmid was verified by restriction digest and sequencing.

The plasmid YP8 was transformed into strain SPD-D (KanMX), yielding strain SPD10, able to produce 149 mg/L of spermidine when cultivated as described above.

In order to improve the fermentation efficiency and increase the TYR (titre, yield and rate), a glucose limited fed-batch fermentation was developed. The aerobic fed-batch process was performed in 1 L DasGip bench fermenters with working volume of 0.8 liter. Agitation at 800 rpm was maintained using an integrated stirrer (DasGip, Jülich, Germany) and the temperature kept at 30° C. The rate of aeration was set to 1 vvm. The pH of the medium was maintained at 4.0 by automatic addition of 2 N KOH during the batch phase and 3 N KOH in the feed phase. The temperature, agitation, gassing, pH and composition of the off-gas were monitored and controlled using the DasGip monitoring and control system. Dissolved oxygen concentration was monitored with an autoclavable polarographic oxygen electrode (Mettler Toledo, Columbus, OH, USA) and kept above 30% via stirrer speed and gas flow rate using the DasGip control system. The effluent gas from the fermentation was analyzed for real-time determination of oxygen and $CO_2$ concentration by DasGip Fedbatch Pro® gas analysis systems with the off gas analyzer GA4 based on zirconium dioxide and two-beam infrared sensor.

The fed-batch cultures were initiated as batch cultures using 10 g/liter glucose. Feeding with fresh medium commenced only after residual ethanol produced from the glucose consumption phase was completely depleted. A feed strategy was designed keeping the volumetric growth rate constant. An exponential feed rate v(t) (liter/h) was calculated according to [10]:

$$v(t) = \frac{Y_{xs}\mu_0}{s_f - s_0} x_0 V_0 \exp(\mu_0 t)$$

where $x_0$, $s_0$ and $V_0$ were the biomass density (g DCW/liter), the substrate concentration (g/liter) and the reactor volume (liter) at the start of the fed-batch process, $Y_{xs}$ was the respiratory yield coefficient (g glucose/g DCW); $s_f$ was the concentration of the growth limiting substrate (g glucose/liter) in the reservoir; $\mu_0$ to the was the specific growth rate (h-1) during the feed phase and t the feeding time. According to the equation above the feed was increased exponentially with a specific feed rate of 0.06 h-1. Correct feed rate addition was obtained programming the fermenter fb-pro software (DasGip) and controlled using the DasGip control system.

Figure 6:
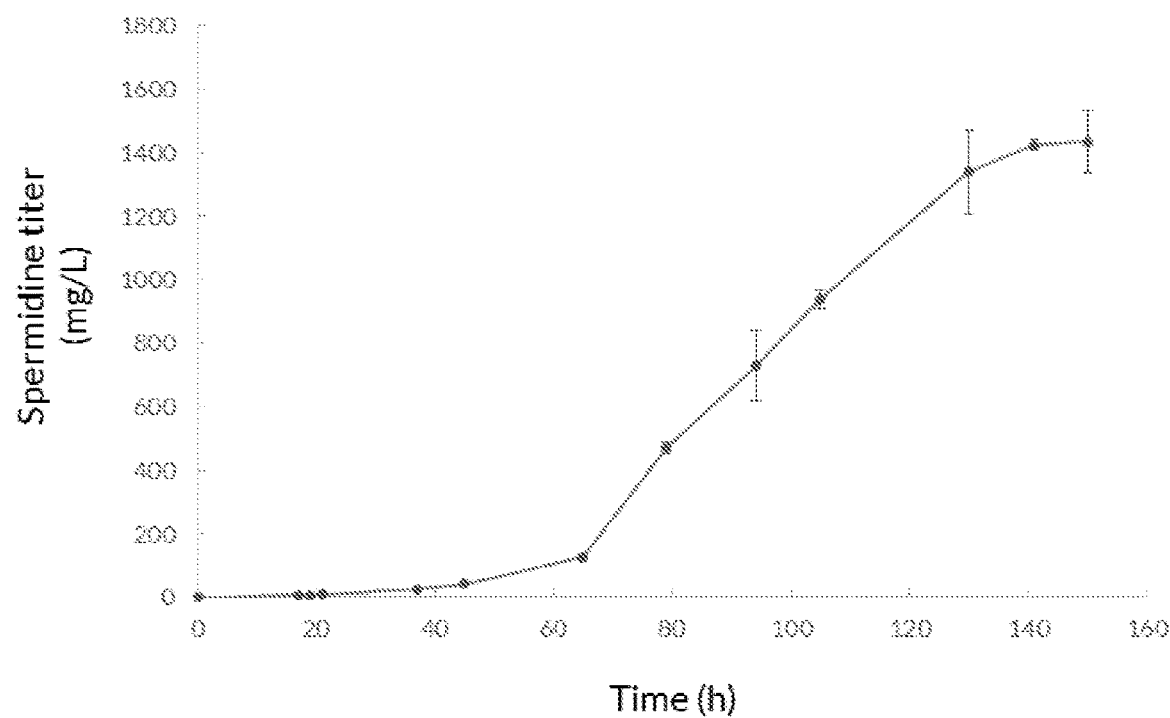
FIG. 6: Production of spermidine in a microbial cell via fed-batch fermentation. The best-producing strain (SPDC10) was grown under glucose-limited fed-batch conditions, resulting in a production of up to 1.4 g/L of spermidine.
Figure 7:
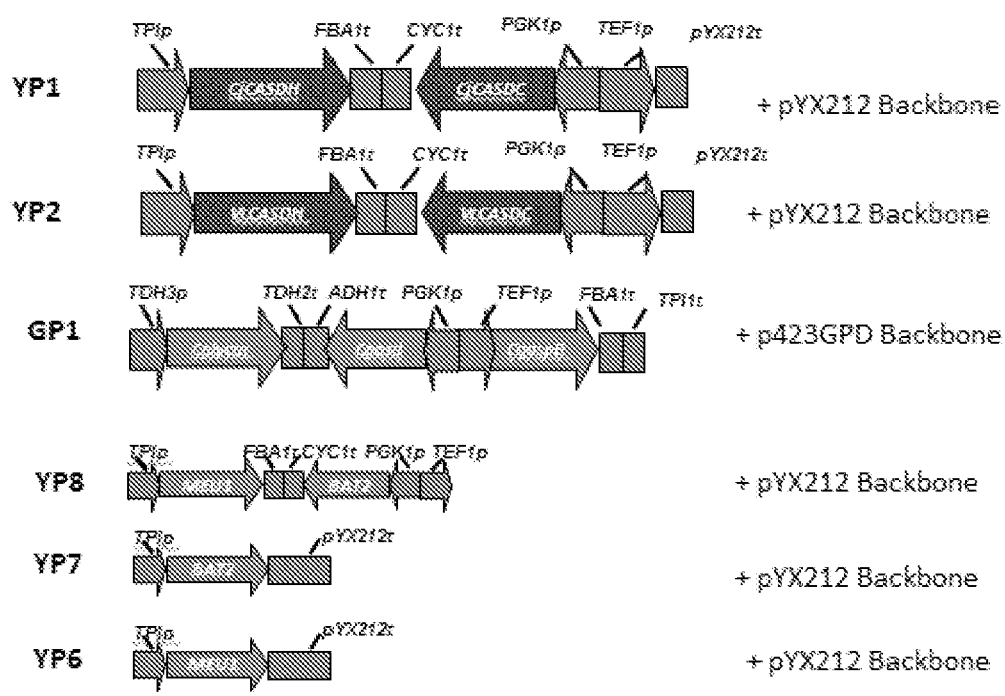
FIG. 7: Map of the constructs used for plasmid expression in examples 1-4.

For batch cultivations, Delft medium was used consisting of the following (per liter): $(NH_4)_2SO_4$, 5 g; $KH_2PO_4$, 3 g; $MgSO_4 \cdot 7H_2O$, 0.50 g; 0.05 ml; trace metals, 1 ml and vitamins, 1 ml. The trace metal solution consisted of the following (per liter): $Na_2EDTA \cdot 5H_2O$, 19.0 g; $ZnSO_4 \cdot 7H_2O$, 0.45 g; $MnCl_2 \cdot 4H_2O$, 1 g; $CoCl_2 \cdot 6H_2O$, 0.3 g; $CuSO_4 \cdot 5H_2O$, 0.3 g; $Na_2MoO_4 \cdot 2H_2O$, 0.4 g; $CaCl_2 \cdot 2H_2O$, 0.45 g; $FeSO_4 \cdot 7H_2$, 0.3 g; $H_3BO_3$, 1 g and KI, 0.10 g. The pH of the trace metal solution was adjusted to 4.0 with 2 M NaOH prior to heat sterilization. The vitamin solution contained (per liter): d-biotin, 0.05 g; p-amino benzoic acid, 0.2 g; nicotinic acid, 1 g; Ca-pantothenate, 1 g; pyridoxine-HCl, 1 g; thiamine-HCl, 1 g and myo-inositol, 25 g. The pH of the vitamin solution was adjusted to 6.5 with 2 M NaOH. The vitamin solution was filter sterilized and stored at 4° C. This medium was supplemented with 10 g/liter glucose. The feed composition used for fed-batch cultivation had the same composition as described above, but the $(NH_4)_2SO_4$; $KH_2PO_4$; $MgSO_4 \cdot 7H_2O$, vitamin solution, and trace metal solution concentrations were increased 3 to 5 times, the glucose concentration was set to 200 to 600 g/liter. Glucose-limited fed-batch fermentation allowed for a strong increase in spermidine production, increasing spermidine titers to as much as 1.4 g/L (FIG. 6).

Example 5

Spermidine Production is Increased by Overexpression of S-Adenosylmethionine Synthetase (MAT)

The present example demonstrates that spermidine production can be increased by increasing synthesis of S-adenosylmethionine (SAM). Increase in the synthesis of SAM is obtained through overexpression of S-adenosylmethionine synthetase (MAT) [EC 2.5.1.6], which catalyzes the transfer of the adenosyl group of ATP to the sulfur atom of methionine to form SAM. To study the effects of MAT overexpression on spermidine production, two heterologous MATs were expressed in the yeast *Saccharomyces cerevisiae*. The first MAT was MAT from *Streptomyces spectabilis* (SsMAT) wherein lysine 18, leucine 31, isoleucine 65 and/or aspartic acid 341 are mutated into arginine, proline, valine and glycine, respectively (K18R, L31P, I65V, D341G) (protein SEQ ID NO: 1). The second MAT was from *Leishmania infantum JPCM5* (SiMAT, protein SEQ ID NO: 25).

Each gene was synthesized with codon optimization for expression in *S. cerevisiae*. The nucleotide sequences of the codon-optimized genes (flanked by restriction sites XbaI/XhoI and including a kozak sequence) are SEQ ID NO: 138 for SsMAT and SEQ ID NO: 139 for SiMAT. Both genes were then amplified by PCR using primers HX-fwd/HX-rev. The purified PCR products were digested using XbaI/XhoI and each one was cloned into plasmid p416TEF [11] under the control of the TEF1 promoter, resulting in plasmids pBPSPD.ST01 (expressing SsMAT) and pBPSPD.ST02 (expressing SiMAT). Both were confirmed by digestion/agarose gel electrophoresis and sequencing.

The background strain used for testing the constructs was SPD-G(KanMX) which contains modifications in the ornithine and spermidine metabolism to facilitate flux towards spermidine production, but no modifications in the SAM metabolism. This strain was obtained by overexpressing the polyamine transporter encoded by *S. cerevisiae* TPO4 in strain SPD-G(KanMX). This gene was expressed under the control of TPI1 promoter and END2 terminator. This strain was constructed using the same procedure as described in Example 1. The resulting genotype of the strain is MATa SUC2 MAL2-8c ura3-52 his3-Δ1 ARG3p::KEX2p car2Δ:: LoxP-CTC1t-AGC1-tHXT7p-TPIp-ORT1-pYX212t ura3:: LoxP-TEF1p-GDH1-DIT1t oaz1Δ::LoxP-KanMX-LoxP-pYX212t-TaSPDS-PGK1p-TEF1p-SPE1-PRM9t-DIT1t-SPE2-TDH3p-TPIp-TPO4-END2t.

To test the effect of MAT overexpression on spermidine production, strain SPD-G(KanMX) was transformed with either plasmid p416TEF (empty plasmid used as a control), plasmid pBPSPD.ST01, or plasmid pBPSPD.ST02, following a LiAc/SS carrier DNA/PEG method and selected on the uracil free plates ("SC-URA"). This resulted in strains SPD13, SPD14 and SPD15 (respectively).

The performance of the strains was compared in triplicates via shake-flask cultivations. For shake-flask cultivations, Delft medium(H) was used consisting of the following (per liter): $(NH_4)_2SO_4$, 7.5 g; $KH_2PO_4$, 14.4 g; $MgSO_4 \cdot 7H_2O$, 0.50 g; histidine, 100 mg; trace metals, 1 ml and vitamins, 1 ml. The trace metal solution consisted of the following (per liter): $Na_2EDTA \cdot 5H_2O$, 19.0 g; $ZnSO_4 \cdot 7H_2O$, 0.45 g; $MnCl_2 \cdot 4H_2O$, 1 g; $CoCl_2 \cdot 6H_2O$, 0.3 g; $CuSO_4 \cdot 5H_2O$, 0.3 g; $Na_2MoO_4 \cdot 2H_2O$, 0.4 g; $CaCl_2 \cdot 2H_2O$, 0.45 g; $FeSO_4 \cdot 7H_2O$, 0.3 g; $H_3BO_3$, 1 g and KI, 0.10 g. The pH of the trace metal solution was adjusted to 4.0 with 2 M NaOH prior to heat sterilization. The vitamin solution contained (per liter): d-biotin, 0.05 g; p-amino benzoic acid, 0.2 g; nicotinic acid, 1 g; Ca-pantothenate, 1 g; pyridoxine-HCl, 1 g; thiamine-HCl, 1 g and myo-inositol, 25 g. The pH of the vitamin solution was adjusted to 6.5 with 2 M NaOH. The vitamin solution was filter sterilized and stored at 4° C. This medium was supplemented with 20 g/liter glucose and the pH was adjusted to 6 using 6M KOH. Single colonies were initially inoculated into 3 ml liquid medium and cultivated for 24 to 36 hours. The cells were then grown in 100 ml shake flasks with 20 ml medium for 3 days (72 hours) with the initial OD 0.1 at 200 rpm, 30° C.

Figure 8:
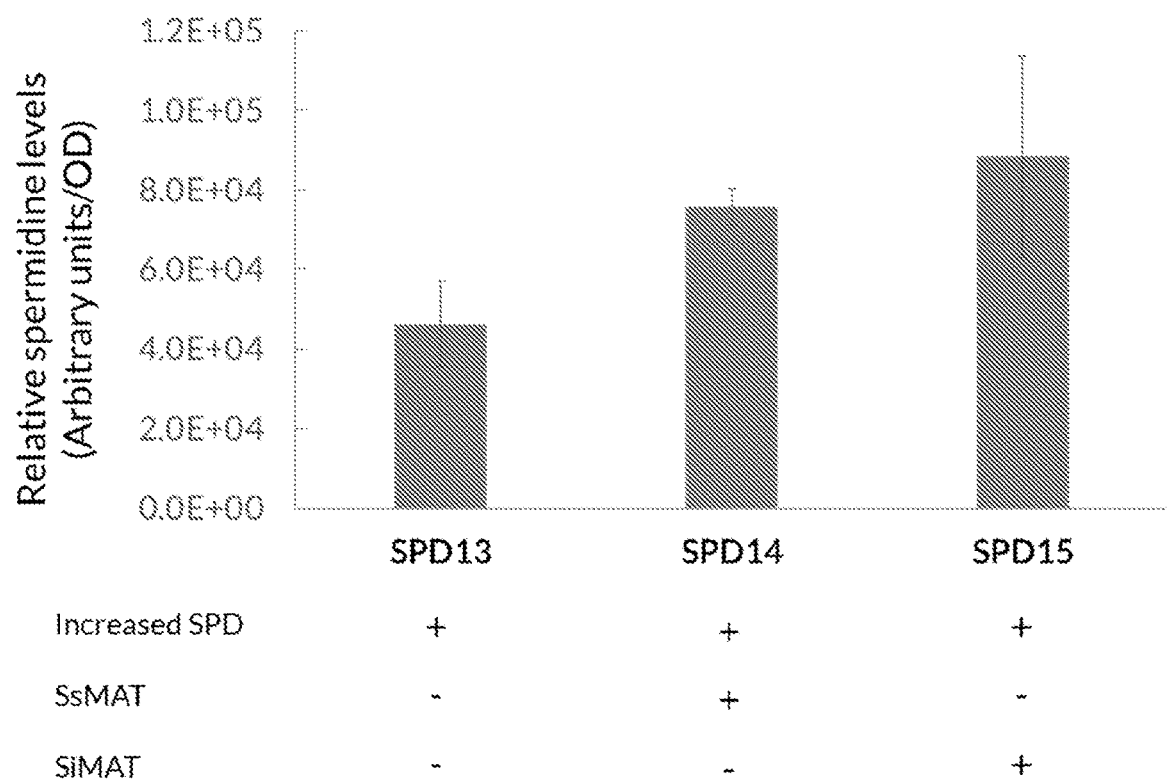
FIG. 8: Production of spermidine in a microbial cell by combining overexpression of spermidine synthetic genes including S-adenosylmethionine decarboxylase (EC 4.1.1.50) and spermidine synthase (EC 2.5.1.16), as well as putrescine biosynthetic pathway ("increased SPD") and overexpression of methionine adenosyltransferase (MAT) [EC 2.5.1.6]. Increasing the activity of MAT through overexpression of either mutated MAT from *Streptomyces spectabilis* (SsMAT) or MAT from *Leishmania infantum* JPCM5 (SiMAT) in *S. cerevisiae* resulted in increased spermidine production compared to a strain not overexpressing MAT.

Spermidine production by the strains was analyzed as described in Example 1 and normalized by the OD of the respective culture. The results showed that expression of either MAT resulted in increased spermidine production. Expression of SsMAT (SPD14) increased spermidine production by 64%, while expression of SiMAT (SPD15) increased production by 90% relative to control that only harbored the empty plasmid (SPD13) (FIG. 8).

Example 6

Spermidine Production is Increased by Overexpression of a Chimeric Methylenetetrahydrofolate Reductase (MTHFR)

The present example demonstrates that spermidine production can be increased by increasing the activity of Methylenetetrahydrofolate reductase (MTHFR) [EC 1.5.1.20], which catalyzes the reduction of 5,10-methylenetetrahydrofolate to 5-methyltetrahydrofolate used to methylate homocysteine in methionine biosynthesis. In this example, a chimeric MTHFR comprised of the yeast Met13p N-terminal catalytic domain and the *Arabidopsis thaliana* MTHFR (AtMTHFR-1)C-terminal regulatory domain (ScAtMTHFR; protein SEQ ID NO: 3) was used. The gene was codon-optimized for expression in *S. cerevisiae* and synthesized. The nucleotide sequence of the codon-optimized gene (flanked by restriction sites XbaI/XhoI and including a kozak sequence) is SEQ ID NO: 140.

The gene was PCR amplified using primers HX-fwd/HX-rev. The purified PCR product was digested using XbaI/XhoI and cloned into plasmid p416TEF under the control of the TEF1 promoter, resulting in plasmid pBPSPD.ST03. Plasmid pBPSPD.ST03 was confirmed by restriction digestion and sequencing and transformed into strain SPD-G (KanMX) using the LiAc/SS carrier DNA/PEG method, followed by selection on uracil free plates ("SC-URA"), resulting in strain SPD16.

Figure 9:
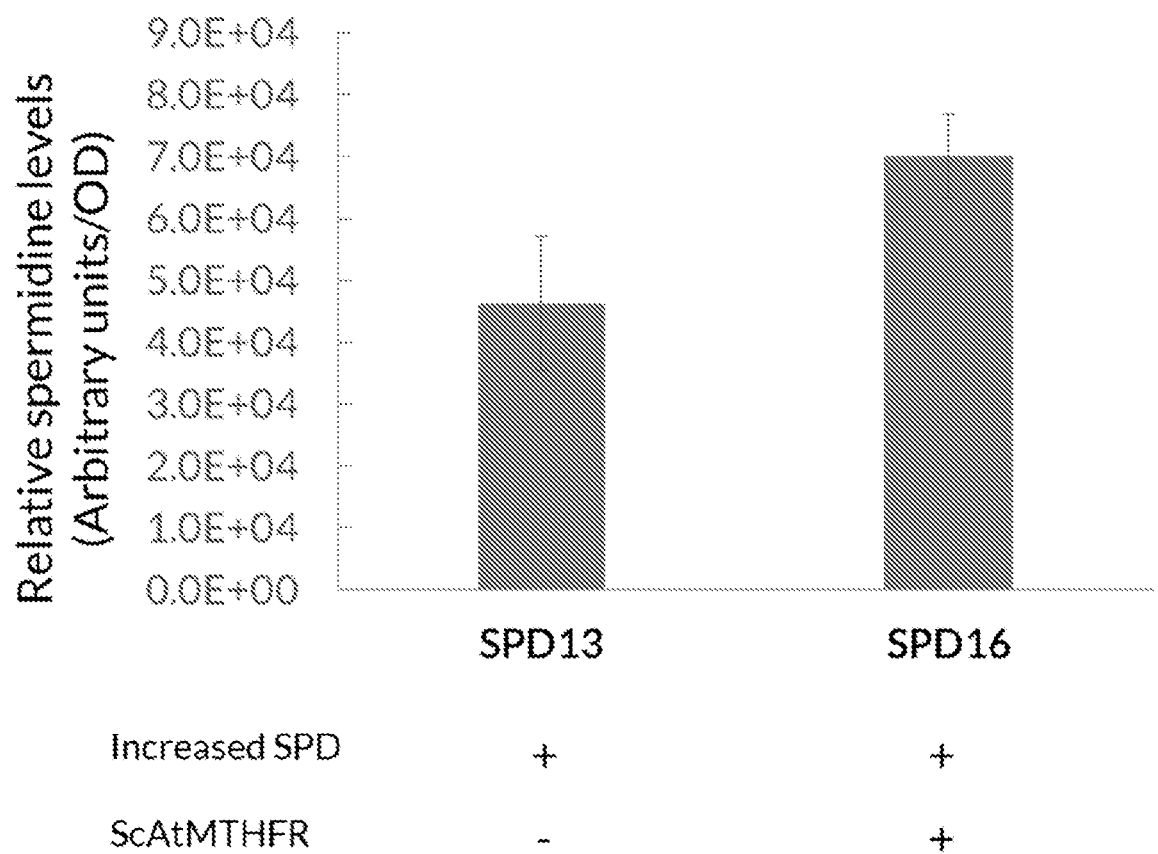
FIG. 9: Production of spermidine in a microbial cell by combining overexpression of spermidine synthetic genes including S-adenosylmethionine decarboxylase (EC 4.1.1.50) and spermidine synthase (EC 2.5.1.16), as well as putrescine biosynthetic pathway ("increased SPD") and overexpression of methylenetetrahydrofolate reductase (MTHFR) [EC 1.5.1.20]. Increasing the activity of MTHFR through overexpression of a chimeric MTHFR comprised of the yeast Met13p N-terminal catalytic domain and the *Arabidopsis thaliana* MTHFR (AtMTHFR-1)C-terminal regulatory domain (ScAtMTHFR) in *S. cerevisiae* resulted in increased spermidine production compared to a strain not overexpressing MTHFR.

To test the effect of MTHFR overexpression, strain SPD16 and strain SPD13 (control strain not overexpressing MTHFR) were cultivated as described in Example 5 and analyzed as describe in Example 1. Spermidine production was normalized by the OD of the respective culture. The results showed that overexpression of ScAtMTHFR (strain SPD16) resulted in 50% increase in spermidine production compared to a strain not overexpressing MTHFR (strain SPD13, which only harbours an empty plasmid), confirming that increased MTHFR activity has a positive effect on spermidine production (FIG. 9).

Example 7

Spermidine Production is Increased by Overexpression of Transcription Factors Responsible for Regulating Exporters Involved in the Pleiotropic Drug Response The present example demonstrates that overexpression of transcription factors involved in the pleiotropic drug response (*S. cerevisiae* PDR1 and PDR2) results in increased spermidine production.

PDR1 (nucleotide SEQ ID NO: 141; corresponding protein SEQ ID NO: 30) and PDR2 (also known as YRR1; nucleotide SEQ ID NO: 142; corresponding protein SEQ ID NO: 129) were each amplified from the *S. cerevisiae* genome by PCR using primers PDR1-fwd/PDRR1-rev and PDR2-fwd/PDRR2-rev, respectively and cloned into plasmid p416TEF using restriction enzymes XbaI/BamHI and XhoI/BamHI, respectively. This resulted in plasmids pBPSPD.ST04 (expressing PDR1) and pBPSPD.ST05 (expressing PDR2). Both plasmids were confirmed by digestion/agarose gel electrophoresis and sequencing. The plasmids were then separately transformed into strain SPD-G (KanMX) using the LiAc/SS carrier DNA/PEG method and selected on uracil free plates ("SC-URA"), resulting in strains SPD17 (containing pBPSPD.ST04) and SPD18 (containing pBPSPD.ST05).

Figure 10:
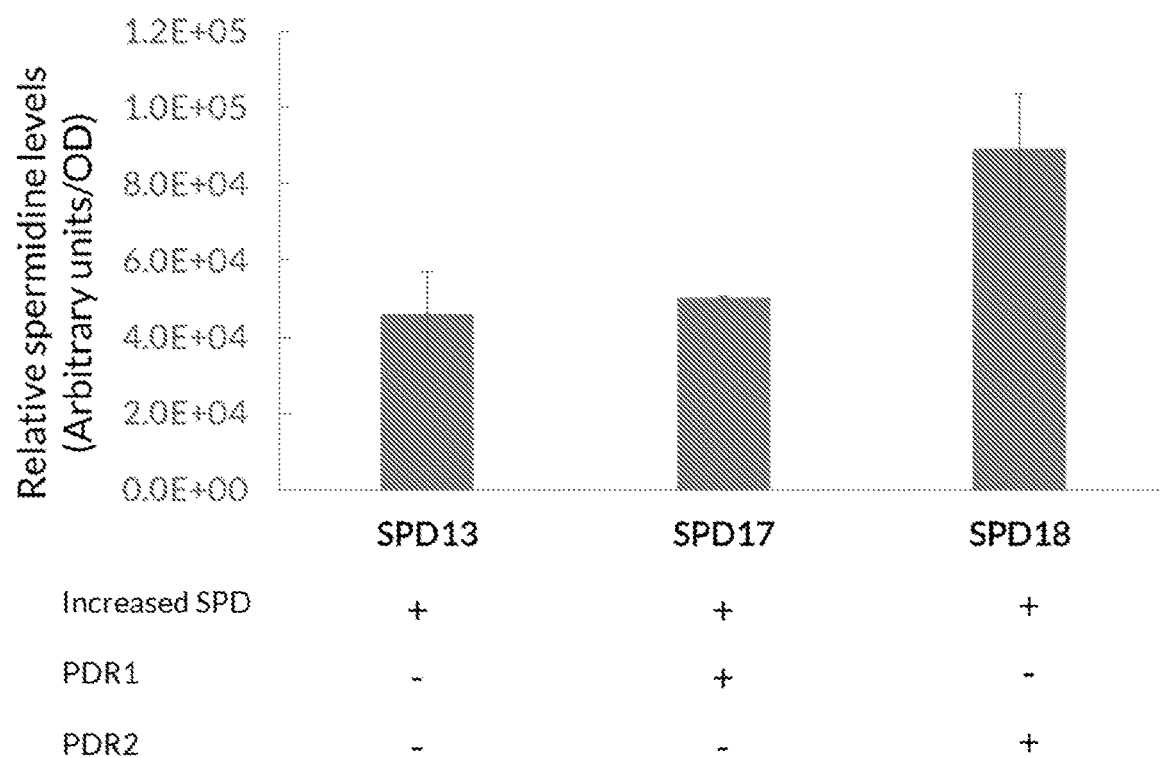
FIG. 10: Production of spermidine in a microbial cell by combining overexpression of spermidine synthetic genes including S-adenosylmethionine decarboxylase (EC 4.1.1.50) and spermidine synthase (EC 2.5.1.16), as well as putrescine biosynthetic pathway ("increased SPD") and overexpression of transcription factors involved in the pleiotropic drug response (*S. cerevisiae* PDR1 and PDR2). Overexpression of PDR1 or PDR2 in *S. cerevisiae* resulted in increased spermidine production compared to a strain not overexpressing any PDR.

The strains SPD17 and SPD18 were then cultivated along strain SPD13 (control strain harboring empty p416TEF and not overexpressing any PDR) as described in Example 5 and analyzed as describe in Example 1. Spermidine production was normalized by the OD of the respective culture. The results showed that overexpression of either PDR had a positive effect on spermidine production (FIG. 10). While overexpression of PDR1 (strain SPD17) resulted in a modest 9% increase in spermidine production, overexpression of PDR2 (strain SPD18) resulted in a 93% increase in spermidine production compared to control (strain SPD13, not overexpressing PDR1).

Example 8

Spermidine Production is Increased by Overexpression of Subunits of the RNA Polymerase II Mediator Complex The present example shows that overexpression of subunits of the RNA Polymerase II mediator complex, in particularly *S. cerevisiae* GAL11 (protein sequence shown in SEQ ID NO: 31) has a positive effect on spermidine production.

The gene GAL11 (nucleotide SEQ ID NO: 143) was amplified from the genome of *S. cerevisiae* strain CEN.PK113-7D using primers Gal11fwd/Gal11-rev and cloned into plasmids p416TEF and p416CYC [11] using restriction enzymes XbaI/BamHI. This resulted in plasmid pBPSPD.ST06 (with GAL11 Cloned under the control of a *S. cerevisiae* TEF1 promoter) and plasmid pBPSPD.ST07 (with GAL11 cloned under the control of a *S. cerevisiae* CYC1 promoter). Both plasmids were confirmed by digestion/agarose gel electrophoresis and sequencing.

The plasmids were then separately transformed into strain SPD-G(KanMX) using the LiAc/SS carrier DNA/PEG method and selected on uracil free plates ("SC-URA"), resulting in strains SPD19 (containing pBPSPD.ST06) and SPD20 (containing pBPSPD.ST07). The strains SPD19 and SPD20 were then cultivated along strain SPD13 (control strain harboring empty p416TEF and not overexpressing GAL11) as described in Example 5 and analyzed as describe in Example 1. Spermidine production was normalized by the OD of the respective culture.

Figure 11:
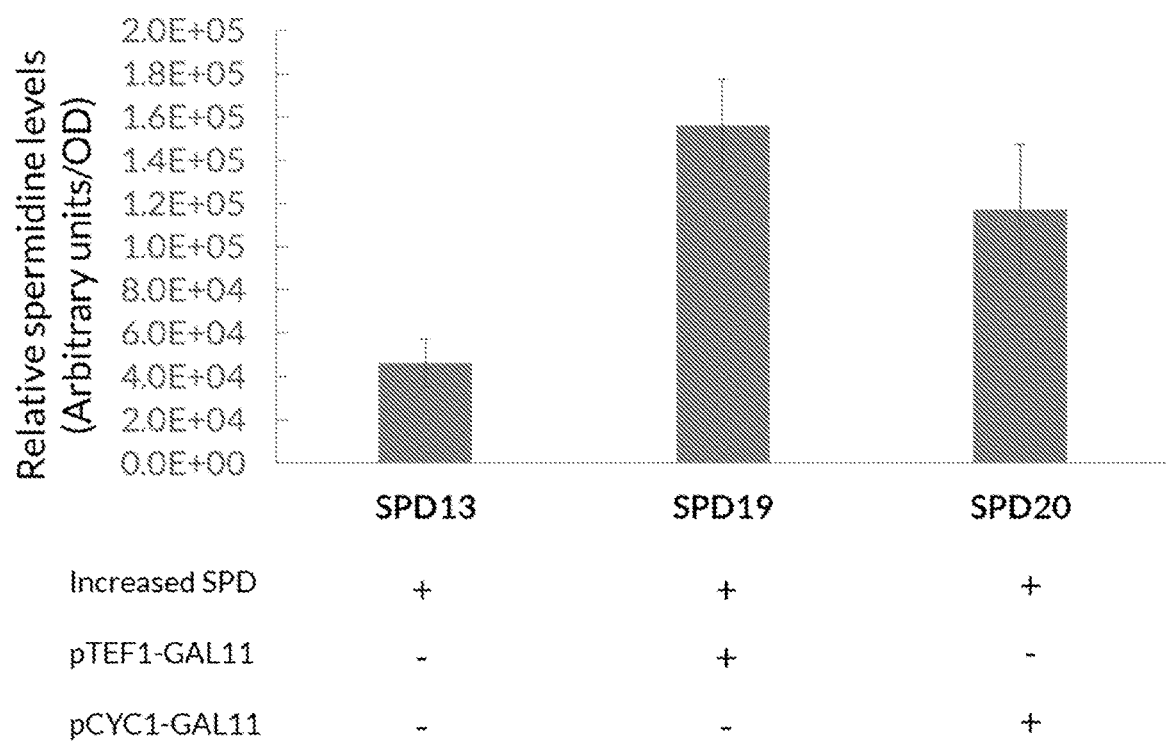
FIG. 11: Production of spermidine in a microbial cell by combining overexpression of spermidine synthetic genes including S-adenosylmethionine decarboxylase (EC 4.1.1.50) and spermidine synthase (EC 2.5.1.16), as well as putrescine biosynthetic pathway ("increased SPD") and overexpression of subunits of the RNA Polymerase II mediator complex, in particularly *S. cerevisiae* Overexpression of GAL11 under the control of either the TEF1 or CYC1 promoter in *S. cerevisiae* resulted in increased spermidine production compared to a strain not overexpressing GAL11.

The results showed that overexpression of GAL11 had a positive effect on spermidine production (FIG. 11). Overexpression of GAL11 under the control of the TEF1 promoter (strain SPD19) resulted in a 3.4-fold increase in spermidine production, while overexpression of GAL11 under the control of the CYC1 promoter (strain SPD20) resulted in a 2.5-fold increase in spermidine production, compared to control (strain SPD13, not overexpressing GAL11).

Example 9

Construction of Yeast Strains for Increased Spermine Production

The purpose of this example is to describe how to construct strains that have increased spermine production as a result of increased S-adenosylmethionine (SAM) levels.

In order to increase spermidine production by the cell, the gene Spermine Synthase (EC 2.5.1.22), encoded by *S. cerevisiae* SPE4 (nucleotide SEQ ID NO: 144; corresponding protein SEQ ID NO: 128) can be overexpressed.

To overexpress SPE4 in *S. cerevisiae*, SPE4 is amplified from the genome of *S. cerevisiae* and cloned into the vector pIYC04 [12] under the control of the TEF1 promoter, yielding plasmid pIYC04-SPE4. This plasmid is then co-transformed with either p416TEF (empty plasmid) into strain SPD-G(KanMX) or pBPSPD.ST02 (p416TEF expressing SiMAT), resulting in strains SPD21 and SPD22, respectively. Transformation is performed using the LiAc/SS carrier DNA/PEG method and selected on uracil and histidine free plates ("SC-URA-HIS"). The resulting strains are cultivated as described in Example 5, with the exception that no histidine is added to the media, and analyzed for spermine production as described in Example 1.

Example 10

Construction of Bacterial Cells for Increased Spermidine/Spermine Production

The purpose of this example is to describe how to construct bacterial strains that have increased spermine production as a result of increased S-adenosylmethionine (SAM) levels.

To create *E. coli* strain with increased spermidine production, the strain *E. coli* WL3110 (orig. K12 W3110 (CGSC, *Coli* Genetic Stock Center) can be used. This strain is transformed with either plasmids for overexpression of endogenous or heterologous speE (E.C.: 2.5.1.16; SEQ ID no. 145), speD (EC 4.1.1.50; SEQ ID no. 146) and MAT (EC 2.5.1.6; SEQ ID NO: 139) genes. For example the expression vector pTRC-LIC (Plasmid #62343; Addgene (Massachusetts, USA)) is used to systematically co-express the mentioned genes under control of the strong $P_{trc}$ promoter. Cloning is done via amplification of target genes through 30 bp overhang primers to the expression vector ($P_{trc}$ promoter control) and carried out via the Gibson cloning approach [13]. For the tailored production of spermine, heterologous spermine synthases (E.C. 2.5.1.22) from eukaryotic sources are expressed e.g. derived from *S. cerevisiae, Triticum aestivum, Oryza sativa, Glycine max, Citrus sinesis, Homo sapiens*. For example spermine synthase gene SPE4 (GI: 3201942; nucleotide SEQ ID NO: 144; corresponding protein SEQ ID NO: 128) is amplified from *S. cerevisiae* genomic DNA (CEN.PK113-11C) using PCR with 30 bp overhang primers and cloned via Gibson cloning (Gibson et al. 2009) into expression vector pTRC.

To create a *C. glutamicum* strain with increased spermidine production, the *C. glutamicum* strain ATCC 13032 can be used. For increased spermidine production the genes speE (SEQ ID no. 145), speD (EC 4.1.1.50; SEQ ID no. 146) and MAT (EC 2.5.1.6; SEQ ID NO: 139) can be overexpressed through a plasmid based expression. For example *E. coli-C. glutanicum* shuttle vector pMS2 (ATTC®67189TM) with kanamycin as selective marker can be used. 30 bp overhanging primers are used to amplify fragments and subsequently cloned via Gibson cloning [13] into the shuttle vector pMS2 with speE, speD and MAT under Ptac control creating the expression vector pFDAMS2. After transformation into the modified *C. glutanicum* strain ATCC 13032 strain (see above) it is cultivated as described in Schneider et al. 2010 [14]. For the production of spermine heterologous spermine synthases (E.C. 2.5.1.22) from eukaryotic sources are expressed via plasmid-based expression (see above). For example spermine synthases can be derived from *S. cerevisiae* (SPE4, (nucleotide SEQ ID NO: 144; corresponding protein SEQ ID NO: 128), *Triticum aestivum, Oryza sativa, Glycine max, Citrus sinesis, Homo sapiens*.

TABLE 1

Constructed background strains

| No | Strain | Genotype |
|---|---|---|
| 1 | WT-PUT-B(KanMX) | MATa SUC2 MAL2-8c ura3-52 his3-Δ1 oaz1Δ::LoxP-KanMX-LoxP-TEF1p-SPE1-PRM9t |
| 2 | WT-SPD-B(KanMX) | MATa SUC2 MAL2-8c ura3-52 his3-Δ1 oaz1Δ::LoxP-KanMX-LoxP-pYX212t-SPE3-PGK1p-TEF1p-SPE1-PRM9t-DIT1t-SPE2-TDH3p |
| 3 | PUT-B(KanMX) | MATa SUC2 MAL2-8c ura3-52 his3-Δ1 ARG3p::KEX2p car2Δ::LoxP-CTC1t-AGC1-tHXT7p-TPIp-ORT1-pYX212t ura3::LoxP-TEF1p-GDH1-DIT1t oaz1Δ::LoxP-KanMX-LoxP-TEF1p-SPE1-PRM9t |
| 4 | PUT-B(KanMX)-HOM6 | MATa SUC2 MAL2-8c ura3-52 his3-Δ1 ARG3p::KEX2p carΔ::LoxP-CTC1t-AGC1-tHXT7p-TPIp-ORT1-pYX212t ura3::LoxP-TEF1p-GDH1-DIT1t oaz1Δ::LoxP-KanMX-LoxP-TEF1p-SPE1-PRM9t HOM6p::KEX2p |
| 5 | SPD-B(KanMX) | MATa SUC2 MAL2-8c ura3-52 his3-Δ1 ARG3p::KEX2p car2Δ::LoxP-CTC1t-AGC1-tHXT7p-TPIp-ORT1-pYX212t ura3::LoxP-TEF1p-GDH1-DIT1t oaz1Δ::LoxP-KanMX-LoxP-pYX212t-SPE3-PGK1p-TEF1p-SPE1-PRM9t-DIT1t-SPE2-TDH3p |
| 6 | SPD-D(KanMX) | MATa SUC2 MAL2-8c ura3-52 his3-Δ1 ARG3p::KEX2p car2Δ::LoxP-CTC1t-AGC1-tHXT7p-TPIp-ORT1-pYX212t ura3::LoxP-TEF1p-GDH1-DIT1t oaz1Δ::LoxP-KanMX-LoxP-pYX212t-TaSPDS-PGK1p-TEF1p-SPE1-PRM9t-DIT1t-SPE2-TDH3p |
| 7 | SPD-G(KanMX) | MATa SUC2 MAL2-8c ura3-52 his3-Δ1 ARG3p::KEX2p car2Δ::LoxP-CTC1t-AGC1-tHXT7p-TPIp-ORT1-pYX212t ura3::LoxP-TEF1p-GDH1-DIT1t oaz1Δ::LoxP-KanMX-LoxP-pYX212t-TaSPDS-PGK1p-TEF1p-SPE1-PRM9t-DIT1t-SPE2-TDH3p-TPIp-TPO4-END2t |

TABLE 2

Plasmid constructs

| No | Plasmids | Genotype or characteristics | Backbone plasmid |
|---|---|---|---|
| 1 | YP1 | pYX212-CjCASDH-CjCASDC | pYX212 |
| 2 | YP2 | pYX212-VcCASDH-VcCASDC | pYX212 |
| 6 | GP1 | p423GPD-Cglycm-Cgasd-CgaspB | p423GPD |
| 7 | YP6 | PZW-MEU1 | pYX212 |
| 8 | YP7 | PZW-BAT2 | pYX212 |
| 9 | YP8 | PZW-MEU1-BAT2 | pYX212 |
| 10 | pBPSPD.ST01 | p416TEF-SsMAT | p416TEF |
| 11 | pBPSPD.ST02 | p416TEF-SiMAT | p416TEF |
| 12 | pBPSPD.ST03 | p416TEF-ScAtMTHFR | p416TEF |

TABLE 2-continued

Plasmid constructs

| No | Plasmids | Genotype or characteristics | Backbone plasmid |
|----|----------|------------------------------|------------------|
| 13 | pBPSPD.ST04 | p416TEF-PDR1 | p416TEF |
| 14 | pBPSPD.ST05 | p416TEF-PDR2 | p416TEF |
| 15 | pBPSPD.ST06 | p416TEF-GAL11 | p416TEF |
| 16 | pBPSPD.ST07 | p416CYC-GAL11 | p416CYC |
| 17 | pIYC04-SPE4 | pIYC04-SPE4 | pIYC04 |

TABLE 3

Polyamine over-producing strains

| No | Strain | Background strains | Plasmids transformed |
|----|--------|--------------------|----------------------|
| 1 | SPD01 | WT-PUT-B(KanMX) | YP1 + p423GPD |
| 2 | SPD02 | PUT-B(KanMX) | YP1 + GO4 |
| 3 | SPD03 | WT-PUT-B(KanMX) | YP2 + p423GPD |
| 4 | SPD04 | PUT-B(KanMX) | YP2 + GO4 |
| 5 | SPD05 | PUT-B(KanMX)-HOM6 | YP1 + GP1 |
| 6 | SPD06 | PUT-B(KanMX)-HOM6 | YP2 + GP1 |
| 7 | SPD07 | SPD-B(KanMX) | YP6 + GO4 |
| 8 | SPD08 | SPD-B(KanMX) | YP7 + GO4 |
| 9 | SPD09 | SPD-B(KanMX) | YP8 + GO4 |
| 10 | SPD10 | SPD-D(KanMX) | YP8 + GO4 |
| 11 | SPDC1 | WT-PUT-B(KanMX) | pYX212 + p423GPD |
| 12 | SPDC2 | PUT-B(KanMX) | pYX212 + GO4 |
| 13 | SPDC3 | PUT-B(KanMX) | pYX212 + p423GPD |
| 14 | SPDC4 | SPD-B(KanMX) | pYX212 + GO4 |
| 15 | SPD11 | PUT-B(KanMX) | YP1 + p423GPD |
| 16 | SPD12 | PUT-B(KanMX) | YP1 + p423GPD |
| 17 | SPD13 | SPD-G(KanMX) | p416TEF |
| 18 | SPD14 | SPD-G(KanMX) | pBPSPD.ST01 |
| 19 | SPD15 | SPD-G(KanMX) | pBPSPD.ST02 |
| 20 | SPD16 | SPD-G(KanMX) | pBPSPD.ST03 |
| 21 | SPD17 | SPD-G(KanMX) | pBPSPD.ST04 |
| 22 | SPD18 | SPD-G(KanMX) | pBPSPD.ST05 |
| 23 | SPD19 | SPD-G(KanMX) | pBPSPD.ST06 |
| 24 | SPD20 | SPD-G(KanMX) | pBPSPD.ST07 |
| 25 | SPD21 | SPD-G(KanMX) | pIYC04-SPE4 + p416TEF |
| 26 | SPD22 | SPD-G(KanMX) | pIYC04-SPE4 + pBPSPD.ST02 |

TABLE 4

Primers

| No | Oligo Name | SEQ ID NO | Sequence 5' to 3' (include modification codes if applicable) |
|----|------------|-----------|---------------------------------------------------------------|
| 1 | OAZ1-L-F1 | 32 | GTATGAAGTAATACAGAAAAGGAAAAC |
| 2 | OAZ1-L-R1(Kan) | 33 | GACCTGCAGCGTACGAAGCTTCAGCAATCTCTGGTGGAACGTCTAG |
| 3 | KanMX-F1 | 34 | CTGAAGCTTCGTACGCTGCAGGTC |
| 4 | KanMX-R1 | 35 | GGCCACTAGTGGATCTGATATCAC |
| 5 | OAZ1-R-F1(kan) | 36 | GTGATATCAGATCCACTAGTGGCCCCTGAACCAAAACTTCAAATTCGAATAC |
| 6 | OAZ1-R-R1 | 37 | GCATTCAAACTCTAAAATAACAAAG |
| 7 | TEF1P-F1(kan) | 38 | GTGATATCAGATCCACTAGTGGCCATAGCTTCAAAATGTTTCTACTCC |
| 8 | TEF1P-R1 | 39 | TTTGTAATTAAAACTTAGATTAGATTGC |
| 9 | SPE1-F1(TEF) | 40 | GCAATCTAATCTAAGTTTTAATTACAAAATGTCTAGTACTCAAGTAGGAAATGC |
| 10 | SPE1-R1(PRM9) | 41 | GTGCTAGTGTCTCCCGTCTTCTGTTCAATCGAGTTCAGAGTCTATGTATAC |
| 11 | PRM9t-F1 | 42 | ACAGAAGACGGGAGACACTAGCAC |
| 12 | PRM9t-R1 | 43 | ATTTTCAACATCGTATTTTCCGAAGC |
| 13 | OAZ1-R-F2(PRM9) | 44 | GCTTCGGAAAATACGATGTTGAAAATCCTGAACCAAAACTTCAAATTCGAATAC |
| 14 | pyx212t-R1(kan) | 45 | GTGATATCAGATCCACTAGTGGCCTGCCGTAAACCACTAAATCGGAACCC |
| 15 | pyx212t-F1 | 46 | TAGGGCCCACAAGCTTACGCGTCGAC |
| 16 | SPE3-R1(pyx212t) | 47 | GTCGACGCGTAAGCTTGTGGGCCCTACTAATTTAATTCCTTGGCTGCCCAG |
| 17 | SPE3-F1(PGK) | 48 | CTACTTTTTACAACAAATATAACAAAATGGCACAAGAAATCACTCACCCAAC |

TABLE 4-continued

Primers

| No | Oligo Name | SEQ ID NO | Sequence 5' to 3' (include modification codes if applicable) |
|---|---|---|---|
| 18 | PGK1p-R1 | 49 | TTTGTTATATTTGTTGTAAAAAGTAG |
| 19 | PGK1p-F1 | 50 | ACGCACAGATATTATAACATCTGCAC |
| 20 | TEF1p-F2(PGK1p) | 51 | GTGCAGATGTTATAATATCTGTGCGTATAGCTTCAAAATGTTTCTACTCC |
| 21 | DIT1t-R1(PRM9t) | 52 | CTTCGGAAAATACGATGTTGAAAATGTTACTCCGCAACGCTTTTCTGAACG |
| 22 | DIT1t-F1 | 53 | TAAAGTAAGAGCGCTACATTGGTCTACC |
| 23 | SPE2-R1(DIT1t) | 54 | GGTAGACCAATGTAGCGCTCTTACTTTATCATATTTTCTTCTGCAATTTCATATAG |
| 24 | SPE2-F1(TDH3p) | 55 | GTTTCGAATAAACACACATAAACAAACAAAATGACTGTCACCATAAAAGAATTGAC |
| 25 | TDH3p-R1 | 56 | TTTGTTTGTTTATGTGTGTTTATTCGAAAC |
| 26 | TDH3p-F1 | 57 | TCGAGTTTATCATTATCAATACTGCC |
| 27 | OAZ1-R-F3(TDH3p) | 58 | GGCAGTATTGATAATGATAAACTCGACCTGAACCAAAACTTCAAATTCGAATAC |
| 28 | TPIp-F1(TDH3p) | 59 | GGCAGTATTGATAATGATAAACTCGAGTTTAAAGATTACGGATATTTAACTTAC |
| 29 | TPIp-R1 | 60 | TTTTAGTTTATGTATGTGTTTTTTGTAGTTATAG |
| 130 | (ZHILIpYX212) TPIp-F1 | 61 | GTGAGGGAGACCTAACTACATAGTGTTTAAAGATTACGGATATTTAACTTACTTAGAATAATGCC |
| 131 | TPIp-R1 | 62 | TTTTAGTTTATGTATGTGTTTTTTGTAGTTATAG |
| 132 | CjCASDH-F1 | 63 | CTATAACTACAAAAAACACATACATAAACTAAAAATGAAGAATTTGTTGATCATCGGTGCT |
| 133 | CjCASDH-R1 | 64 | CTCATTAAAAAACTATATCAATTAATTTGAATTAACTTATTCACCCAATGATGGAGTCATTTCG |
| 134 | FBA1t-F1 | 65 | GTTAATTCAAATTAATTGATATAGTTTTTTAATGAG |
| 135 | CYC1t-F1 | 66 | GATACCGTCGACCTCGAGTCATGTAATTAGTTATG |
| 136 | CjCASDC-R1 | 67 | CATAACTAATTACATGACTCGAGGTCGACGGTATCTTAATTTCTTAATGAGTAATCTTTATAAGAAAATTC |
| 137 | CjCASDC-F1 | 68 | GTAATTATCTACTTTTTACAACAAATATAACAAAATGTTTTATGAAAAGATTCAAACTCCAGC |
| 138 | PGK1p-R2 | 69 | TTTGTTATATTTGTTGTAAAAAGTAGATAATTAC |
| 139 | TEFp-R(pYX212t) | 70 | GGATACCCGGGTCGACGCGTAAGCTTGTGGGCCCTATTTGTAATTAAAACTTAGATTAGATTGCTATGC |
| 140 | VcCASDH-F1 | 71 | CTATAACTACAAAAAACACATACATAAACTAAAAATGTCTATTTTGCAAATTGGTGCAGGTGG |
| 141 | VcCASDH-R1 | 72 | CTCATTAAAAAACTATATCAATTAATTTGAATTAACTTATTTAACAACTTGAATATCTGGTTGACCTGG |
| 142 | VcCASDC-R1 | 73 | CATAACTAATTACATGACTCGAGGTCGACGGTATCTTATTCAATTGACCATAAAGACAAAGTTC |
| 143 | VcCASDC-F1 | 74 | GTAATTATCTACTTTTTACAACAAATATAACAAAATGGAAACTTTGCAAGATATCGGTAC |
| 156 | (ZWM)TPIp-F-156 | 75 | CGTCCTCTCGAAAGGTGGTTTAAAGATTACGGATATTTAACTTAC |

TABLE 4-continued

Primers

| No | Oligo Name | SEQ ID NO | Sequence 5' to 3' (include modification codes if applicable) |
|---|---|---|---|
| 157 | (TPIp)MEU1-F-157 | 76 | CTACAAAAAACACATACATAAACTAAAAATGAACAGGATTAAGAATACATTTTCTG |
| 158 | MEU1-R(Pyx212t)-158 | 77 | GGTCGACGCGTAAGCTTGTGGGCCCTATTACCAATAGTTTGGAAATAAGTATC |
| 159 | Pyx212t-R(ZWM)-159 | 78 | CAGGTGGTCATGGCCCTTTGCCGTAAACCACTAAATCG |
| 160 | (TPIp)BAT2-F-160 | 79 | CTACAAAAAACACATACATAAACTAAAAATGACCTTGGCACCCCTAGAC |
| 161 | BAT2-R(Pyx212t)-161 | 80 | GGTCGACGCGTAAGCTTGTGGGCCCTATCAGTTCAAATCAGTAACAACC |
| 162 | MEU1-R(FBA1t)-162 | 81 | CATTAAAAAACTATATCAATTAATTTGAATTAACTTACCAATAGTTTGGAAATAAGTATC |
| 163 | BAT2-R(CYC1t)-163 | 82 | CATGACTCGAGGTCGACGGTATCTCAGTTCAAATCAGTAACAACCCTTG |
| 180 | (TDH3p)lysCm-F-180 | 83 | CGAATAAACACACATAAACAAACAAAATGGCTTTGGTTGTTCAAAAGTACG |
| 181 | lysCm-R(TDH2t)-181 | 84 | CTAAATCATTAAAGTAACTTAAGGAGTTAAATTTATCTACCAGTACCTGCGTAAAC |
| 182 | TDH2t-F-182 | 85 | ATTTAACTCCTTAAGTTACTTTAATGATTTAG |
| 183 | ADH1t-F1-183 | 86 | GCGAATTTCTTATGATTTATG |
| 184 | asd-R(ADH1t)-184 | 87 | CATAAATCATAAGAAATTCGCTTATTTAACTAACAATTCAGCAATTTGG |
| 185 | (PGK1p)asd-F-185 | 88 | CTACTTTTTACAACAAATATAACAAAATGACTACAATTGCTGTTGTTG |
| 186 | (TEF1p)aspB-F-186 | 89 | CAATCTAATCTAAGTTTTAATTACAAAATGTCTTCAGTTTCTTTACAAG |
| 187 | aspB-R(FBA1t)-187 | 90 | CATTAAAAAACTATATCAATTAATTTGAATTAACTTAATTAGCGTAATGTTCAGC |
| 194 | TPI1t-F(ZWM)-194 | 91 | CAGGTGGTCATGGCCCTTGATTAATATAATTATATAAAAATATTATCTTCTTTTC |
| 195 | Verify-HOM6-F-195 | 92 | CTTGCTTTCCAGTTGAAAAG |
| 196 | Verify-HOM6-R-196 | 93 | GACAGGGAAGGAAGTTGG |
| 197 | HOM6-L-F1-197 | 94 | CATTTGACAGCGTTTGC |
| 198 | HOM6-L-R1(KEX2p)-198 | 95 | CATGTCGAGATACGTGTATCTACTTTTTTTTATTATTCGATTGATG |
| 199 | (KEX2p)KiURA3-F-199 | 96 | GTAGATACACGTATCTCGACATGTTTTATTTTTACTATACATACATAAAAGGTGATTCTGGGTAGAAGATCG |
| 200 | KiURA3-R-200 | 97 | CATCGATAAGCTTGATATCG |
| 201 | (KiURA3)KEX2p-F-201 | 98 | CGATATCAAGCTTATCGATGGTAGATACACGTATCTCGACATG |

TABLE 4-continued

Primers

| No | Oligo Name | SEQ ID NO | Sequence 5' to 3' (include modification codes if applicable) |
|---|---|---|---|
| 202 | KEX2p-R-202 | 99 | CTGATAATGGGTTAGTAGTTTATAATTATG |
| 203 | (KEX2p) HOM6-R-F-203 | 100 | CATAATTATAAACTACTAACCCATTATCAGATGAGCACTAAAGTTGTTAATG |
| 204 | HOM6-R-R-204 | 101 | CACACCAGATATCCTACCAAC |
| 294 | 294pYX212t-R | 102 | TGCCGTAAACCACTAAATCGG |
| N/A | HX-fwd | 130 | GACCTGTTGTTTCTAGAAAAACA |
| N/A | HX-rev | 131 | CTAGCCTAACAACCTCGAGTTA |
| N/A | Gal11-fwd | 132 | GTTGTTtctagaAAAACAATGTCTGCTGCTCCTGTCC |
| N/A | Gal11-rev | 133 | GTTGTTggatccTCAAGTAGCACTTGTCCAATTATT |
| N/A | PDR1-fwd | 134 | GTTGTTTCTAGAAAAACAATGCGAGGCTTGACACCTAA |
| N/A | PDR1-rev | 135 | GTTGTTGGATCCTTAACTATCTGGATAAACGTCGC |
| N/A | PDR2-fwd | 136 | GTTGTTggatccAAAACAATGAAAAGAAGAAGCGATGCT |
| N/A | PDR2-rev | 137 | GTTGTTCTCGAGTTAATTGTCTTTGTAATCATCGAA |

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] WO 2016/144247
[2] Kim S K, Jin Y S, Choi I G, Park Y C, Seo J H. Enhanced tolerance of Saccharomyces cerevisiae to multiple lignocellulose-derived inhibitors through modulation of spermidine contents. Metab Eng. 2015 May; 29:46-55. doi: 10.1016/j.ymben.2015.02.004
[3] Kim S K, Jo J H, Jin Y S, Seo J H. Enhanced ethanol fermentation by engineered Saccharomyces cerevisiae strains with high spermidine contents. Bioprocess Biosyst Eng. 2017 May; 40(5):683-691. doi: 10.1007/s00449-016-1733-3.
[4] Kim S K, Jo J H, Park Y C, Jin Y S, Seo J H. Metabolic engineering of Saccharomyces cerevisiae for production of spermidine under optimal culture conditions. Enzyme Microb Technol. 2017 June; 101:30-35. doi: 10.1016/j.enzmictec.2017.03.008.
[5] Qin J, Zhou Y J, Krivoruchko A, Huang M, Liu L, Khoomrung S, Siewers V, Jiang B, Nielsen J. Nat Commun. 2015 Sep. 8; 6:8224. doi: 10.1038/ncomms9224.
[6] Shao Z, Zhao H, Zhao H. DNA assembler, an in vivo genetic method for rapid construction of biochemical pathways. Nucleic Acids Res. 2009 February; 37(2):e16. doi: 10.1093/nar/gkn991.
[7] Gibson D G, Young L, Chuang R Y, Venter J C, Hutchison C A 3rd, Smith H O. Enzymatic assembly of DNA molecules up to several hundred kilobases. Nat Methods. 2009 May; 6(5):343-5. doi: 10.1038/nmeth.1318.
[8] Gietz R D, Schiestl R H. High-efficiency yeast transformation using the LiAc/SS carrier DNA/PEG method. Nat Protoc. 2007; 2(1):31-4.
[9] Canelas A B, Ten Pierick A, Ras C, Seifar R M, Van Dam J C, Van Gulik W M, Eijnen J J. Quantitative Evaluation of Intracellular Metabolite Extraction Techniques for Yeast Metabolomics. Anal. Chem., 2009. 81, 7379-7389.
[10] Scalcinati G, Knuf C, Partow S, Chen Y, Maury J, Schalk M, Daviet L, Nielsen J, Siewers V. Dynamic control of gene expression in Saccharomyces cerevisiae engineered for the production of plant sesquitepene α-santalene in a fed-batch mode. Metab. Eng., 2012. 14, 91-103.
[11] Mumberg D, Müller R, Funk M. Yeast vectors for the controlled expression of heterologous proteins in different genetic backgrounds. Gene. 1995; 156(1):119-22.
[12] Chen Y, Daviet L, Schalk M, Siewers V, Nielsen J. Establishing a platform cell factory through engineering of yeast acetyl-CoA metabolism. Metab Eng. 2013; 15:48-54. doi: 10.1016/j.ymben.2012.11.002.
[13] Gibson, D. G. et al. Enzymatic assembly of DNA molecules up to several hundred kilobases. Nat. Methods 6, 343-345 (2009).
[14] Schneider, Jens, and Volker F. Wendisch. "Putrescine production by engineered Corynebacterium glutamicum." Applied microbiology and biotechnology 88.4 (2010): 859-868.

The invention claimed is:

1. A microbial cell capable of producing spermidine, wherein said microbial cell is genetically modified for overexpression of S-adenosylmethionine decarboxylase (EC 4.1.1.50) and spermidine synthase (EC 2.5.1.16); and for enhanced S-adenosylmethionine (SAM) biosynthesis by overexpression of at least one enzyme in the methionine salvage pathway selected from a group consisting of 5-methylthioribose-1-phosphate isomerase (MRI) (EC 5.3.1.23), methylthioribulose-1-phosphate dehydratase (MDE) (EC 4.2.1.109), 2,3-dioxomethiopentane-1-phosphate enolase/phosphatase (EC 3.1.3.77), acireductone dioxygenase (EC 1.13.11.54), and branched-chain amino acid transaminase (BAT) (EC 2.6.1.5, EC 2.6.1.57, EC 2.6.1.42), wherein said microbial cell is genetically modified for attenuated activity of ornithine decarboxylase antizyme (OAZ) and ornithine carbamoyltransferase (OTC) (EC 2.1.3.3), or deletion or disruption of a gene encoding OAZ and a gene encoding OTC, wherein the at least one enzyme for enhanced SAM biosynthesis is overexpressed in an amount to produce an increased amount of spermidine compared to a corresponding microbial cell not overexpressing the at least one enzyme.

2. The microbial cell according to claim 1, wherein said microbial cell is genetically modified for overexpression of at least one enzyme selected from a group consisting of ornithine decarboxylase (ODC) (EC 4.1.1.17), N-acetylglutamate synthase (NAGS) (EC 2.3.1.1), acetylglutamate kinase (EC 2.7.2.8), N-acetyl-gamma-glutamyl-phosphate reductase (EC 1.2.1.38), acetylornithine aminotransferase (EC 2.6.1.11), acetylornithine deacetylase (EC 3.5.1.16) and ornithine acetyltransferase (EC 2.3.1.35).

3. The microbial according claim 1, wherein said microbial cell is genetically modified for attenuated activity of L-ornithine transaminase (EC 2.6.1.13) or deletion or disruption of a gene encoding L-ornithine transaminase.

4. The microbial cell according to claim 1, wherein said microbial cell is genetically modified for enhanced S-adenosylmethionine (SAM) biosynthesis by overexpression of S-adenosylmethionine synthetase (MAT) (EC 2.5.1.6).

5. The microbial cell according to claim 1, wherein said microbial cell is genetically modified for enhanced S-adenosylmethionine (SAM) biosynthesis by overexpression of methylenetetrahydrofolate reductase (MTHFR) (EC 1.5.1.20).

6. The microbial cell according to claim 5, wherein said microbial cell is genetically modified for enhanced S-adenosylmethionine (SAM) biosynthesis by overexpression of phosphoribosyldiphosphate (PRPP) 5-amidotransferase (EC 2.4.2.14).

7. The microbial cell according to claim 1, wherein said microbial cell is genetically modified for enhanced conversion of L-aspartate-4-semialdehyde to methionine.

8. The microbial cell according to claim 7, wherein said microbial cell is genetically modified for enhanced conversion of L-aspartate-4-semialdehyde to methionine by overexpression of at least one enzyme selected from a group consisting of homoserine dehydrogenase [EC 1.1.1.3]; homoserine O-acetyltransferase [EC 2.3.1.31]; O-acetylhomoserine (thiol)-lyase [EC 2.5.1.49], also referred to as O-acetylhomoserine aminocarboxypropyltransferase; and 5-methyltetrahydropteroyltriglutamate-homocysteine S-methyltransferase (METE) [EC 2.1.1.14].

9. The microbial cell according to claim 1, wherein said microbial cell is genetically modified for enhanced conversion of pyruvate to L-aspartate-4-semialdehyde.

10. The microbial cell according to claim 9, wherein said microbial cell is genetically modified for enhanced conversion of pyruvate to L-aspartate-4-semialdehyde by overexpression of at least one enzyme selected from a group consisting of pyruvate carboxylase (EC 6.4.1.1), aspartate aminotransferase (EC 2.6.1.1), aspartate kinase (AK) (EC 2.7.2.4) and aspartic beta semialdehyde dehydrogenase (EC 1.2.1.11).

11. The microbial cell according to claim 1, wherein said microbial cell is genetically modified for overexpression of subunits of the RNA Polymerase II mediator complex.

12. The microbial cell according to claim 1, wherein said microbial cell is genetically modified for enhanced spermine biosynthesis by overexpression of spermine synthase (EC 2.5.1.22).

13. The microbial cell according to claim 1, wherein said microbial cell is genetically modified for overexpression of *Saccharomyces cerevisiae* PDR1 (SEQ ID NO: 30) and/or PDR2 (SEQ ID NO: 129).

14. The microbial cell according to claim 1, wherein said microbial cell is genetically modified for enhanced SAM biosynthesis by overexpression of methylthioadenosine phosphorylase (MTAP) (EC 2.4.2.28) and BAT.

15. The microbial cell according to claim 1, wherein said microbial cell produces at least about 100 mg spermidine per liter of culture medium.

16. The microbial cell according to claim 1, wherein said microbial cell is genetically modified for overexpression of methylthioadenosine phosphorylase (MTAP) (EC 2.4.2.28).

17. The microbial cell according to claim 1, wherein said microbial cell is genetically modified for overexpression of mitochondrial amino acid transporter (AGC1), mitochondrial ornithine importer (ORT1), and NADP+-dependent glutamate dehydrogenase.

18. The microbial cell according to claim 1, wherein said microbial cell is genetically modified for expression or overexpression argA (SEQ ID NO: 103 or SEQ ID NO:104), argB (SEQ ID NO:105 or SEQ ID NO:106), argC (SEQ ID NO:107 or SEQ ID NO:108), argD (SEQ ID NO: 109 or SEQ ID NO:110), and argJ/argE (SEQ ID NO:111 or SEQ ID NO:112).

19. The microbial cell according to claim 1, wherein said microbial cell is genetically modified for overexpression of *Saccharomyces cerevisiae* GAL11 (SEQ ID NO: 31).

20. A method for producing spermidine comprising:
    culturing a microbial cell according to claim 1 in a culture medium and in culture conditions suitable for production of spermidine from said microbial cell; and
    collecting spermidine from said culture medium and/or said microbial cell.

21. A food additive comprising the microbial cell of claim 1.

22. A microbial cell capable of producing spermidine,
    wherein said microbial cell is genetically modified for overexpression of S-adenosylmethionine decarboxylase (EC 4.1.1.50) and spermidine synthase (EC 2.5.1.16);
    wherein said microbial cell is genetically modified for enhanced S-adenosylmethionine (SAM) biosynthesis by overexpression of at least one enzyme in the methionine salvage pathway selected from a group consisting of methylthioadenosine phosphorylase (MTAP) (EC 2.4.2.28) and branched-chain amino acid transaminase (BAT) (EC 2.6.1.5, EC 2.6.1.57, EC 2.6.1.42),
    wherein said microbial cell is genetically modified for attenuated activity of ornithine decarboxylase antizyme (OAZ), or deletion or disruption of a gene encoding OAZ, and
    wherein said microbial cell is genetically modified for overexpression of ornithine decarboxylase (ODC) (EC 4.1.1.17).

* * * * *

UNITED STATES PATENT AND TRADEMARK OFFICE
CERTIFICATE OF CORRECTION

PATENT NO. : 12,435,348 B2
APPLICATION NO. : 16/629643
DATED : October 7, 2025
INVENTOR(S) : Qin et al.

Page 1 of 2

It is certified that error appears in the above-identified patent and that said Letters Patent is hereby corrected as shown below:

In the Specification

Column 3, Line 2: Please correct "H2 S:" to read --H2S:--

Column 3, Line 25: Please correct "(HOME)" to read --(HOM6)--

Column 4, Lines 24-25: Please correct "*S. cerevisiae* Overexpression" to read --*S. cerevisiae* GAL11. Overexpression--

Column 8, Line 14: Please correct "TP1" to read --TPI--

Column 18, Lines 13-14: Please correct "α-semialdehyde" to read --γ-semialdehyde--

Column 22, Line 50: Please correct "HOME" to read --HOM6--

Column 25, Line 47: Please correct "HOME" to read --HOM6--

Column 27, Line 3: Please correct "example, METS" to read --example, MET3--

Column 27, Line 4: Please correct "METS, MET10" to read --MET5, MET10--

Column 30, Line 57: Please correct "PUCE" to read --PUC6--

Column 31, Line 53: Please correct "DH5a" to read --DH5α--

Column 34, Line 8: Please correct "(K1URA3)" to read --(KlURA3)--

Column 34, Line 14: Please correct "K1URA3" to read --KlURA3--

Signed and Sealed this
Third Day of February, 2026

John A. Squires
*Director of the United States Patent and Trademark Office*

CERTIFICATE OF CORRECTION (continued)
U.S. Pat. No. 12,435,348 B2

Column 34, Lines 15-16: Please correct "K1URA3-KEX2p" to read --KlURA3-KEX2p--

Column 34, Line 19: Please correct "-K1URA3-" to read -- -KlURA3- --

Column 34, Line 29: Please correct "K1URA3" to read --KlURA3--

Column 35, Line 60: Please correct "G04" to read --GO4--

Column 36, Line 51: Please correct "Sph1" to read --SphI--

Column 37, Line 51: Please correct "$FeSO_4 \cdot 7H_2$," to read --$FeSO_4 \cdot 7H_2O$,--